(12) United States Patent
Mahanti et al.

(10) Patent No.: US 11,823,154 B2
(45) Date of Patent: Nov. 21, 2023

(54) CONTEXT-BASED COMMUNICATION REQUESTS

(71) Applicant: Block, Inc., San Francisco, CA (US)

(72) Inventors: Arjun Mahanti, Brooklyn, NY (US); Matthew T. Kursmark, Brooklyn, NY (US); Brian Stegall, Fox Point, WI (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/730,996

(22) Filed: Apr. 27, 2022

(65) Prior Publication Data
US 2022/0358476 A1 Nov. 10, 2022

Related U.S. Application Data

(63) Continuation of application No. 17/039,405, filed on Sep. 30, 2020, now Pat. No. 11,341,473.

(51) Int. Cl.
*G06Q 20/20* (2012.01)

(52) U.S. Cl.
CPC ......... *G06Q 20/202* (2013.01); *G06Q 20/204* (2013.01); *G06Q 20/209* (2013.01)

(58) Field of Classification Search
CPC ... G06Q 20/202; G06Q 20/204; G06Q 20/209
See application file for complete search history.

(56) References Cited

U.S. PATENT DOCUMENTS

| 5,148,154 A | 9/1992 | Mackay et al. |
| D403,313 S | 12/1998 | Peppel |
| 5,980,089 A | 11/1999 | Weis |
| D595,731 S | 7/2009 | Vu et al. |
| D598,929 S | 8/2009 | Bhat et al. |
| 7,606,734 B2 | 10/2009 | Baig et al. |
| D617,335 S | 6/2010 | Ehrler et al. |
| 8,606,703 B1 | 12/2013 | Dorsey et al. |
| D710,869 S | 8/2014 | Davis et al. |
| D718,777 S | 12/2014 | Hobbs et al. |
| D718,778 S | 12/2014 | Hobbs et al. |
| D719,964 S | 12/2014 | Hobbs et al. |

(Continued)

FOREIGN PATENT DOCUMENTS

| WO | 2012/094301 A1 | 7/2012 |
| WO | 2018/063474 A1 | 4/2018 |
| WO | 2018/200193 A1 | 11/2018 |

OTHER PUBLICATIONS https://www.youtube.com/watch?v=plARrn1DlWc, Silverware, (Year: 2013).*

(Continued)

*Primary Examiner* — A. Hunter Wilder
*Assistant Examiner* — Joseph M Mutschler
(74) *Attorney, Agent, or Firm* — Lee & Hayes, P.C.

(57) ABSTRACT

This disclosure describes, in part, techniques for enabling merchant devices to interoperate with one another in a more robust manner, such that overall operation and efficiency within a merchant establishment is improved. For instance, the techniques described herein may enable the intelligent routing of requests between devices within the merchant establishment based on real-time locations of the devices, which devices are associated with which orders, and the like.

20 Claims, 82 Drawing Sheets

(56) References Cited

U.S. PATENT DOCUMENTS

| | | |
|---|---|---|
| 9,230,292 B2 | 1/2016 | Amin et al. |
| D760,772 S | 7/2016 | Winther et al. |
| D772,272 S | 11/2016 | Lee et al. |
| D788,128 S | 5/2017 | Wada |
| 9,881,288 B1 | 1/2018 | Bell et al. |
| D823,337 S | 7/2018 | Shelksohn |
| 10,168,860 B1 | 1/2019 | Bell et al. |
| 10,467,559 B1 | 11/2019 | Svenson et al. |
| 10,528,945 B1 | 1/2020 | Renke et al. |
| D881,909 S | 4/2020 | Domm et al. |
| D884,725 S | 5/2020 | Mizutani et al. |
| D886,848 S | 6/2020 | Weick et al. |
| 10,943,311 B1 | 3/2021 | Svenson et al. |
| D921,675 S | 6/2021 | Kmak et al. |
| 11,348,190 B2 | 5/2022 | Brock et al. |
| D966,310 S | 10/2022 | Kmak et al. |
| D971,931 S | 12/2022 | Deng et al. |
| D971,942 S | 12/2022 | Desantis et al. |
| D973,676 S | 12/2022 | Knowles et al. |
| D975,721 S | 1/2023 | Arima |
| D976,265 S | 1/2023 | Lu et al. |
| D976,928 S | 1/2023 | Boufarhat et al. |
| D979,584 S | 2/2023 | Dalonzo et al. |
| D980,255 S | 3/2023 | Prasad |
| D982,605 S | 4/2023 | Klahm et al. |
| 2003/0174823 A1 | 9/2003 | Justice et al. |
| 2005/0004843 A1 | 1/2005 | Heflin |
| 2006/0235755 A1 | 10/2006 | Mueller et al. |
| 2007/0018041 A1 | 1/2007 | Butler et al. |
| 2007/0136110 A1 | 6/2007 | Presley et al. |
| 2008/0319864 A1 | 12/2008 | Leet |
| 2009/0240624 A1 | 9/2009 | James et al. |
| 2009/0271283 A1 | 10/2009 | Fosnacht et al. |
| 2011/0029359 A1 | 2/2011 | Roeding et al. |
| 2013/0159928 A1 | 6/2013 | Joynes et al. |
| 2014/0006182 A1 | 1/2014 | Wilson |
| 2014/0156431 A1 | 6/2014 | Morgan et al. |
| 2014/0257926 A1 | 9/2014 | Rasband |
| 2014/0372300 A1 | 12/2014 | Blythe |
| 2015/0032567 A1 | 1/2015 | Bhatia |
| 2015/0046297 A1 | 2/2015 | Bahrami et al. |
| 2015/0081478 A1 | 3/2015 | Bahrami et al. |
| 2015/0169034 A1 | 6/2015 | Huang et al. |
| 2016/0171584 A1 | 6/2016 | Cao |
| 2016/0247113 A1 | 8/2016 | Rademaker |
| 2016/0259517 A1* | 9/2016 | Butcher ............ G06F 3/04847 |
| 2016/0353235 A1 | 12/2016 | Williams et al. |
| 2017/0018041 A1 | 1/2017 | Fox |
| 2017/0109843 A1* | 4/2017 | Berg ..................... G06Q 50/12 |
| 2017/0161851 A1 | 6/2017 | Li et al. |
| 2017/0339336 A1 | 11/2017 | Daliyot |
| 2018/0039397 A1 | 2/2018 | Medvedev |
| 2018/0089658 A1 | 3/2018 | Bell et al. |
| 2018/0249861 A1 | 9/2018 | Hiatt et al. |
| 2018/0268220 A1 | 9/2018 | Lee et al. |
| 2018/0271322 A1 | 9/2018 | Thai et al. |
| 2018/0330346 A1 | 11/2018 | Grassadonia et al. |
| 2018/0364887 A1* | 12/2018 | Bell .................... G06F 3/04817 |
| 2018/0365663 A1 | 12/2018 | Bell et al. |
| 2019/0118838 A1 | 4/2019 | Lequio et al. |
| 2019/0197599 A1 | 6/2019 | Zia et al. |
| 2019/0228463 A1 | 7/2019 | Chan et al. |
| 2019/0377476 A1 | 12/2019 | Wong et al. |
| 2020/0065404 A1 | 2/2020 | Reina et al. |
| 2020/0160463 A1 | 5/2020 | He |
| 2020/0342668 A1 | 10/2020 | Chojnacka et al. |
| 2020/0356910 A1 | 11/2020 | Nguyen et al. |
| 2020/0357083 A1 | 11/2020 | Wallace |
| 2020/0364810 A1 | 11/2020 | Carter et al. |
| 2021/0096704 A1 | 4/2021 | Ericsson et al. |
| 2021/0097515 A1 | 4/2021 | Jenkins et al. |
| 2022/0051206 A1 | 2/2022 | Bell et al. |
| 2022/0091726 A1 | 3/2022 | Azmoon et al. |
| 2022/0101292 A1 | 3/2022 | Mahanti et al. |
| 2022/0101294 A1 | 3/2022 | Mahanti et al. |
| 2022/0101410 A1 | 3/2022 | Mahanti et al. |

OTHER PUBLICATIONS https://www.youtube.com/watch?v=plARrn1DIWc, Silverware (Year: 2013).*

Anonymous, "Silverware-We got you covered," dated Aug. 5, 2020, Retrieved from the Internet URL:https://web.archive.org/web/20200805094909/https://www.silverwarepos.conn/features/Silverwarepos.com , on Aug. 27, 2021, pp. 1-15.

Brill, Rachel, "Resy is Using Machine Learning to Help Restaurants Turn Tables More Efficiently." Foodable Network, (Jun. 15, 2018), pp. 1-4.

Bandoim, "Artificial Intelligence Takes Over Restaurant Reservations", Forbes.com dated Apr. 27, 2019, Retrieved from the Internet:https://www.forbes.com/sites/lanabandoim/2019/04/27/artificial-intelligence-takes-over-restaurant-reservations/?sh=393c05567aea on Mar. 24, 2022, pp. 1-4.

Dziurzanski et al., "Integrated Process Planning and Scheduling in Commercial Smart Kitchens", Arxiv.org, Cornell University Library, 201 OLIN Library Cornell University Ithaca, NY14853, Oct. 8, 2019 , pp. 1-6.

Robertson, Adi, "Microsoft Layout lets HoloLens users design a floor plan with holographic furniture" TheVerge.com (Year: 2018), 1 page.

Sarmah, Harshajit, "5 AI-Powered Home And Interior Designing Tools" AnalyticsIndiaMag.com (Year: 2019), 14 pages.

* cited by examiner

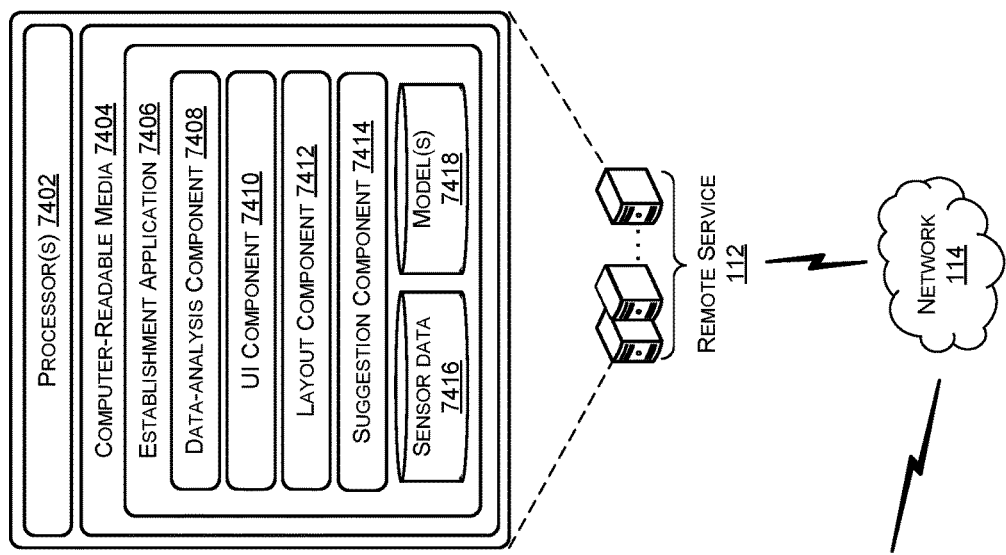
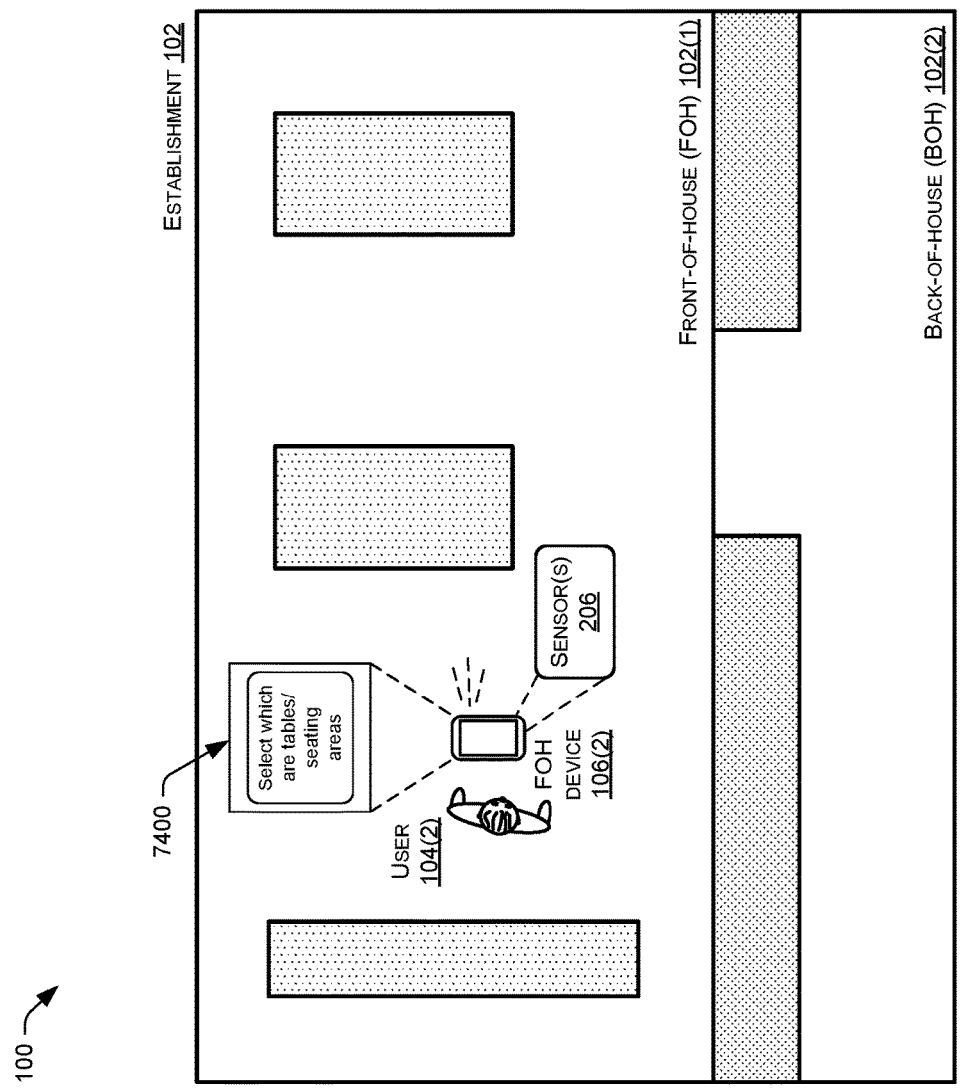
FIG. 74

CONTEXT-BASED COMMUNICATION REQUESTS

PRIORITY

This application is a continuation of, and claims priority to, U.S. patent application Ser. No. 17/038,405, filed on Sep. 30, 2020, which is fully incorporated by reference herein in its entirety.

TECHNICAL FIELD

More and more merchants are utilizing electronic devices and associated computing applications to aid in the operation of their respective businesses. For instance, retail establishments often use point-of-sale (POS) devices for processing payments, updating and accessing inventory levels, and/or the like. Restaurant establishments may also equip their servers and other staff with mobile POS devices for ordering items on behalf of customers, scheduling preparation of the items, and so forth. As use of these devices increases, so too do merchant desires for more intelligent applications executing on the devices.

BRIEF DESCRIPTION OF THE DRAWINGS

Features of the present disclosure, its nature and various advantages, will be more apparent upon consideration of the following detailed description, taken in conjunction with the accompanying drawings.

FIG. 7 also illustrates that an operator of the BOH device selects to view details regarding a first displayed order.

FIG. 13 illustrates another example UI that a BOH device associated with a preparation station may display prior to the selection at the expeditor station shown in FIG. 12. As illustrated, this UI may prioritize preparation of different orders in the establishment.

FIG. 14 illustrates another example UI that the BOH device of FIG. 13 may display after the selection at the expeditor station shown in FIG. 12. As illustrated, this UI includes an indication that the expeditor has requested that the preparation station begin preparing a certain item.

FIG. 16 illustrates another example UI that a BOH device may display. Here, the UI presents various kitchen-performance metrics.

Additionally, a second FOH device is near a second location that is associated with a second order and, thus, presents a request or suggestion that a server of the second FOH device perform a second, different action associated with the second order.

Figure 24:
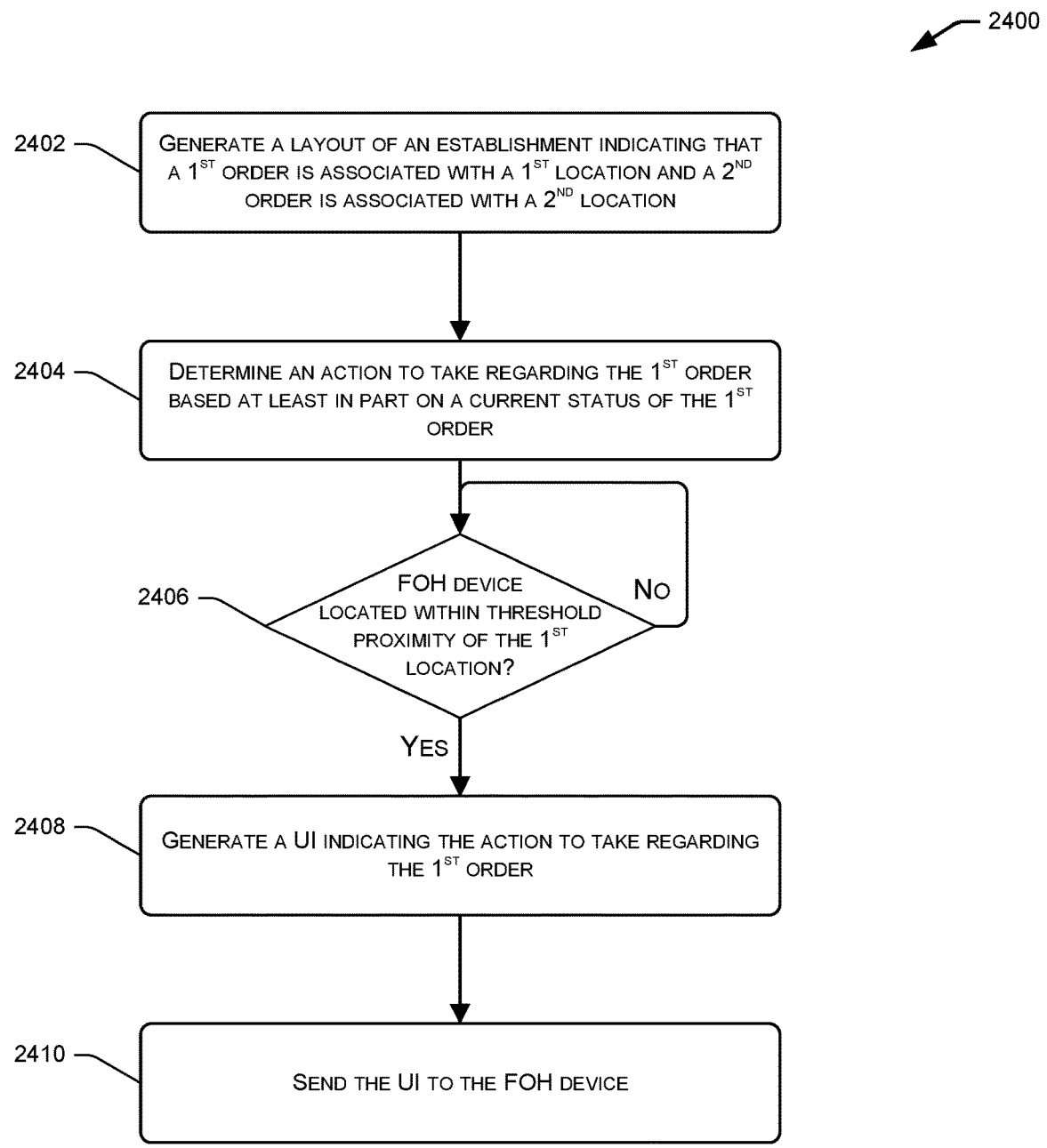

FIG. 24 illustrates a flow diagram of an example process for determining that a particular FOH device is within a threshold proximity of a first location and, in response, sending a UI to the FOH device requesting or suggesting a particular action associated with the first location.

Figure 25:
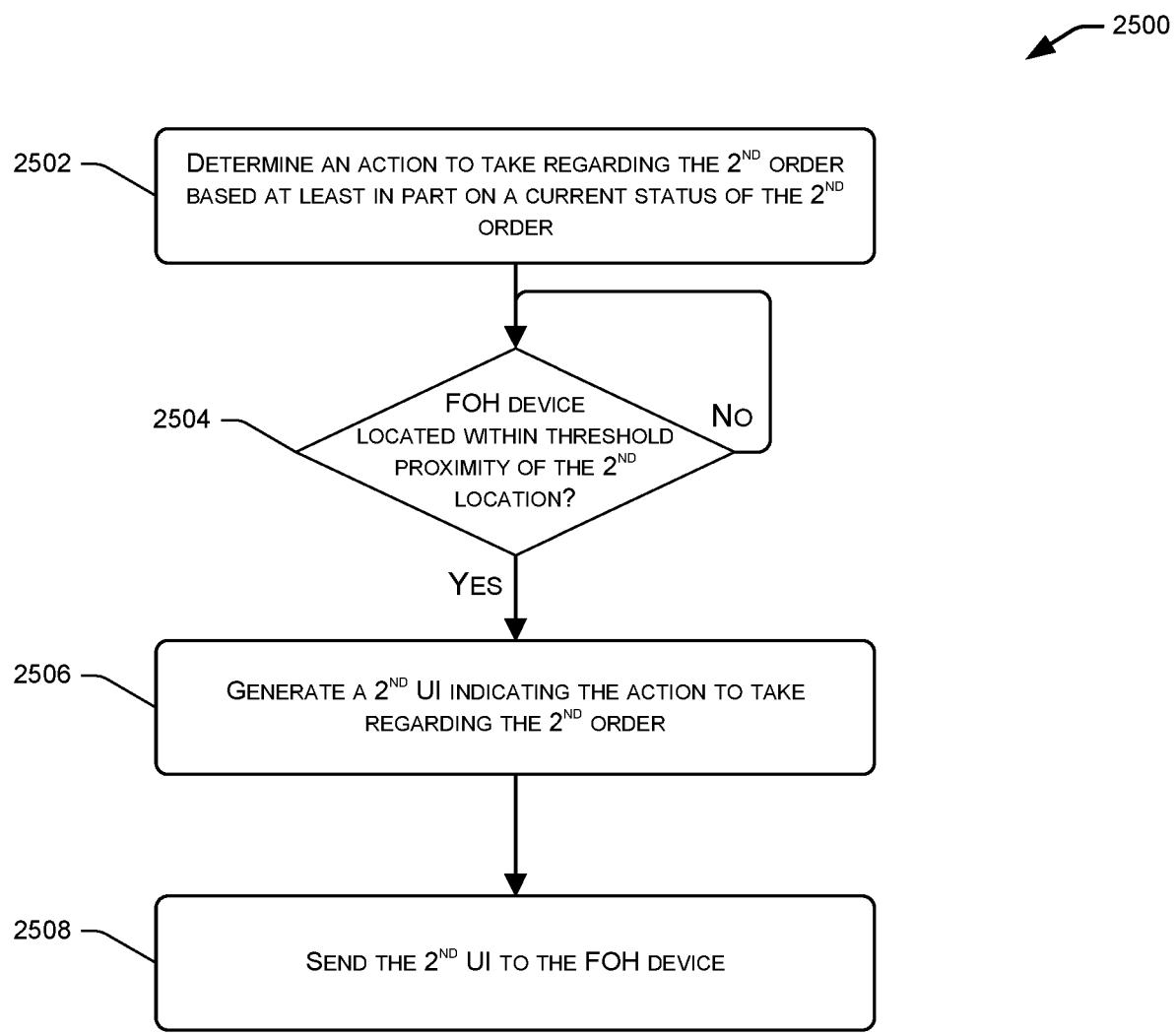

FIG. 25 illustrates a flow diagram of another example process for determining that the FOH device is within a threshold proximity of a second location and, in response, sending a second UI to the FOH device requesting or suggesting a particular action associated with the second location.

Figure 26:
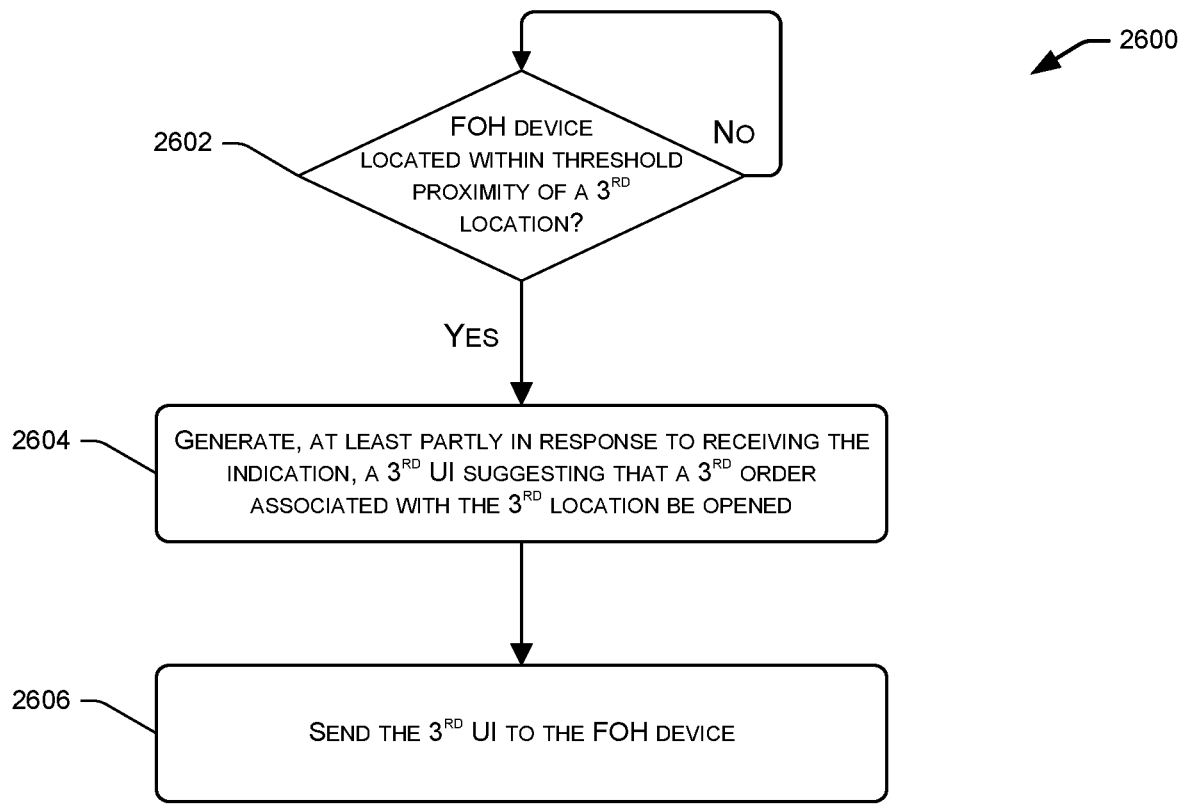

FIG. 26 illustrates a flow diagram of another example process for determining that the FOH device is within a threshold proximity of a third location and, in response, sending a third UI to the FOH device requesting or suggesting a particular action associated with the third location.

Figure 27:
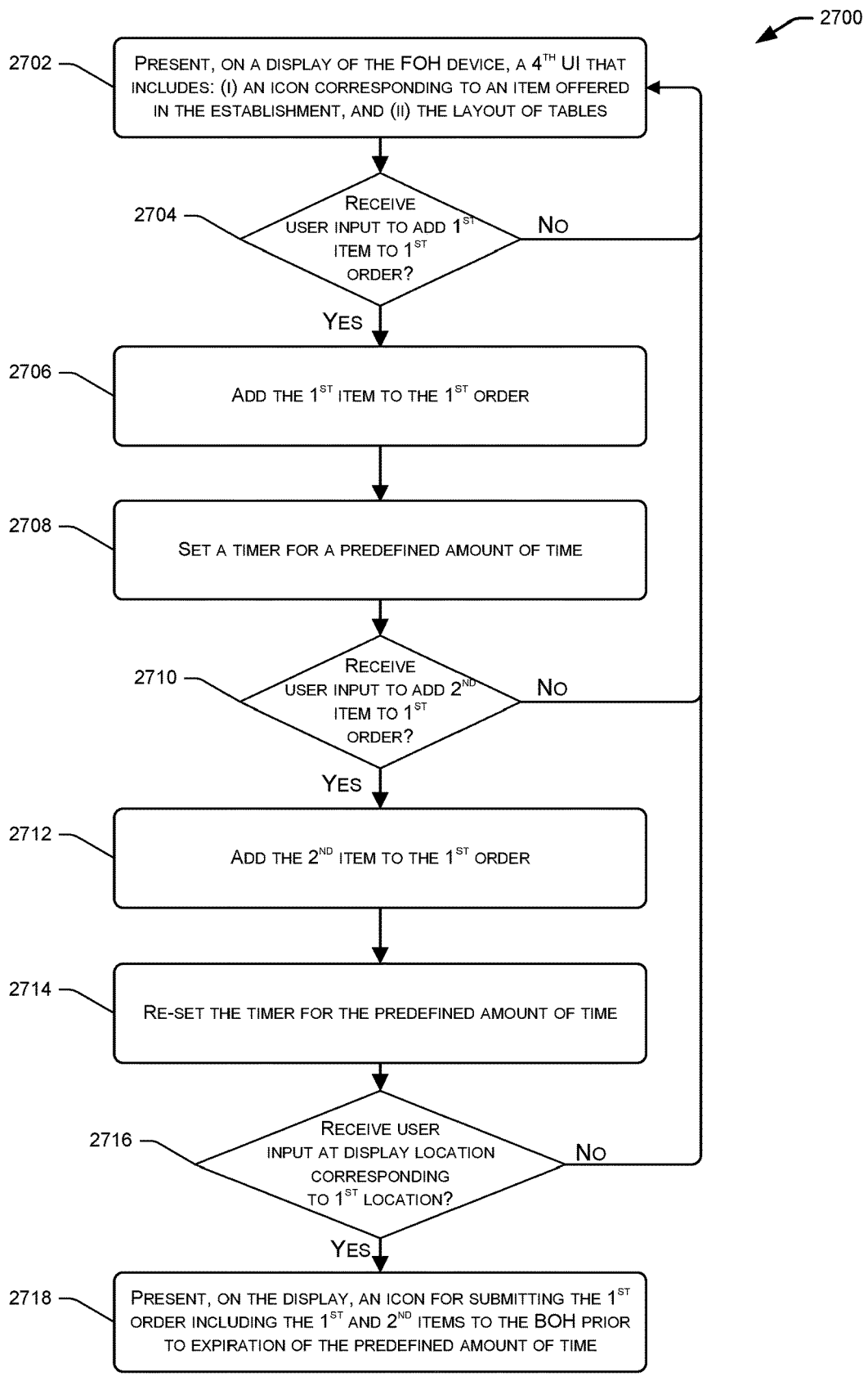

FIG. 27 illustrates a flow diagram of another example process for enabling an operator of a FOH device to add items to an order.

Figure 28:
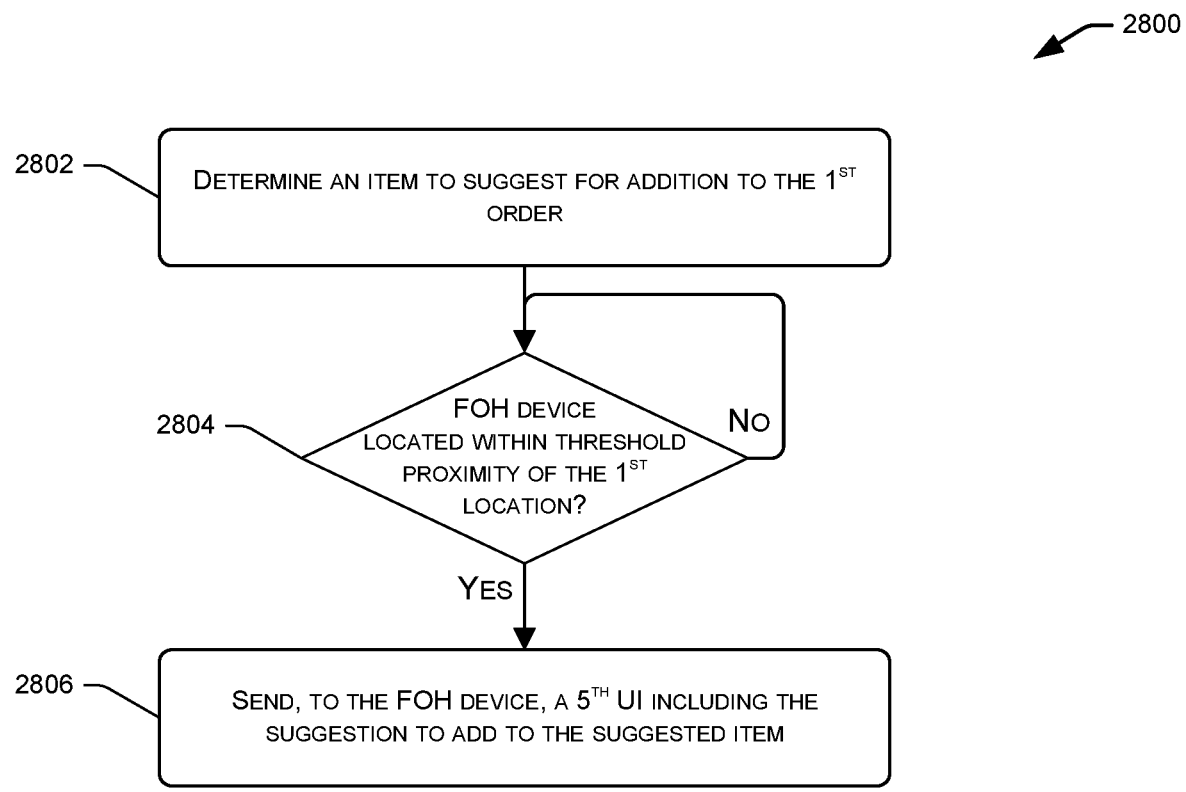

FIG. 28 illustrates a flow diagram of another example process for determining an item to suggest for addition to a first order and presenting the suggestion on an FOH device in response to the FOH being within a threshold proximity of a first location associated with the first order.

Figure 29:
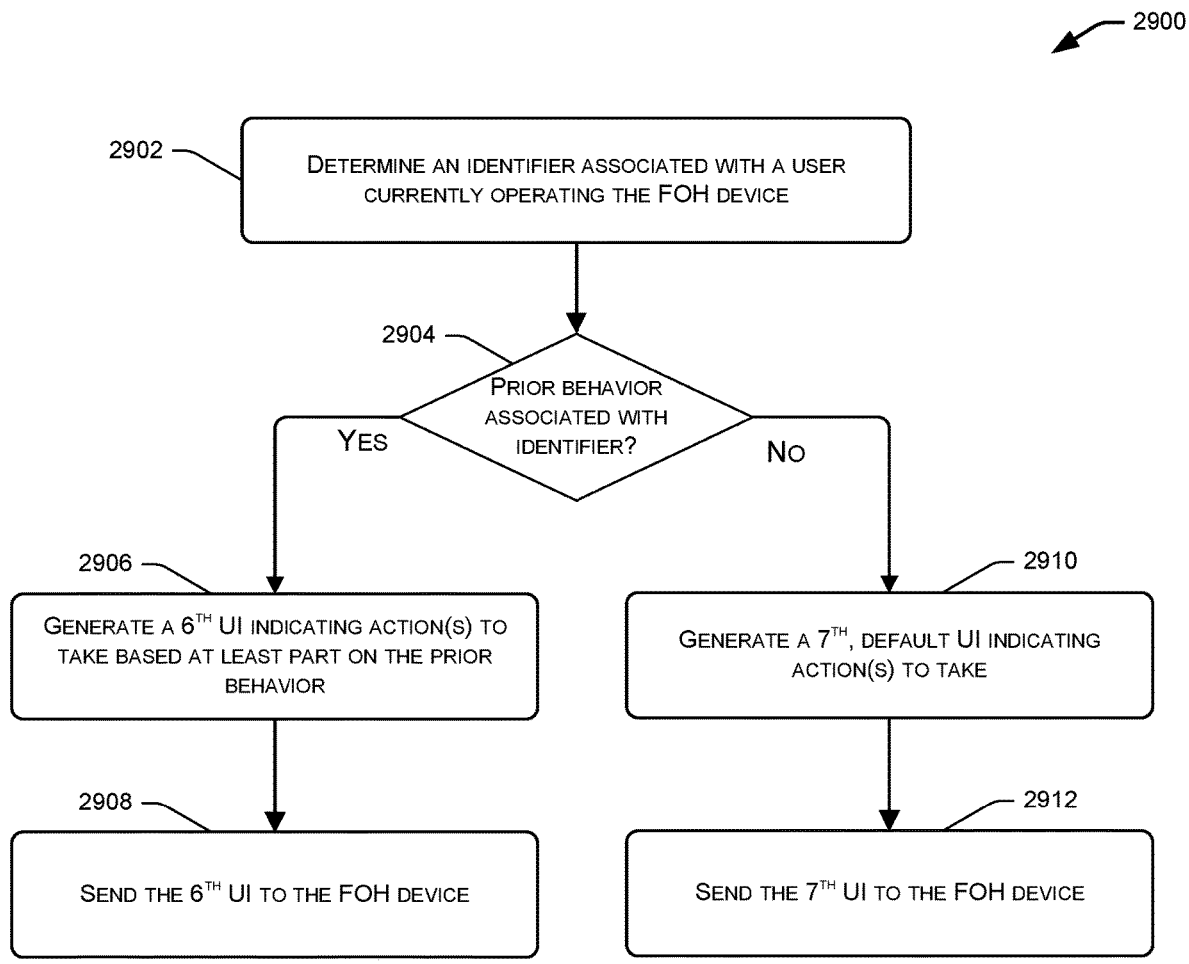

FIG. 29 illustrates a flow diagram of another example process for determining the identity of an operator of an FOH device, determining whether the identity is associated with prior behavior and, if so, presenting a UI that includes a sequence of actions that have been customized to the operator based on the prior behavior.

Figure 30:
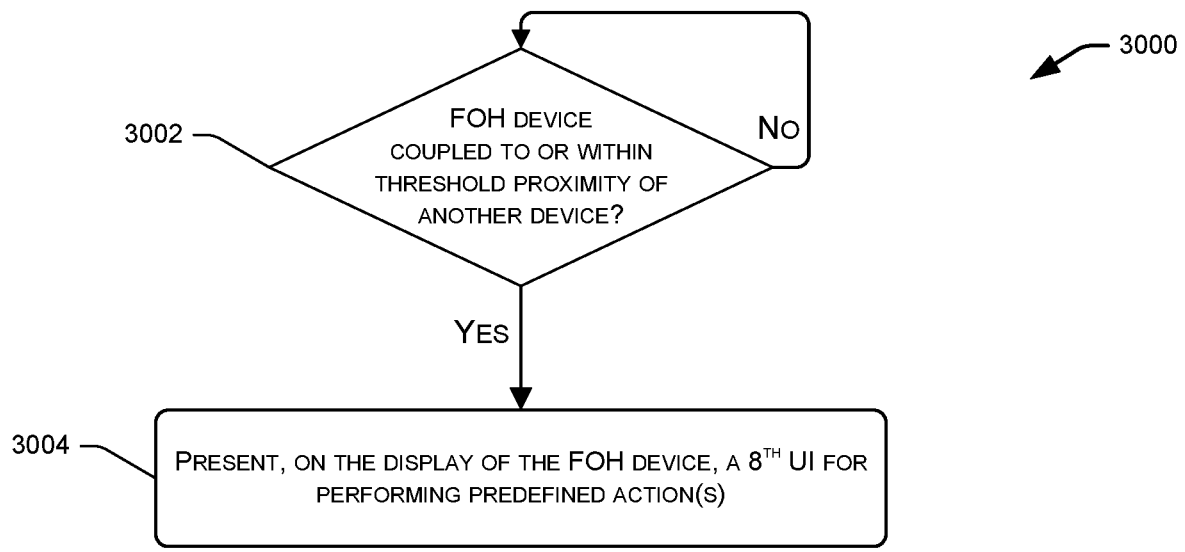

FIG. 30 illustrates a flow diagram of another example process for determining if an FOH device is physically coupled to, or within a threshold proximity of, another device and, if so, presenting a UI indicating a sequence of actions to perform.

Figure 31:
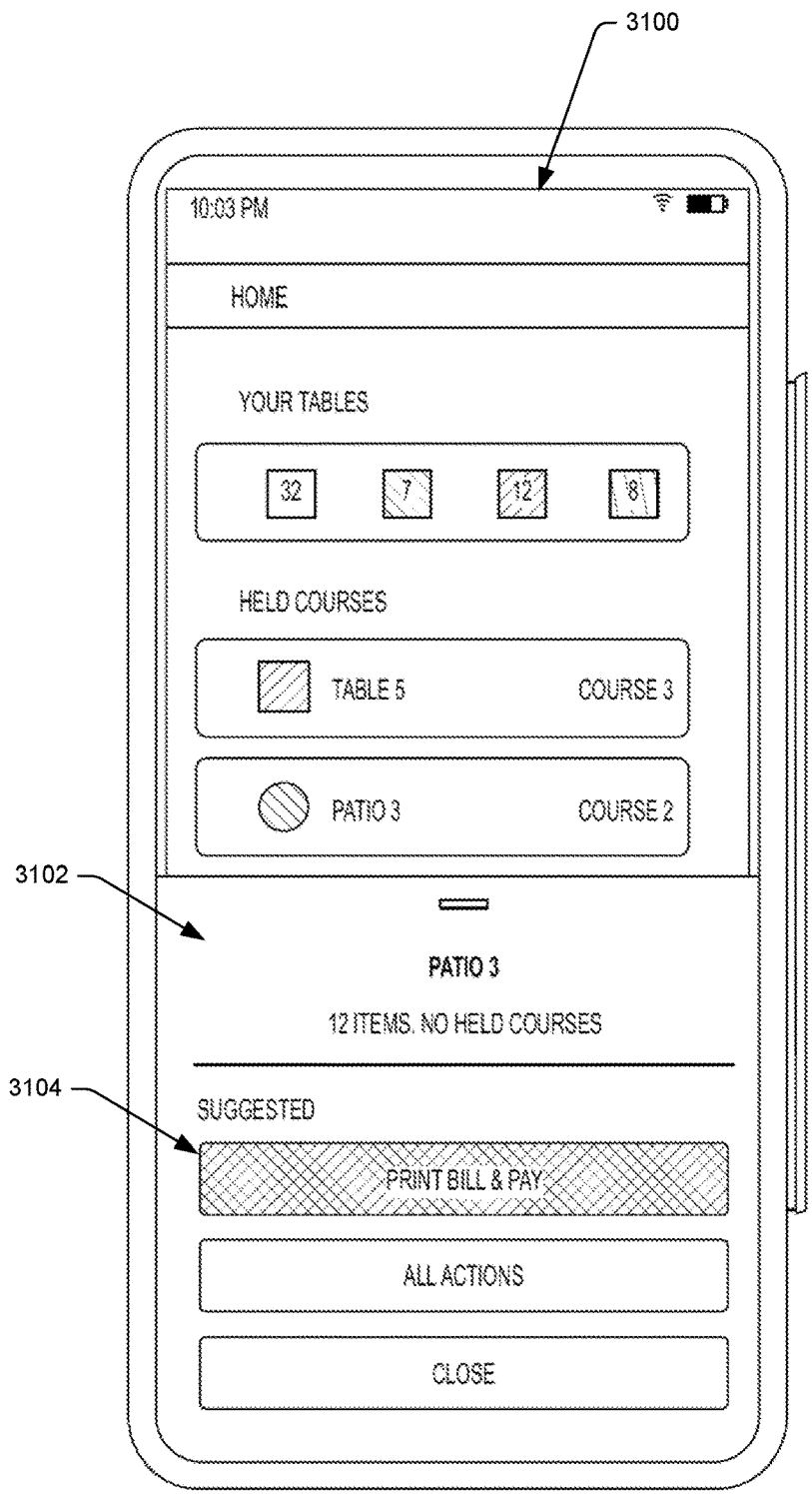

FIG. 31 illustrates an example UI that an FOH device may present in response to being located with a threshold proximity of a particular location in an establishment. As illustrated, this UI suggests that an operator of the FOH device print a bill for customer(s) located near the particular location.

Figure 32:
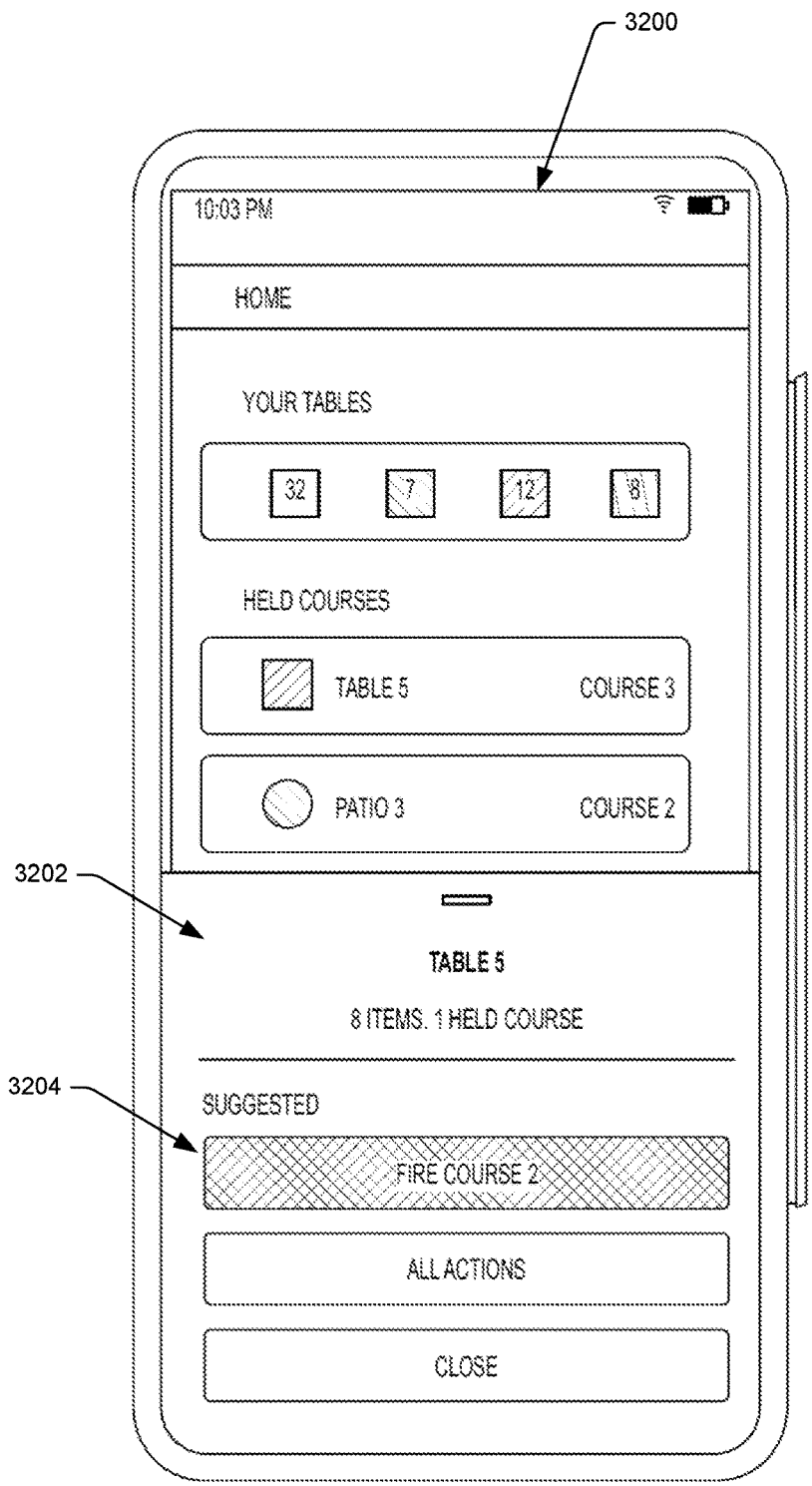

FIG. 32 illustrates another example UI that an FOH device may present in response to being located with a threshold proximity of a particular location in an establishment. As illustrated, this UI suggests that an operator of the FOH device request to fire a course ordered by customer(s) located near the particular location.

Figure 33:
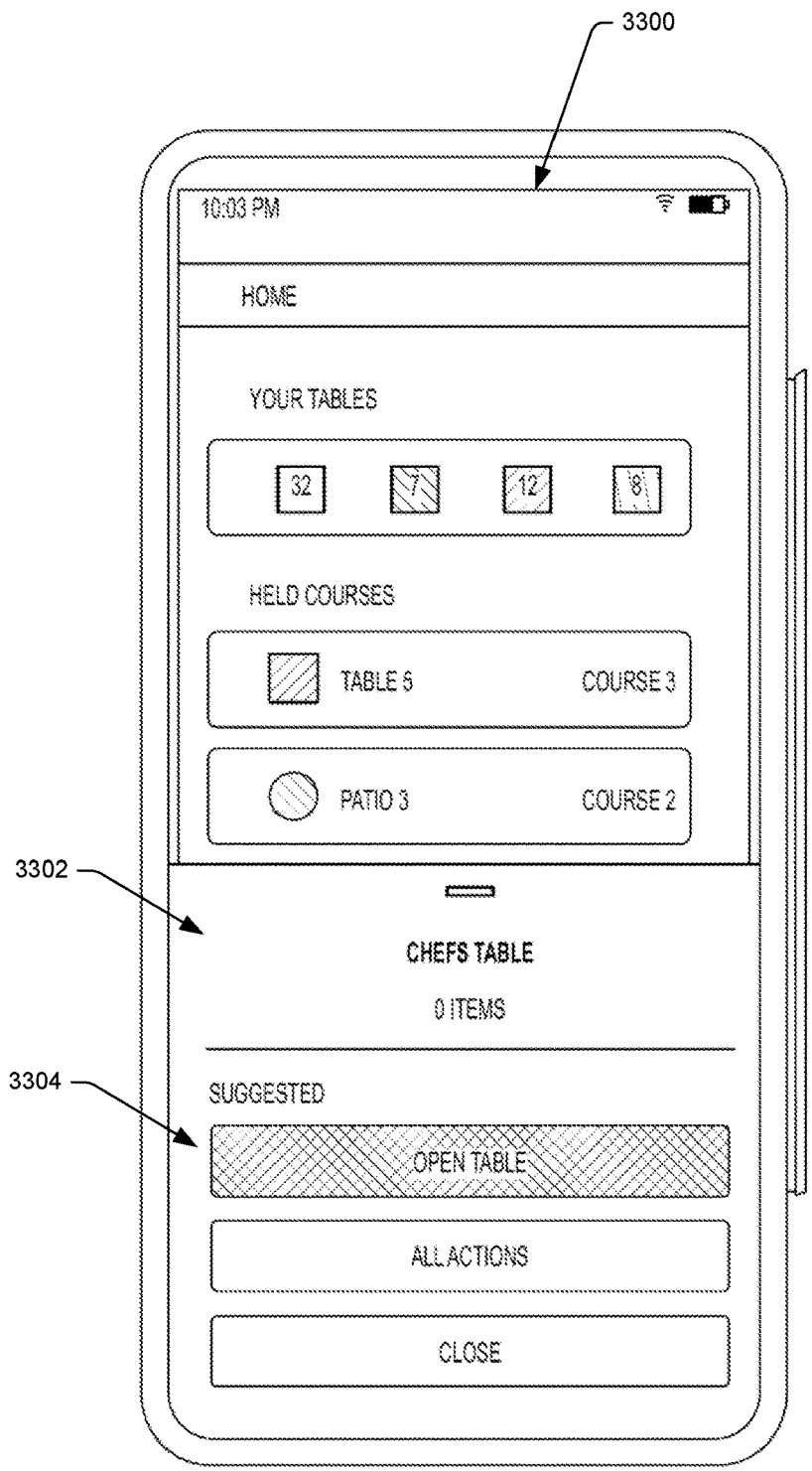

FIG. 33 illustrates another example UI that an FOH device may present in response to being located with a threshold proximity of a particular location in an establishment. As illustrated, this UI suggests that an operator of the FOH device request to open a table or order for associated with the particular location, given that the table is not currently associated with an open order.

Figure 34:
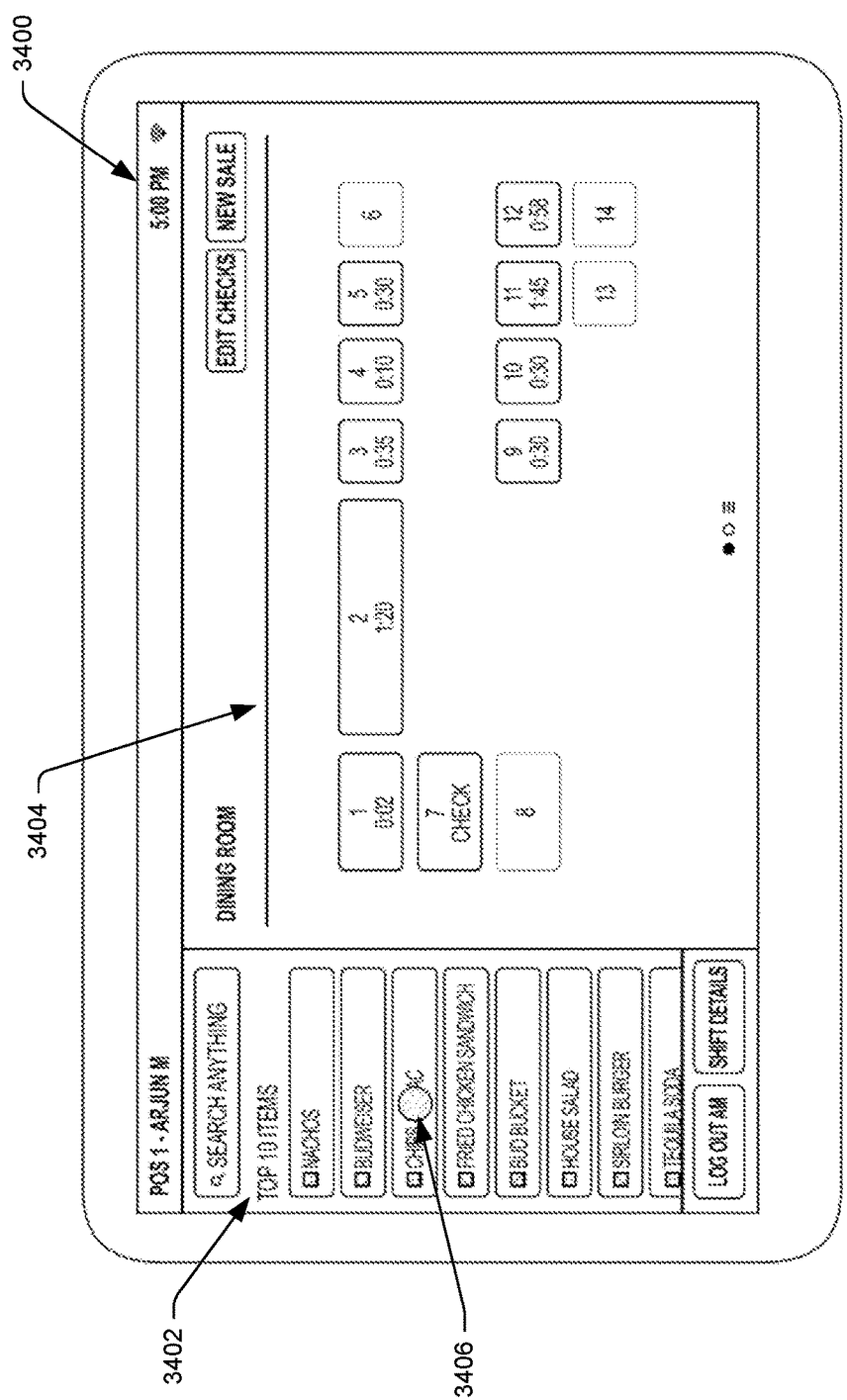

FIG. 34 illustrates another example UI that an FOH device may present. As illustrated, this UI illustrates items available to be ordered and a layout of the establishment. Using this UI, an operator of the FOH device may add an item to an order associated with a particular table or seating area by dragging an icon associated with the icon to an icon associated with the table or seating area.

Figure 35:
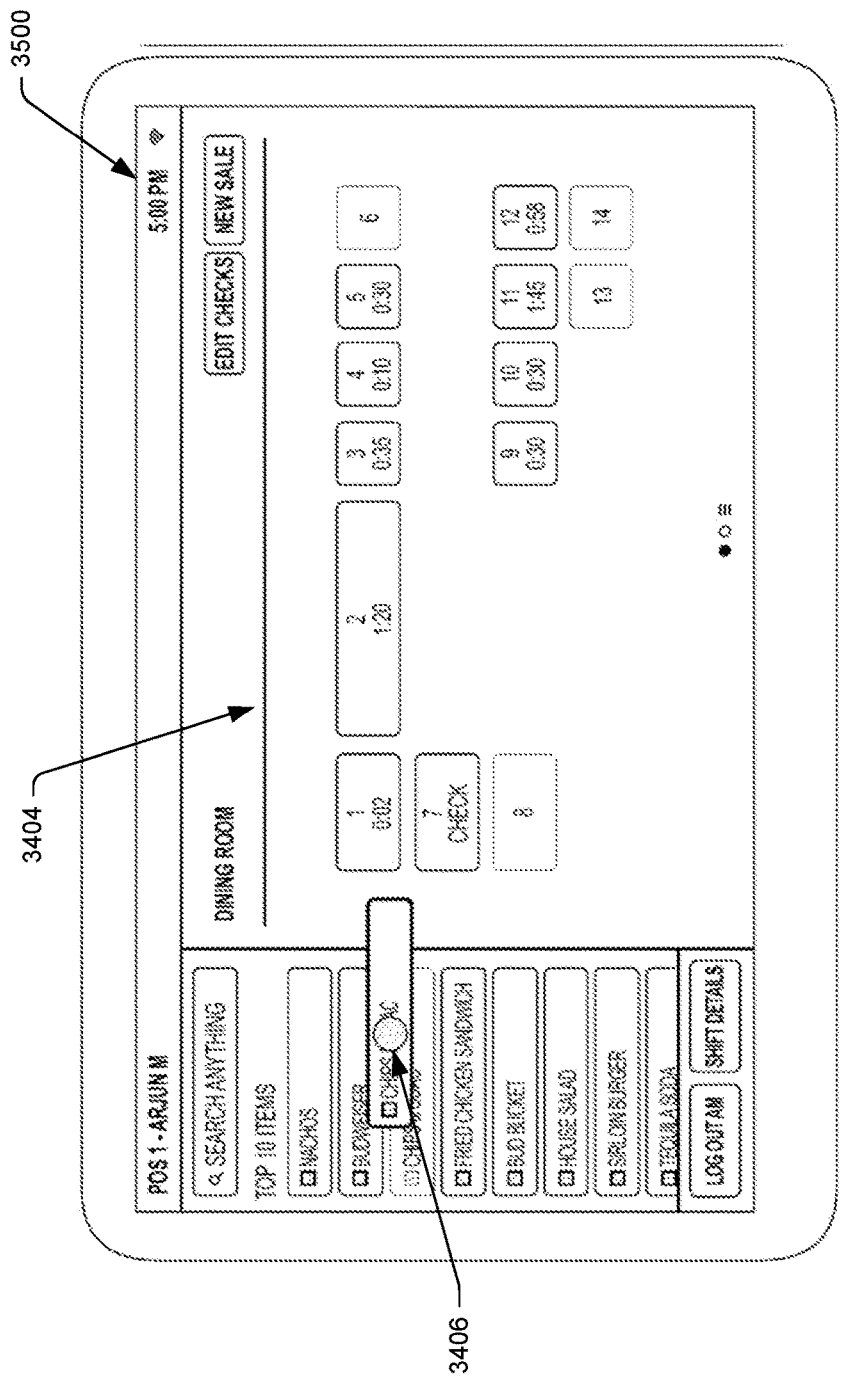

FIG. 35 illustrates another example UI that the FOH of FIG. 34 may present as the operator drags the icon associated with the item towards an icon associated with a table or seating area.

Figure 36:
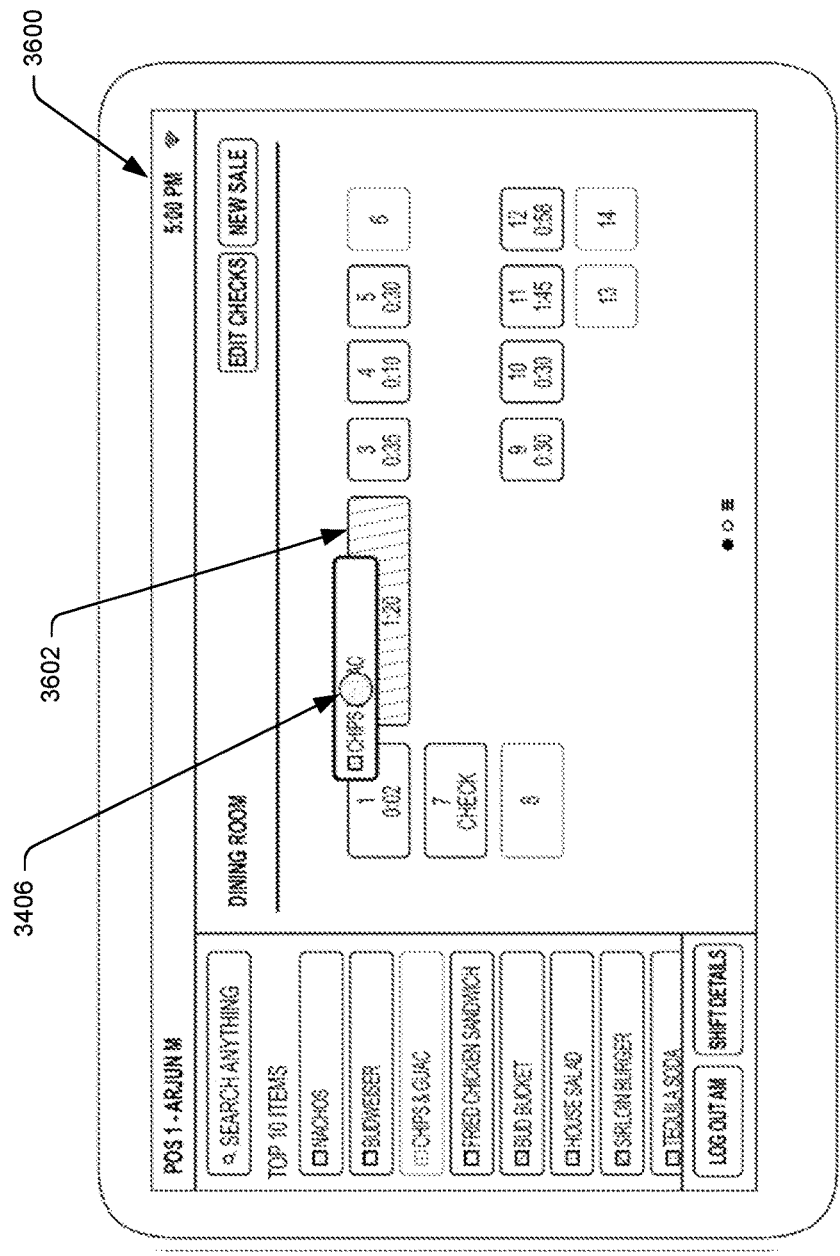

FIG. 36 illustrates another example UI that the FOH of FIG. 34 may present just before the operator "drops" the icon associated with the item on an icon associated with a table or seating area.

Figure 37:
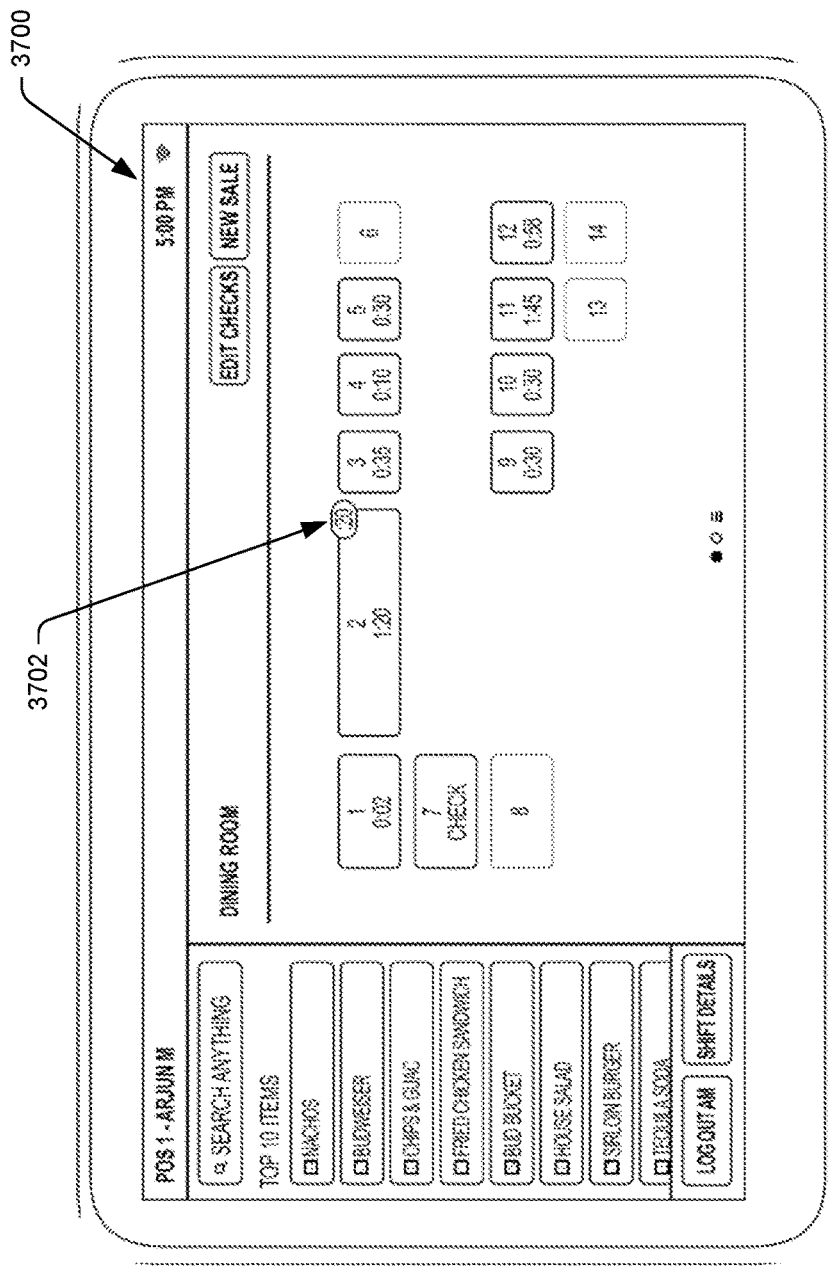

FIG. 37 illustrates another example UI that the FOH of FIG. 34 may present after the UI of FIG. 36. Here, the item ("Chips and Guac") has been added to an order associated with table 2. In addition, the UI presents a timer that is set for a predefined amount of time, after expiration of which the FOH device may send the order to a BOH device in the establishment for preparation of the order.

Figure 38:
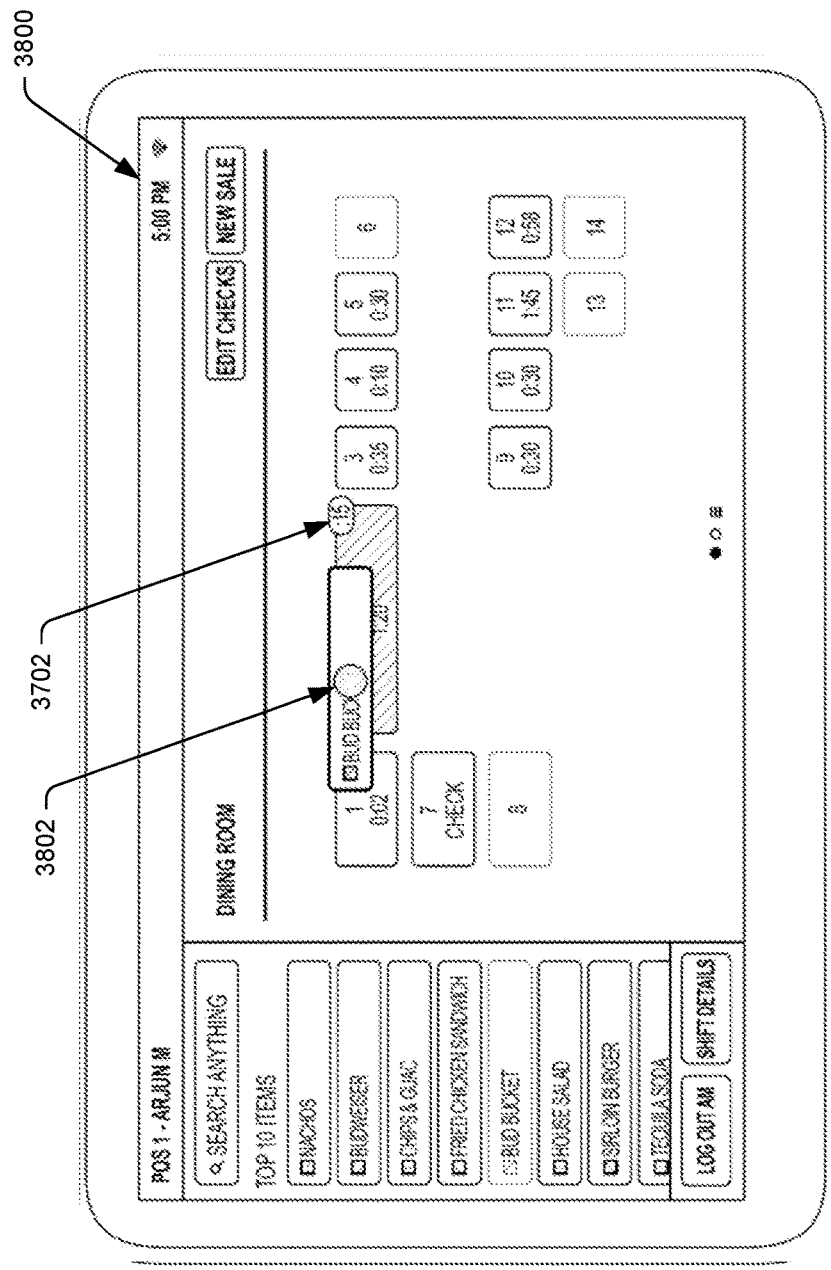

FIG. 38 illustrates another example UI that the FOH of FIG. 34 may present, showing that an operator of the FOH device has added another item to table 2.

Figure 39:
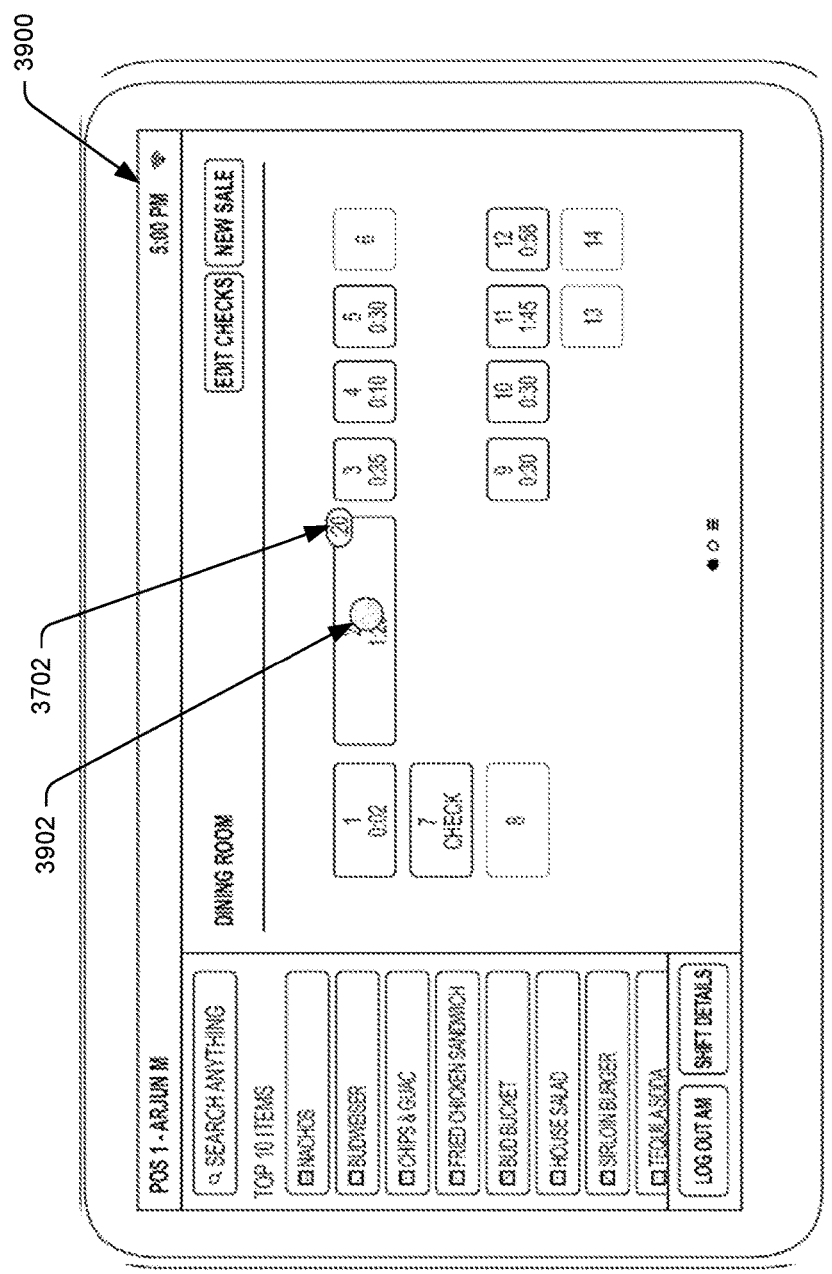

FIG. 39 illustrates another example UI that the FOH device of FIG. 34 may present after the operator has added the second item. Here, the item ("Bud Bucket") has been added to the order and the timer has been re-set in response to the second item being added to the order.

Figure 40:
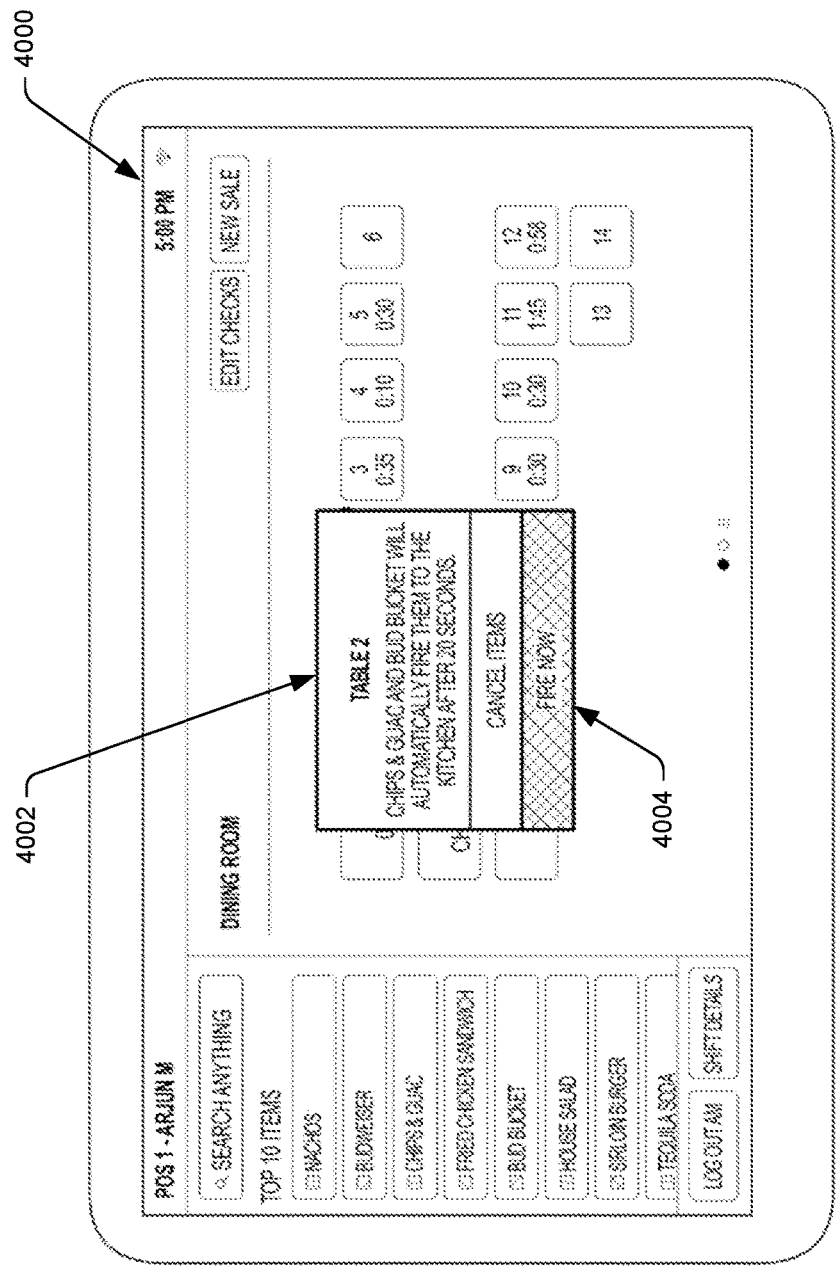

FIG. 40 illustrates another example UI that the FOH device of FIG. 34 may present after the operator of the FOH device has selected the icon associated with table 2. Here, the UI includes an operation to send to the order to the BOH device for preparation of the order prior to expiration of the timer.

Figure 41:
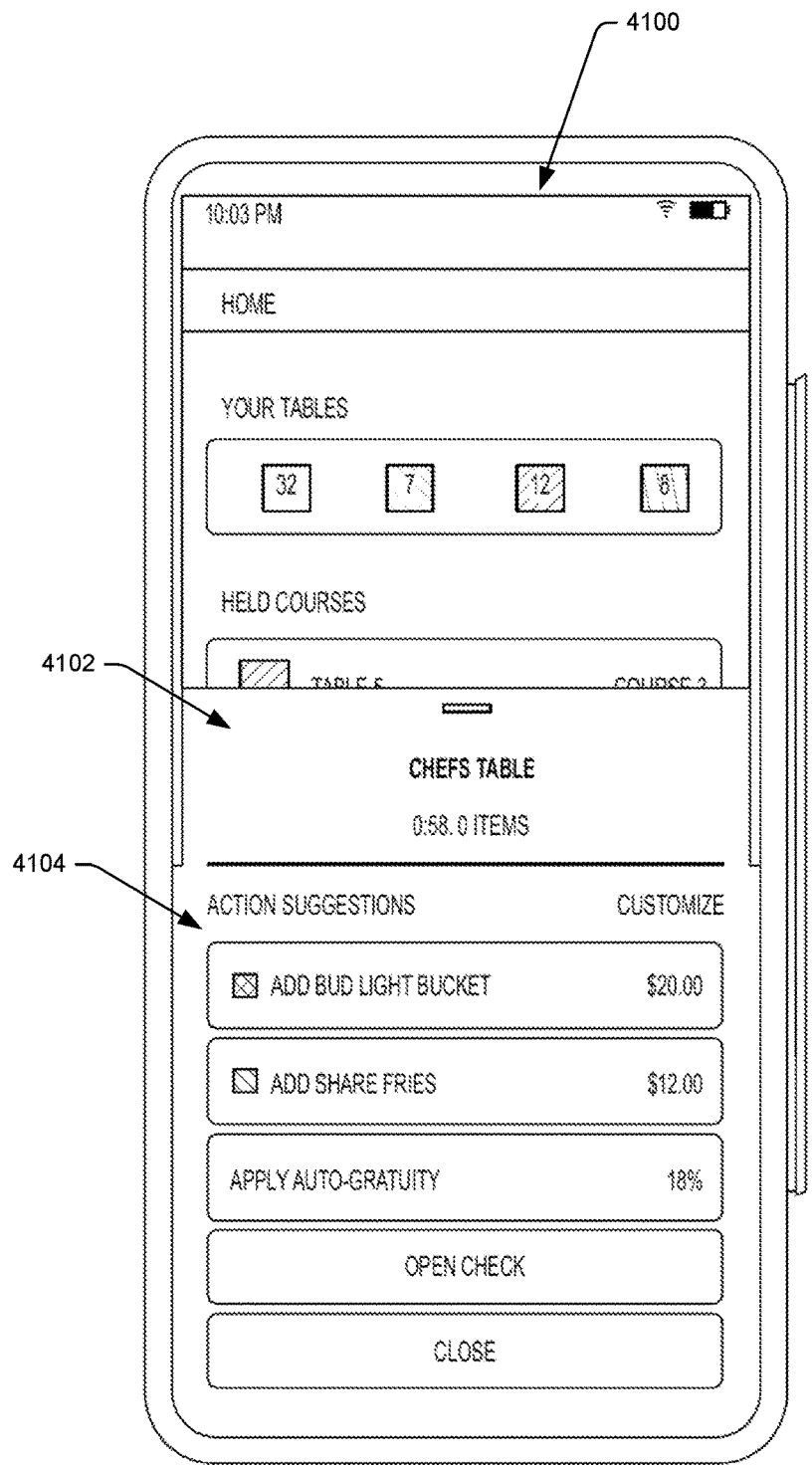

FIG. 41 illustrates another example UI that an FOH device may present. Here, the UI includes suggested items or actions, which may be presented in response to the FOH device being within a threshold proximity of a particular location in the establishment.

Figure 42:
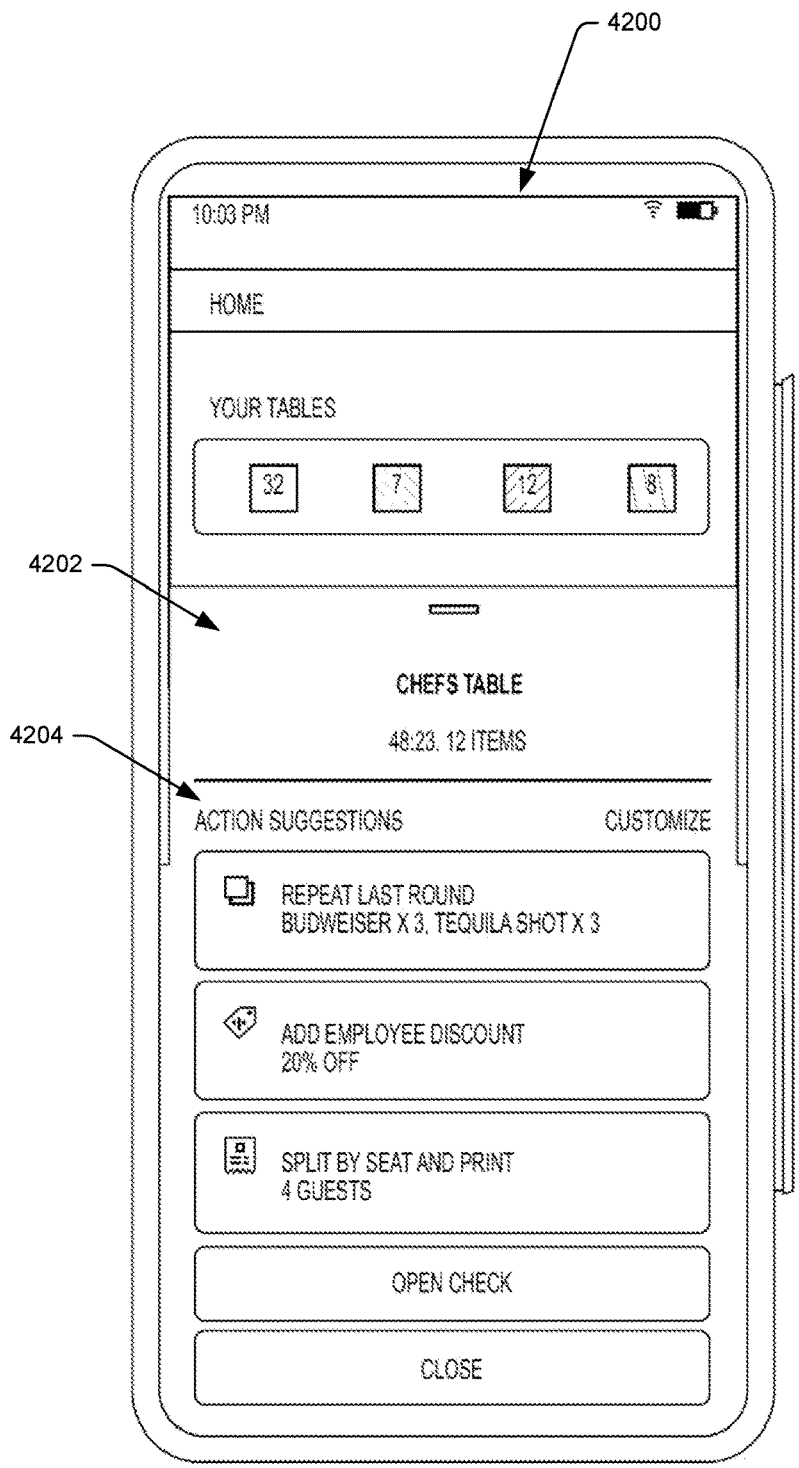

FIG. 42 illustrates another example UI that an FOH device may present. Here, the UI includes different suggested items or actions, which may be presented in response to the FOH device being within a threshold proximity of a particular location in the establishment.

Figure 43:
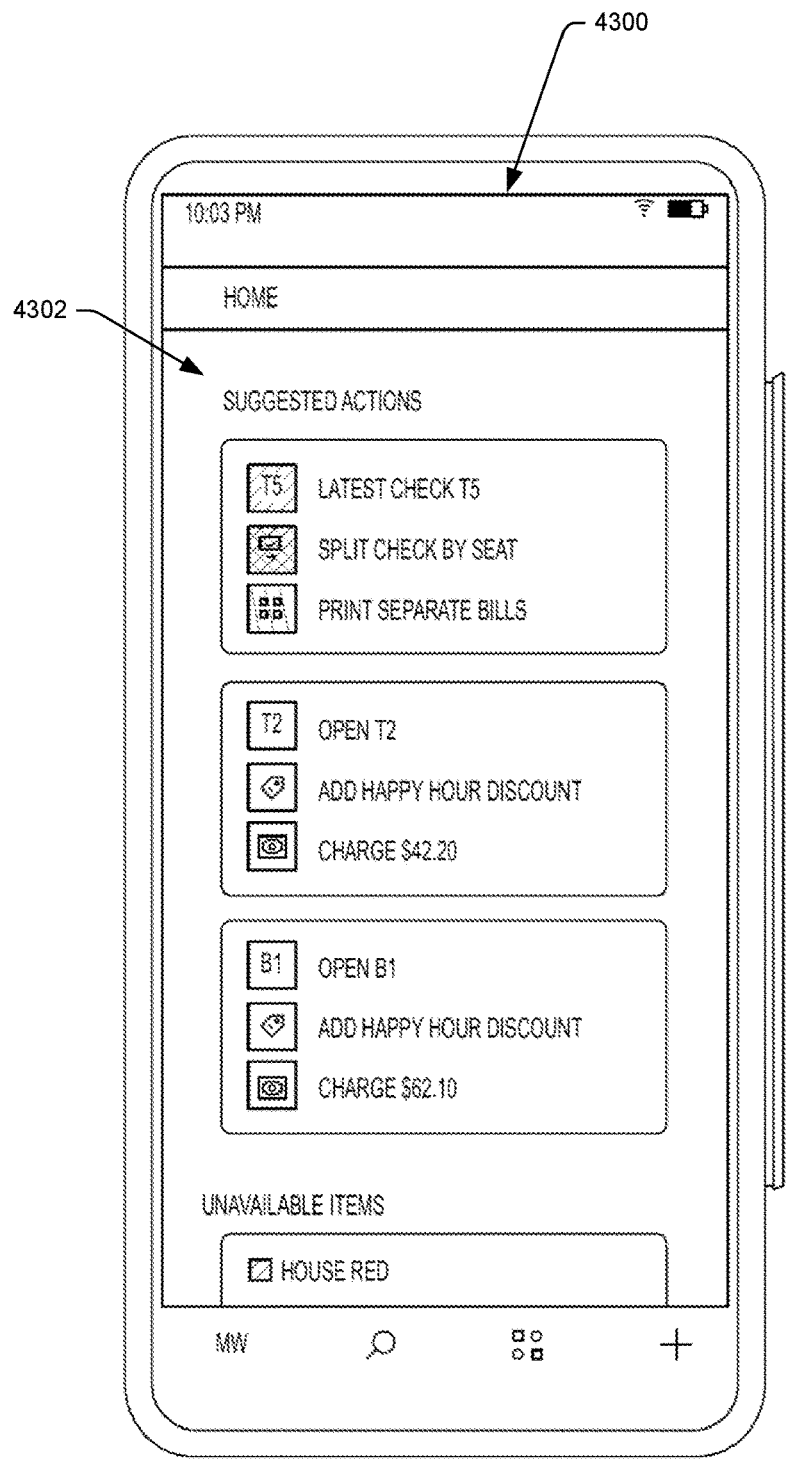

FIG. 43 illustrates another example UI that an FOH device may present. Here, the UI includes different actions that the operator may perform.

Figure 44:
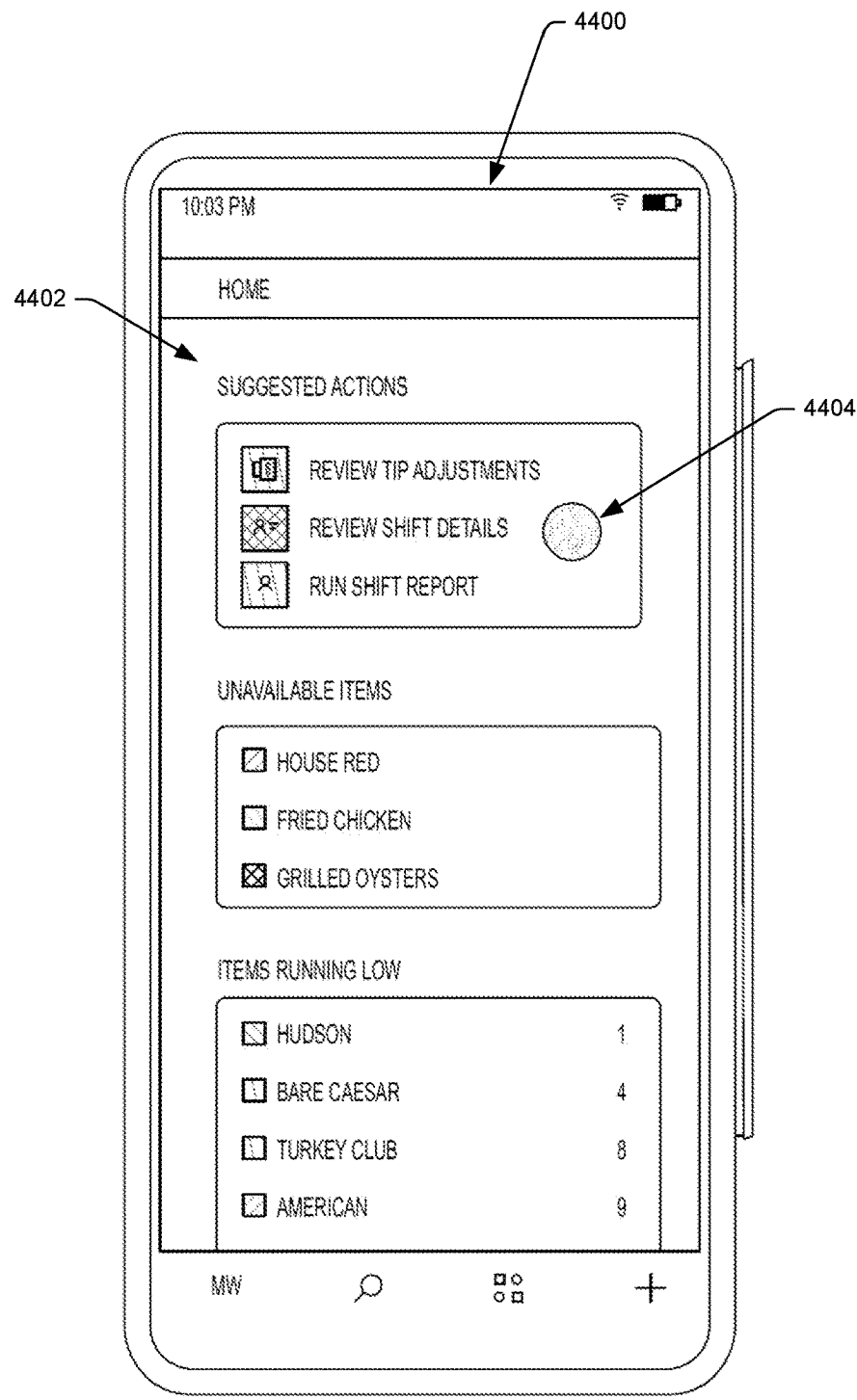

FIG. 44 illustrates another example UI that an FOH device of FIG. 41 may present. Here, the operator of the FOH device requests to perform the suggested actions, which may be customized based on prior behavior of the current operator of the FOH device.

Figure 45:
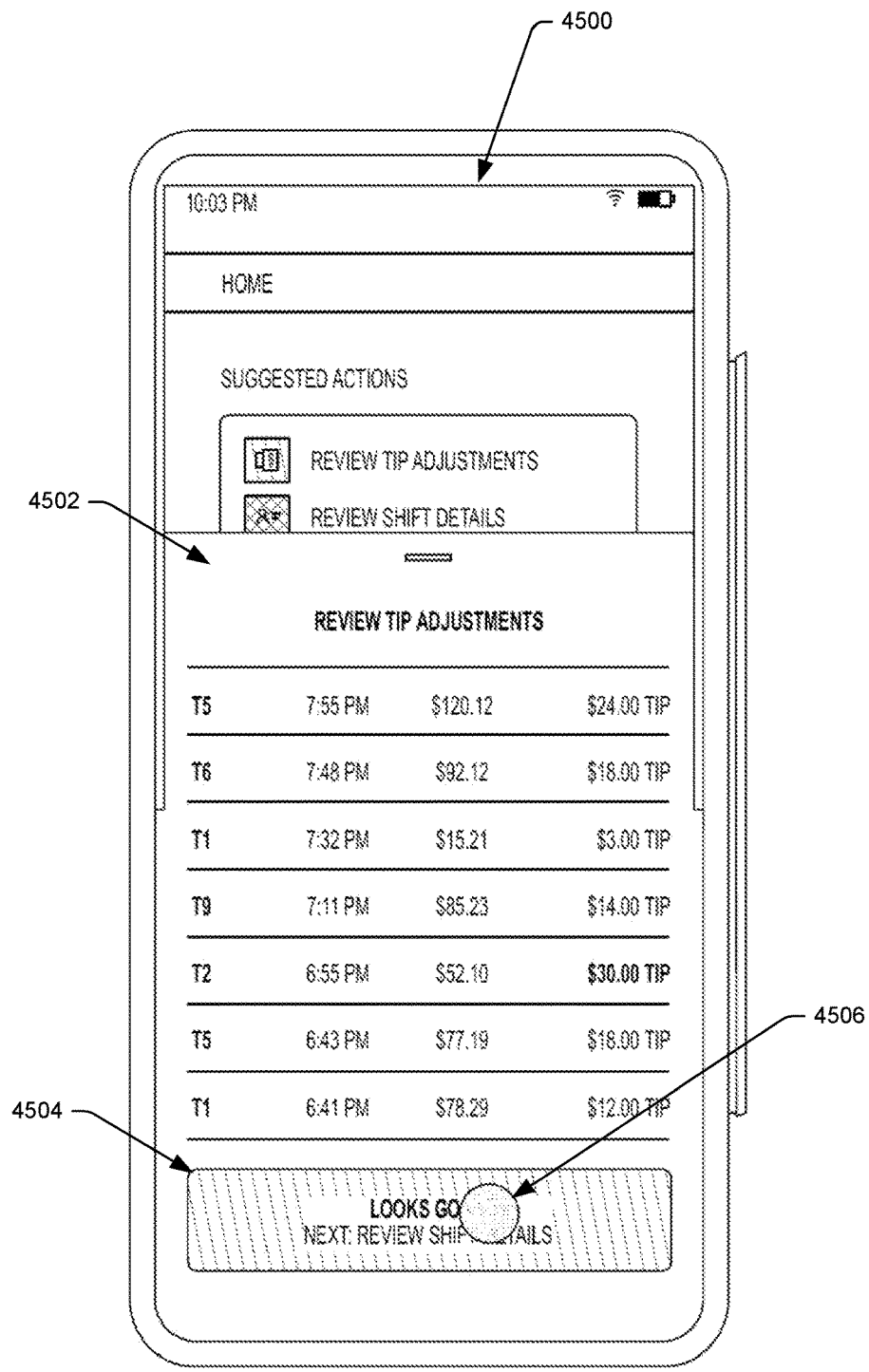

FIG. 45 illustrates another example UI that the FOH device of FIG. 44 may present after the selection shown in FIG. 44. Here, the UI illustrates details regarding tips received by the operator of the FOH device and an icon for viewing details regarding the shift of the operator.

Figure 46:
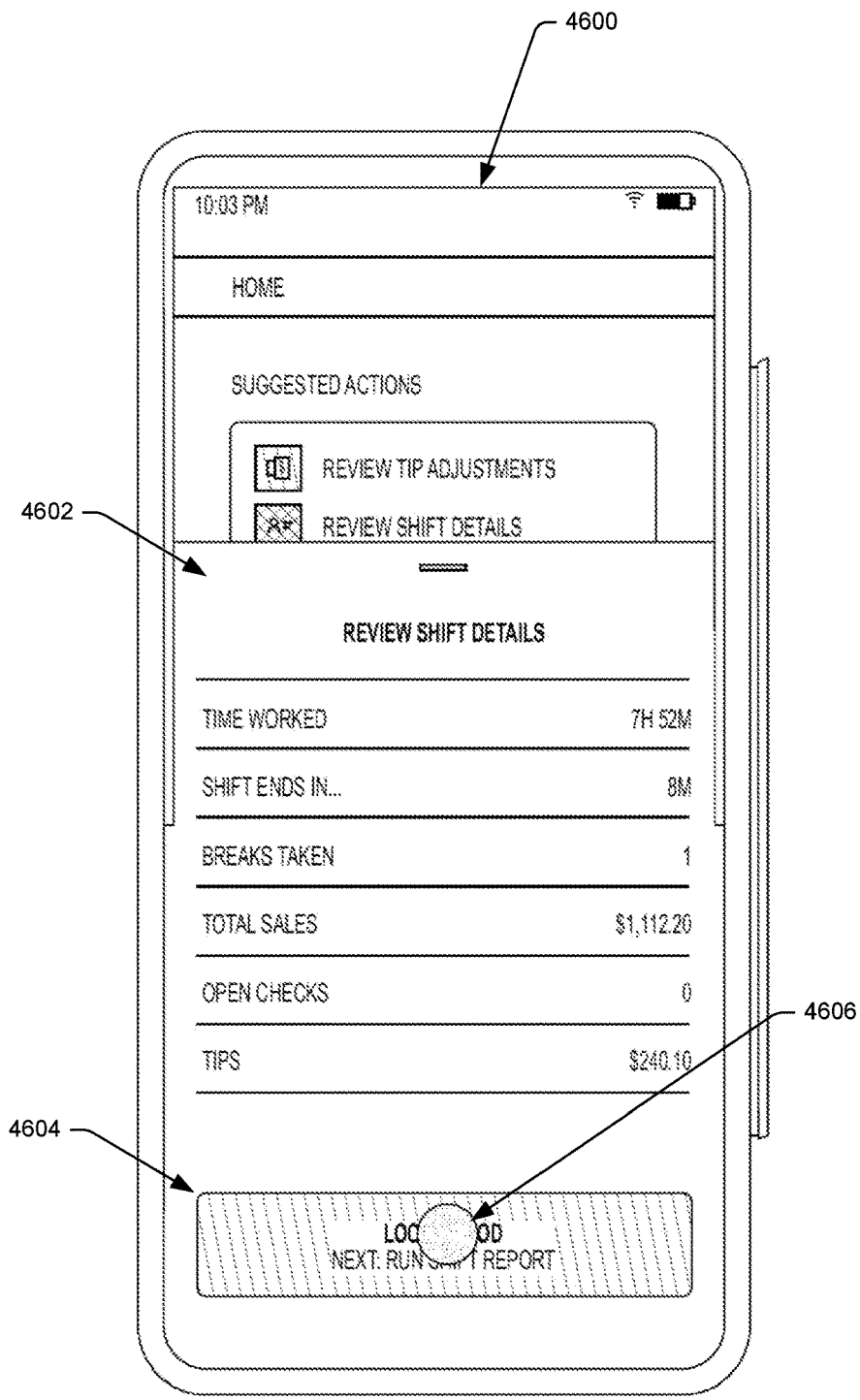

FIG. 46 illustrates another example UI that the FOH device after the selection shown in FIG. 45. Here, the UI illustrates shift details and includes an icon for allowing the operator to run a shift report.

Figure 47:
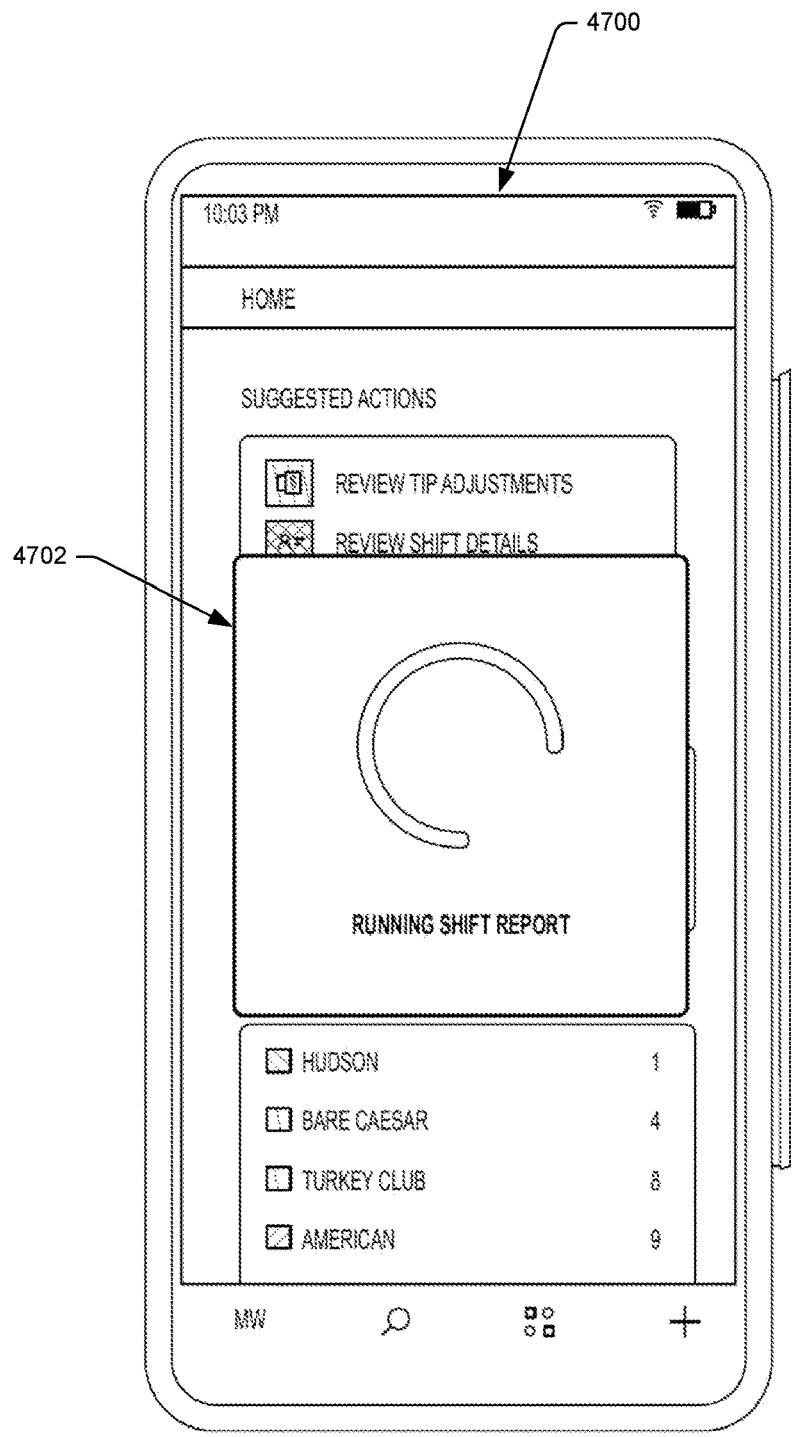

FIG. 47 illustrates another example UI that the FOH device after the selection shown in FIG. 46. Here, the UI indicates that the FOH device is running a shift report for the operator.

Figure 48:
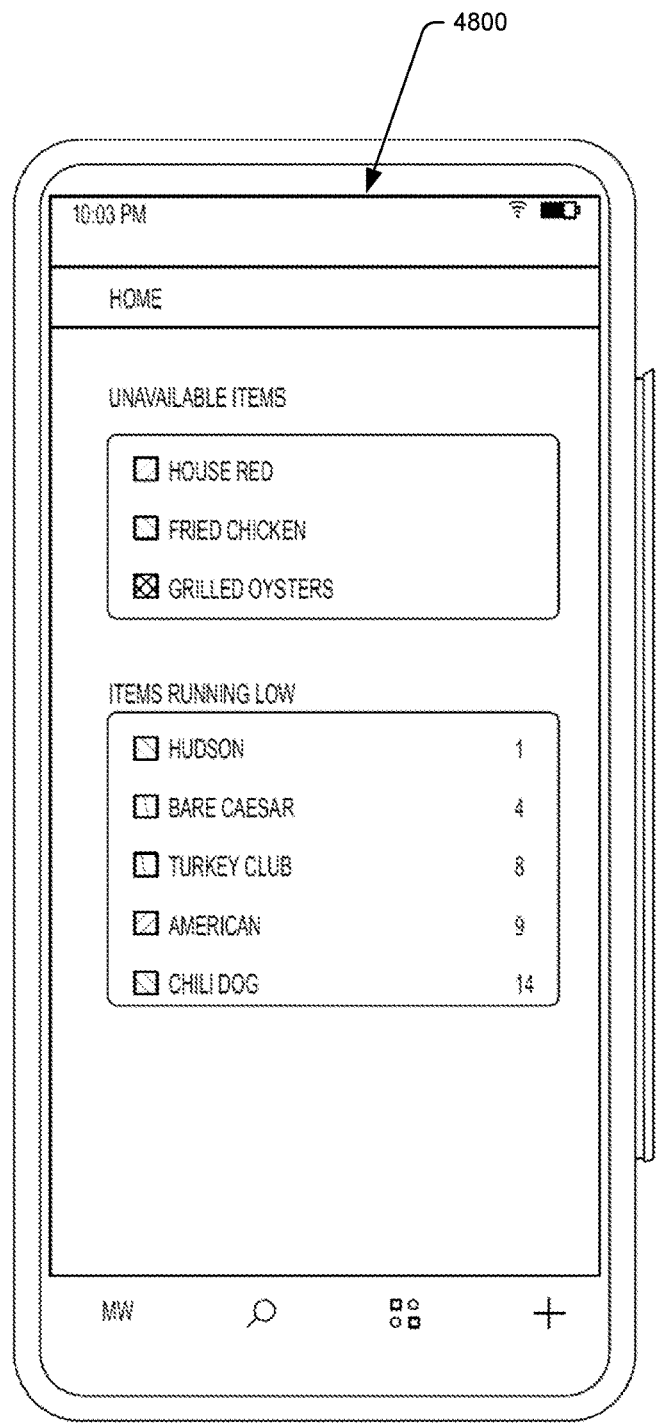

FIG. 48 illustrates another example UI that the FOH device after the running of the shift report shown in FIG. 47.

Figure 49:
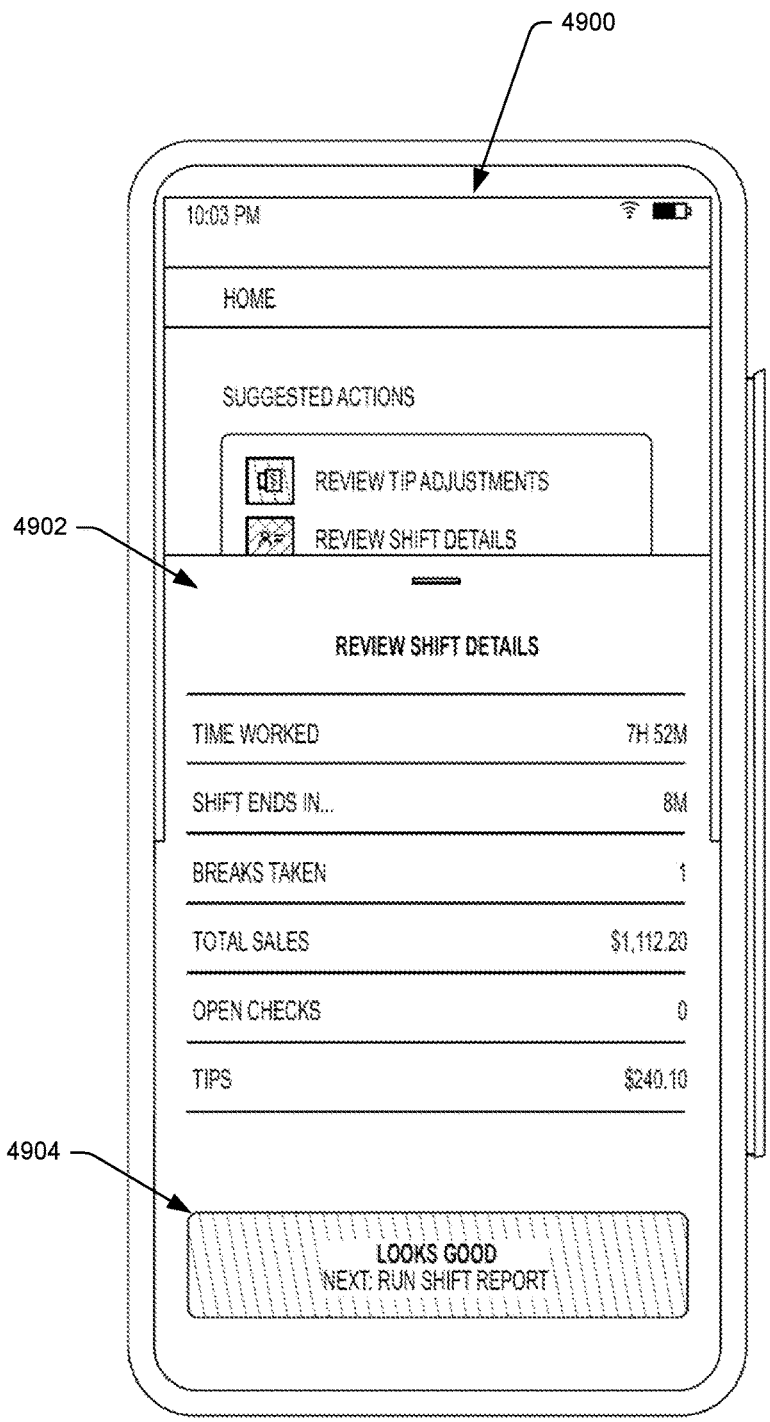

FIG. 49 illustrates an example UI that an FOH device may present prior to being coupled to or within a threshold proximity of another device.

Figure 50:
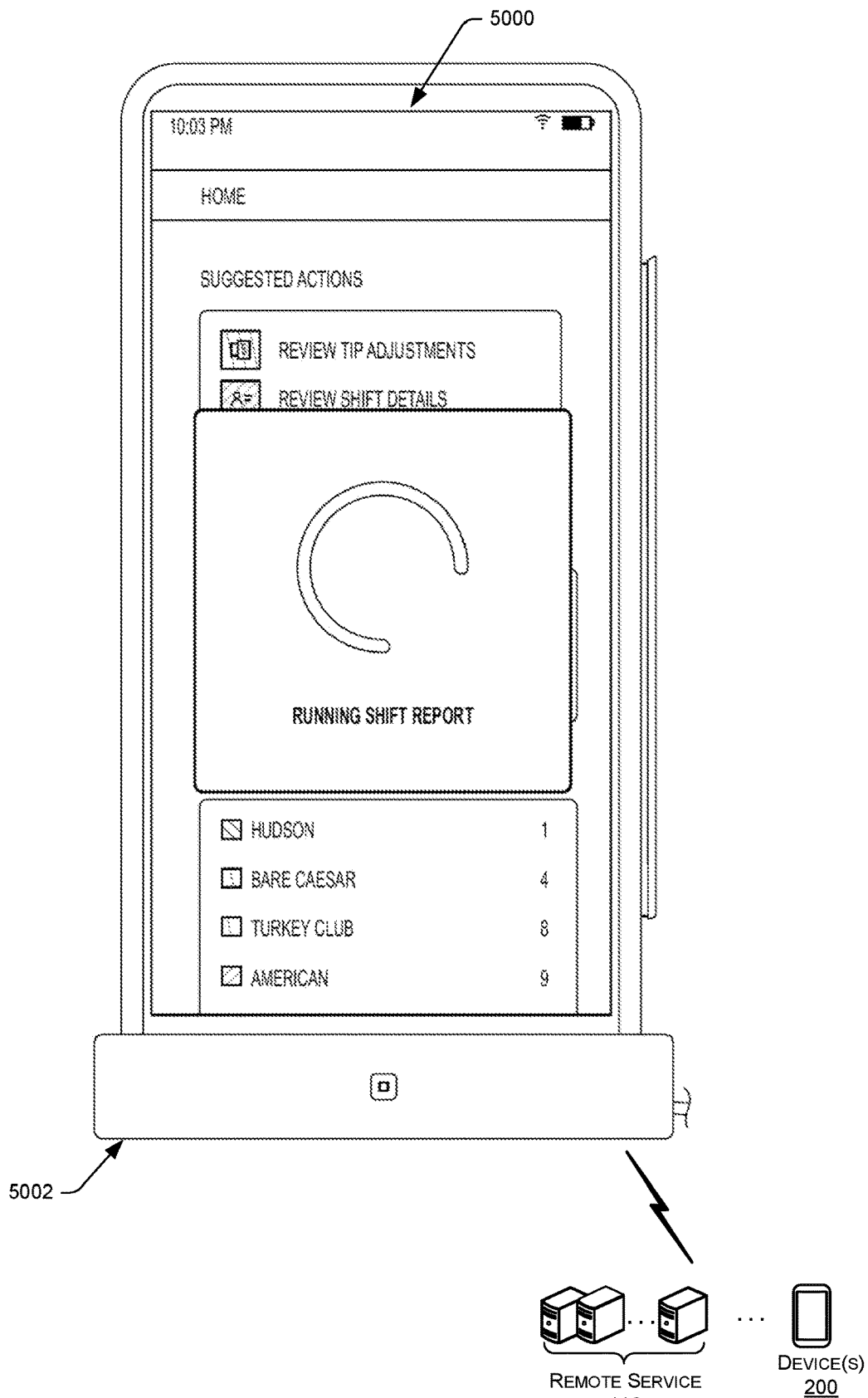

FIG. 50 illustrates another example UI that the FOH device of FIG. 49 may present after being physically coupled to another device, such as a cradle. As illustrated, the FOH device may begin running a shift report automatically in response to being physical coupled to the cradle.

Figure 51:
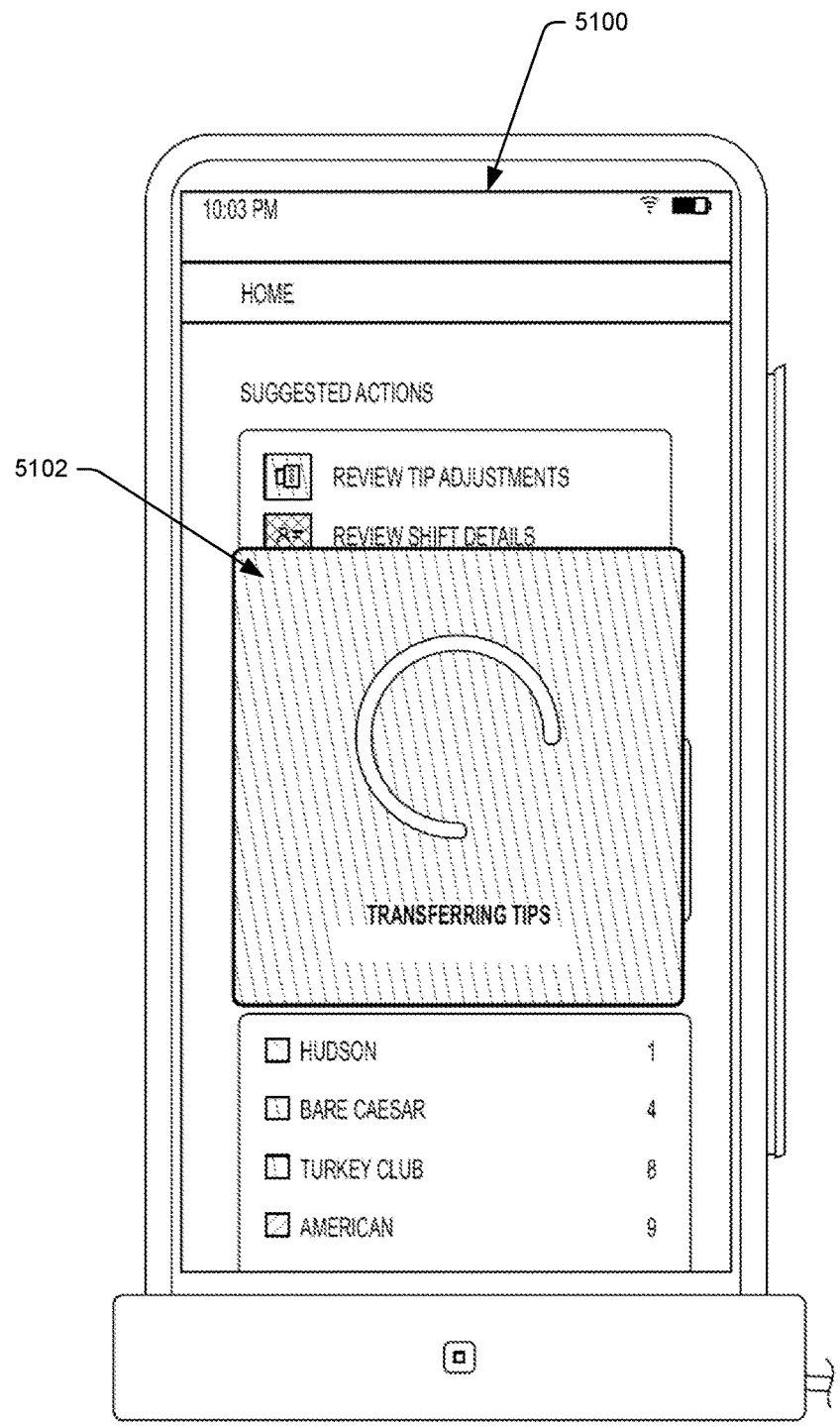

FIG. 51 continues the illustration of FIG. 50 and shows that tips are being transferred to an account associated with an operator of the FOH device.

Figure 52:
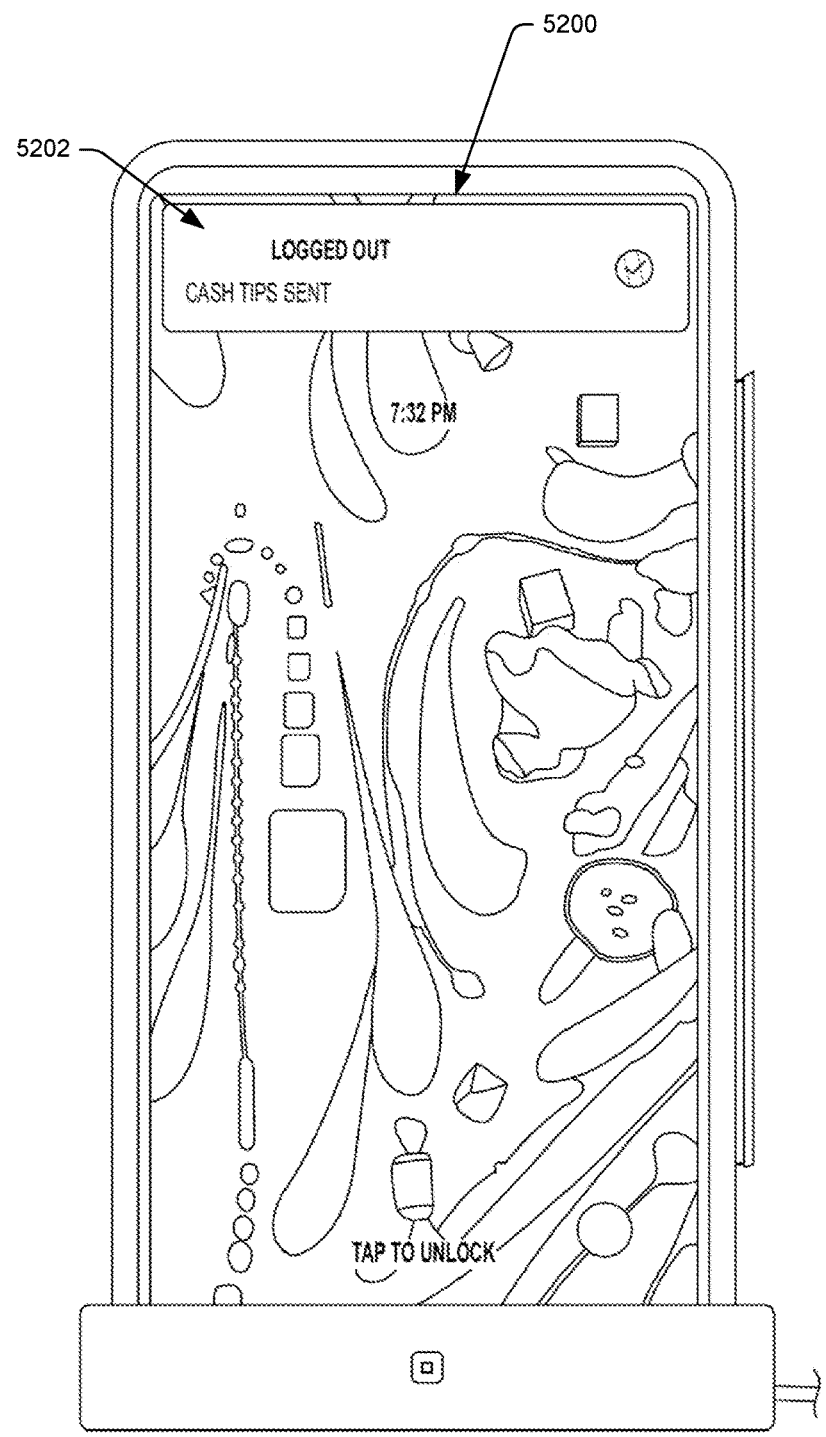

FIG. 52 concludes the illustration of the FIG. 50 and shows that the operator has been logged out of the FOH device.

Figure 53:
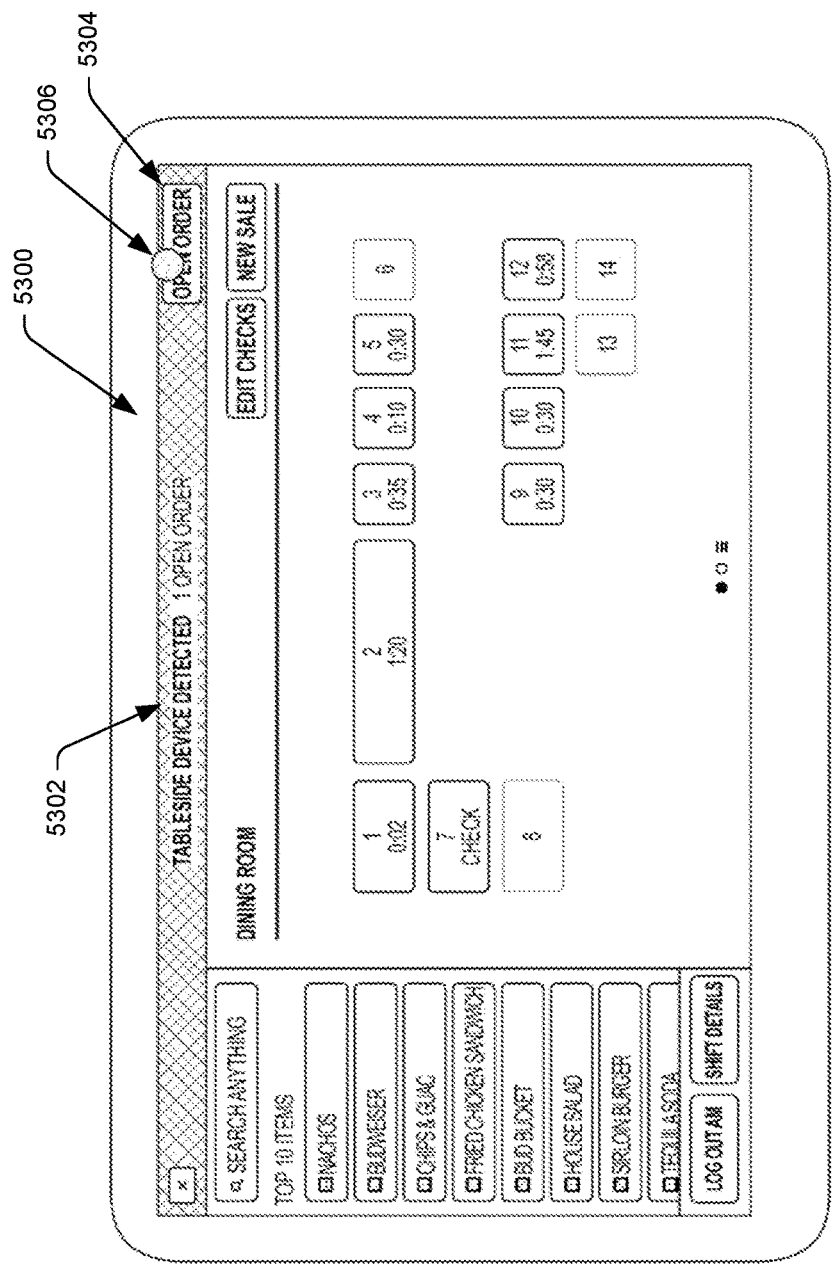

FIG. 53 illustrates another example UI that an FOH device may perform in response to being coupled to or within a threshold proximity of another device. In this example, the FOH device detects that it is within a threshold proximity of a tableside device (e.g., another FOH device) and, thus, presents a suggestion to open an order.

Figure 54:
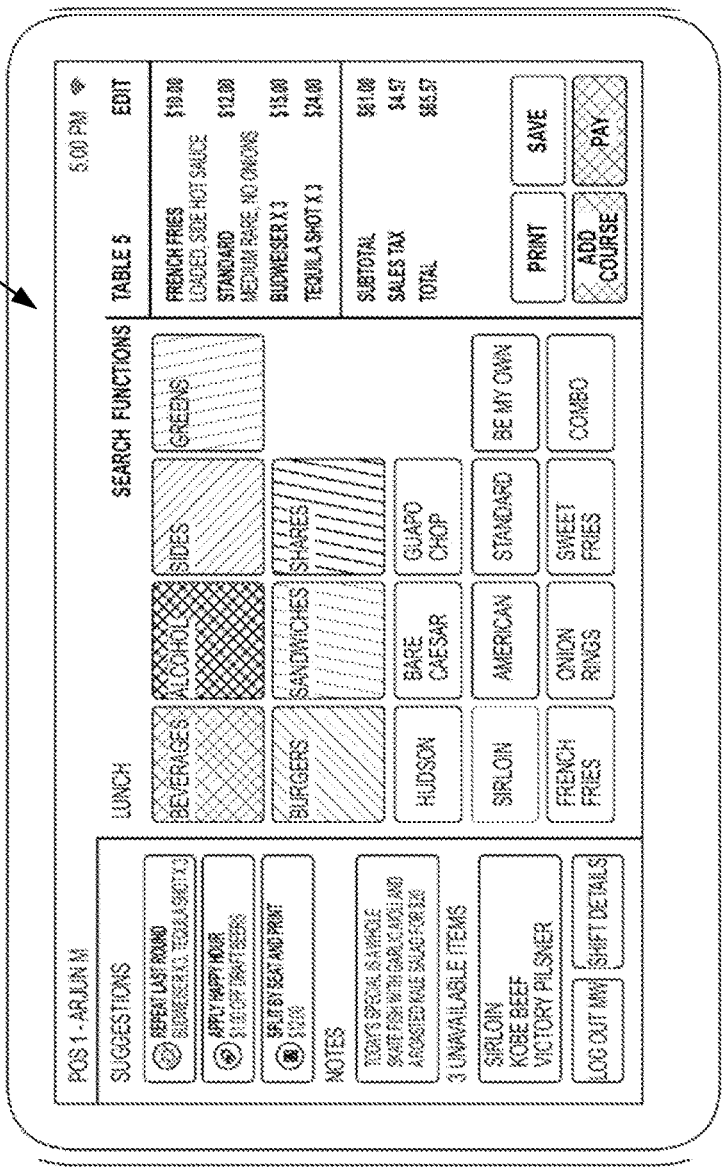

FIG. 54 illustrates an example UI that the FOH device of FIG. 53 may present in response to opening the order.

Figure 55:
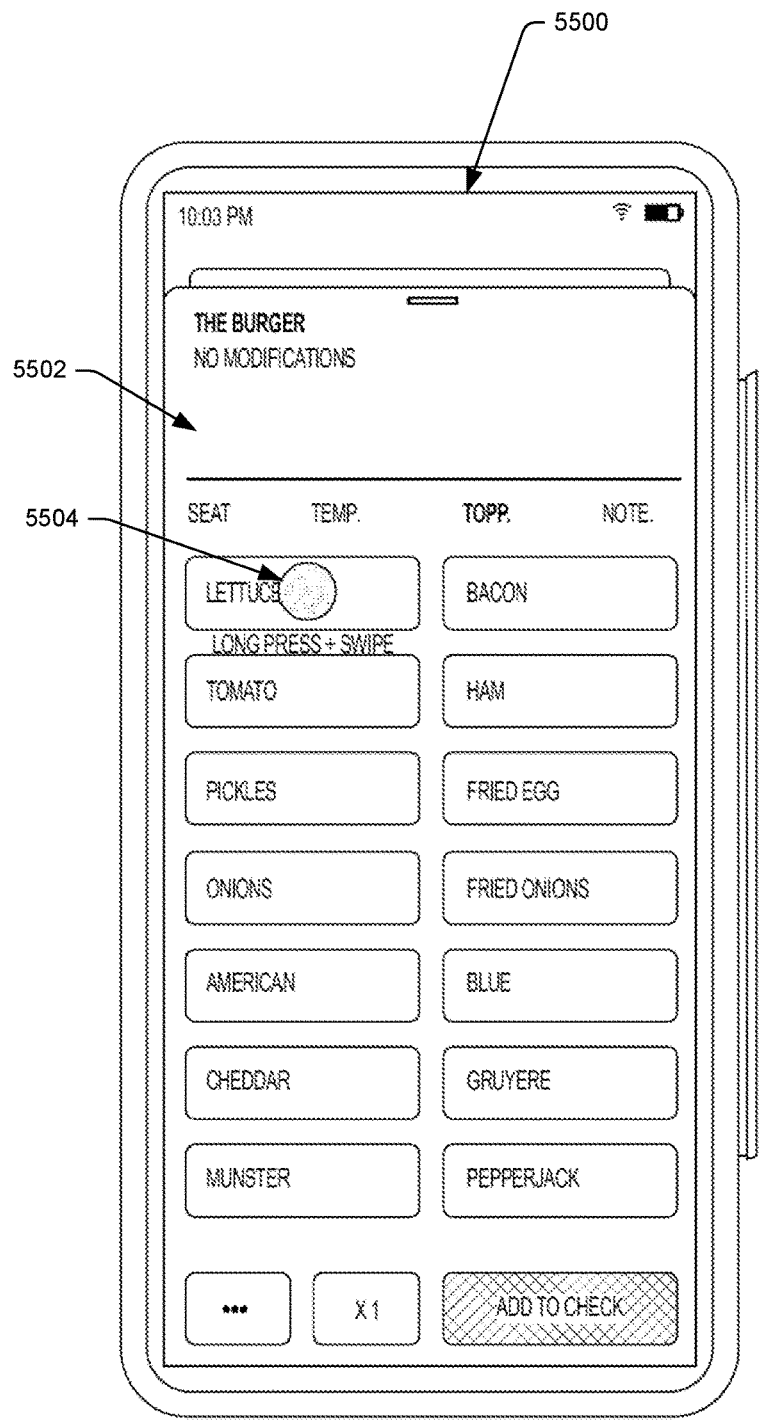

FIG. 55 and subsequent UIs illustrate different gestures that may be associated with different actions. Here, the UI illustrates different options associated with a particular item ("the burger"), with an operator of the FOH device having selected one particular option ("lettuce").

Figure 56:
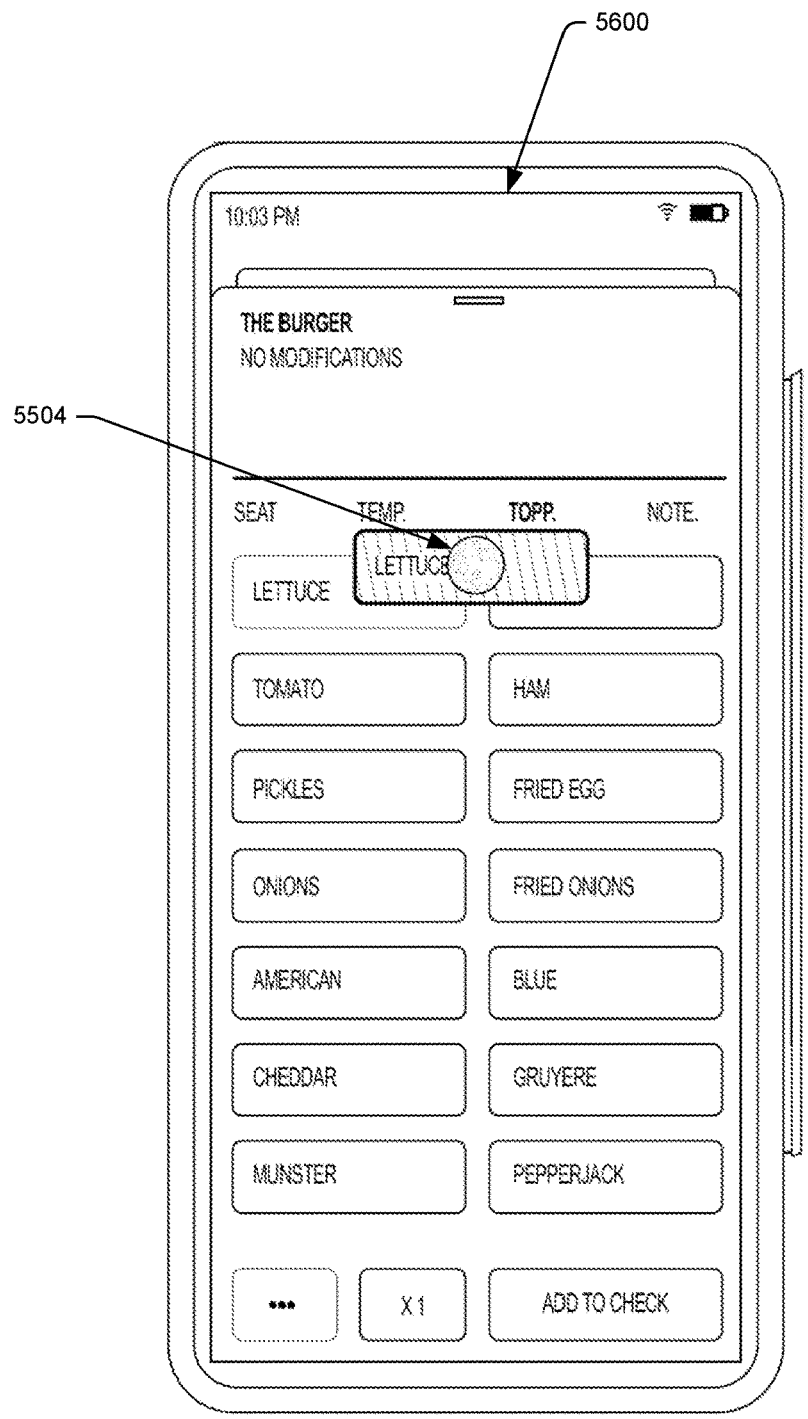

FIG. 56 continues the illustration of the UI of FIG. 55 and illustrates the operator of the FOH device swiping the selected icon to the right.

Figure 57:
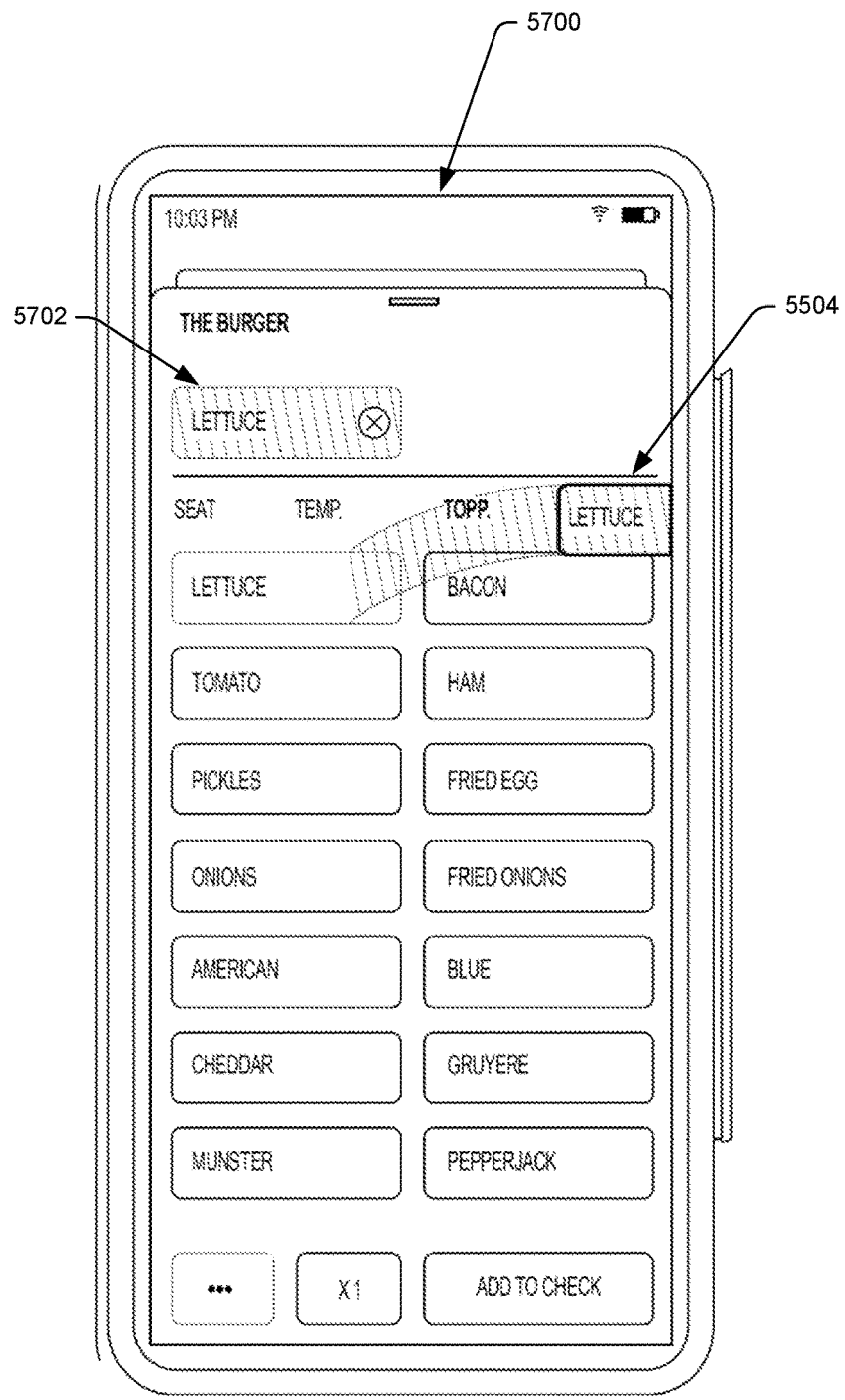

FIG. 57 continues the illustration of the UI of FIG. 56 and shows that the selected option ("lettuce") has been added to the item in response to operator swiping the icon to the right.

Figure 58:
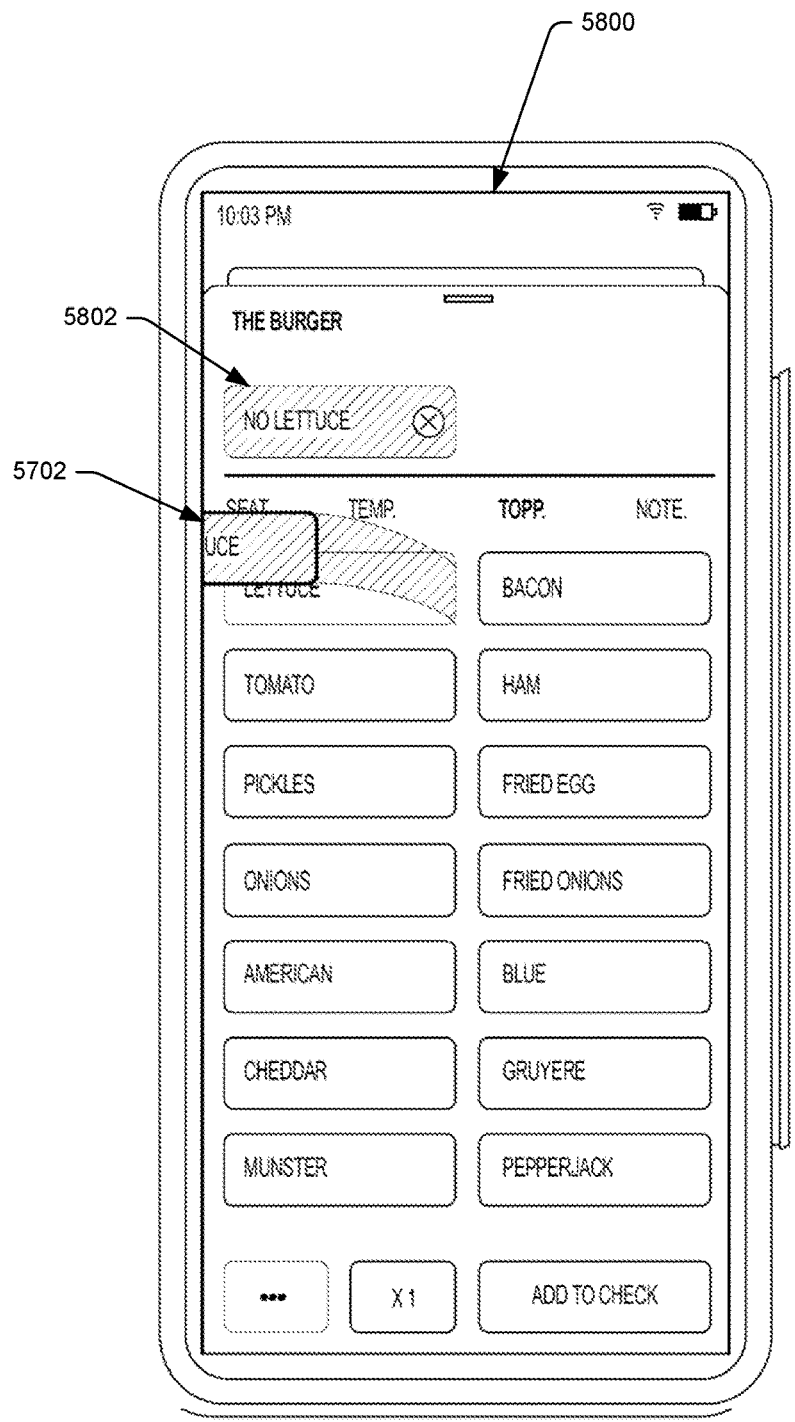

FIG. 58 continues the illustration of the UI of FIG. 57 and shows the operator swiping the icon associated with the selected option to the left. In response, the UI indicates that the selected option ("lettuce") has been removed from the item.

Figure 59:
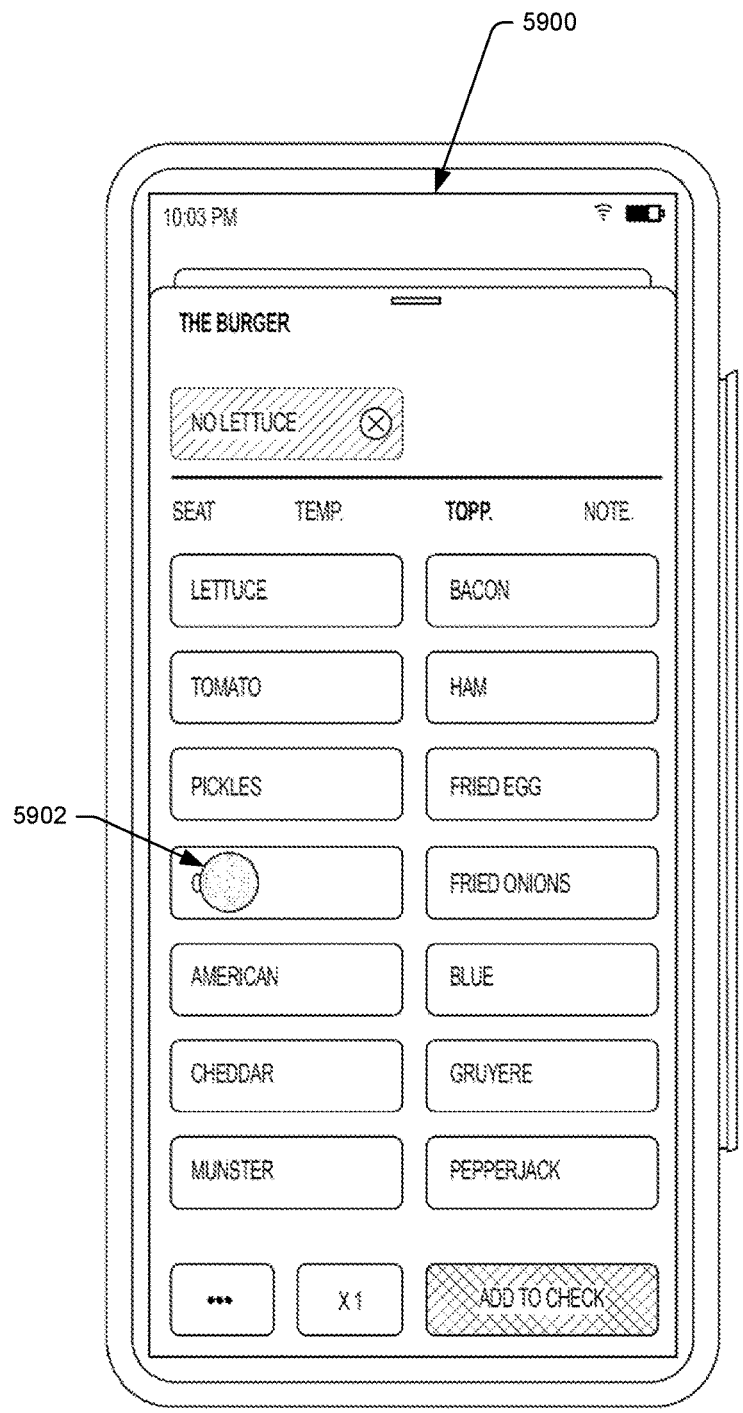

FIG. 59 illustrates the operator selecting another example option ("onions").

Figure 60:
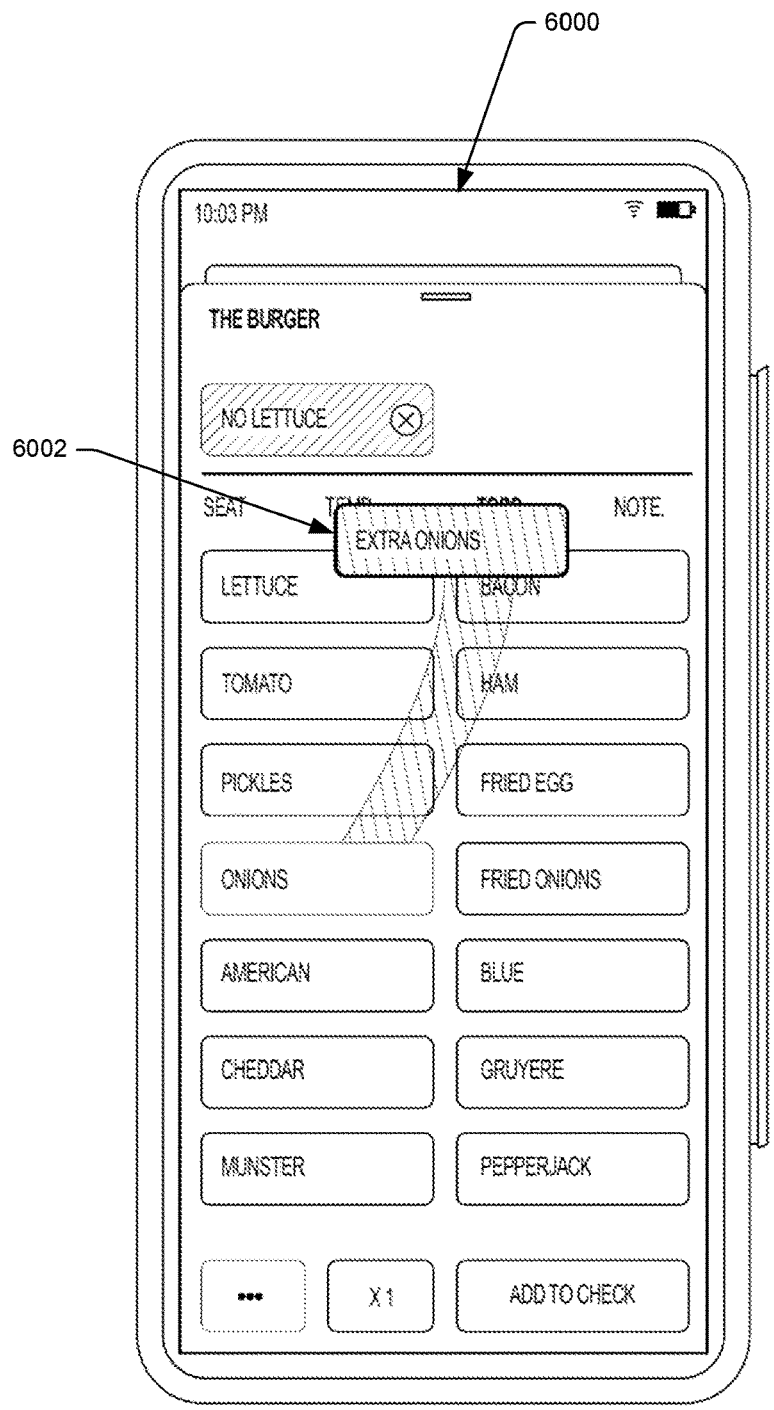

FIG. 60 continues the illustration of the UI of FIG. 59 and illustrates the operator swiping the icon associated with the option upwards.

Figure 61:
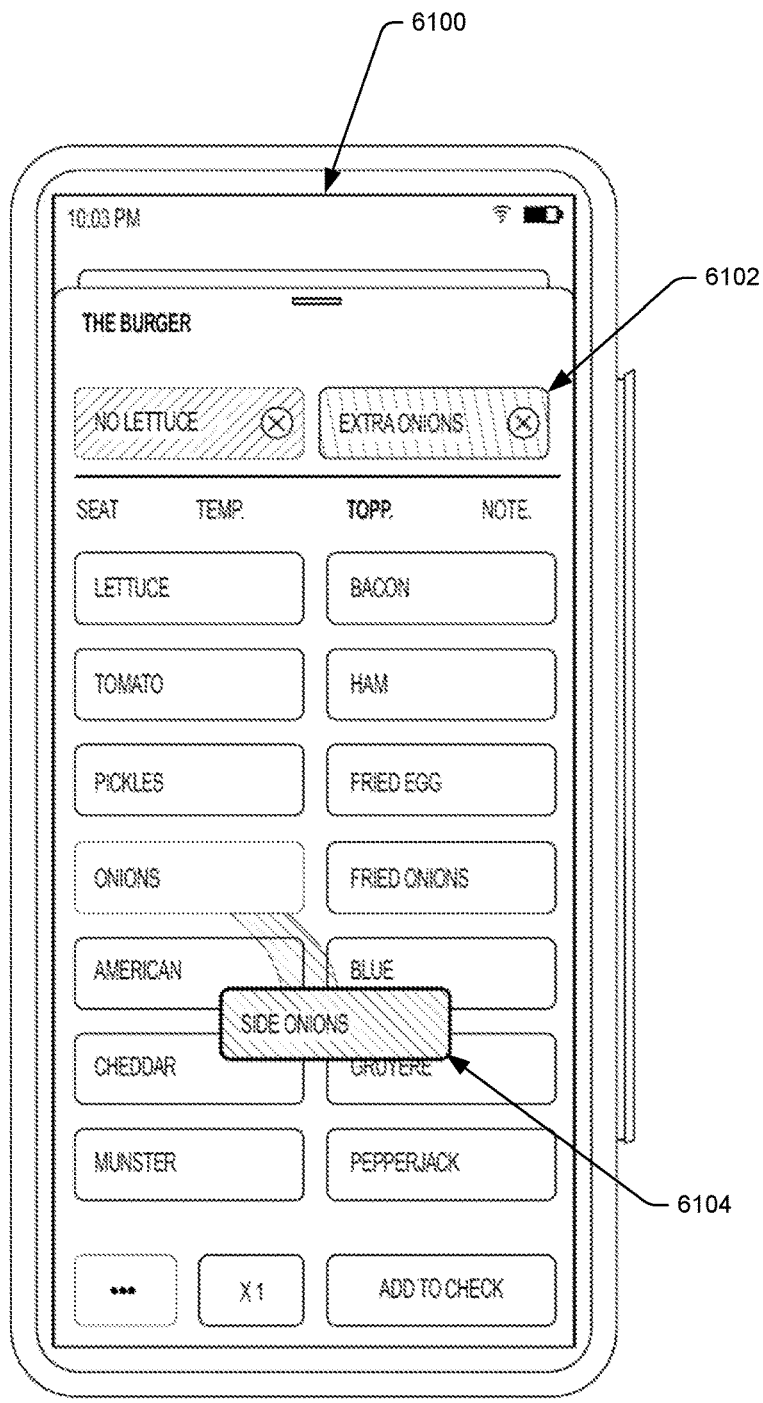

FIG. 61 continues the illustration of the UI of FIG. 60 and illustrates that an extra amount of the selection option ("onions") has been added to the order in response to the upward swipe. In addition, this UI illustrates that the operator now swipes the icon downwards and, in response, indicates that the option will be provided on the side.

Figure 62:
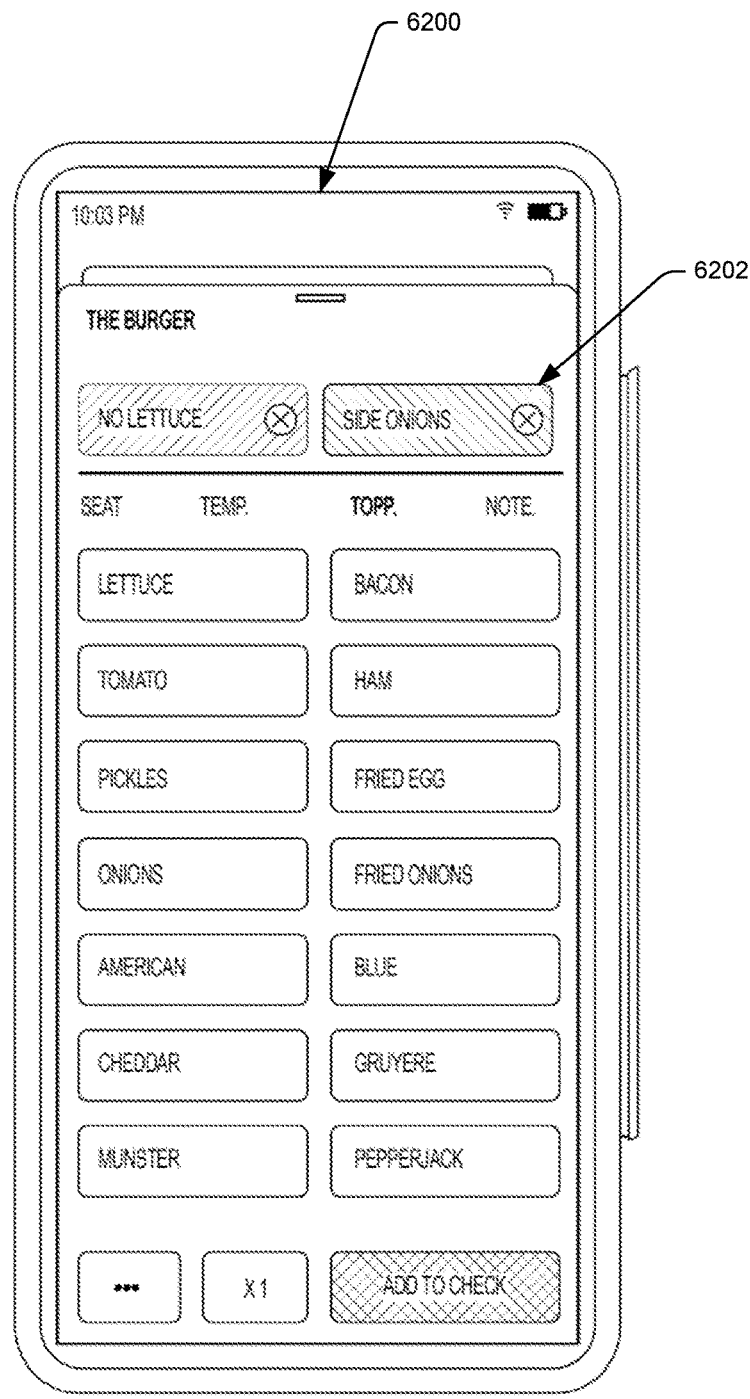

FIG. 62 continues the illustration of the UI of FIG. 61 and illustrates that the extra amount of the selection option has been changed to a side of the selected option in response to the downwards swiping of the icon.

Figure 63:
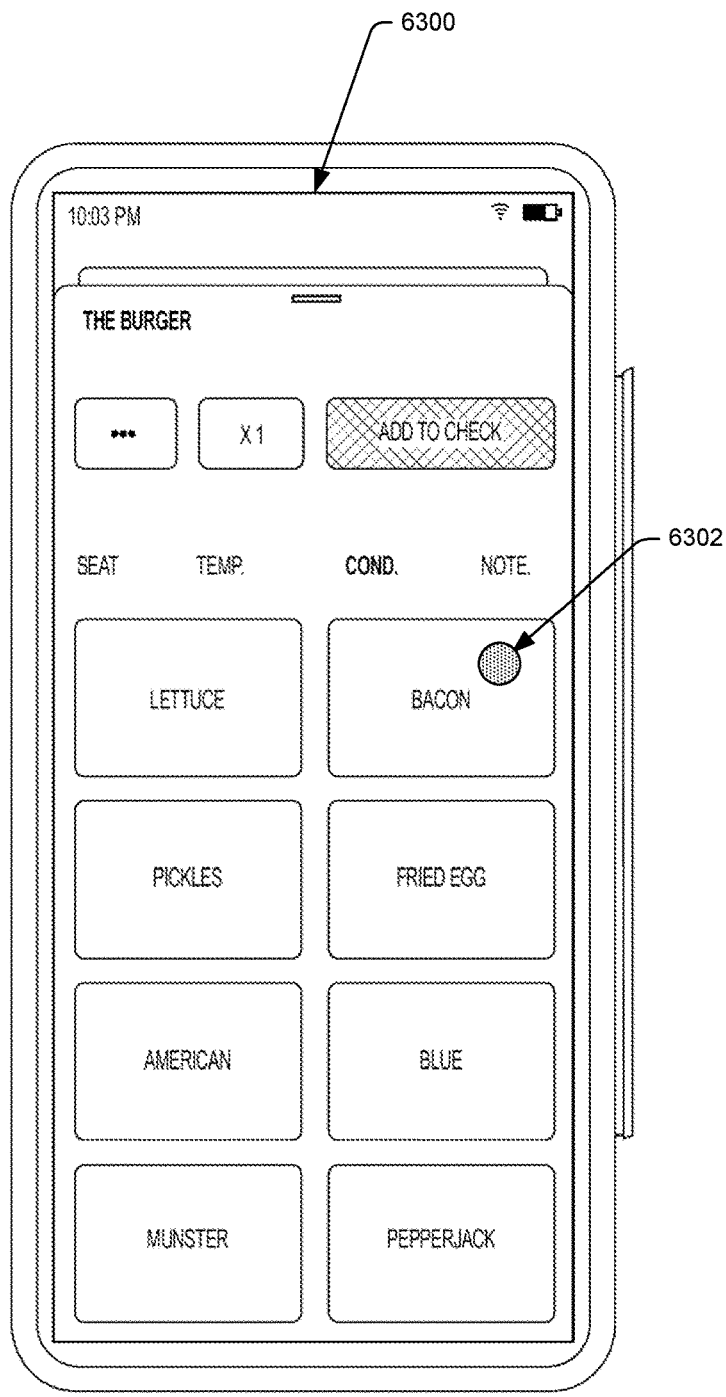

FIG. 63 and subsequent UIs illustrate other example UIs and gestures for performing different actions. Here, an operator of the FOH device has selected one example option ("Bacon").

Figure 64:
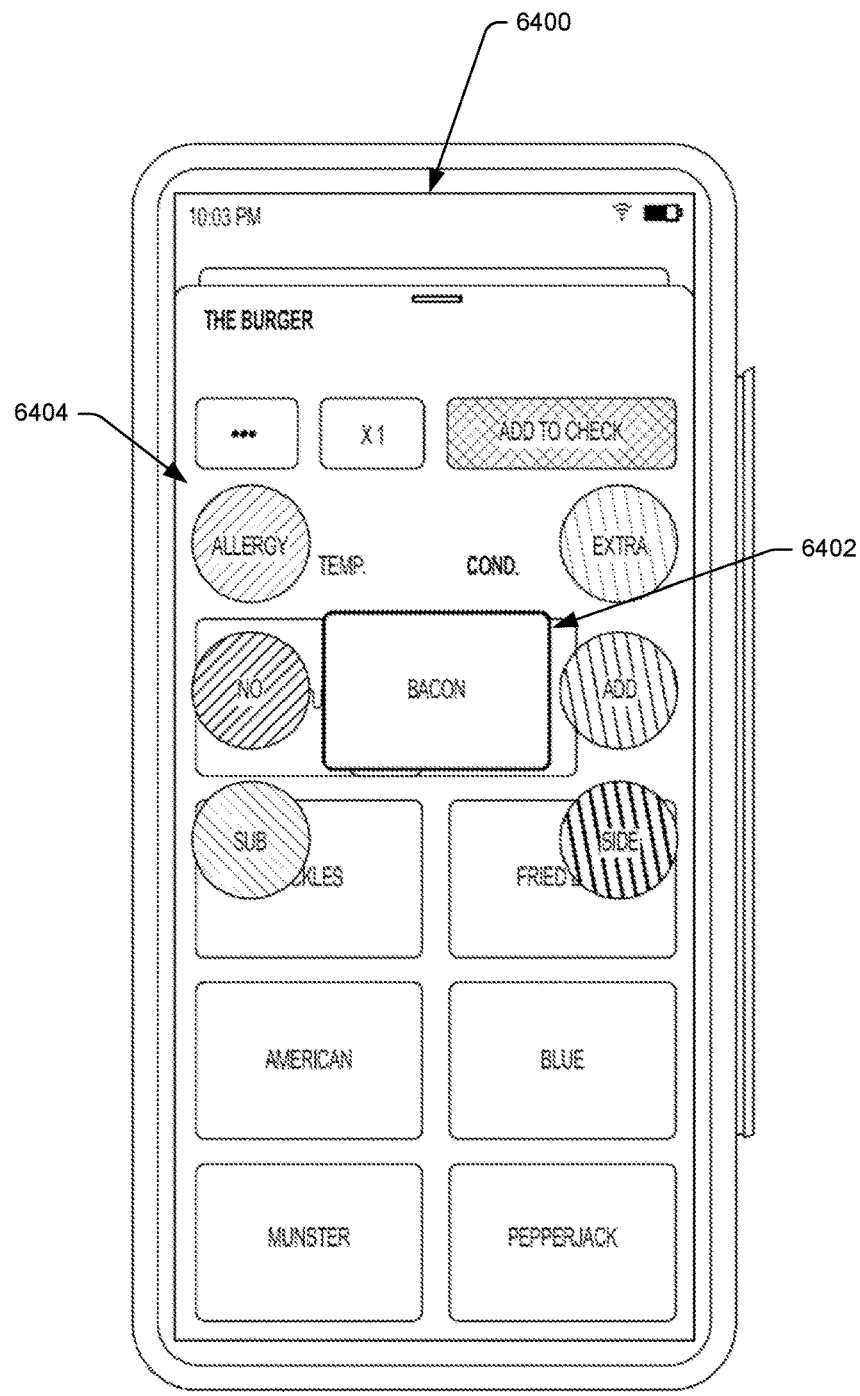

FIG. 64 illustrates an example UI that the FOH device may present in response to the selection shown in FIG. 63. Here, different modifiers associated with the option are presented.

Figure 65:
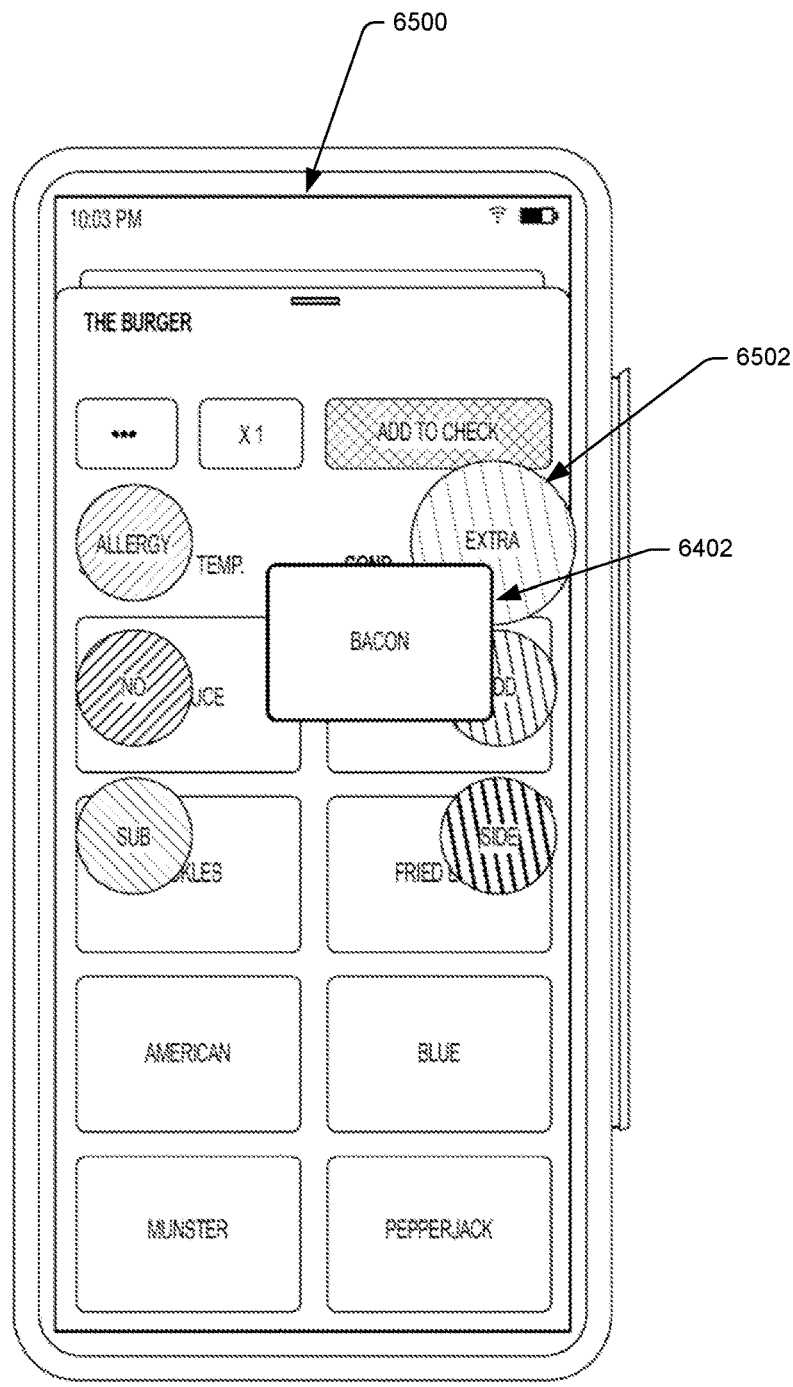

FIG. 65 continues the illustration of the UI of FIG. 64 and illustrates the operator dragging the option ("Bacon") to one of the presented modifiers ("Extra"). In response, the icon associated with the selected modifiers has enlarged.

Figure 66:
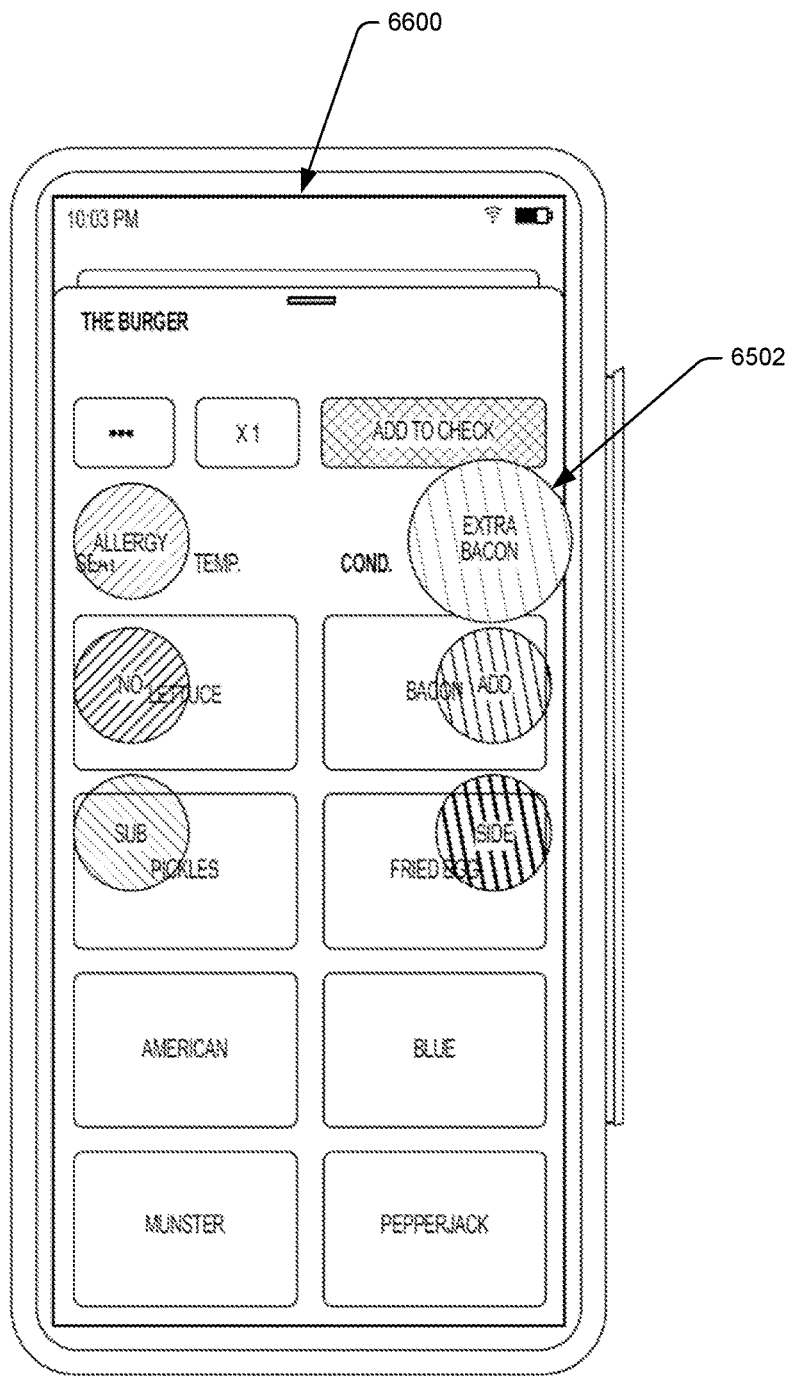

FIG. 66 continues the illustration of the UI of FIG. 65 and illustrates that the icon corresponding to the selected modifier now displays an indication of the option, in addition to the modifier itself ("Extra Bacon").

Figure 67:
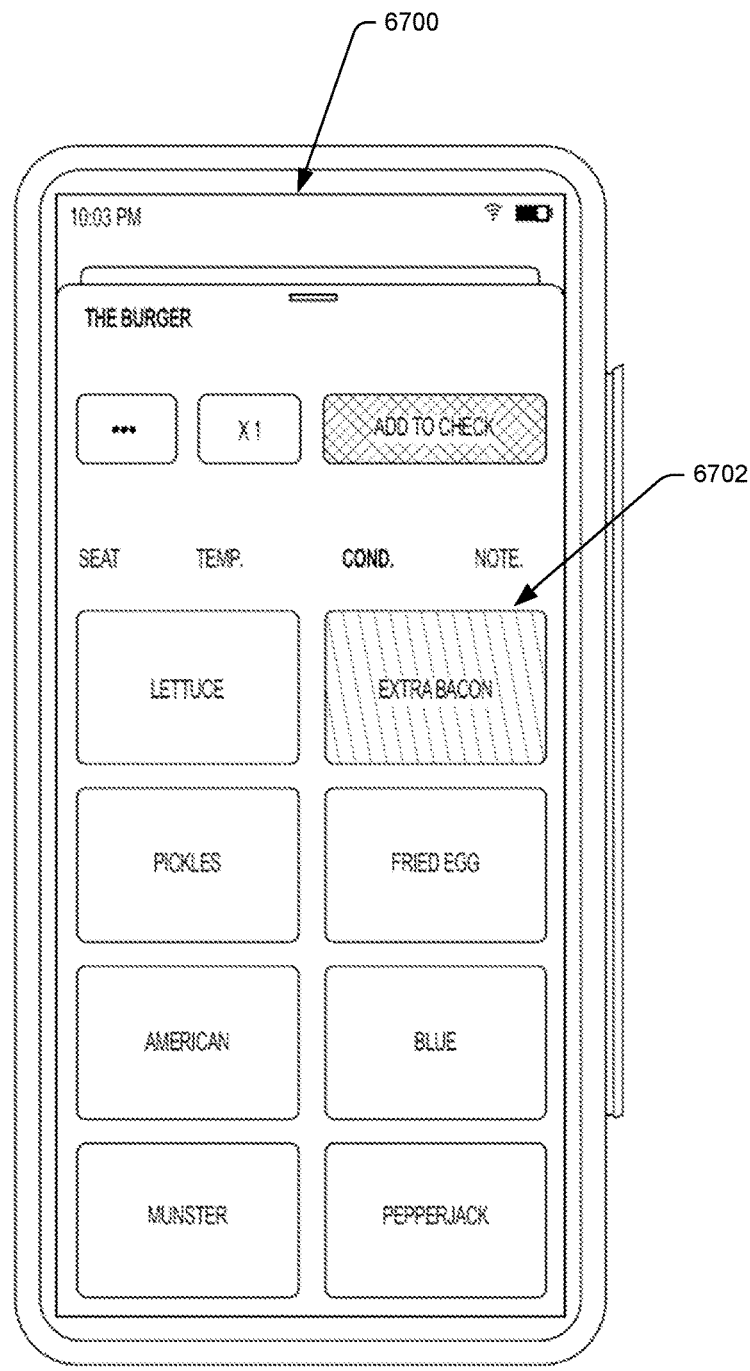

FIG. 67 illustrates an example UI that the FOH may present after the UI of FIG. 66. Here, the modifiers are removed from the display, but the initial UI of FIG. 63 has been altered to indicate the selection made above.

Figure 68:
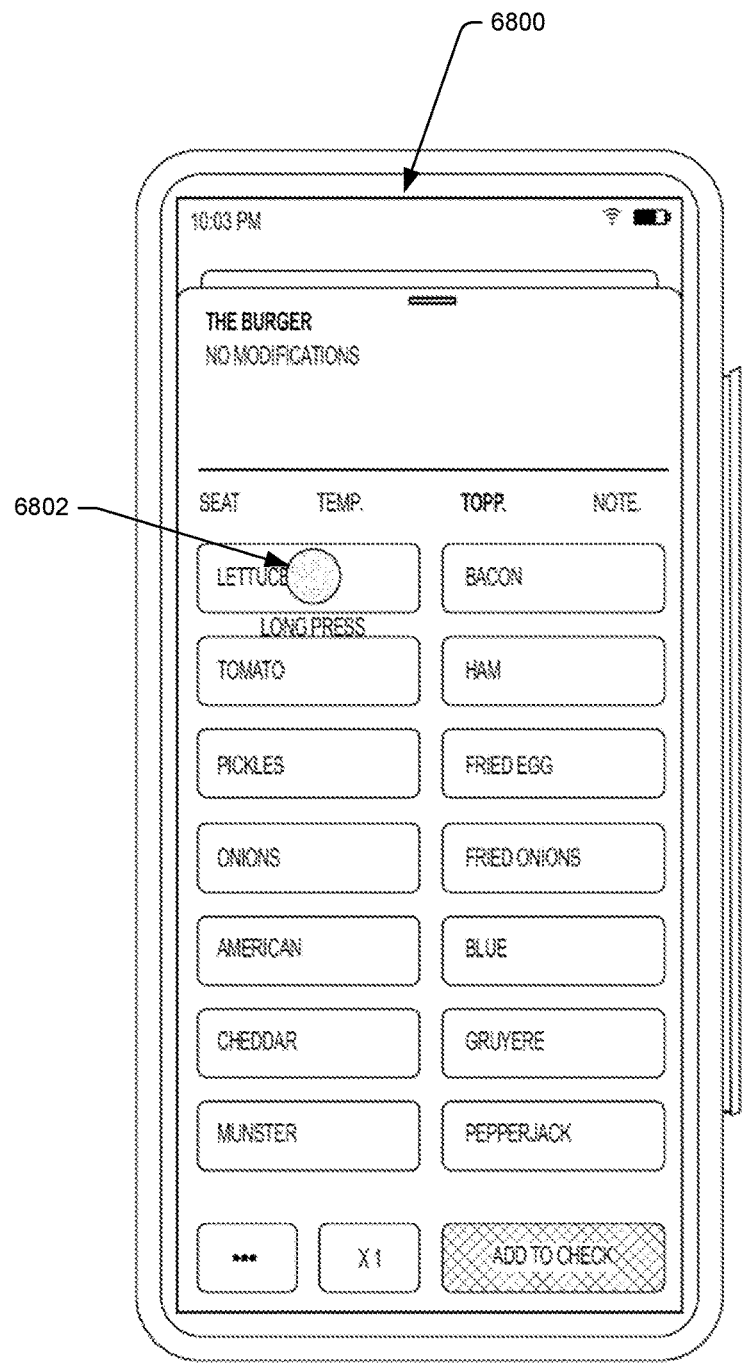

FIG. 68 and subsequent UIs illustrate still other example UIs and gestures for performing different actions. Here, an operator of the FOH device has selected one example option ("Lettuce").

Figure 69:
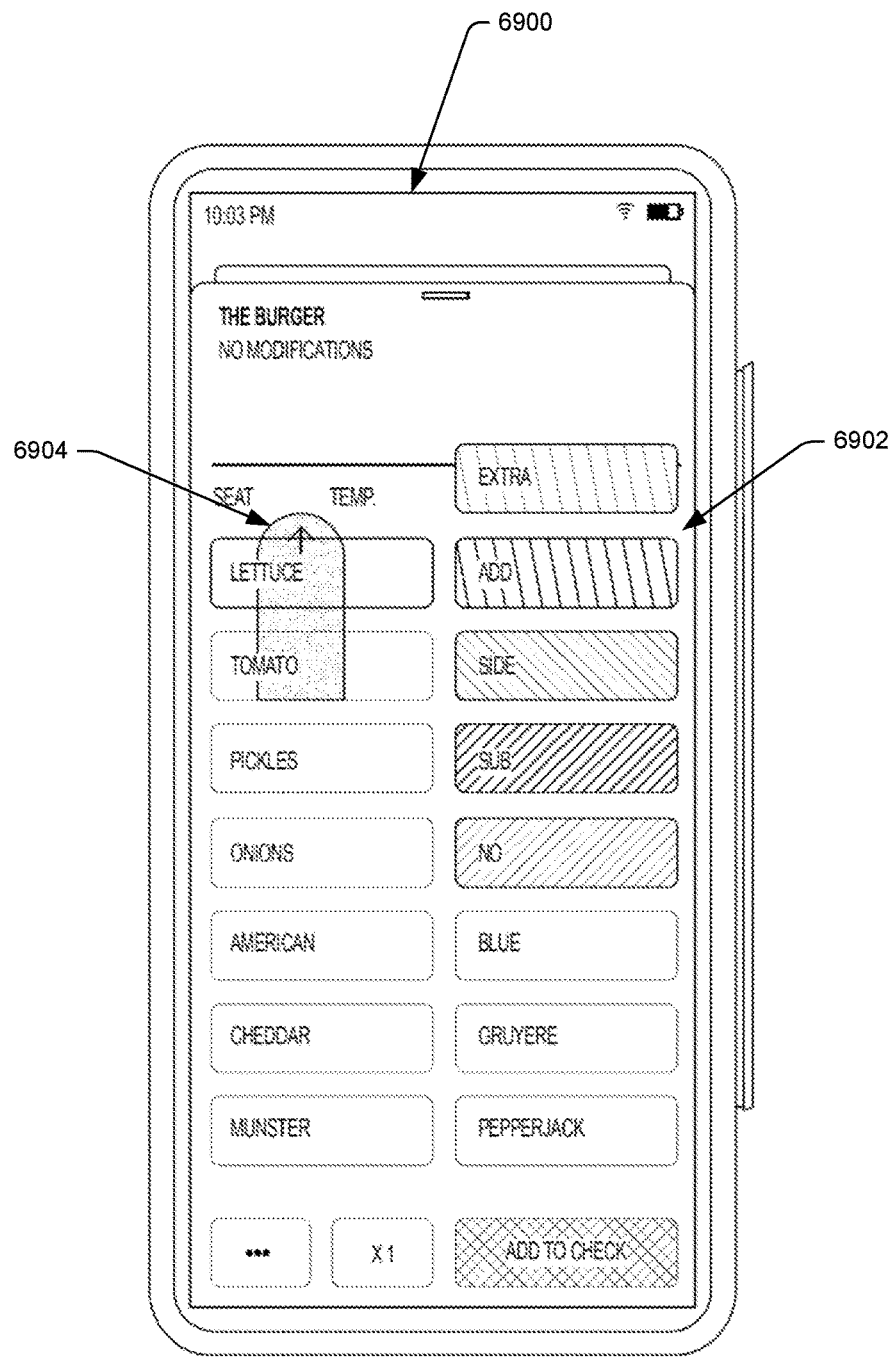

FIG. 69 continues the illustration of the UI of FIG. 68 and illustrates that a number of modifiers have been presented adjacent the selected icon ("Lettuce"). In addition, this UI illustrates that the operator swipes upwards from the selected icon.

Figure 70:
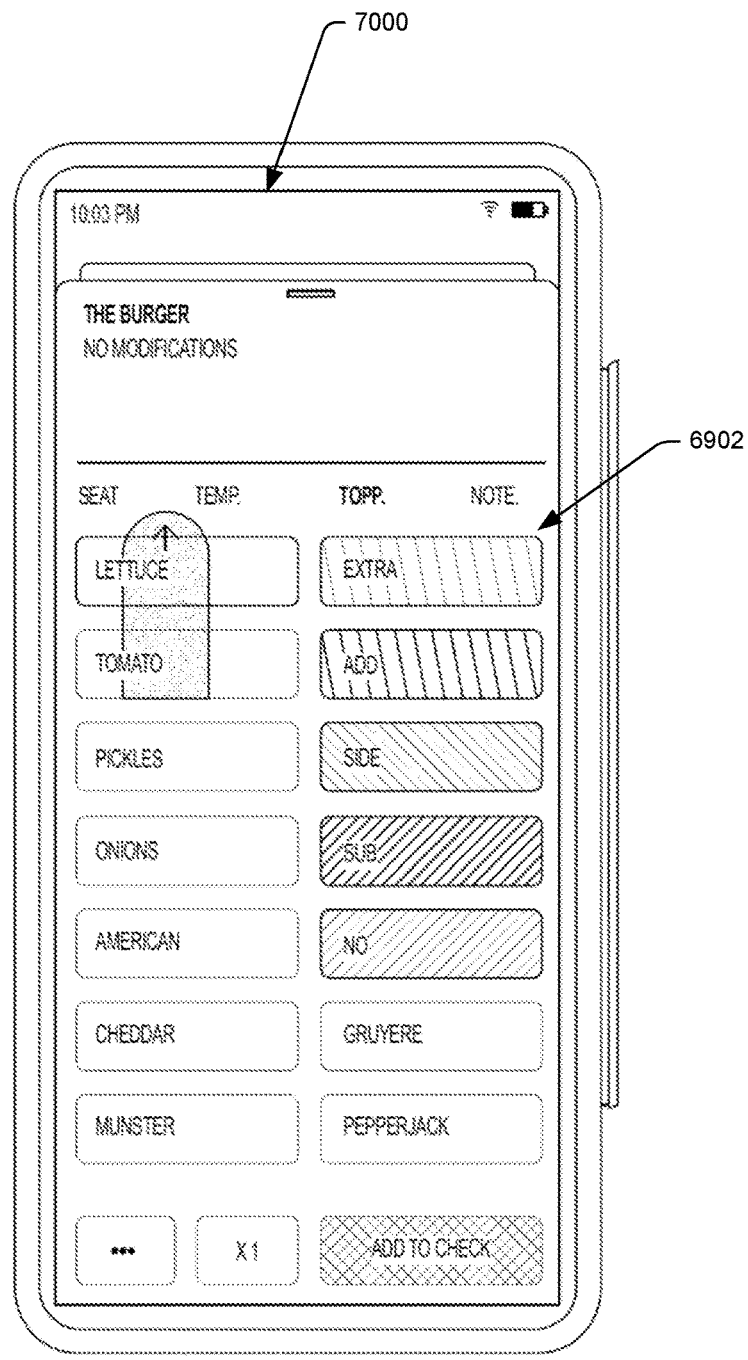

FIG. 70 continues the illustration of the UI of FIG. 69 and illustrates that the locations of the modifiers have changed in response to the upward swipe of the operation in FIG. 69. For example, a modifier entitled "extra" is now adjacent the "lettuce" icon rather than "add", as was previously adjacent this icon.

Figure 71:
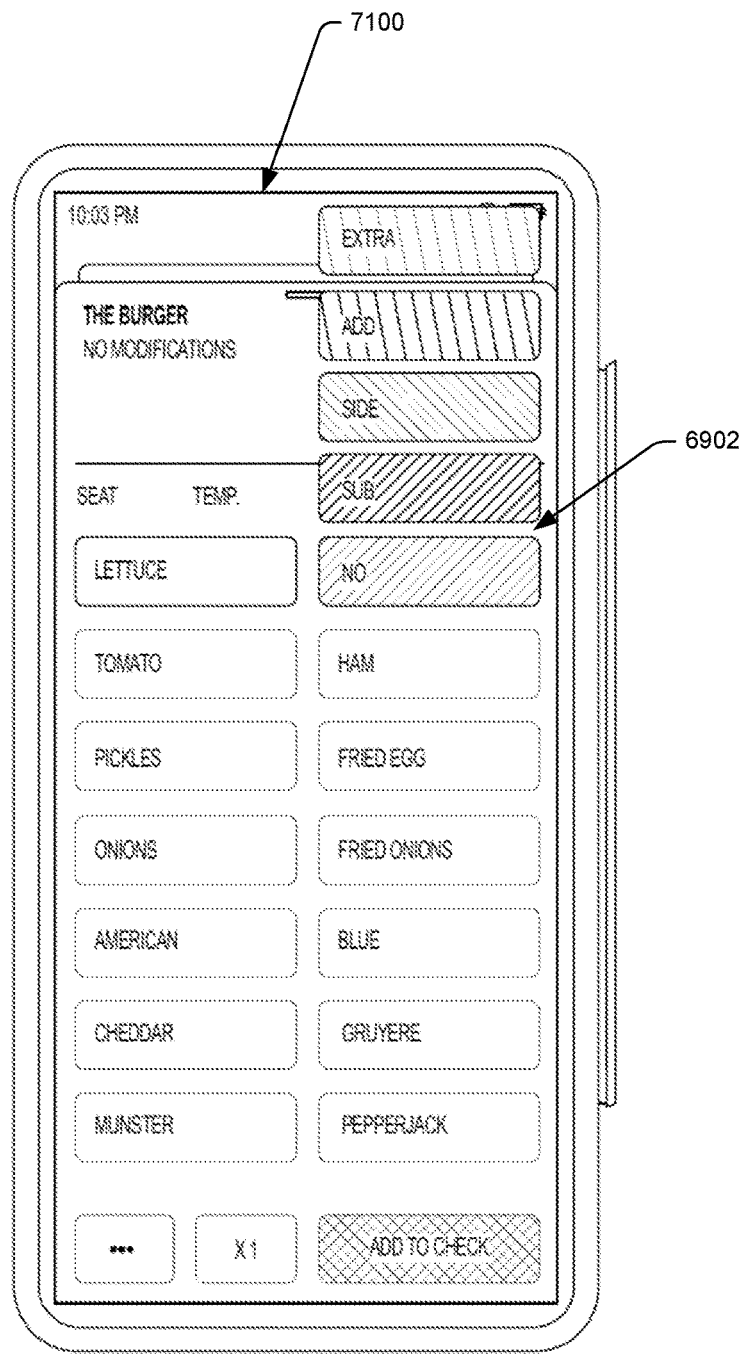

FIG. 71 continues the illustration of the UI of FIG. 70 and shows an example UI after a user has swiped downwards such that a modifier of "no" is adjacent the icon for "lettuce".

Figure 72:
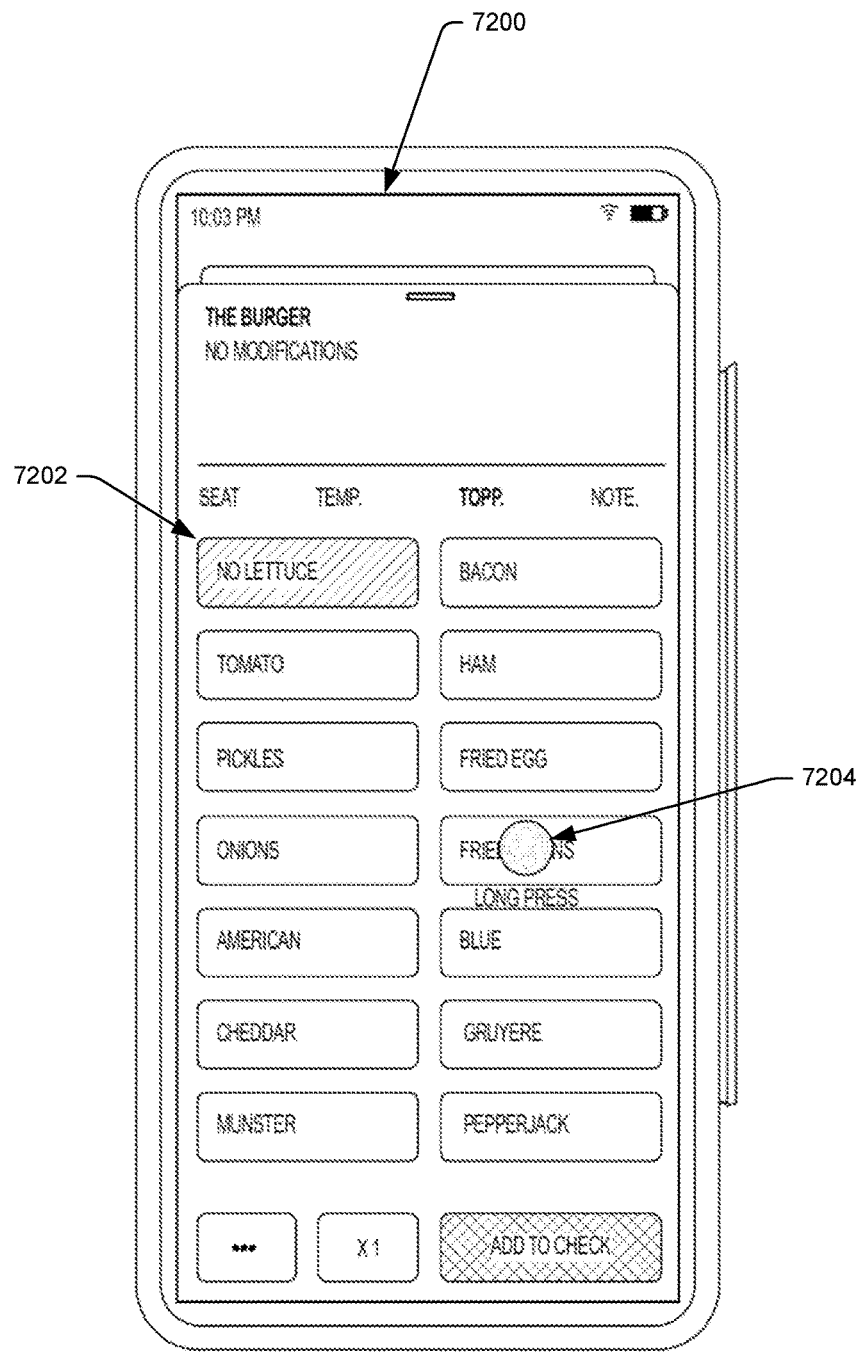

FIG. 72 illustrates an example UI that the FOH device may present after the selection of FIG. 71. As illustrated, the UI indicates that the item is to have "no lettuce". In addition, the operator has selected an icon corresponding to another option ("Fried Onions").

Figure 73:
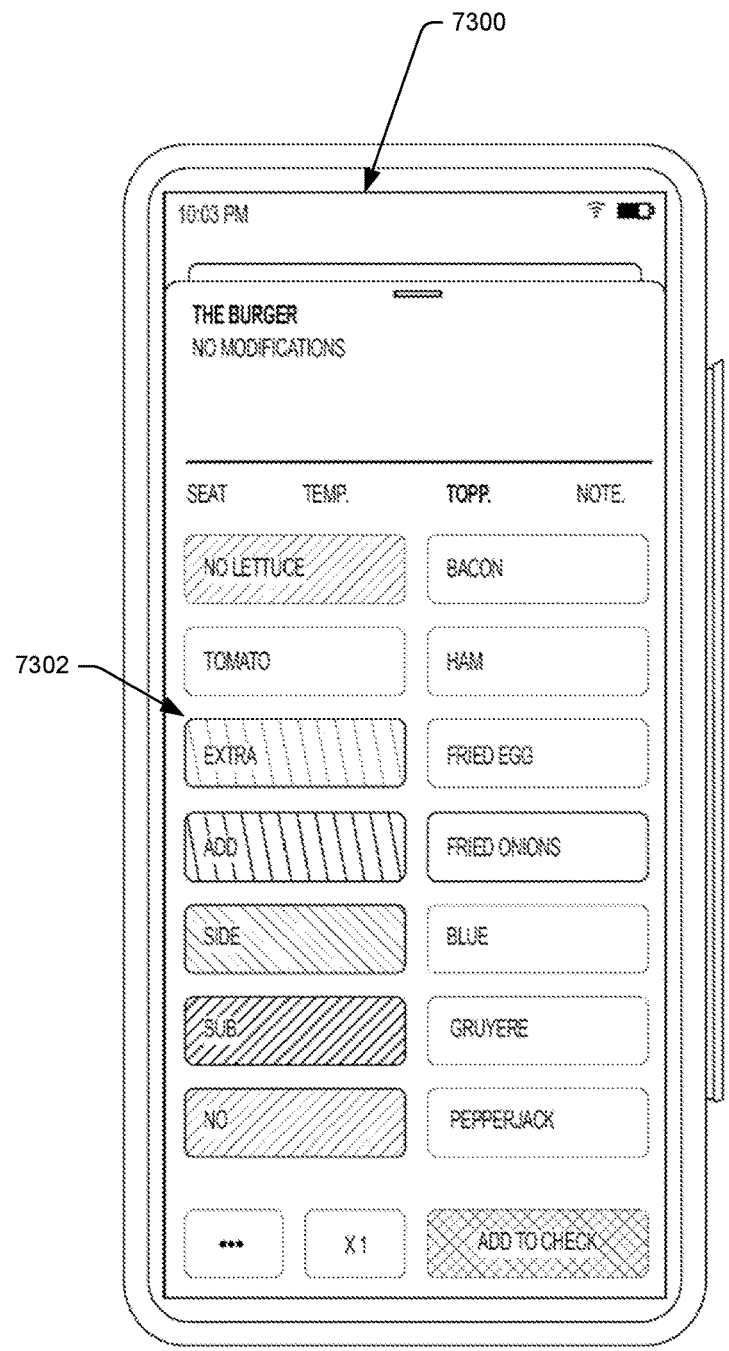

FIG. 73 illustrates an example UI that the device may present after the selection of FIG. 72. Again, the modifiers may appear adjacent the icon for the selected option and the operator may select one of the modifiers by swiping upwards and/or downwards until the desired modifier is adjacent to the selected option.

Figure 1:
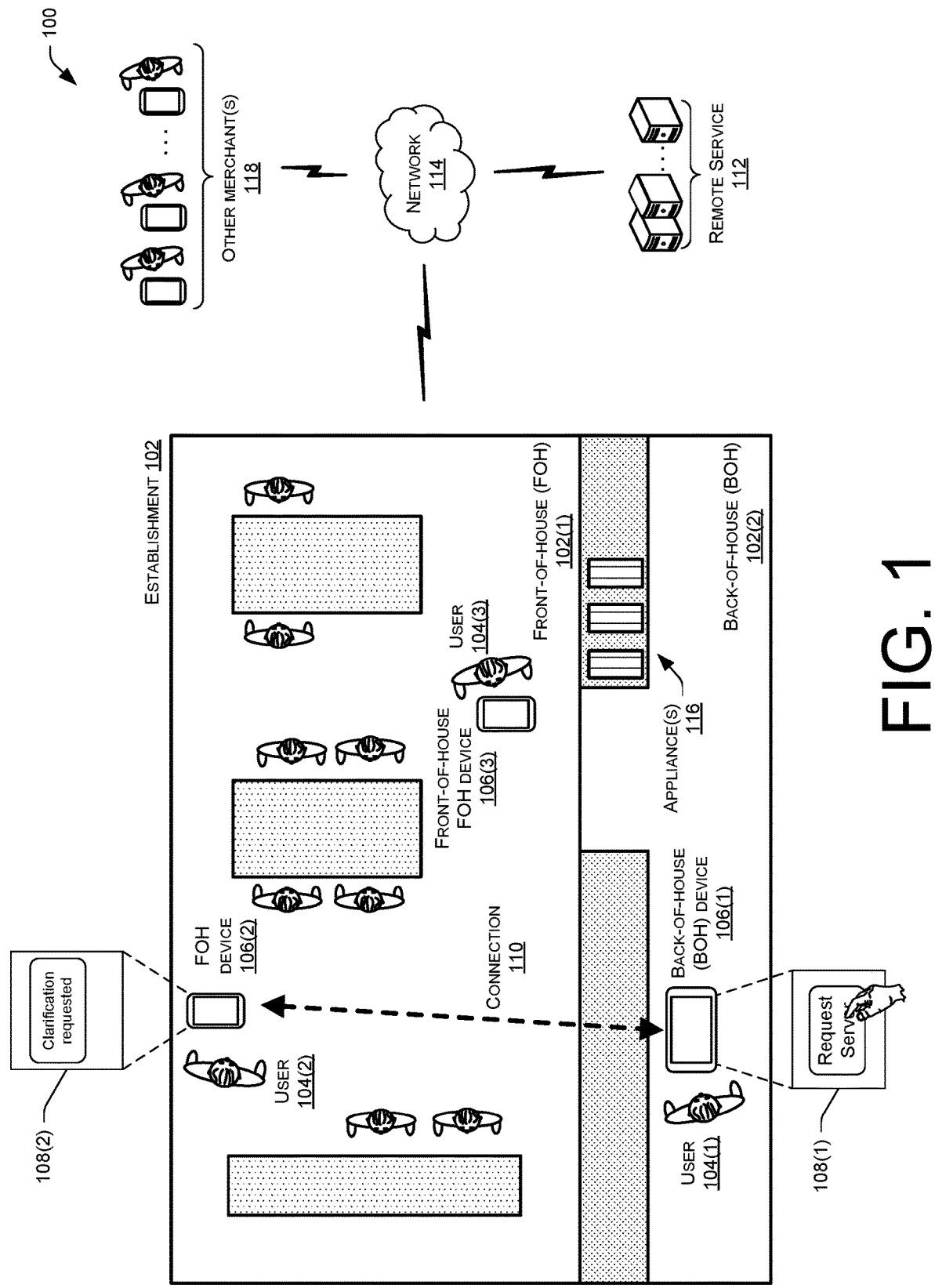
FIG. 1 illustrates an example environment in which a first user in an establishment operates a back-of-house (BOH) device to request a server that placed an order whose details are presented on the BOH device. In response, the BOH device may determine a front-of-house (FOH) device that placed the order, establish a communication session of with the FOH device, and send a request for the server to the FOH device.

FIG. 74 illustrates the example environment of FIG. 1. Here, a merchant operates a merchant device to capture data (e.g., image data) of the establishment. The merchant device then sends the data to a remote service, which analyzes the data to identify flat surfaces in the environment and to send, back to the merchant device, a UI for indicating which flat surfaces correspond to seating areas and which do not. After receiving the respective indications from the merchant, the service may generate and present on the merchant device a layout of available seating areas in the establishment.

Figure 75:
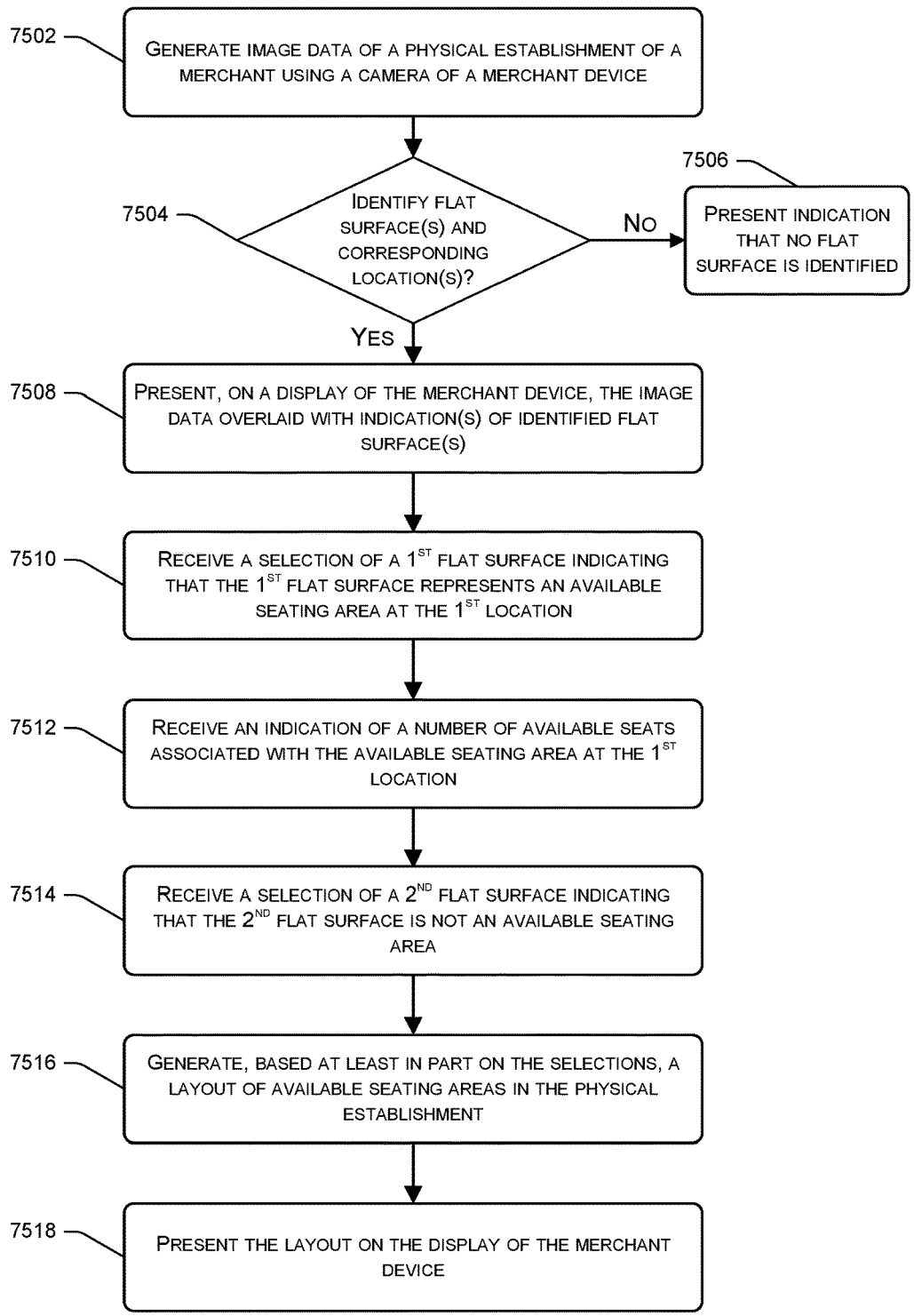

FIG. 75 illustrates a flow diagram of an example process for generating a layout of available seating areas in an establishment.

Figure 76:
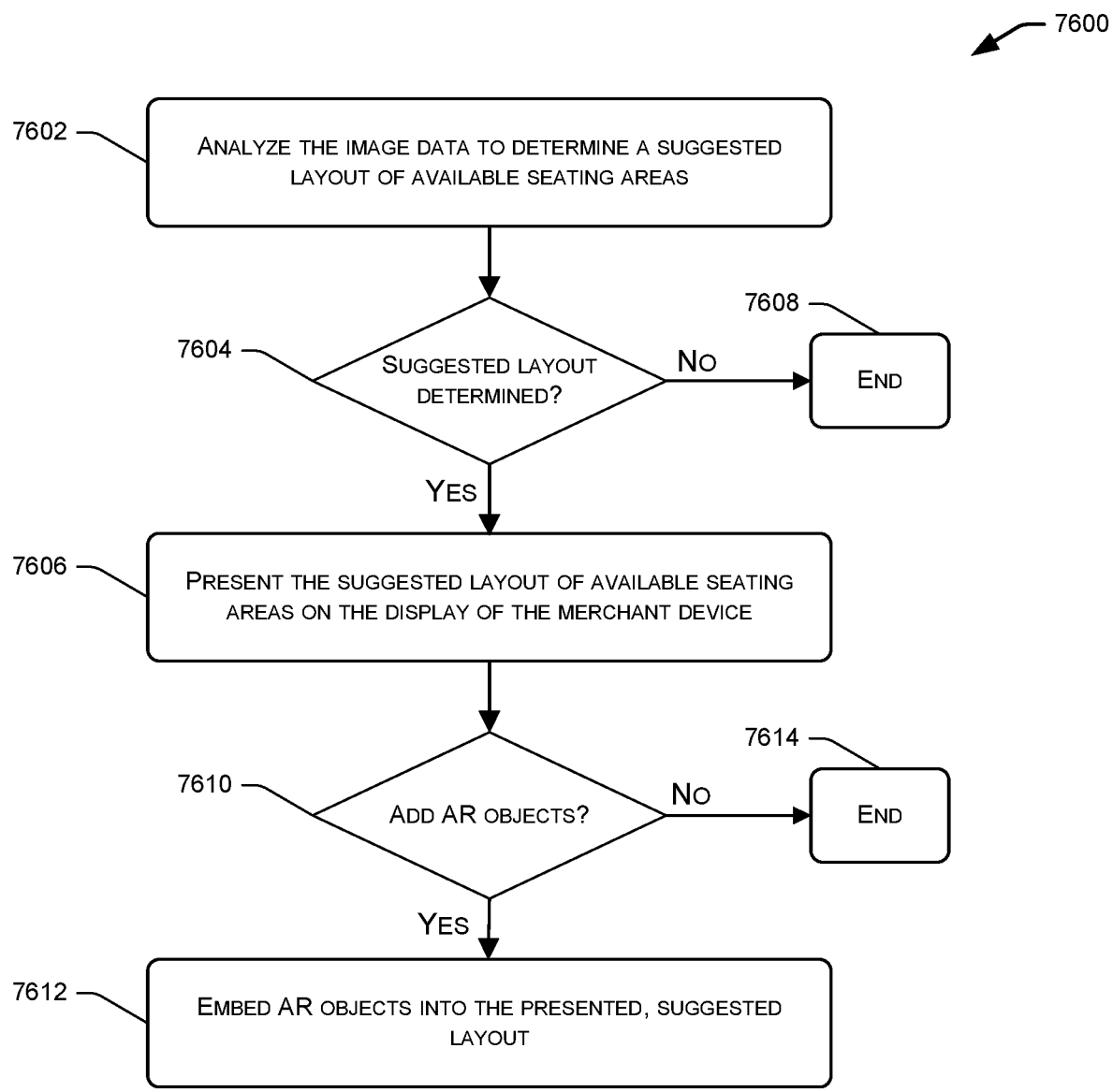

FIG. 76 illustrates a flow diagram of another example process for determining a suggested layout of available seating areas in an establishment.

Figure 77:
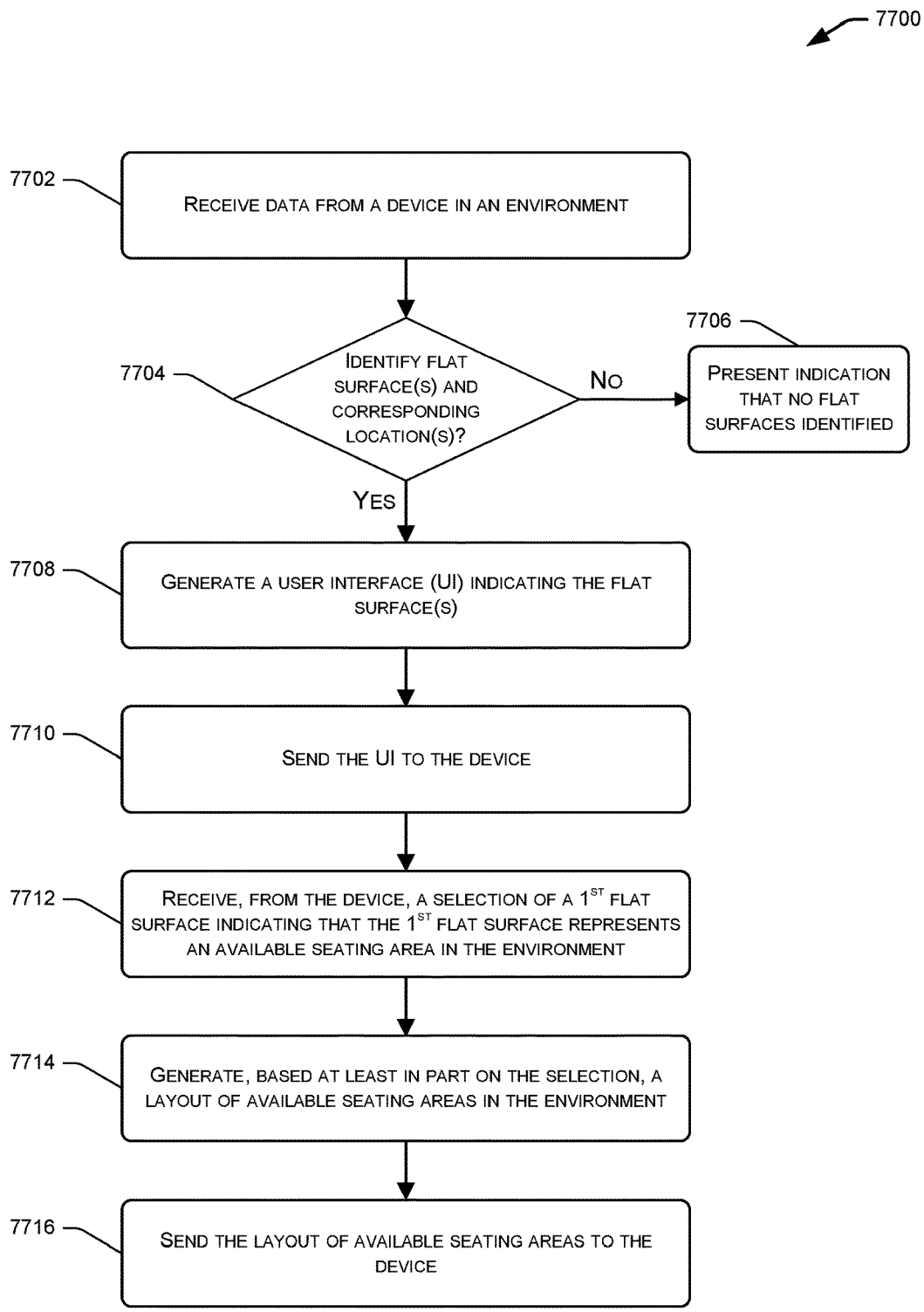

FIG. 77 illustrates a flow diagram of another example process for generating a layout of example seating areas in an establishment.

Figure 78:
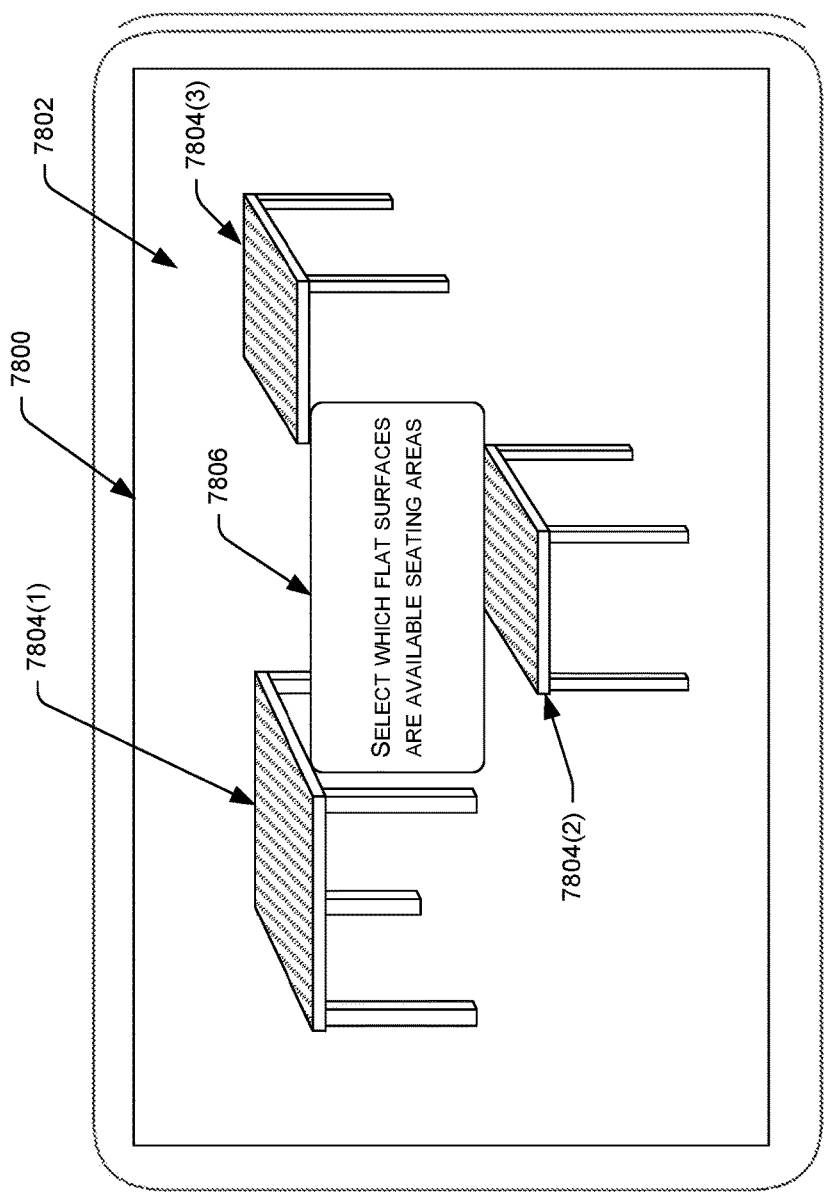

FIG. 78 illustrates an example UI that a merchant device may present after scanning an establishment of the merchant. As illustrated, the UI indicates which surfaces in the establishment have been identified as flat surfaces and enables the merchant to select which of the identified flat surfaces are in fact available seating areas.

Figure 79:
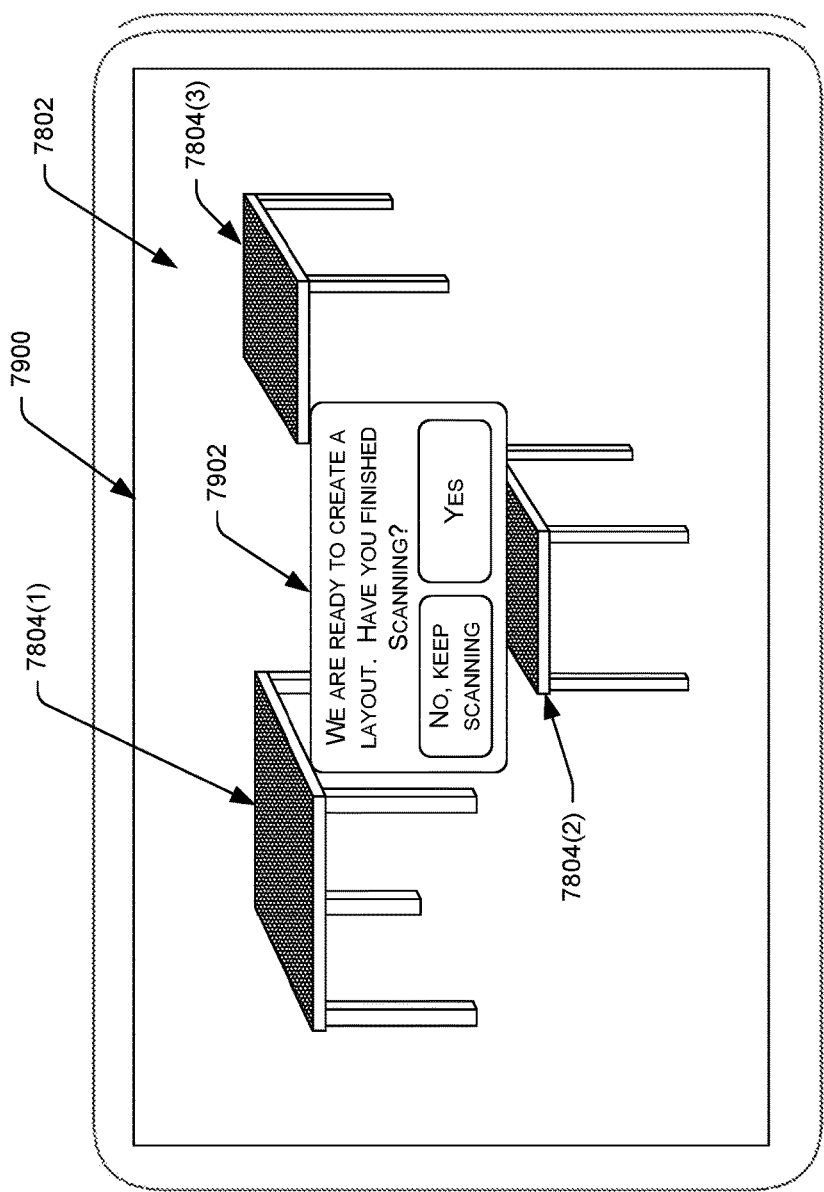

FIG. 79 illustrates an example UI after the merchant has indicated, via the UI from FIG. 78, that all three tables are available seating areas. This UI also provides an option to the merchant to continue scanning the establishment or to generate a layout of available seating areas.

Figure 80:
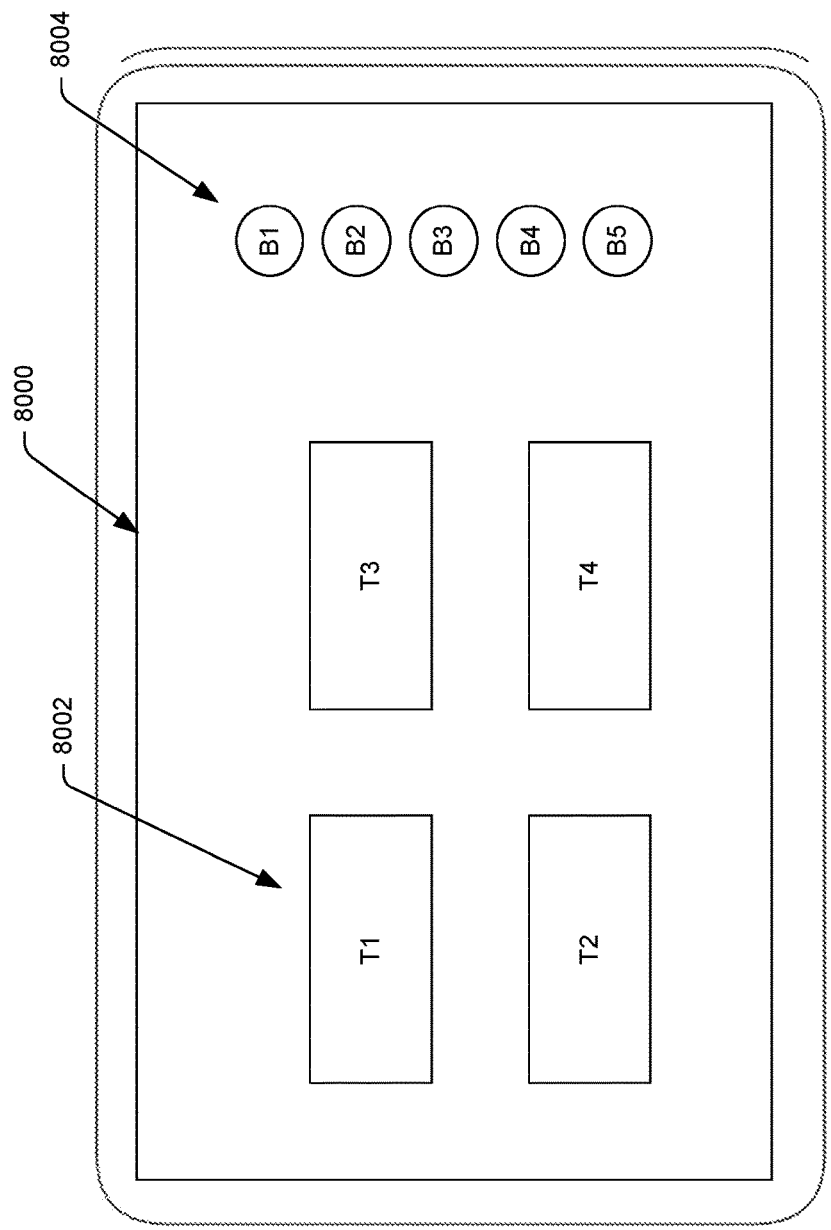

FIG. 80 illustrates an example UI that the merchant device may present after the merchant requests to view a generated layout via the UI of FIG. 79. As illustrated, this UI presents a generated layout of available seating areas in the establishment of the merchant.

Figure 81:
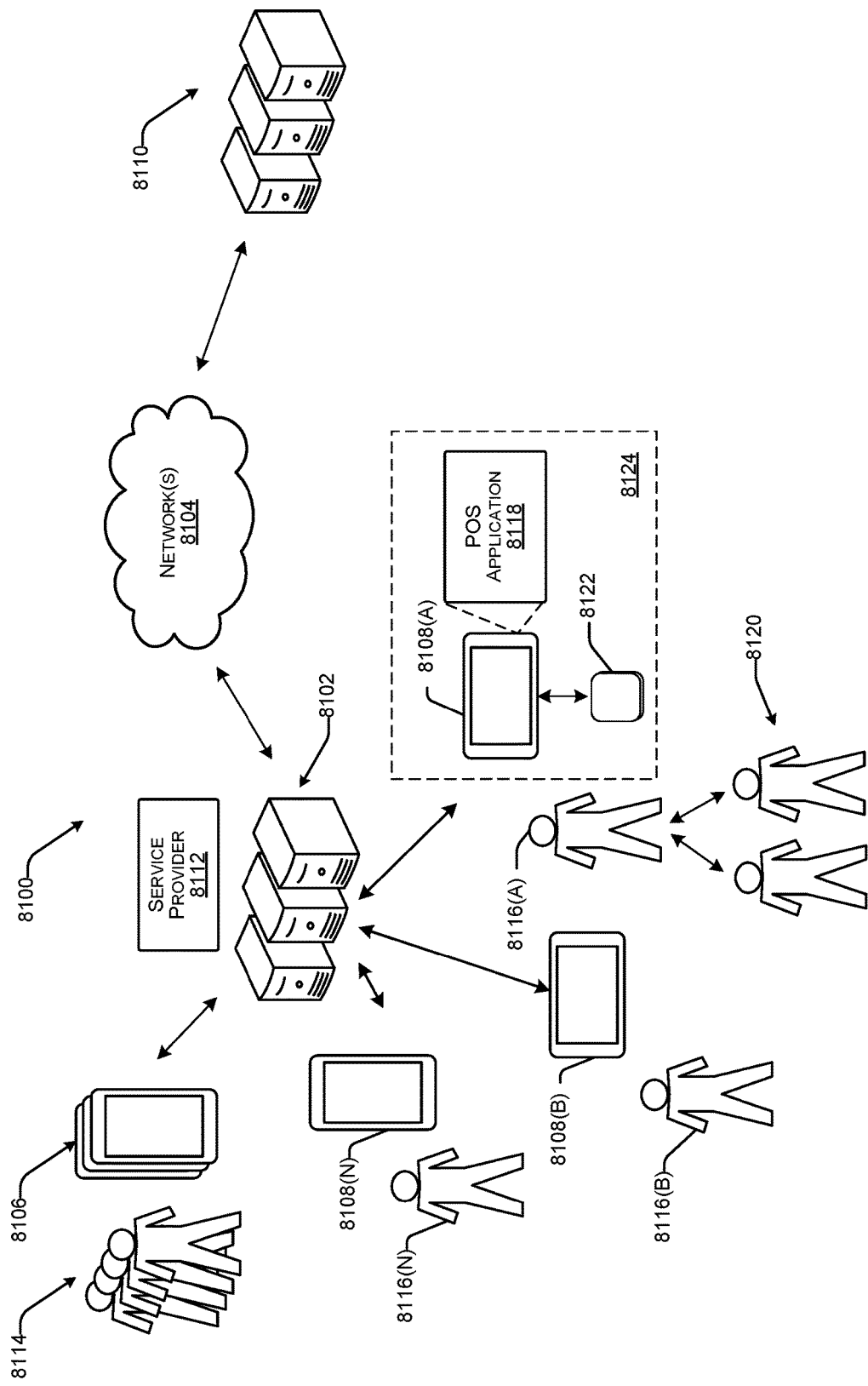

FIG. 81 is an example network environment in which the described techniques may be implemented.

Figure 82:
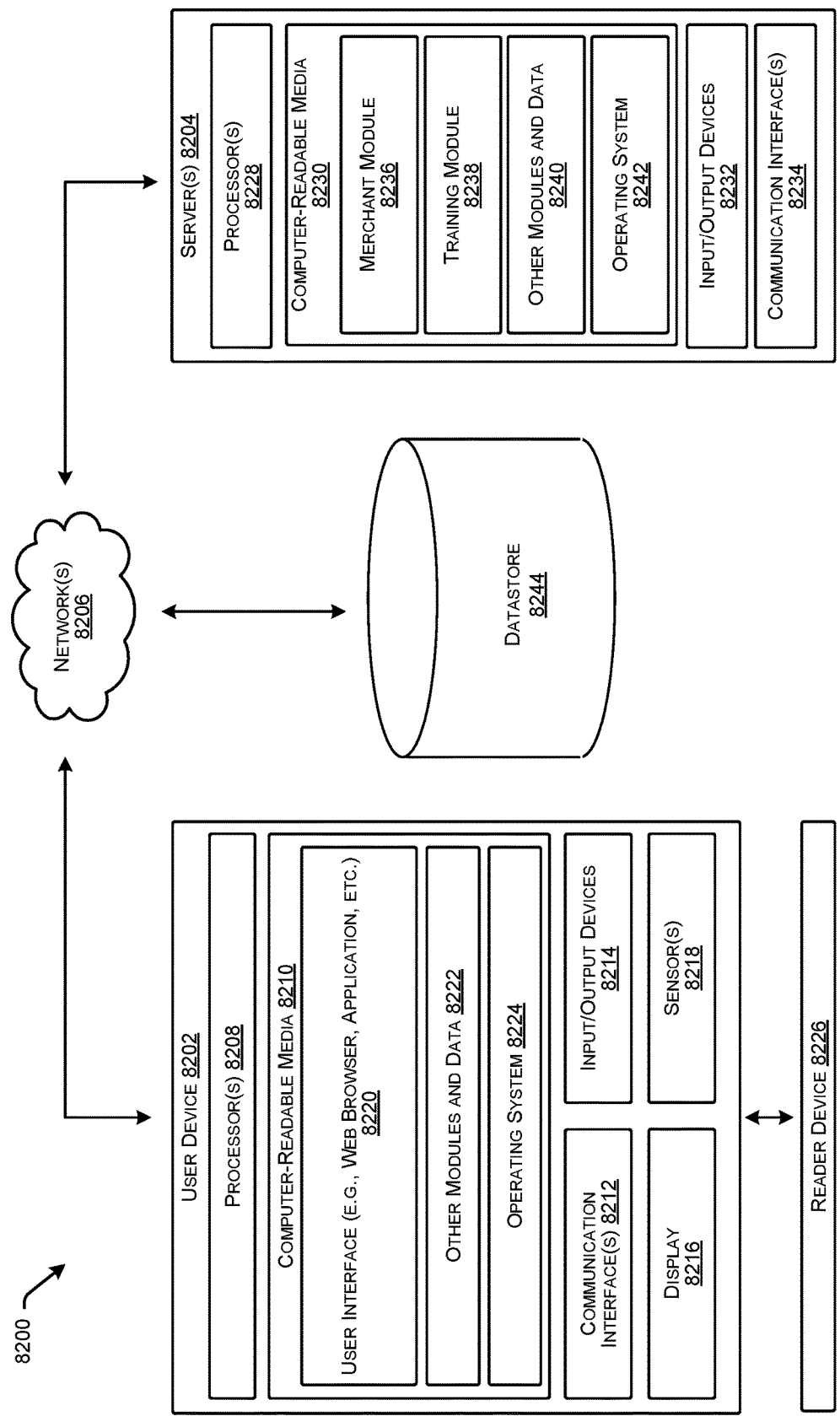

FIG. 82 are example hardware and/or software modules that may implement the described techniques.

In the figures, the left-most digit(s) of a reference number identifies the figure in which the reference number first appears. The use of the same reference numbers in different figures indicates similar or identical items or features. The drawings are not to scale.

DETAILED DESCRIPTION

As described above, more and more merchants are utilizing electronic devices and associated computing applications to aid in the operation of their respective businesses. For instance, retail establishments often use point-of-sale (POS) devices for processing payments, updating and accessing inventory levels, and/or the like. Restaurant establishments may also equip their servers and other staff with mobile POS devices for ordering items on behalf of customers, scheduling preparation of the items, and so forth.

Despite the use and advancement of these devices, these devices often operate in a standalone manner. For example, a server within a restaurant may utilize a mobile front-of-house (FOH) device for taking orders from customers and submitting them for preparation to a back-of-house (BOH) device, generally not viewable by the customers. A cook, chef, expeditor, or other user of the BOH device, meanwhile, may use the BOH device to view current orders to prepare the orders. In still other instances, a host or hostess may utilize another FOH device to maintain a waiting list for customers awaiting seating in the establishment. In general, however, these devices provide functionality for their given tasks, and often do not interact with the other devices to improve the general operation of the establishment.

This disclosure describes, in part, techniques for enabling these types of merchant devices to interoperate with one another in a more robust manner, such that overall operation and efficiency within a merchant establishment is improved at least through intelligent and dynamically changing device-to-device and device-to-network connections. For instance, the techniques described herein may enable the intelligent routing of requests between devices within the merchant establishment based on real-time locations of the devices, which devices are associated with which orders, proximity of the devices to the customers or customer locations (e.g., seating areas), and the like. Further, such routing may be optimized based on contextual information, such as time of the day, network usage, device usage, and other such metrics. To provide an example, a first server within a restaurant may operate a first FOH for inputting orders to a BOH device. A second server, meanwhile, may operate a second FOH for also inputting orders to the BOH device. The BOH device may receive the orders from each of these FOH devices (and, potentially, many others) and may present, on a display of the BOH device, details regarding each order that need be prepared for the respective customers. For example, the BOH device may display a prioritized list of orders such that one or more BOH employees at the restaurant may view the display and determine how and in what order to prepare the orders.

If, however, a cook, chef, food runner, expeditor, or other BOH employee has a question regarding an order, that employee may utilize the BOH device to request clarification. For example, the employee may select an order, or an individual item from an order, from the BOH device and may input a request to speak with a server that is responsible for placing the order. In response to receiving this request, the BOH device may determine which of the multiple FOH devices placed the order with the BOH device. In response to identifying the responsible FOH devices, the BOH device may establish a dedicated communication session with the FOH device and may send the request or query to the FOH device. For example, the BOH device may establish a short-range wireless connection (e.g., Bluetooth, Zigbee, etc.) with the FOH device, may establish a connection over Wi-Fi, may establish a connection over the Internet, or the like for routing the request to the FOH device. In some embodiments, the type of connection is based at least on device characteristics, the nature or size of data packet being sent over the channel, or the like.

The FOH device may, in turn, receive the request from the BOH device and may output data indicative of the request, such as displaying the request on a display of the FOH device. For example, the FOH device may present an indication that a particular BOH device associated with a particular location in the restaurant has requested clarification on a particular order placed by the FOH device. The server may, in turn, go to the specified location to clarify the order, as requested. In another example, the communication session may enable a back-and-forth dialogue between the operator of the BOH device and the server operating the FOH device. For example, the communication session may enable a video chat, a voice chat, an instant-messaging chat, or any other type of interactive dialogue involving audio, visual, or haptic inputs from one or both parties.

Thus, the techniques described herein may create real-time or near real-time communication sessions between devices, with the initiating device automatically identifying the device to connect to. As used herein, real-time communication sessions may represent sessions created substantially contemporaneously with an event (e.g., within 1 second, 100 milliseconds, etc. of a communication request), while near-real-time communication sessions may represent sessions created within a greater threshold amount of time after an event (e.g., within a few seconds, one minute, etc. of a communication request). Furthermore, the techniques described herein allow switching between devices thereby creating unique sessions one after the other, sometimes even allowing multiple devices to communicate with each other for a predetermined time period or for a specific order. For example, the BOH device may automatically identify the FOH device to establish the communication session with based on the FOH device having previously input the order in question. In another example, the BOH device may automatically ping the FOH device closest to the table from which the order in question was placed. The generated communication session may stay open for a predetermined amount of time (e.g., one minute, five minutes, etc.), until completion of a request, and/or the like. The automatic establishment of a communication session in real-time provides at least some of the technological advancements discussed herein. For instance, the generating of these real-time communication sessions creates groups of interoperable devices rather than individual devices that generally function singularly. Further, by automatically identifying the appropriate FOH device to connect to, the techniques eliminate the need to analyze details regarding individual orders to determine the server or device that provided the particular order. Instead, an operator of the BOH device may issue the request and the BOH device may automatically create the appropriate communication channel. These efficiencies may be particularly important in establishments, such as restaurants that handle large volumes of orders and move at an extremely quick pace. Further, using the techniques described herein, FOH devices may identify and initiate connections with other FOH devices and/or BOH devices, while BOH devices may similarly identify and initiate connections with other BOH devices and/or FOH devices.

In other instances, the techniques described herein may utilize device location within an establishment for issuing instructions or suggestions on the devices. For example, one or more of the devices operating in the example restaurant, and/or a remote service coupled to these devices, may generate a layout of orders and their respective locations within the restaurant and may use this layout for determining when to issue instructions or suggestions and/or to determine which devices to issue the instructions or suggestions to. For example, the layout may maintain an association between a first order of a first table associated with a first location in the restaurant, and a second order of a second table associated with a second location in the restaurant, and so forth.

Thereafter, the device(s) and/or the remote service may determine an action to take regarding one of the orders, such as the first order. For example, the device(s) or remote service may determine that the customers associated with the first order are likely ready to receive the bill based on a predefined amount of time having elapsed since the items associated with the first order were completed and/or delivered to the customers. After making this determination, the device(s) and/or remote service may determine when an FOH is within a threshold proximity of the first location associated with the first order. For example, the device(s) or remote service may determine when a particular FOH device is within ten feet of a table that is associated with the first order, based on a GPS signal of the device, based on data from one or more beacons in the restaurant determining the device's location, and/or the like.

After determining that the FOH is within the threshold proximity of the first location, the device(s) and/or remote service may send, to the FOH device, an indication of the suggestion to print the bill for the customers associated with the first order. For example, the FOH device may present, on a display of the FOH device, a suggestion to print the bill for the first table and an icon that is selectable to cause the bill to be printed (e.g., printed on paper via the FOH device or another device, printed on a display of the FOH device, or the like).

In another example, the device(s) or the remote service may determine a second action to take with regard to a second order that is associated with a second location within the restaurant. For example, the second action may comprise suggesting a certain course to the customers at the second location, firing a course for preparation at the BOH of the restaurant (i.e., sending the order to a BOH device), and so forth. When the device(s) or the remote service determines that the same or another FOH device is within a threshold proximity of the second location, that FOH device may receive the suggestion to perform the action and, potentially, an icon that is selectable to perform the action.

By integrating both computational techniques (e.g., for determining suggested actions to take with respect to different orders) and proximity-based techniques (e.g., for determining which devices to send the suggested actions to), the disclosed methods and systems offer intelligent ways to detect a relevant pair of devices for dedicated and, in some cases, timed communication sessions. That is, these techniques at least provide technological advancements by sending the notifications to the appropriate devices, based on their current locations, at the appropriate times, based on the history and timing of the individual orders. The techniques thus result in the sending of communications to devices when the communications are actionable—that is, when the operators of the devices are near the location where the communications are actionable and at times when the communications are actionable.

In still other instances, the techniques described herein may analyze image data of an establishment, such as the example restaurant discussed above, to automatically generate a layout of available seating areas in the establishment. For example, the techniques may provide a UI for display on a merchant device, instructing the operator of the merchant device to use their camera to walk around and image the inside of the establishment. The merchant device may then analyze this data to determine the layout or may send this data to another device or remote service for analyzing the data. In either case, a device may analyze the data using light detection and ranging (LIDAR), trained machine-learning models, or the like to identify relevant surfaces (such as flat surfaces) within the establishment. For example, the device may identify one or more surfaces within the image data that are flat, have a predefined size (e.g., width and length), that are oriented approximately parallel to a plane defined by a floor of the establishment, and that are within a predefined length above the plane of the floor (e.g., at least two feet above the floor). Thus, the device may analyze the data to identify surfaces that may correspond to seating areas for customers, such as tables, bar stools, countertops, and the like. In addition to identifying such surfaces, the device performing the analysis may determine an associated location (e.g., an X, Y location) associated with each respective surface. For example, the device may use LIDAR, computer-vision techniques, or the like to determine the location of each identified surface within the environment of the establishment.

After analyzing the data to identify seating or ecommerce surfaces therein, the techniques may provide a UI for display on the merchant device. In some instances, the UI includes indicators of the identified surfaces overlaid on the actual surfaces in the image data captured by the merchant device. For example, the UI may overlay a predefined color, cross-hatching, or the like on the identified surfaces overlaid on the image data of the establishment. The UI may further include an instruction to the operator of the device to select which of the indicated surfaces correspond to available seating areas. Thus, the operator of the merchant device may, for example, use a touchscreen or other input mechanism on the merchant device to select those surfaces that correspond to available seating areas and/or those surfaces that do not, and to allow translation of the virtual layout of the establishment with recommended seating and dining surfaces to a physical layout.

After selecting the surfaces that correspond to the available seating areas, the operator of the merchant device may indicate that they have finished indicating the available seating areas and may request that a layout of available seating areas be automatically generated. In response to this indication, the merchant device, another device, or the remote service may automatically generate the layout of available seating areas in the establishment. For example, the device may determine the location associated with each surface indicated to correspond to a seating area and may use this location and estimated size of the surface to generate the layout. In some instances, the merchant may also indicate the number of available seats at each flat surface (e.g., each table), and the layout may indicate these corresponding numbers of seats.

After generating the layout, the layout may be presented on a UI on the display of the merchant device. The presented layout may, for example, comprise a top-down, two-dimensional view of the available seating areas in the establishment. In some instances, this UI may also provide tools to enable the merchant to modify or correct any errors in the layout. For example, the tools may allow the merchant to move, add, or remove tables, seats, and/or the like.

While traditional technology enables merchants to generate a layout of available seating areas manually, the above techniques thus use technology on one or more devices to generate image data of an environment and automatically generate a layout of available seating areas in the environment. Thus, these techniques provide an efficient and tailored solution to generating establishment layouts and, further, do so via technological advances. For example, the techniques enable a merchant to generate a layout by capturing image data and allowing one or more devices to analyze the image data to identify flat surfaces and, based on these flat surfaces, automatically create the layout. The layout is thus created automatically, rather than manually, and is done much more quickly and efficiently than via manual methods. Furthermore, such layout may be tied to devices to provide some of the functionalities disclosed herein. For example, one section displayed in the layout can be tied to a pair of FOH device and BOH device, while another section can be associated with another pair of FOH device and BOH device. Such pre-defined associations can be leveraged when communicating for an order, for example.

Additional technical improvements are described below in the discussion of FIGS. 1-82. It is to be appreciated that while these examples are described with reference to a restaurant environment the techniques apply equally to other types of merchant and non-merchant environments.

Device-Aware Requests

FIG. 1 illustrates an example architecture 100 for performing techniques described herein. The example architecture 100 includes a merchant establishment 102, such as a restaurant, having a front-of-house (FOH) 102(1) and a back-of-house (BOH) 102(2). As is known, the FOH 102(1) corresponds to a portion of the establishment 102 where customers interact with staff of the merchant (e.g., order items, etc.) and can include both merchant devices accessible by customers or merchants, or customer devices accessible by customers. The BOH 102(2) corresponds to a portion of the establishment 102 where staff prepares items on behalf of the customers and is accessible by merchants. In some instances, staff of the merchant use merchant devices (e.g., devices configured as a point-of-sale (POS) device for conducting transactions with customers, kitchen-display devices for displaying pending orders, etc.), both in the FOH 102(1) and the BOH 102(2). For example, FIG. 1 illustrates that a user 104(1) may operate a BOH device 106(1), while users 104(2) and 104(2) may operate respective FOH devices 106(2) and 106(3). It is noted that while this example, and examples below, describe the techniques in the context of a restaurant environment, it is to be appreciated that the techniques may apply equally to other retail and non-retail establishments that may utilize different types of devices (e.g., BOH/FOH devices and otherwise), such as brick-and-mortar retail stores, warehouses, grocery stores, and/or other retail and non-retail establishments.

In this example, each of the devices 106(1)-(3) are configured with establishment applications for performing an array of functions within the establishment. For instance, the BOH device 106(1) may be configured to display details regarding orders associated with respective customers in the FOH 102(1). The BOH device 106(1) may also be configured to establish communication sessions with other BOH/FOH devices, activate appliances in the establishment, and perform other actions, as described in detail below. The FOH devices 106(1)-(2), meanwhile, may be configured to establish communication sessions with other BOH/FOH devices, generate orders on behalf of the customers and send the orders to BOH devices, act as a POS device for conducting transactions with the customers, illustrate a layout of available seating areas in the establishment, and perform other actions, also as described in detail below. In some instances, other devices, such as a remote server, may initiate communication sessions with BOH and/or FOH devices. For example, a remote server may determine when an inventory level is running low and may establish a communication session with a BOH device to provide a corresponding notification.

In this example, the user 104(1) may use the BOH device 106(1) to view details associated with an order provided to the BOH device 106(1) by a particular FOH device. Further, in this example, the user 104(1) may have a request regarding the order and, thus, may use a UI 108(1) to request a server who is related to the order, or is proximate to the table that placed the order. In response to this request, the BOH device 106(1) (or another device) may determine an FOH device associated with the order. That is, the BOH device 106(1) or another device may determine, from details associated with the order that the user 104(1) desires clarification on, which FOH device provided the order to the BOH device 106(1).

In this example, the BOH device 106(1) may determine that the FOH device 106(2) operated by the user 104(2) provided the order and, thus, may generate a connection 110 between the BOH device 106(1) and the FOH device 106(2). That is, the BOH device 106(1) may initiate and/or establish a communication session between the BOH device 106(1) and the FOH device 106(2), or vice versa. This communication session may comprise a connection over a short-range wireless network (e.g., Bluetooth, Zigbee, etc.), a connection over Wi-Fi, a connection via the Internet, and/or the like. After establishing the connection 110, the BOH device 106(1) or another device may present, on the FOH device 106(2), a UI 108(2) indicating a request, such as a clarification regarding a particular order has been requested by a BOH device. In some instances, this UI 108(2) may indicate the order for which clarification is requested, the BOH device 106(1) that initiated the request, the location of the BOH device 106(1) in the establishment (e.g., hot station, cold station, etc.), and/or the like.

Further, while FIG. 1 illustrates presenting the UI 108(2) on the FOH device 106(2), in some instances the techniques may additional or alternatively create a near real-time, interactive communication session between the BOH and FOH devices. For example, the techniques may establish a video or voice call, a chat session, or the like between the devices to enable the user 104(1) to provide input for an order, such as clarify the order with the user 104(2). In some instances, such a dedicated session can be timed, for example to lapse after a response to the original request is obtained or timed to the duration of the order. Furthermore, the request for the user 104(2) can be dynamically configured with interactive elements (such as buttons) to allow the user to provide input in a frictionless manner. The request can also include alternatives, for example, if the restaurant is running out of inventory on a specific ordered item.

Using the techniques shown in FIG. 1, the BOH device 106(1) automatically identifies which FOH device 106(2) provided an order for which the user 104(1) has a question and, in response to identifying this FOH device, automatically establishes a communication session with identified FOH device. In some instances, some or all of these techniques are performed by applications executing on the BOH/FOH devices. In other instances, some or all of these techniques are performed by a remote service 112 communicatively coupled to the BOH/FOH devices via one or more network(s) 114. The network(s) may represent any combination of wired and/or wireless networks. Furthermore, as described herein, a "merchant" can be any entity that offers items (e.g., goods or services) for purchase or other means of acquisition (e.g., rent, borrow, barter, etc.). The merchant can offer items for purchase or other means of acquisition via brick-and-mortar stores, mobile stores (e.g., pop-up shops, food trucks, etc.), online stores ("ecommerce"), combinations of the foregoing, and so forth. In case of a peer-to-peer (P2P) scenario, the merchant and customer can be a first P2P customer and a second P2P customer, respectively, capable of transferring money to each other via a P2P payment application. In some instances, the merchant may also comprise a consumer that purchases one or more items (e.g., using a mobile payment application) and uses the techniques described herein to finance these items on an individual basis.

In addition, in some instances the establishment 102 may include one or more network-connected appliances 116 (e.g., "smart appliances"), such as smart ovens, microwaves, fryers, dishwashers, or the like. In some instances, these appliances may also communicate with the BOH devices, FOH devices, and/or the remote service 112. For example, the user 104(1) may use the BOH device 104(1) in some instances to turn on or off one or more of the appliances 116, control the appliances 116, alter settings of the appliances 116, and/or the like. In some instances, as described below, the BOH device 106(1) may present one or more UIs for notifying the user 104(1) when a capacity of one or more of the appliances has been reached and may suggest activation of at least one additional appliance in response.

In some instances, the remote service 112 may function as a payment processing service that receives and processes payment transactions on behalf of the establishment 102, as well as on behalf of other merchants 118. In this regard, the remote service 112 may receive, from respective merchant computing devices associated with a plurality of merchants, respectively, transaction information of transactions performed between the plurality of merchants and a plurality of buyers. For example, the remote service 112 may receive this transaction information from devices within the establishment 102, devices associated with the other merchants 118, and/or the like. In addition, each of the merchant computing devices may have respective instances of a merchant application installed thereon for configuring the plurality of merchant computing devices as a plurality of point-of-sale (POS) terminals, respectively, with these respective instances of the merchant application configuring the respective POS terminals to communicate the transaction information over one or more networks to the payment processing system (i.e., the remote service 112). In addition, the remote service 112 may generate, using a trained model, a plurality of merchant profiles for each of the merchants. The merchant profiles may store information regarding merchant type, merchant location, merchant inventories, and/or other data associated with the respective merchants. The trained model, meanwhile, may be rained using at least one of the plurality of merchants, the plurality of buyers, the transaction information, and/or additional information.

Figure 2:
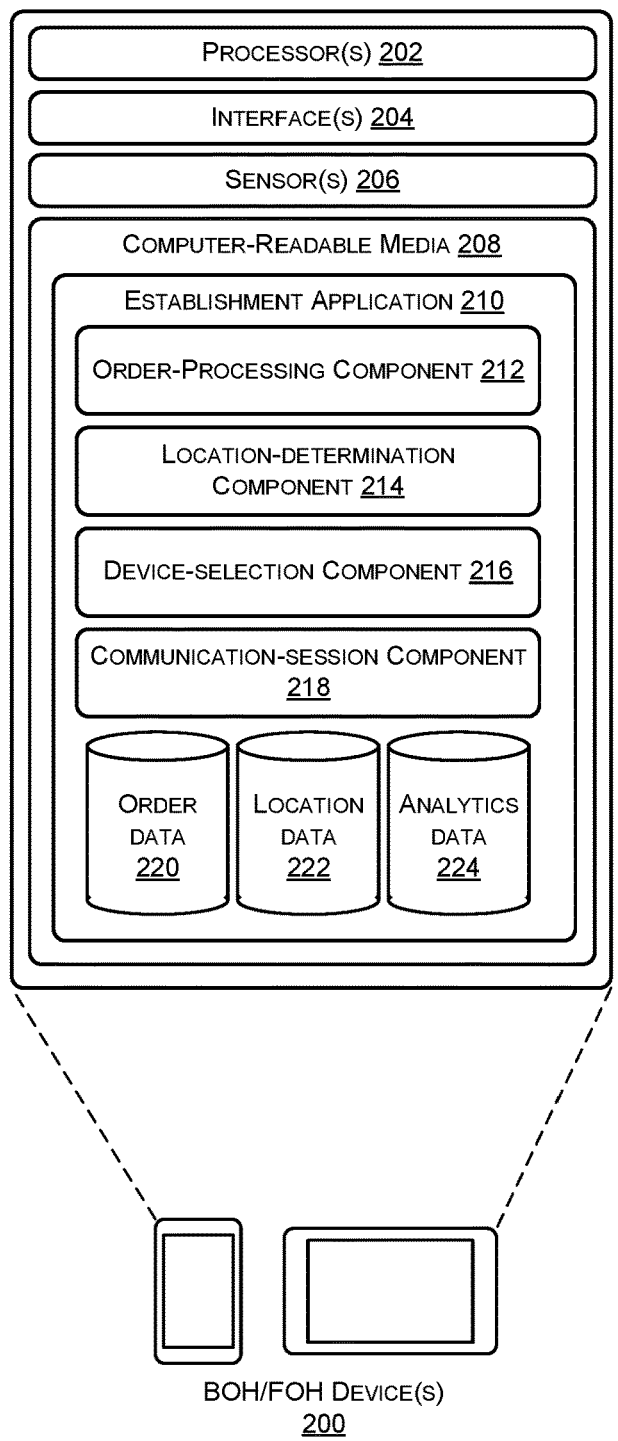
FIG. 2 illustrates example components of the BOH and/or FOH devices described herein for performing the technique described herein.

FIG. 2 illustrates example components of the BOH and/or FOH devices 200 described herein for performing the technique described herein. Further, while this figure illustrates these components as residing in the FOH and/or BOH devices, it is to be appreciated that some or all of these components may additionally or alternatively reside in the remote service 112 and/or at other locations. As illustrated, each device 200 may include one or more processors 202, one or more or more interfaces 204 for communicating with other devices, and one or more sensors (e.g., cameras, GPS units, etc.) for generating data sensor data. In addition, each device 200 may include computer-readable media 206 executing an instance of an establishment application 210, which may enable the techniques described above and below. In some instances, a FOH device may store and execute an instance of an establishment application 210 configured to enable the FOH operations described herein, while a BOH device may store and execute an instance of an establishment application 210 configured to enable the BOH operations described herein. In other instances, the establishment application 210 may be common across both BOH and FOH devices. The BOH and/or FOH devices may comprise any type of computing device, such as tablet computing devices, mobile phones, laptop computers, desktop computer, server computers, specialized computers, and/or the like. In some instances, the FOH device may comprise a device that is operated by a merchant, while in other devices the FOH device may be operated by a customer, such as a customer at a table or other seating area. In still other instances, the FOH device may include a first display operable by the merchant and a second display operable by the customer.

In this example, the establishment application 210 includes an order-processing component 212, a location-determination component 214, a device-selection component 216, a communication-session component 218, as well as order data 220, location data 222, and analytics data 224. The order-processing component 212 may enable an array of features described and illustrated below, such as enabling FOH devices to enter customer orders, enabling BOH devices to view and interact with orders, and so forth. In general, the order-processing component 212 is responsible for presenting some or all of each UI illustrated and described below.

The location-determination component 214 may be used to determine a location of one or more BOH and/or FOH devices for determining one or more actions to take with respect to these devices. The location-determination component 214 may function to determine location(s) of device(s) using GPS data, triangulation techniques based on beacons or other devices in the establishment 102, or via any other location techniques. In some instances, and as described below, the establishment application 210 may send UIs to particular devices based on the location of these devices, as determined by the location-determination component 214.

The device-selection component 216 may function to determine which device(s) to establish a communication session between, with this communication session being initiated and/or established via the communication-session component 218. In some instances, the device-selection component 216 determines which device to establish a communication session based on a location of one or more devices, based on which device is associated with a particular order, device characteristics, and/or the like. Further, the communication-session component 218 may establish a connection between devices in a peer-to-peer manner, over a wide area network, or a local network, and/or in any other manner. Furthermore, the communication-session component 218 may customize the communication session based on the request, where customization can dictate for example timing for how long the session should be active, privacy controls with respect to information sharing between the devices, and interactive elements based on the request to allow for seamless interaction. Examples of establishing communications between devices for an array of purposes are illustrated and described below, for example at least in FIGS. 3-80.

The order data 220 may comprise details regarding orders placed to BOH device(s) via one or more FOH device(s). For example, the order data 220 may comprise identifiers of the ordered items, modifiers of these items, identifiers of a table or location associated with each order, identifiers of a seat or person associated with each item of each order, one or more times associated with each order, a current status of each order, and/or the like. This order data 220 may be used for an array of purposes, as illustrated and described below.

The location data 222, meanwhile, may be determined by the location-determination component 214 and may correspond to the current, past, and/or predicted location(s) of mobile device(s) within the establishment 102. In some instances, this location data 222 is used to determine which device(s) to send data to and a time at which to send the data to the determined device, as described and illustrated in detail below.

The analytics data 224, meanwhile, may indicate one or more metrics associated with the operation of the establishment 102. For example, the analytics data 224 may indicate average times to prepare orders, current, past, or predicted load of certain appliances in the BOH 102(2) of the establishment 102, capacities of these appliances, and/or other type of metrics that may be tracked in the establishment 102.

Figure 3:
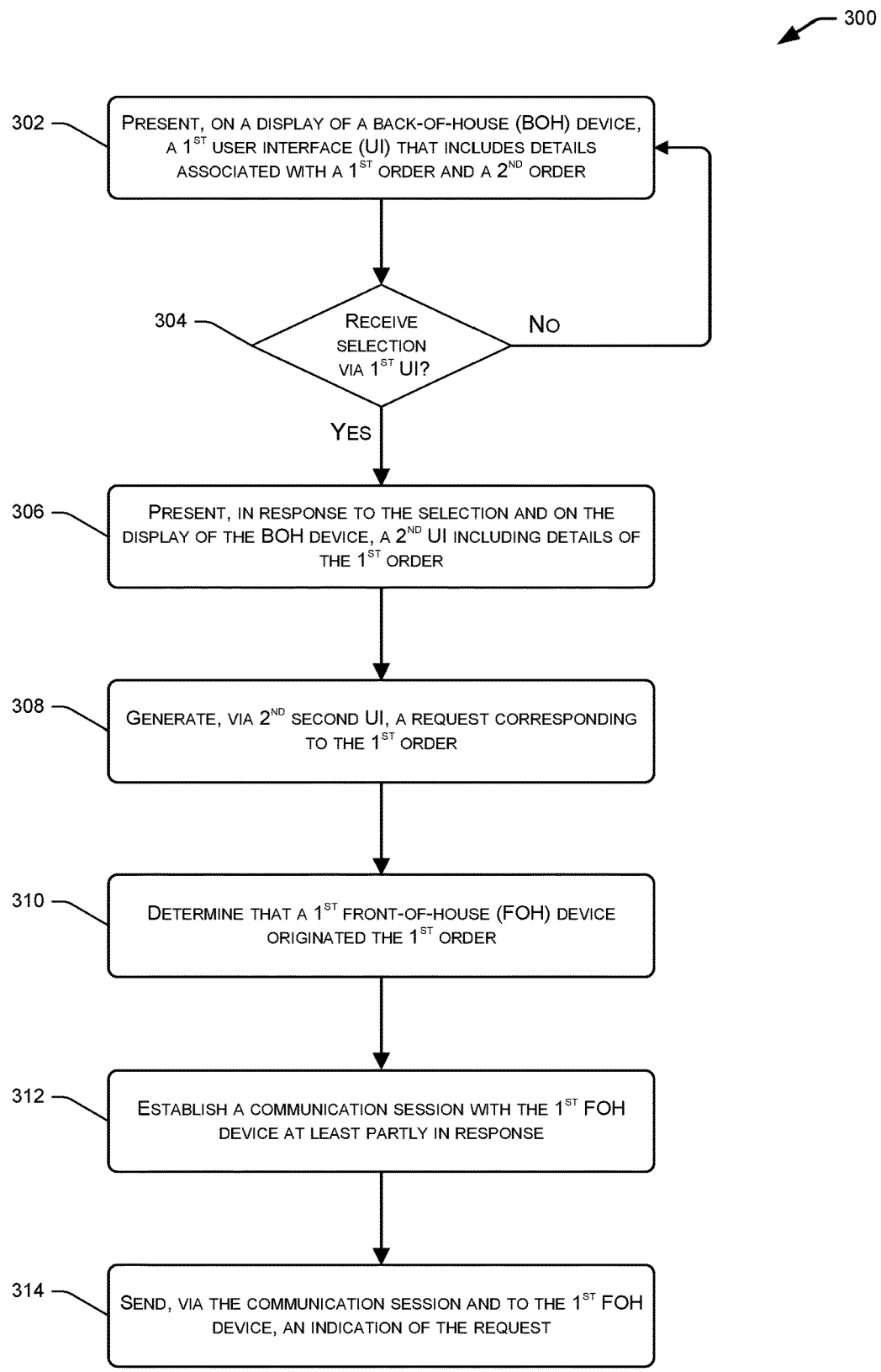
FIG. 3 illustrates a flow diagram of an example process for establishing a communication session between a BOH device and an FOH device for sending, to the FOH device, a request regarding an order placed by the FOH device.

FIG. 3 illustrates a flow diagram of an example process 300 for establishing a communication session, such as between the BOH device 106(1) and the FOH device 106(2) of FIG. 1. The process 300, as well as the additional processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, modules, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In some instances, the processes described herein may be performed, in whole or in part, by modules of the BOH/FOH devices, the remote service 112, other devices, and/or combinations thereof.

An operation 302 represents presenting, on a display of the BOH device 106(1), a first UI including details associated with at least a first order and a second order. In this example, the FOH device 106(2) provided the first order to the BOH device 106(1), while the FOH device 106(3) provided by the second order to the BOH device 106(1). The first UI may depict details regarding the first order, the second order, and, potentially, other orders provided to the BOH device 106(1) by the same or other FOH devices.

Figure 7:
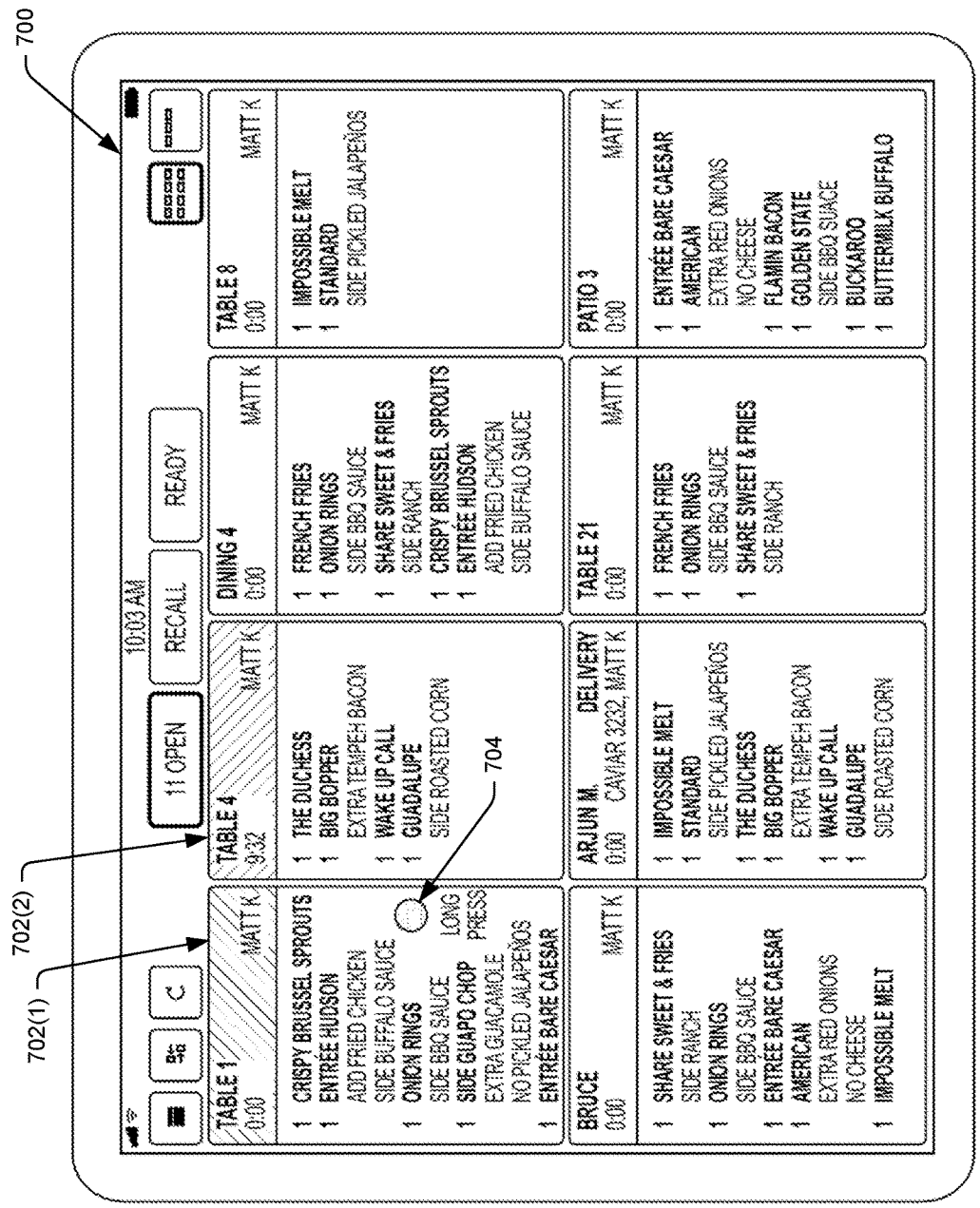
FIG. 7 illustrates an example user interface (UI) that a BOH device may display for presenting current orders that are to be prepared.

FIG. 7 illustrates an example of the first UI 700. As illustrated, the UI 700 includes a first order 702(1), a second order 702(2), and, in this example, six other orders. Each of the illustrated orders may indicate a particular table or other location in the establishment 102 that is associated with the order, the name of the server that provided the order, and details regarding the order, such as identifiers of the items, quantities of the items, and so forth. Each order may also include additional details, such as time at which the order was placed, a time since the order was placed, whether the order is late for delivery or nearly late, and/or the like. In this example, the FOH device 106(2) of FIG. 1 provided the first order 702(1).

Returning to FIG. 3, an operation 304 represents determining whether a selection is received on the first UI. For example, this operation may include determining whether a touchscreen or other input mechanism on the BOH device 106(1) has received a selection of a particular order, such as an order displayed on the UI 700. If not, then the process 300 continues to the display the first UI at the operation 302. Returning to FIG. 7, however, the UI 700 illustrates that the user 104(1) of the BOH device 106(1) has provided a selection 704 of the first order 702(1). In this example, the selection comprises a long-press (e.g., a press greater than a threshold amount of time) on the touchscreen of the device, while in other instances the selection may comprise any other type of selection.

Figure 8:
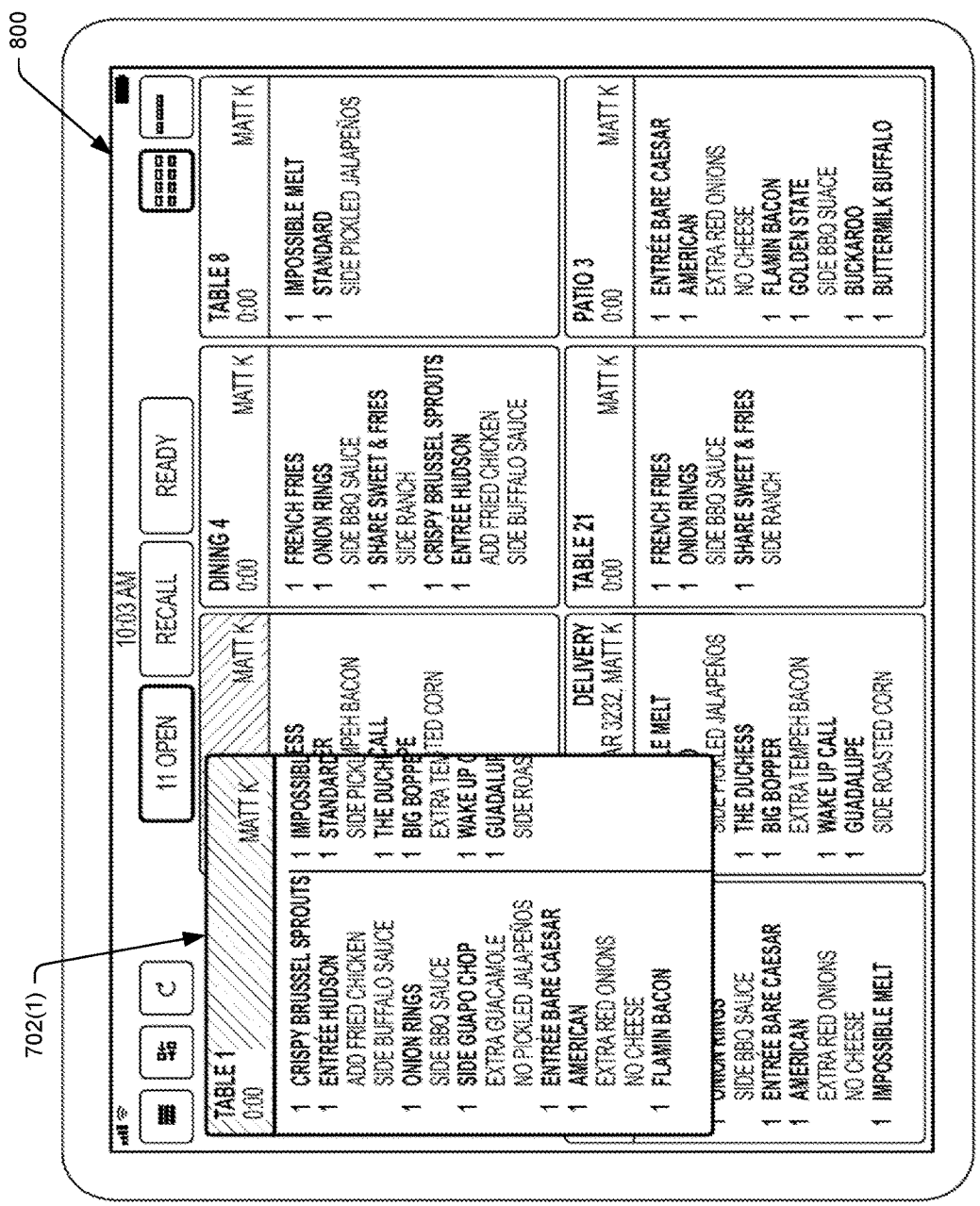
FIG. 8 illustrates another example UI that a BOH device may display in response to the selection shown in FIG. 7. Here, the selected order is expanding to present additional details regarding the order and options regarding the order.
Figure 9:
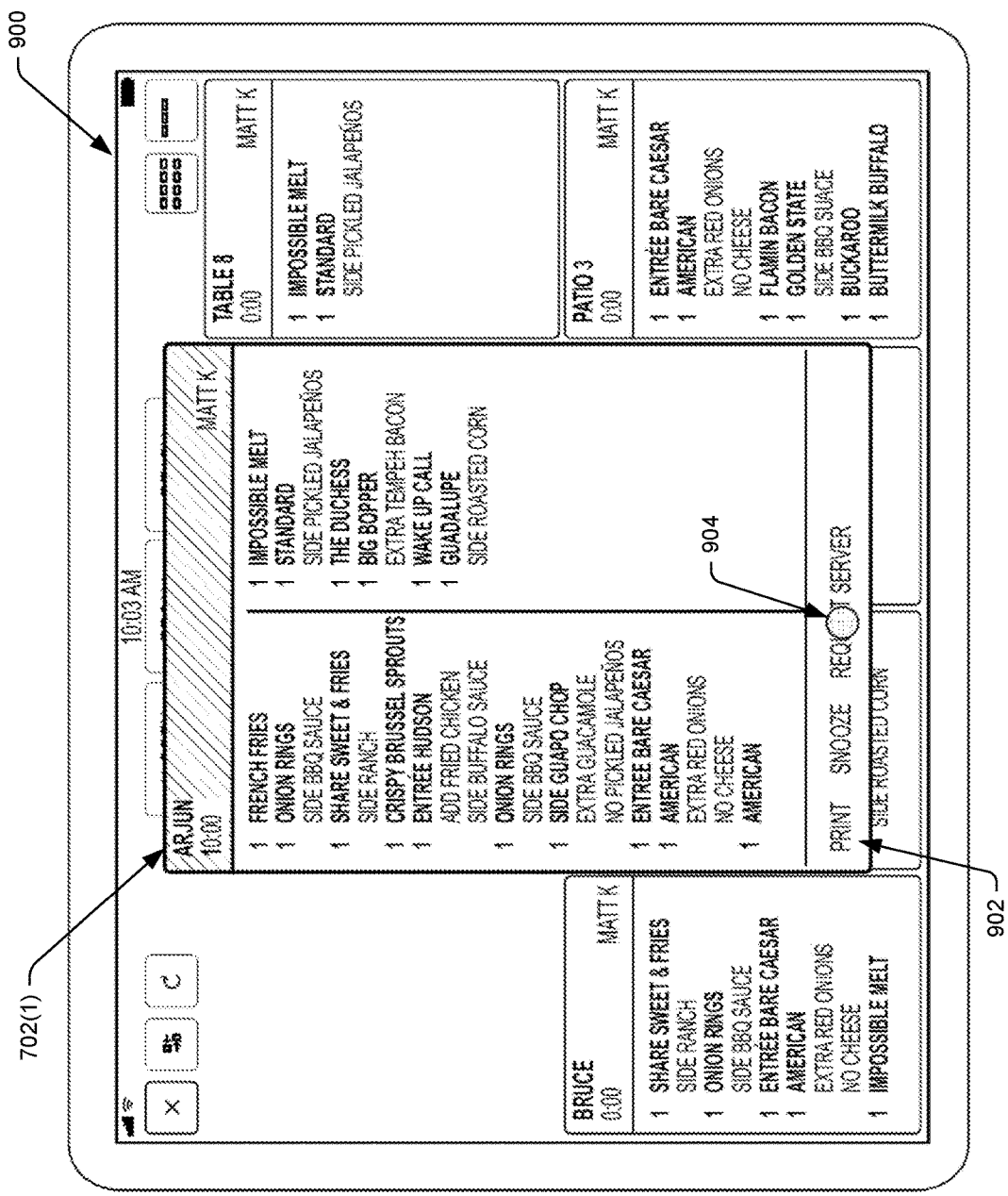
FIG. 9 illustrates another example UI that a BOH device may display after the UI shown in FIG. 8. Here, UI provides options for the operator of the BOH device, including an option to request a server that placed the order.

An operation 306 of FIG. 3 represents presenting, in response to the selection and on the display of the BOH device 106(1), a second UI that includes details (e.g., additional details) of the selected, first order. FIGS. 8-9 illustrate respective example UIs 800 and 900 that the BOH device 106(1) may present in response to the selection 704. For example, the UIs 800 and 900 illustrate that the first order 702(1) may expand on the display of the BOH device 106(1) until reaching the size shown in FIG. 9. In addition to showing details regarding the first order 702(1), the UI 900 may also include additional selectable options, such as "print", "snooze", or "request server". The "print" option may be selectable to print a physical ticket associated with the order, while the "snooze" option may be selectable to pause the order and/or notifications regarding the order. The "request server" option, meanwhile, may be selectable to request the server that placed the order.

Returning to FIG. 3, an operation 308 represents generating, via the second UI, a request corresponding to the first order. For example, this operation may comprise generating a request in response to the user 104(1) selecting one of the selectable options 902 of the example UI 900. FIG. 9, for instance, represents a selection 904 to request the server that initiated the order. Thus, in this example, the operation 308 may generate a request for the server that originated the order.

An operation 310 represents determining that the first FOH device 106(2) originated the first order. For example, the BOH device 106(1) may analyze the stored order data associated with the first order 702(1) to determine that the FOH device 106(2) placed the first order 702(1). In some implementations, the identification of the FOH device also includes receiving device characteristics and communication parameters to allow communication with the identified FOH device.

An operation 312 represents establishing a communication session between the BOH device 106(1) and the first FOH device 106(2). As described above, this may comprise a communication session established over a short-range wireless network, Wi-Fi, the Internet, and/or any other wired and/or wireless connections. Also as described above, the BOH device 106(1) may automatically determine the FOH device 106(2) that originated the order and may automatically establish the communication session in response to receiving the selection from the user 104(1).

At an operation 314, an indication of the request is sent to the FOH device 106(2) via the established communication session. For example, the indication may comprise a notification that the user 104(1) associated with the BOH device 106(1) has a question regarding an order (or, specifically, the first order 702(1)), a specific query regarding the order, or the like. Further, in some instances the communication session may enable a real-time dialogue between the respective users 104(1) and 104(2).

Figure 10:
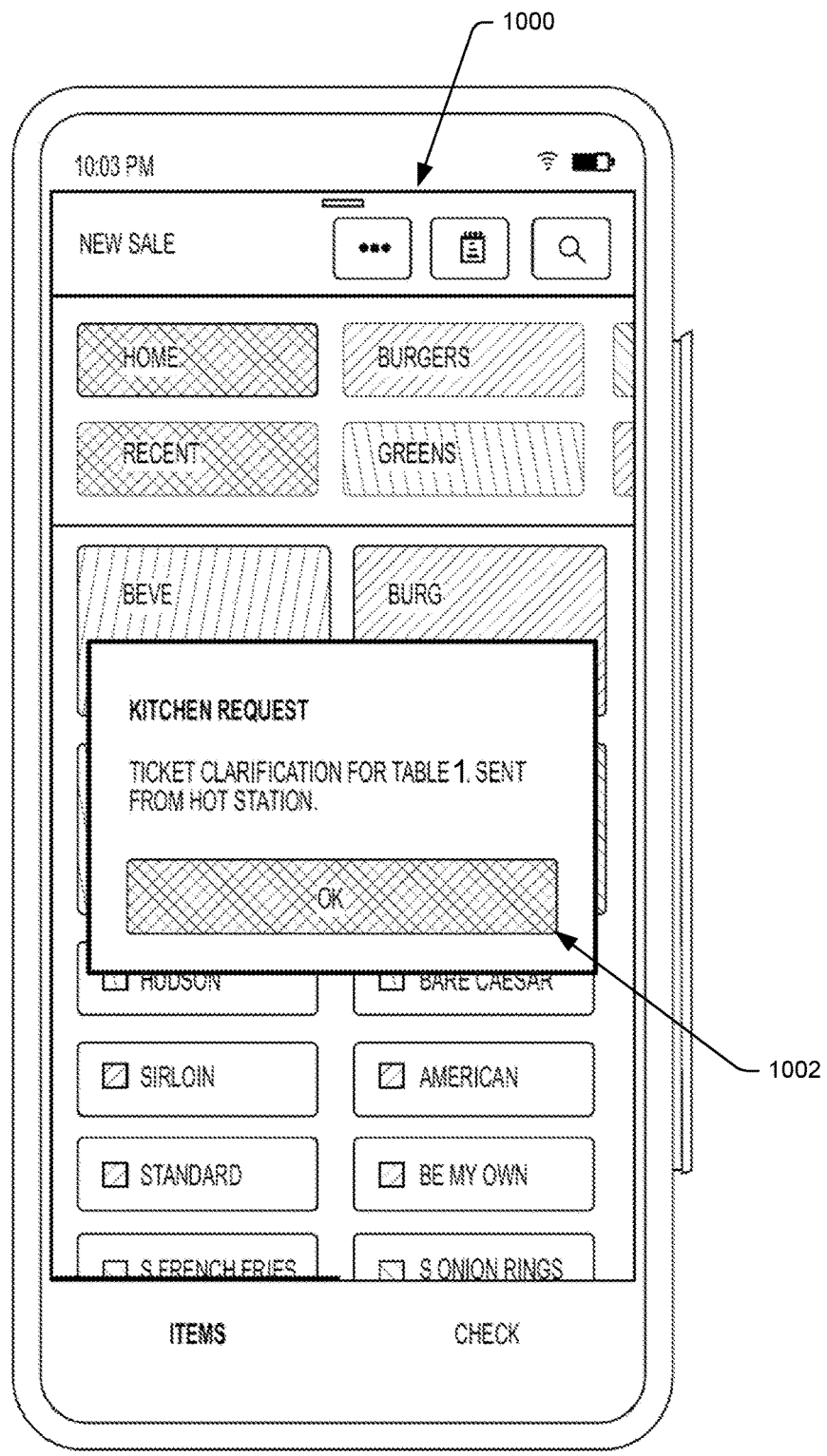
FIG. 10 illustrates another example UI that a FOH device may display in response to the selection by the operator of the BOH device shown in FIG. 9.

FIG. 10 illustrates an example UI 1000 that the FOH device 106(2) may present in response to receiving the indication of the request. As illustrated, the UI 1000 may include a notification 1002 indicating that the kitchen has requested clarification regarding a particular table in the establishment 102. In addition to identifying the table (or other identifier of the order), the notification 1002 may indicate a physical location of the BOH device 106(1) from which the request originated. For instance, in this example the notification 1002 indicates that the request was initiated from the "hot station". In some instances, the notification 1002 may further indicate a query from the user 104(1) (e.g., "Should the sauce be on the side?") and/or other information.

Figure 4:
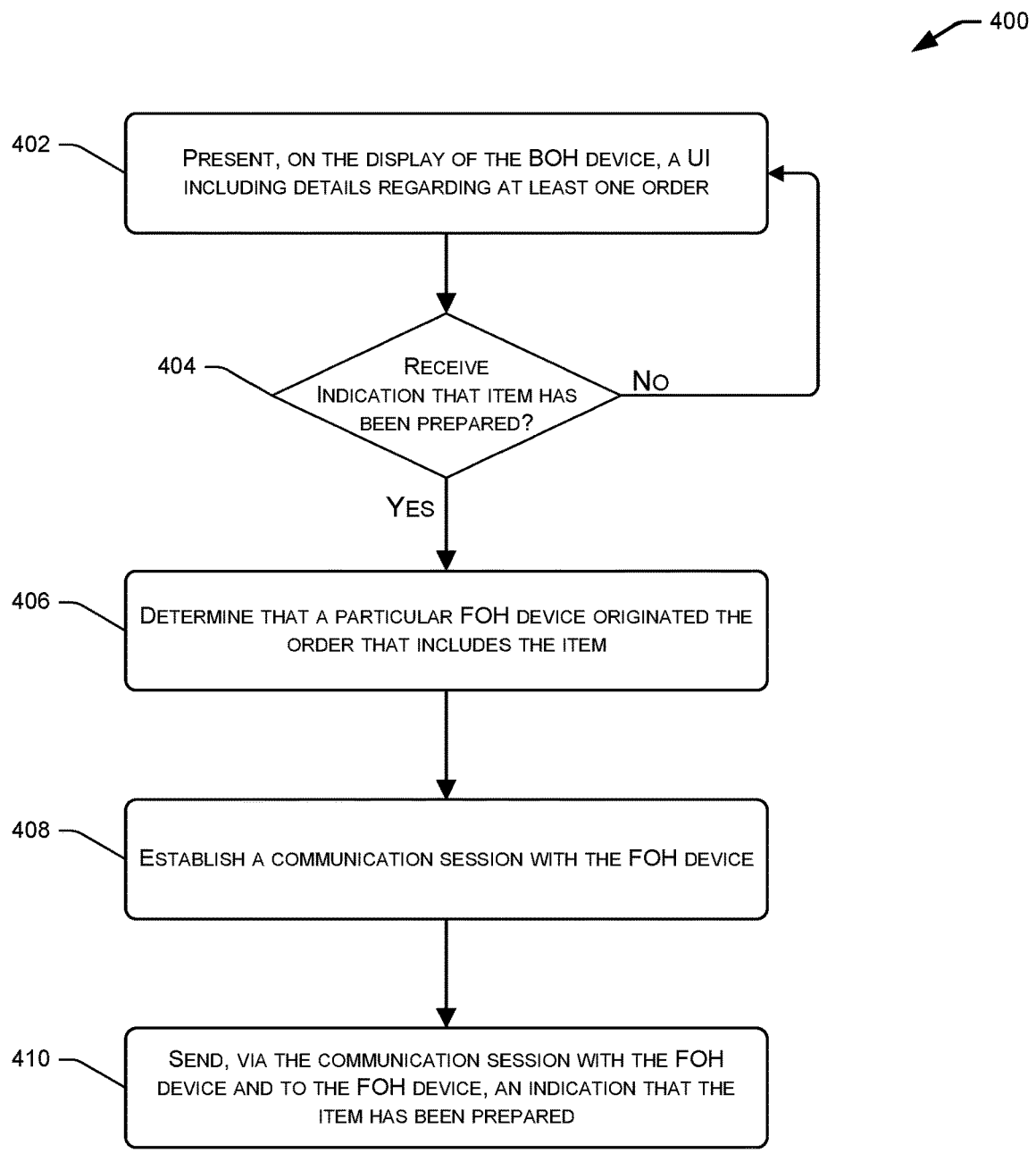
FIG. 4 illustrates a flow diagram of another example process for establishing a communication session between a BOH device and an FOH device for sending, to the FOH device, an indication that an item associated with an order placed by the FOH device has been prepared.

FIG. 4 illustrates a flow diagram of another example process 400 for establishing a communication session between a BOH device and an FOH device in the establishment 102 of FIG. 1. In this example, the communication session may be established for sending, to the FOH device, an indication that an item associated with an order placed by the FOH device has been prepared.

Figure 11:
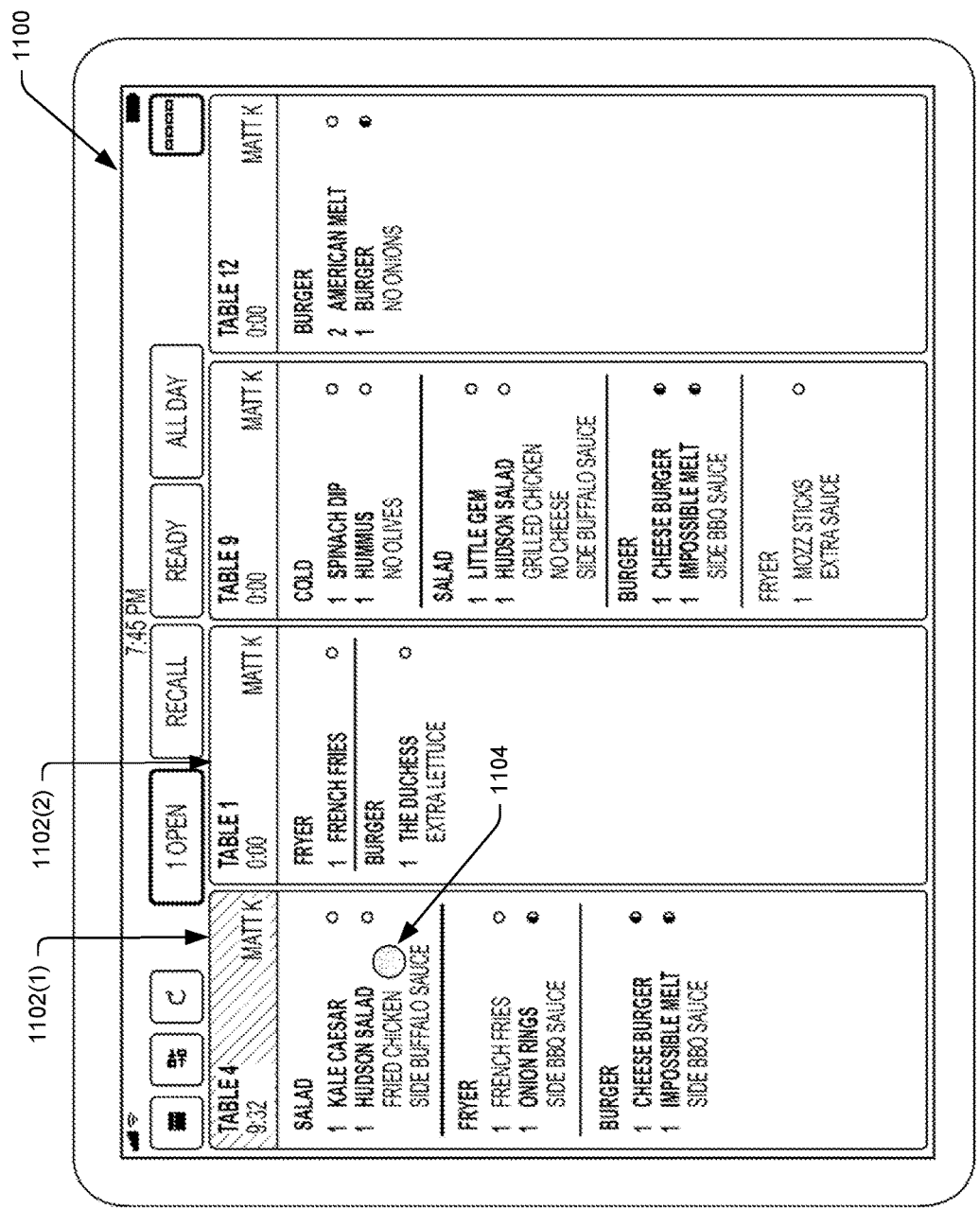
FIG. 11 illustrates another example UI that a BOH device associated with an expeditor station may display. Here, an operator of the BOH device selects an item associated with a particular order.

An operation 402 represents presenting, on a display of the BOH device 106(1), a UI including details regarding an order. FIG. 11, for instance, illustrates an example UI 1100 illustrating details regarding orders 1102(1), 1102(2), and so forth.

An operation 404 represents determining whether the BOH device 106(1) has received an indication that an item from the order has been prepared. FIG. 11, for example, illustrates that the user 104(1) of the BOH device 106(1) has provided a selection 1104 of a particular item ("Hudson Salad") of the display order. In some instances, this selection 1104 may comprise a long-press on the touchscreen of the BOH device 106(1).

Figure 12:
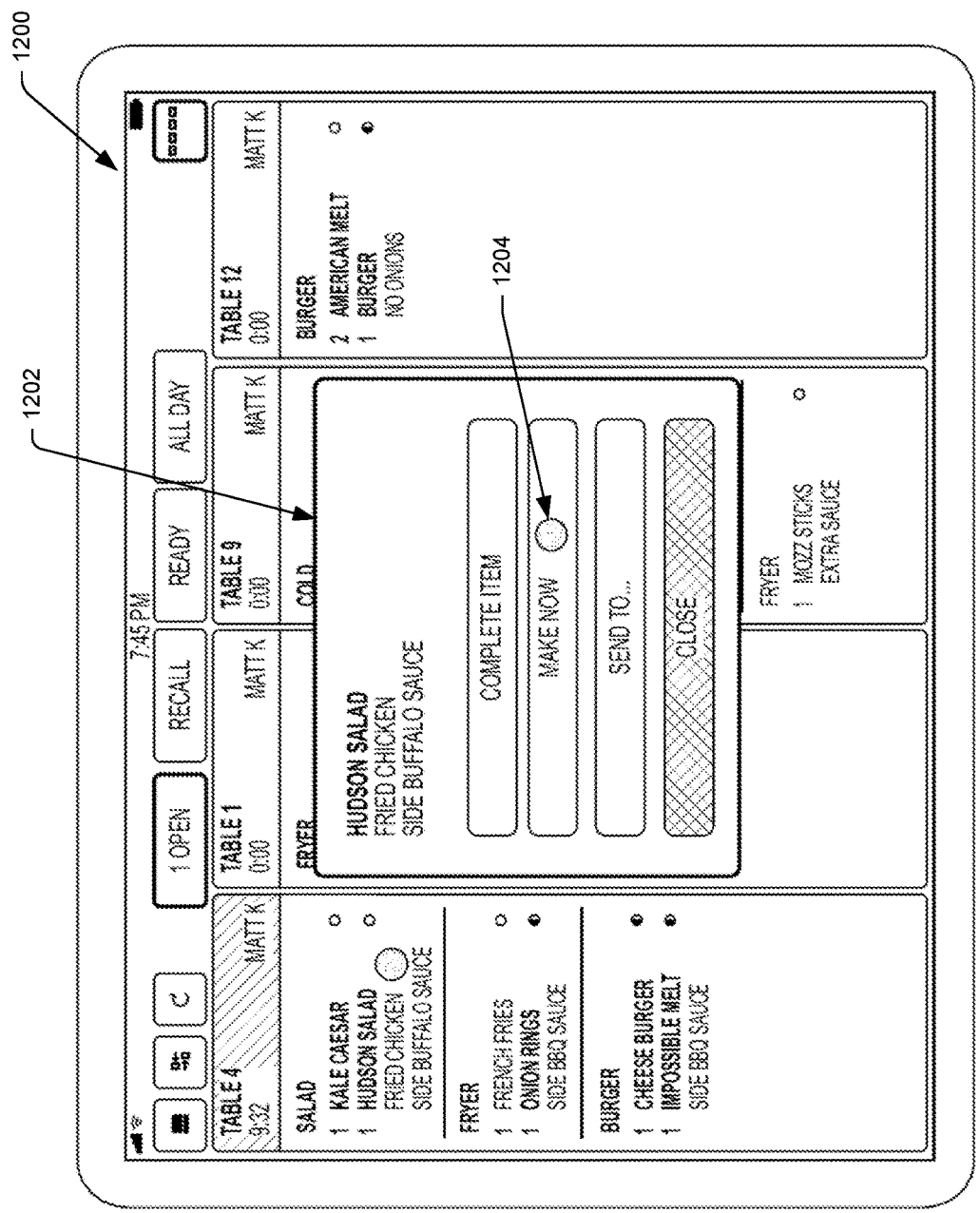
FIG. 12 illustrates another example UI that a BOH device associated with the expeditor station may display in response to the selection of FIG. 11. As illustrated, the BOH device may present several options to the operator including an option to request to make the item now, which the operator selects.

FIG. 12 illustrates that, in response to this selection 1104, the BOH device 106(1) may present an UI 1200. As illustrated, the UI 1200 includes a menu 1202 of multiple options to request regarding the selected item, including "Complete Item", "Make Now", "Send To . . . ", and "Close". While not illustrated, selection of the "Complete Item" icon may result in the BOH device 106(1) determining, at the operation 404, that the BOH device 106(1) has received an indication that an item from the selected order has been completed. Selection of the "Make Now" icon, meanwhile, may result in a communication session being established with another BOH device, as described below with reference to FIGS. 13-15, while selection of the "Send To . . . " icon may move the job of preparing the item to another station. Selection of the "Close" icon may close the menu 1202.

In this example, the user 104(1) may select the "Complete Item" option in the menu 1202 and, in response, the BOH device 106(1) may determine that it has received an indication that an item has been prepared. Returning to FIG. 4, an operation 406 represents determining that a particular FOH device originated the order associated with the item has been completed. Again, this operation may comprise analyzing the order data 220 associated with the order to identify the FOH device that provided the order to the BOH device 106(1).

An operation 408 represents establishing a communication session with the FOH device determined at the operation 406. As described above, this may comprise a communication session established over a short-range wireless network, Wi-Fi, the Internet, and/or any other wired and/or wireless connections. Again, the BOH device 106(1) may automatically determine the FOH device that originated the order and may automatically establish the communication session in response to receiving the selection from the user 104(1).

Figure 21:
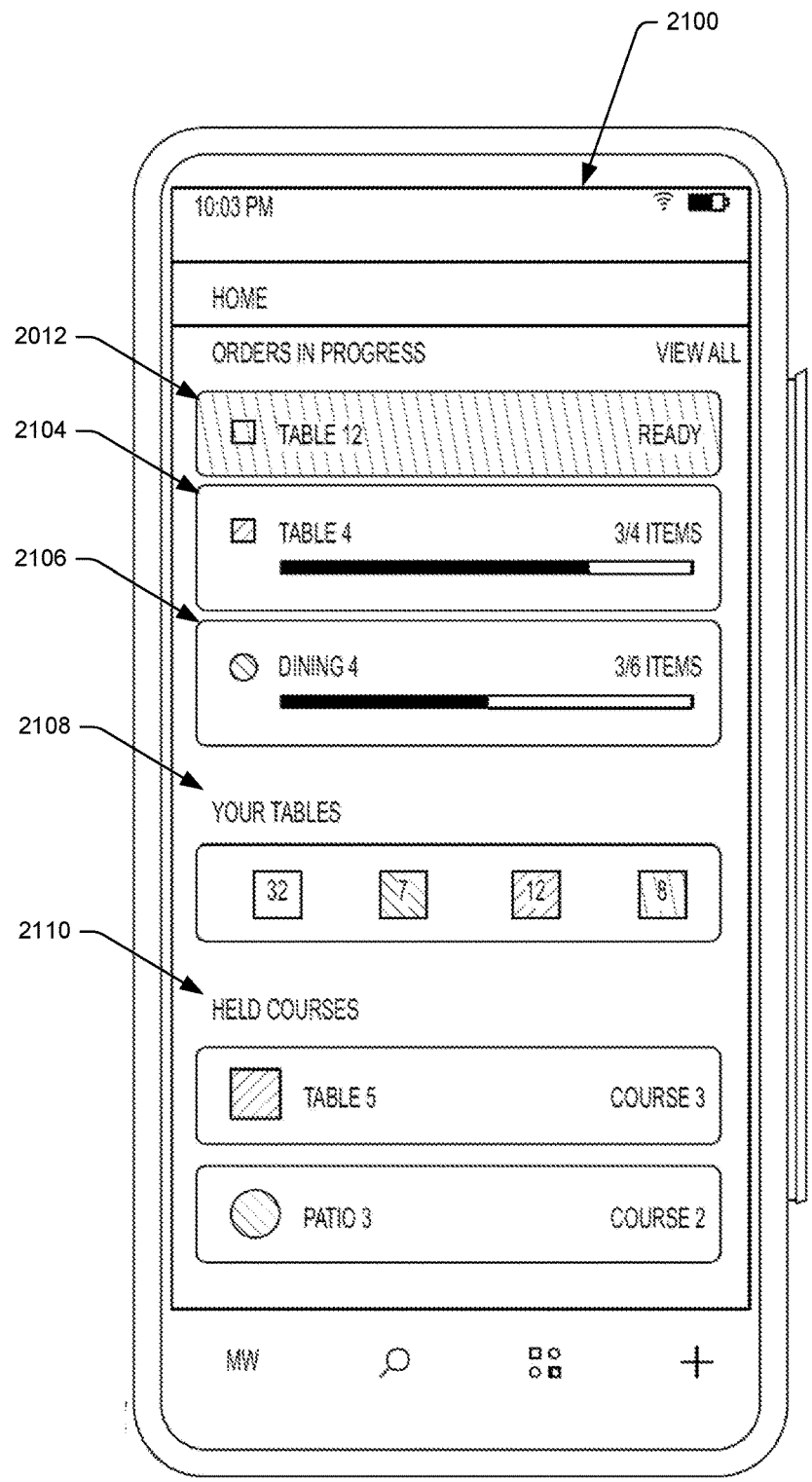
FIG. 21 illustrates another example UI that an FOH device may present for informing an operator of the FOH device of the current status of orders that the operator has placed to the BOH. For instance, this UI indicates that one order is ready for delivery, another order is nearly complete, and a third order is half complete.
Figure 22:
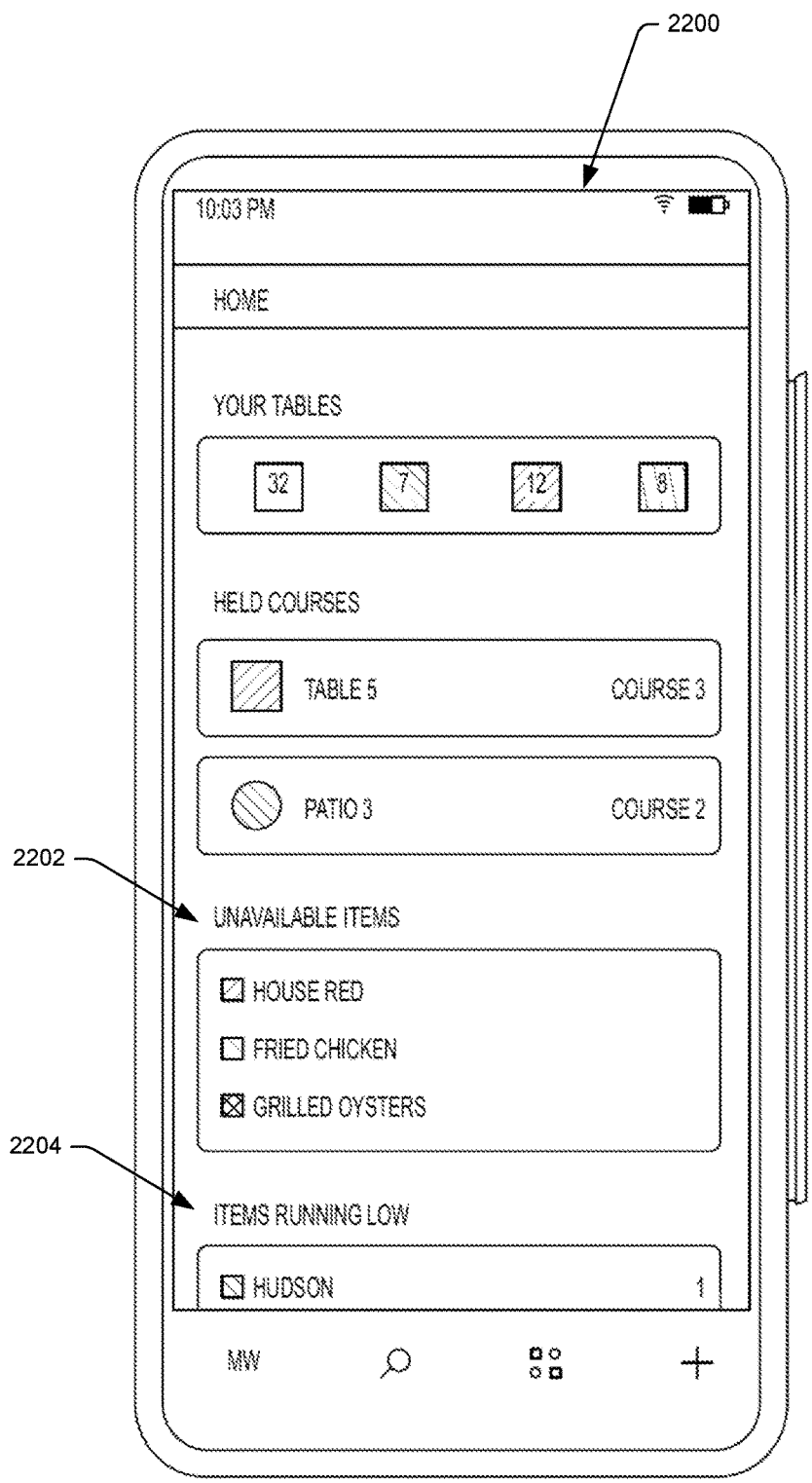
FIG. 22 illustrates another example UI that an FOH device may display to provide information to the operator of the FOH device.

At an operation 410, an indication that the item has been prepared is sent to the FOH device via the established communication session. For example, the indication may comprise a notification that a particular item has been completed, that each item in the order has been completed, or the like. Thus, the operator of the corresponding FOH device may stay apprised of the progress of each order he or she is responsible for. FIGS. 21-22 and a corresponding discussion illustrate and describe this in further detail below.

Figure 5:
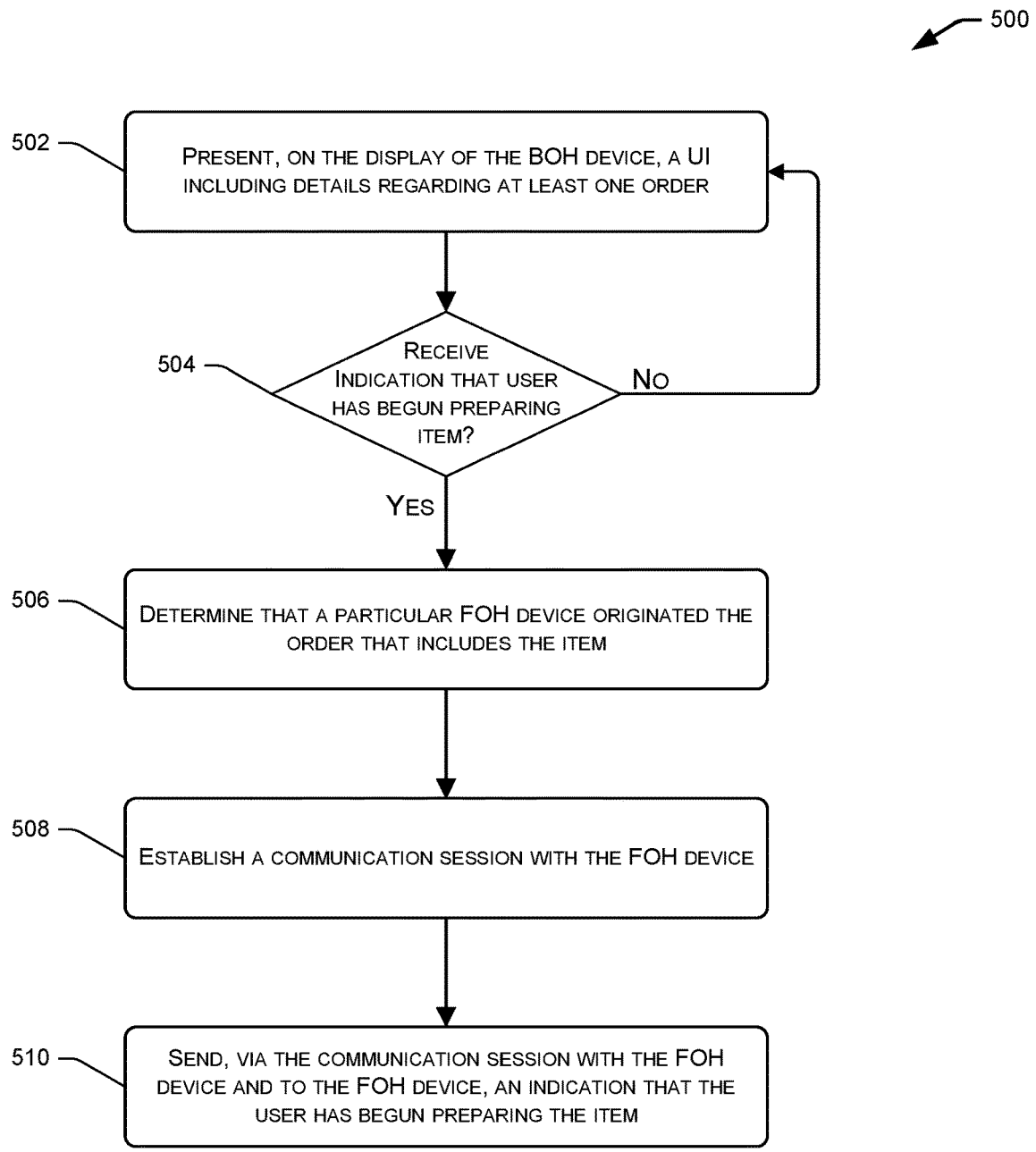
FIG. 5 illustrates a flow diagram of another example process for establishing a communication session between a BOH device and an FOH device for sending, to the FOH device, an indication that a user has begun preparing an item associated with an order placed by the FOH device.

FIG. 5 illustrates a flow diagram of another example process 500 for establishing a communication session between a BOH device and an FOH device for sending, in this example, an indication that a user has begun preparing an item associated with an order placed by the FOH device.

An operation 502 represents presenting, on a display of the BOH device 106(1), a UI including details regarding an order. FIG. 11, for instance, illustrates the example UI 1100 illustrating details regarding the orders 1102(1), 1102(2), and so forth.

An operation 504 represents determining whether the BOH device 106(1) has received an indication that a user has begun preparing an item of the order. FIG. 11, for example, illustrates that the user 104(1) of the BOH device 106(1) has provided a selection 1104 of a particular item ("Hudson Salad") of the display order. In some instances, this selection 1104 may comprise a long-press on the touchscreen of the BOH device 106(1).

FIG. 12 illustrates that, in response to this selection 1104, the BOH device 106(1) may present an UI 1200. As illustrated, the UI 1200 includes the menu 1202 of the multiple options. In addition, to the illustrated options, this menu 1202 (or other menus on other UIs illustrated and described herein) may include an option to indicate the item has been started. In this example, the user 104(1) may select the "Starting Item" option and, in response, the BOH device 106(1) may determine that it has received an indication that a user has begun preparing a particular item. Returning to FIG. 5, an operation 506 represents determining that a particular FOH device originated the order associated with the item has been completed. Again, this operation may comprise analyzing the order data 220 associated with the order to identify the FOH device that provided the order to the BOH device 106(1).

An operation 508 represents establishing a communication session with the FOH device determined at the operation 506. As described above, this may comprise a communication session established over a short-range wireless network, Wi-Fi, the Internet, and/or any other wired and/or wireless connections. Again, the BOH device 106(1) may automatically determine the FOH device that originated the order and may automatically establish the communication session in response to receiving the selection from the user 104(1).

At an operation 510, an indication that the item has been prepared is sent to the FOH device via the established communication session. For example, the indication may comprise a notification that a user in the BOH 102(1) has begun preparing a particular item. Thus, the operator of the corresponding FOH device may stay apprised of the progress of each order he or she is responsible for. Again, FIGS. 21-22 and a corresponding discussion illustrate and described this in further detail below.

Figure 6:
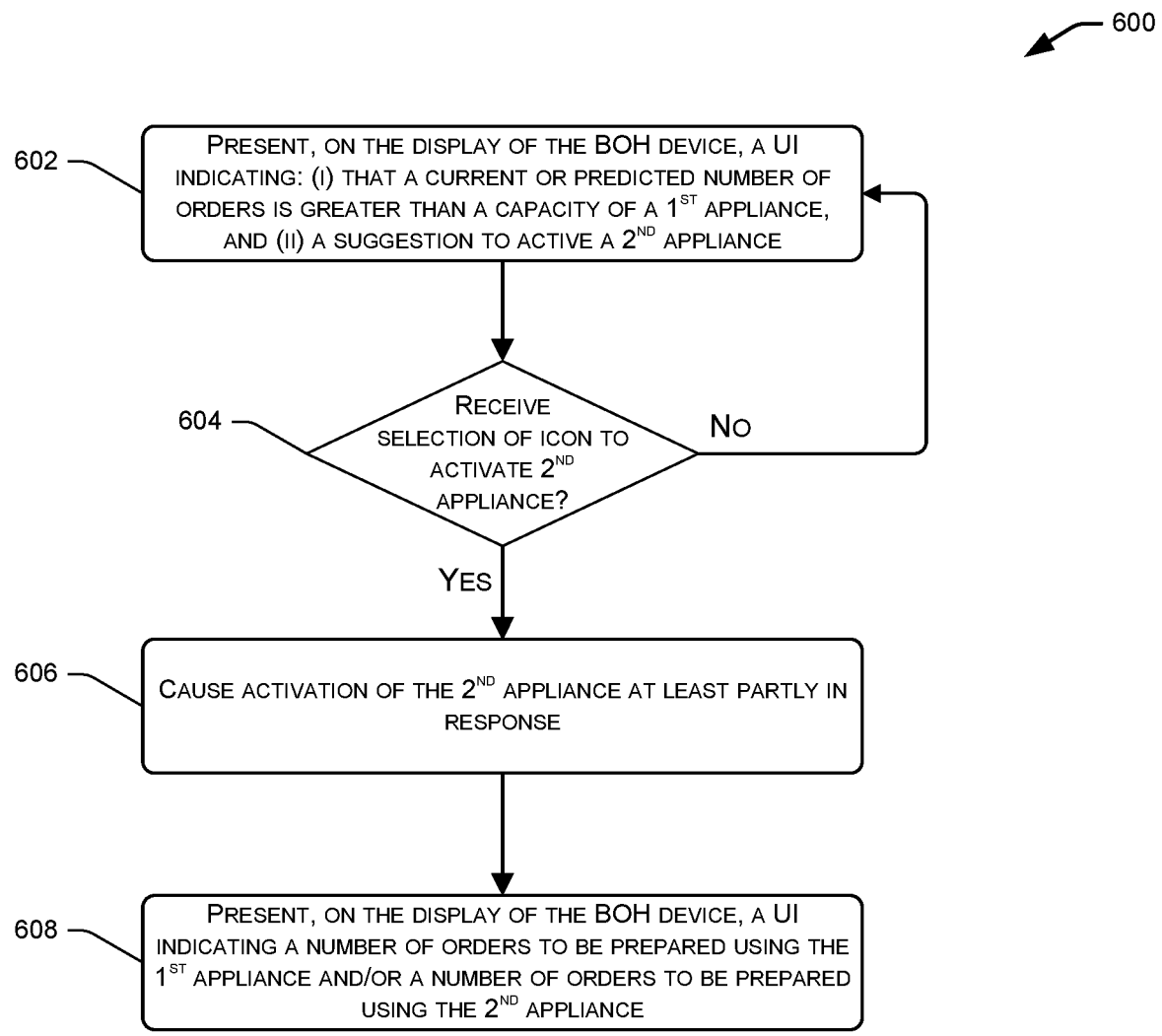
FIG. 6 illustrates a flow diagram of another example process for receiving a request to activate an appliance to handle a current capacity of orders.

FIG. 6 illustrates a flow diagram of another example process 600 for receiving a request to activate an appliance to handle a current capacity of orders. For example, this process 600 may occur when a capacity of one or more of the appliances 116 of FIG. 1 have been reached or is predicted to be reached shortly.

As illustrated, an operation 602 represents presenting, on a display of the BOH device 106(1) a UI indicating: (i) that a current or predicted number of orders handled by a first appliance is different from a capacity of the first appliance, and (ii) a suggestion to activate/deactivate a second appliance to load balance the current or predicted number of orders handled by the first appliance. For example, the BOH device 106(1), the remote service 112, and/or another device may determine, from the order data 220 and the analytics data 224, that a number of items or orders being handled by the first appliance is greater than the capacity of the first appliance or is expected to be greater than the capacity of the first appliance within a threshold amount of time. In response, the BOH device 106(1) may present the UI indicating the number of orders and the suggestion to activate the second appliance.

Figure 17:
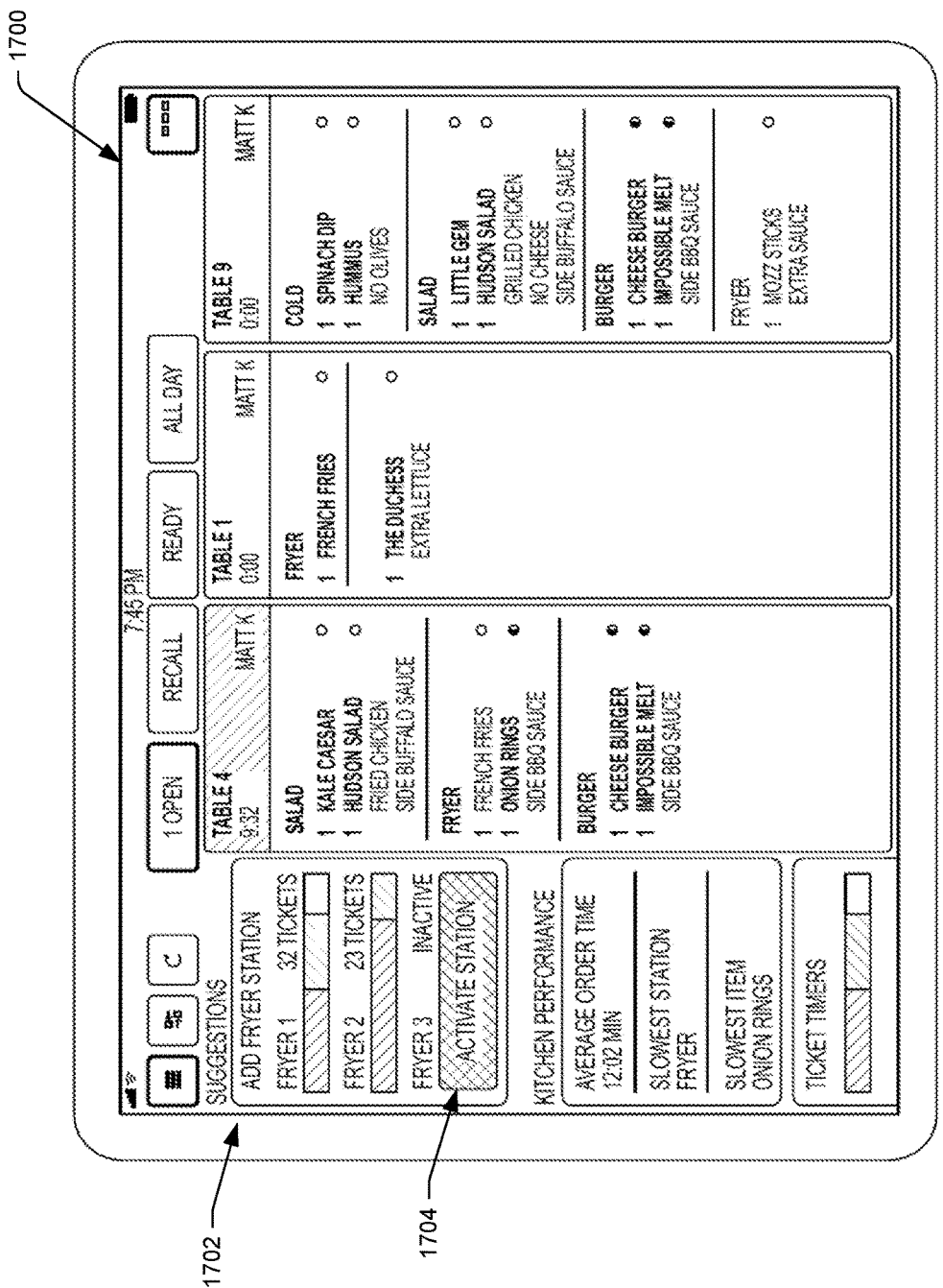
FIG. 17 illustrates another example UI that the BOH device may display. Here, the UI presents certain suggestions for operation of the establishment, such as a suggestion to activate an additional fryer station. The UI also includes an icon for automatically activating the suggested fryer station.

FIG. 17, for instance, illustrated an example UI 1700 that includes an indication 1702 of a number of tickets (or orders) currently being handled by a first fryer in the establishment 102, a number of tickets currently being handled by a second fryer in the establishment 102, and a suggestion to activate a third fryer. For instance, the UI 1700 indicates that the first fryer currently has 32 tickets (nearly at its capacity), while the second fryer currently has 23 tickets (and is at its capacity). In addition, the UI 1700 may include different coloring, hatching, or other visual indicia to indicate the number or relative amount of the tickets that are currently late, predicted to be late, timely, and/or the like.

In addition, the UI 1700 further includes an icon 1704 ("Activate Station") that, when selected may result in the activation of the third fryer. For example, upon selection of the icon 1704, the BOH device 106(1) may send a request to activate the third fryer directly to the third fryer, to the third fryer via the remote service 112, or in any other manner. In response to receiving this request, the third fryer may activate, which may include turning on, altering its settings (e.g., heat), and/or the like. In addition, upon activation of the third fryer, tickets currently in queue with the first or second fryers may automatically move from these queue(s) to a queue associated with the third fryer. In some instances, each fryer or other appliance may be associated with a corresponding display and, thus, the display of the third fryer may be turned on when the fryer is activated. Further, the displays of the first, second, and third fryers may be updated upon activation of the third fryer to indicate the tickets that each fryer is now responsible for. Further, while some of the above examples describe suggesting that a user activate an appliance or other IOT device, such as a fryer, in other instances the techniques may automatically activate one or more of these appliances/devices based on certain criteria being met. For example, when the currently active fryers become associated with a predefined number of orders or exceed their capacity, one or more additional fryers may be automatically activated, and orders previously assigned to the currently active fryers may be reassigned to the newly activated fryer(s).

Returning to FIG. 6, an operation 604 represents determining whether the BOH device 106(1) has received a selection of the icon to activate the second appliance. For example, this operation may include determining whether the user 104(1) of the BOH device 106(1) has selected the icon 1704 for activating the third fryer shown in FIG. 17. If no selection is received, then the process 600 continues to display the UI at the operation 602.

If the selection is received, however, then an operation 606 represents causing activation of the second appliance at least partly in response to the selection. Causing activation of the second appliance may include turning on the second appliance, altering settings of the second appliance, turning on a display associated with the second appliance, and/or the like.

After activating the second appliance, an operation 608 represents presenting, on the display of the BOH device 106(1), a UI indicating a number of orders to be prepared using the first appliance and/or a number of orders to be prepared using the second appliance. For instance, this operation may include updating one or more displays to indicate the number of orders that each appliance is now responsible for. In some instances, this includes updating the display of a BOH device at an expeditor station, while in other instances it may include update the display associated with the first appliance and the display associated with the second appliance.

Figure 18:
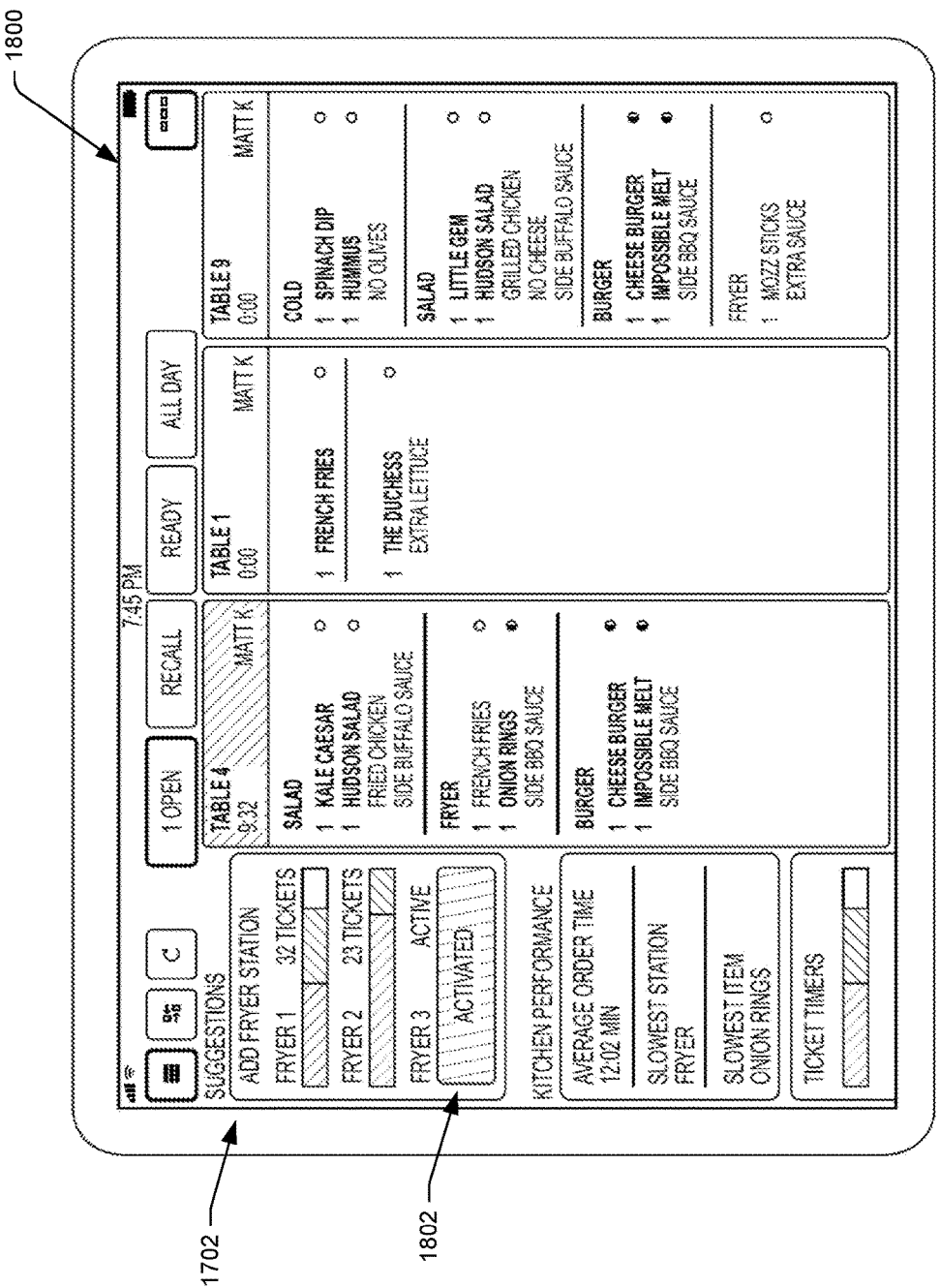
FIG. 18 illustrates another example UI that the BOH device may display after the operator of the device selects the icon shown in FIG. 17.

FIG. 18, for instance, illustrates a UI 1800 that the BOH device 106(1) may present in response to the user 104(1) selecting the icon 1704 on the UI 1700 presented on the display of the BOH device 106(1). As illustrated, the UI 1800 includes an indication 1802 that the icon 1704 was selected and, thus, the third fryer has been activated.

Figure 19:
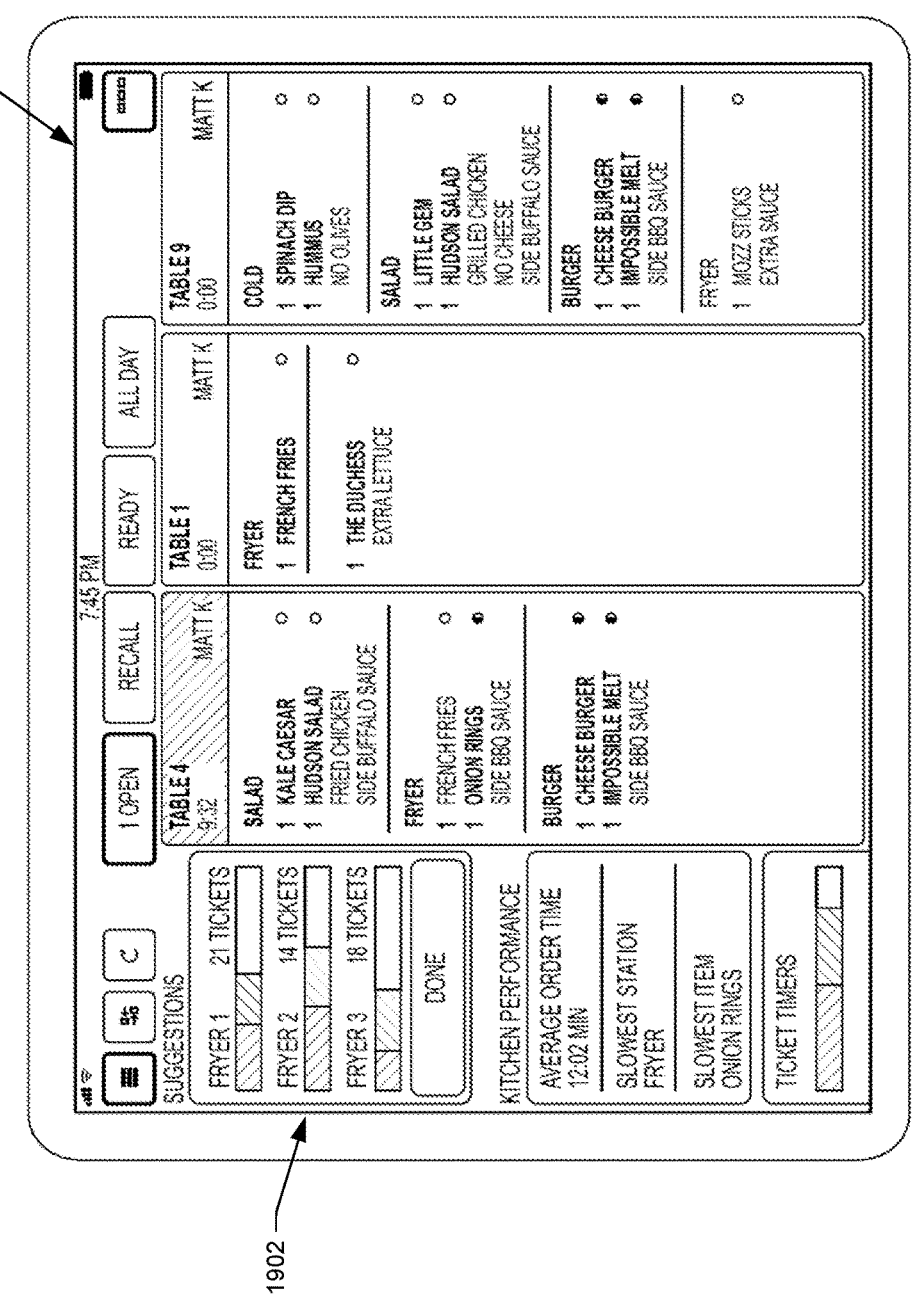
FIG. 19 illustrates another example UI that the BOH device may display after the UI shown in FIG. 18. As illustrated, the UI indicates that orders previously assigned to other fryer stations have now been moved to the recently activated fryer station.

FIG. 19 illustrates a subsequent UI 1900 that the BOH device 106(1) may present after presenting the UI 1800. As illustrated, the UI 1900 indicates, at 1902, that tickets previously assigned to the first and second fryers have been re-assigned to the third fryer. Thus, at this example moment, the first fryer is now responsible for 21 tickets, the second fryer for 14 tickets, and the third fryer for 18 tickets. Importantly, this portion of the UI 1900 indicates that none of the three fryers have reached their capacity. By determining when the appliances are at or about to reach capacity, suggesting activation of an additional appliance, and activating the appliance upon receiving a request to do so, the techniques described herein thus enable the establishment to avoid becoming overwhelmed and late with their received orders.

As described above, FIG. 7 illustrates the example UI 700 that a BOH device may display for presenting current orders that are to be prepared. Again, the UI 700 illustrates eight orders in this example, such as the first order 702(1), the second order 702(2), and so forth. The UI 700 further displays details regarding each order, such as the items of the order, modifiers associated with the order, a server that placed the order, a time associated with the order (e.g., elapsed time since the order was placed, and/or the like. In some instances, the UI 700 may be presented on a BOH device at an expeditor station in the BOH 102(2), a hot station in the BOH 102(2), a cold station in the BOH 102(2), and so forth. In this example, the UI 700 indicates that a user of the BOH device provides the selection 704 of the first order 702(1).

FIG. 8 illustrates the example UI 800 that the BOH device may display in response to the selection 702. As illustrated, the selected order 702(1) is expanding to present additional details regarding the order and options regarding the order. FIG. 9 illustrates the example UI 900 that continues the animation that may occur on the display of the BOH device in response to the selection 702. As illustrated, the UI 900 may display additional details regarding the first order 702(1) and, further, may display the selectable options 904 for the operator of the BOH device, including an option to request a server that placed the order. As described above, in this example, the operation of the BOH device may select the option to request the server that originated the order.

FIG. 10 illustrates the example UI 1000 that an FOH device that originated the first order 702(1) may display in response to the selection 904 from the UI 900. As illustrated, the UI 1000 may include the notification 1002 that the operator of the BOH device has requested clarification regarding a particular order. In some instances, the notification 1002 may include details regarding the query, an indication of the location of the BOH device, and/or additional details.

FIG. 11 illustrates the example UI 1100 that a BOH device associated with an expeditor station may display. As illustrated, the UI 1100 includes details regarding four orders, including the first order 1102(1), the second order 1102(2), and so forth. Here, the operator of the BOH device provides the selection 1104 regarding a particular item associated with the order 1102(1).

FIG. 12 illustrates the example UI 1200 that the BOH device associated with the expeditor station may display in response to the selection 1104. As illustrated, the UI 1200 presents a menu 1200 that includes several options from which the operator may select from. These options may include an option to indicate that the item has been completed or prepared ("Complete Item"), an option to send a request to another BOH device or station to begin preparation of the item ("Make Now"), an option to send information regarding the preparation of the item to another BOH device or station ("Send To . . . "), and so forth. In this example, the operator of the BOH device at the expeditor station provides the selection 1204 to request that an operator associated with another BOH device and station begin preparing the item.

For example, selection of this option may cause the BOH device at the expeditor station to automatically establish a communication session with a BOH device at a station that is responsible for preparing this item. In one example, the BOH device shown in FIG. 12 may automatically analyze the order data 220 to determine the BOH station responsible for preparing this item, which may be based on the type of the item, current load at BOH stations in the establishment 102, and so forth. In this example, the BOH device of FIG. 12 may determine that because the item is a salad, the request to make the item now is to be routed to a cold station in the BOH 102(2). Thus, the BOH device of FIG. 12 may automatically establish a communication session with a BOH device at the cold station and send the request to begin preparation of the salad.

Figure 13:
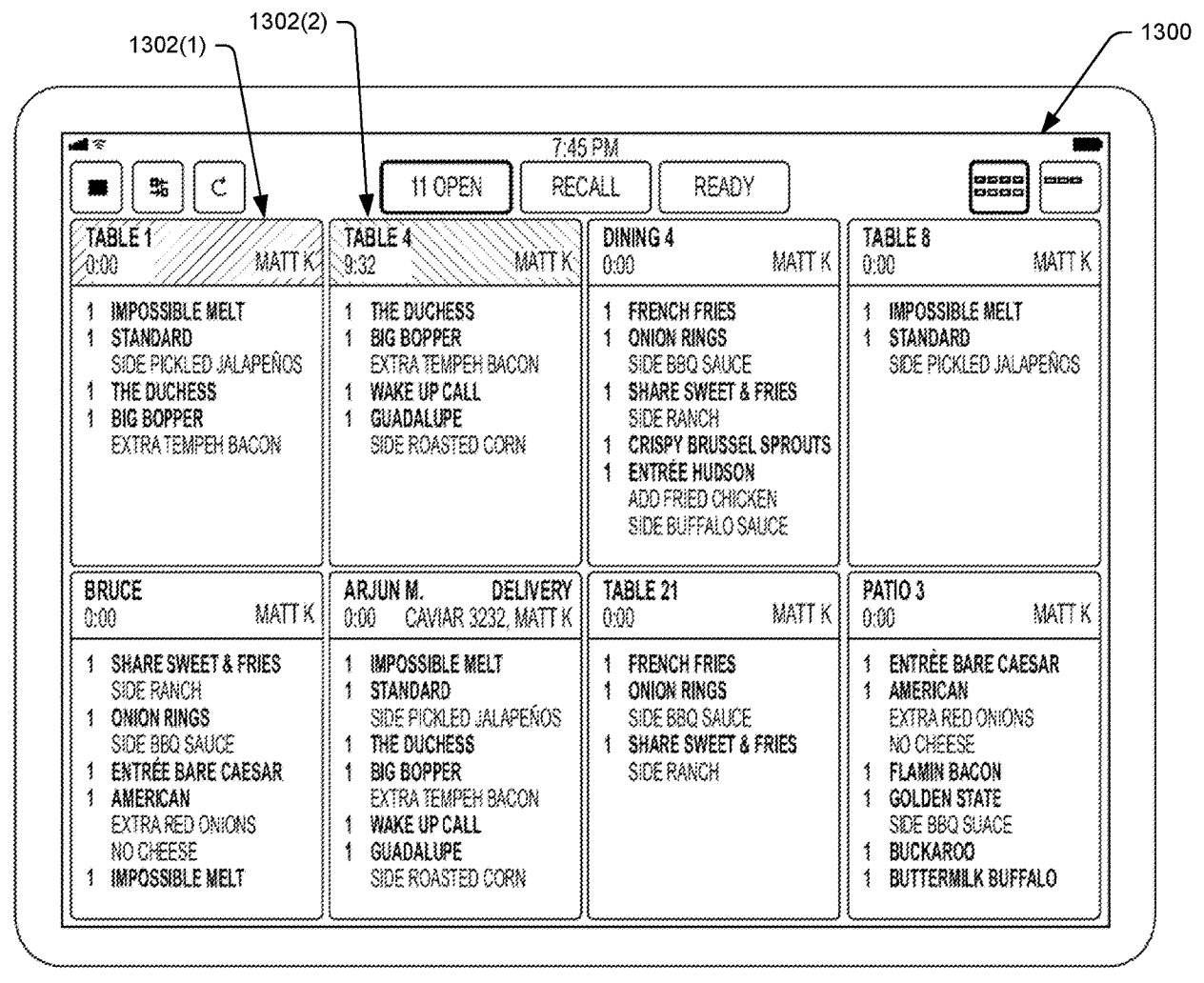

FIG. 13 an example UI 1300 that a BOH device at the cold station may display prior to the selection 1204 at the expeditor station shown in FIG. 12. As illustrated, this UI 1300 may illustrate orders and items within the orders that are to be prepared. In addition, the UI 1300 may prioritize preparation of different orders in the establishment based on when the orders were provided by FOH devices, and the like. As illustrated, the UI 1300 includes details regarding a first order 1302(1), a second order 1302(2), and so forth.

Figure 14:
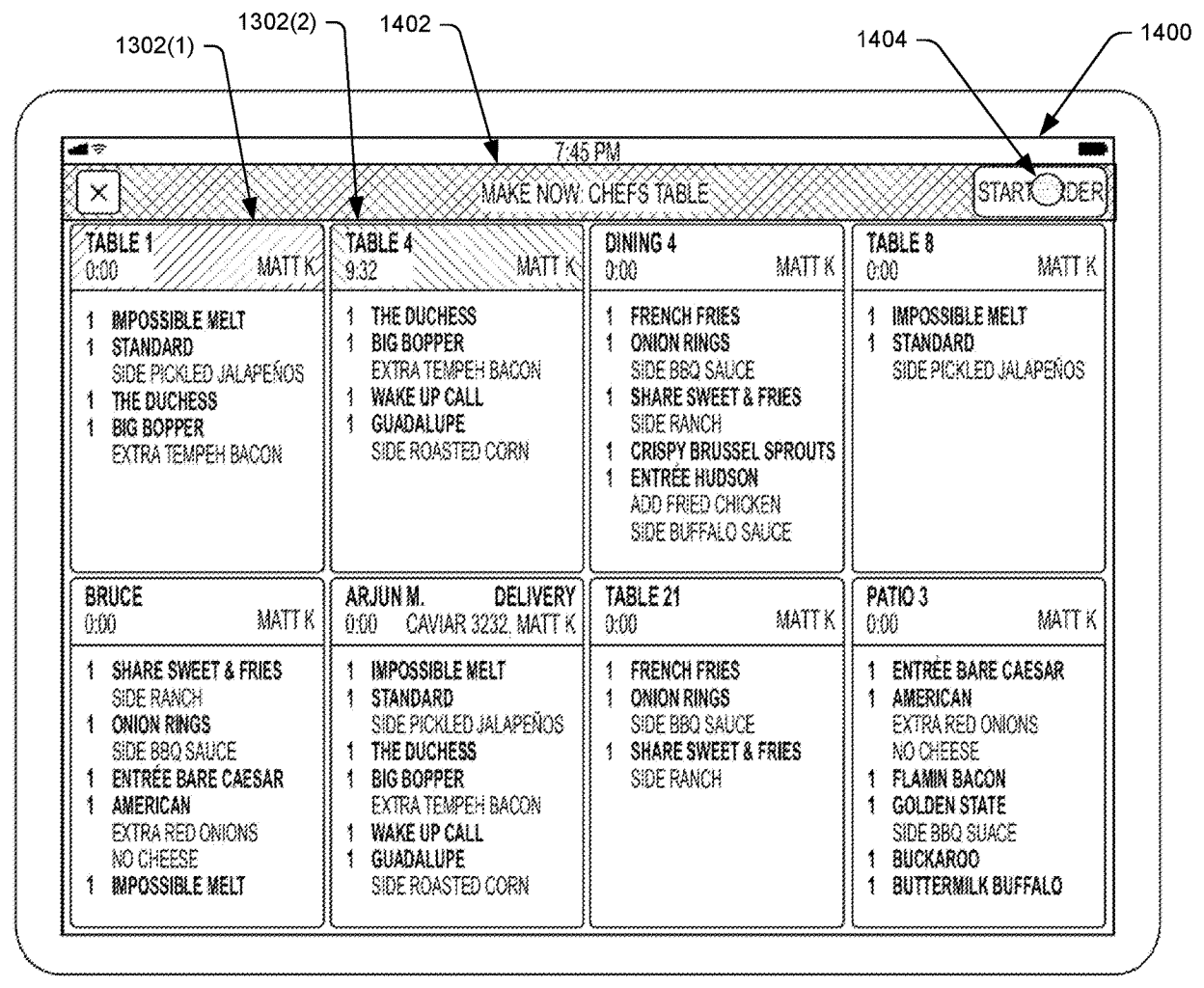

FIG. 14 illustrates an example UI that the BOH device of FIG. 13 may display after the selection 1204 at the expeditor station shown in FIG. 12. As illustrated, this UI 1400 includes a notification 1402 that the expeditor has requested that the preparation station begin preparing a certain item. For example, the notification 1402 may appear at the top of the UI 1400 and may indicate, for example, the location of the table or order for which preparation of an item is being requested. In addition, the notification 1402 may include a selectable icon ("Start Order") that the operator of the BOH device may select to begin preparation of the item. As shown below, this may automatically reprioritize the orders illustrated on the BOH device at this preparation station. As illustrated, in this example the operator of the BOH device provides a selection 1404 of the selectable icon.

Figure 15:
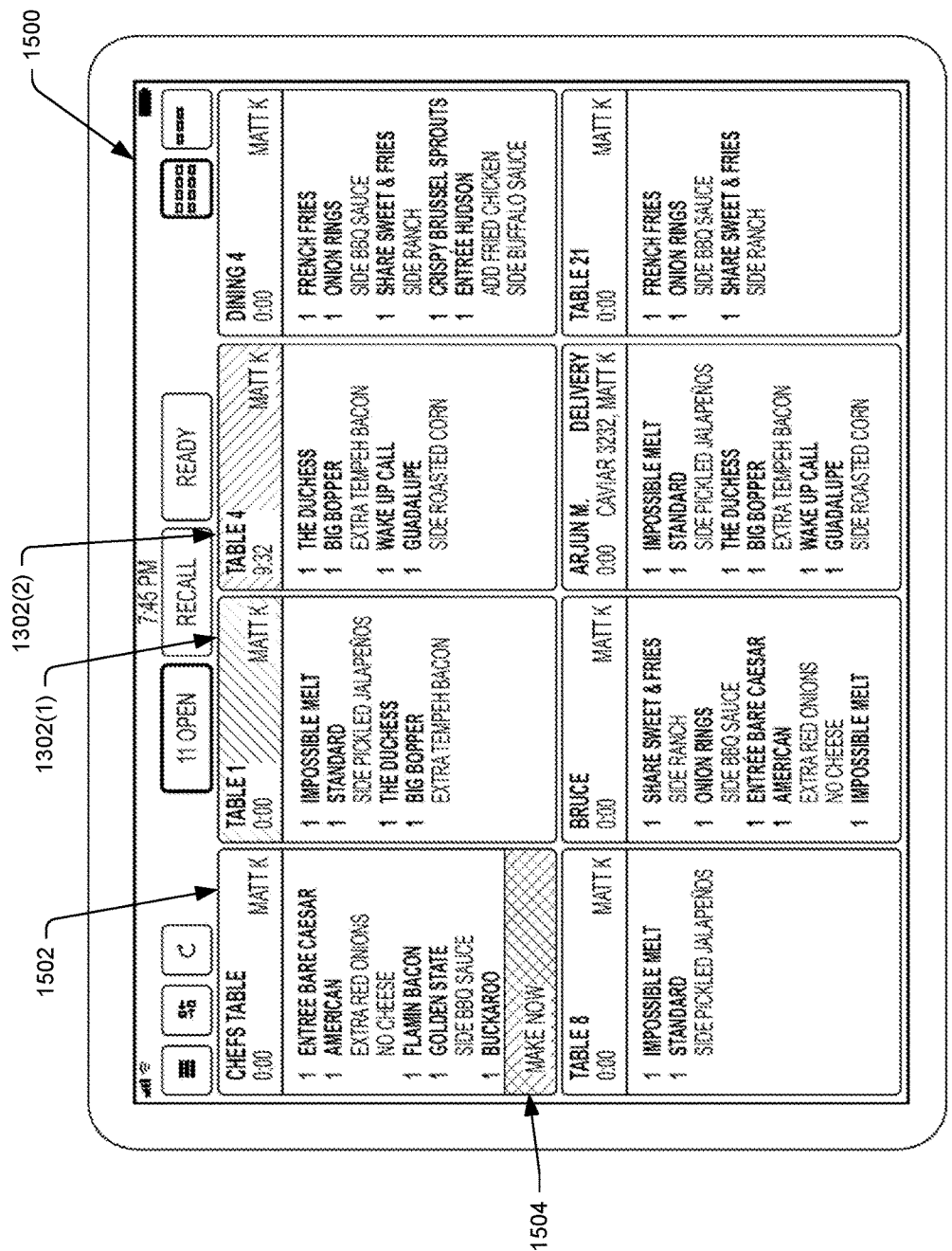
FIG. 15 illustrates another example UI that the BOH device of FIG. 13 may display after the operator of the device selects, via the UI of FIG. 14, the option to start the order requested by the expeditor. As illustrated, the displayed orders have been reprioritized in response to this selection.

FIG. 15 illustrates an example UI 1500 that the BOH device of FIG. 13 may present after the operator of the BOH device provides the selection 1404 shown in FIG. 14. As illustrated, the displayed orders have been reprioritized in response to this selection 1402. For example, a new order 1502 corresponding to the order for which the expeditor station requested to be "made now" may be displayed first, while the order 1302(1) may now be presented second, the order 1302(2) may be presented third, and so forth. Thus, the order for which the expeditor requested to be made now may be presented in the location of the UI 1500 corresponding to the most order that is first in line (that is, the most urgent orders). In addition, the UI 1500 includes an indication 1504 that the order is fact to be made now ("Make Now").

Figure 16:
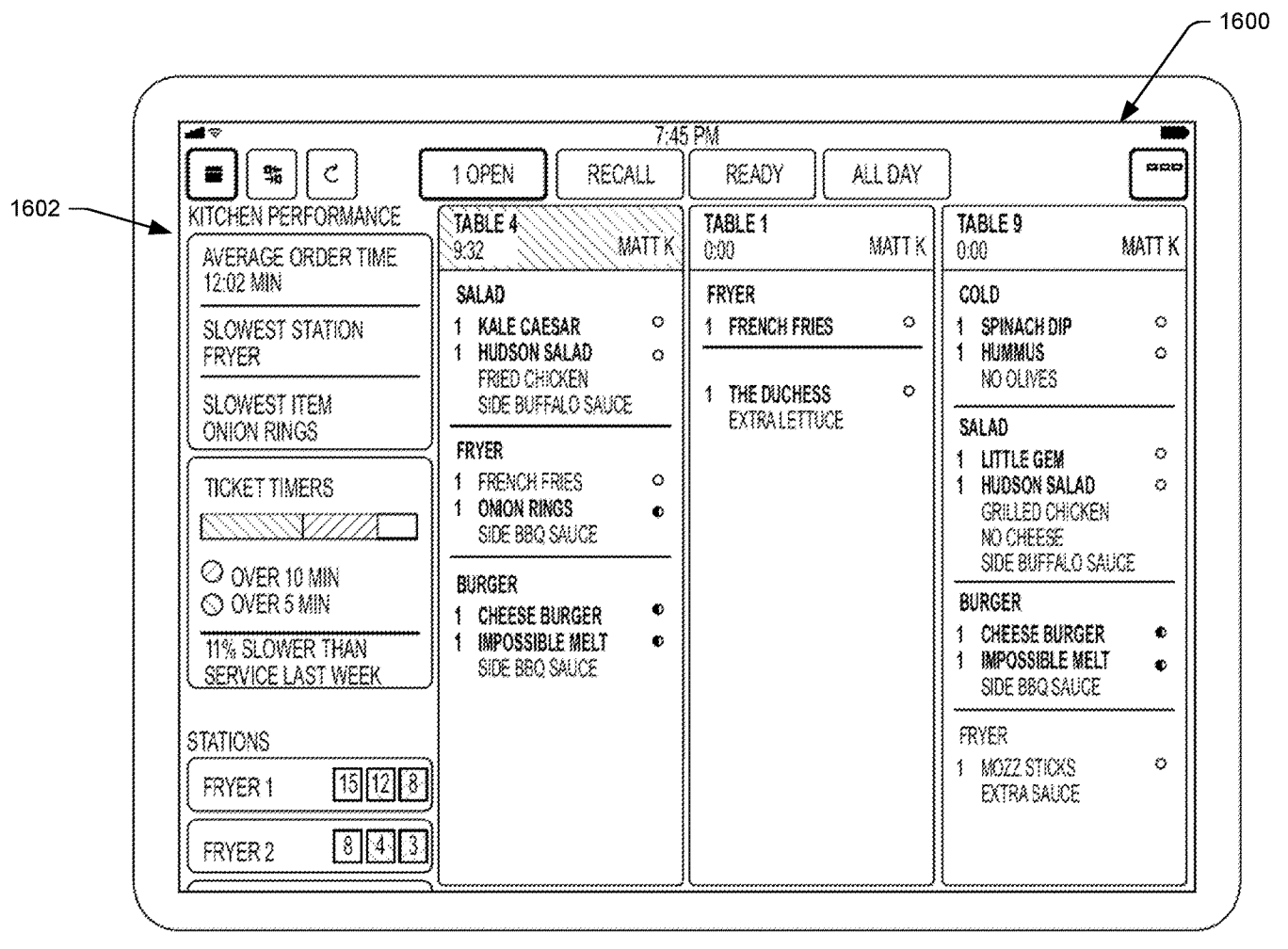

FIG. 16 illustrates another example UI 1600 that a BOH device may display. Here, the UI 1600 presents various kitchen-performance metrics, which may be displayed at an expeditor station, at a preparation station, a sequencing station, or the like. In some instances, the BOH devices may present different metrics based on a currently assigned role of each BOH device. For example, a BOH device at a hot station may present metrics corresponding to fryer wait times, oven wait times, and the like, while a BOH device at a cold station may present metrics corresponding to average times to prepare salads, and the like. In another example, a BOH device at an expeditor station may present metrics associated with orders as a whole, such as average times to deliver completed orders to tables, orders that are running late or predicted to run late, or the like.

In this example, the UI 1600 presents example metrics 1602, which include the average time to prepare an order, the station that is currently the slowest in the kitchen, and the item that is currently taking the longest to prepare. In addition, the example metrics 1602 indicate the number of tickets that are over time by certain amounts of time (e.g., more than ten minutes late, more than five minutes late, etc.). The example metrics 1602 further depict the currently load at certain stations, such as a current number of tickets that are assigned to a first fryer, a second fryer, and so forth. In addition, the metrics 1602 may indicate the number of tickets that are currently late at each fryer or other station, the number of tickets that may be late at each fryer and other station, and so forth. Of course, while the metrics 1602 illustrate example metrics, it is to be appreciated that any other types of metrics may be stored in the analytics data 224 and presented on the UI 1600 and/or other UIs.

FIG. 17 illustrates the example UI 1700 that the BOH device may display, as discussed above. Here, the UI 1700 presents certain suggestions 1702 for operation of the establishment, such as a suggestion to activate an additional fryer station. This UI 1700 also includes the icon 1704 for automatically activating the suggested fryer station.

FIG. 18 illustrates the example UI 1800 that the BOH device may display after the operator of the device selects the icon 1704. As described above, in response to this selection, the UI 1800 may change the display of the icon from "activate station" to "activated". In addition, the BOH device may have automatically sent a request to activate to the third fryer station in response.

FIG. 19 illustrates the example UI 1900 that the BOH device may display after the third fryer station has bene activated. As illustrated, the UI 1900 indicates, at 1902, that the tickets being handled by the fryers have been reallocated based on the activation of the third fryer. For example, the UI 1900 illustrates that the load has now been balanced across the three fryers such that no individual fryer is currently responsible for a number of orders that is greater than the respective capacity of the fryer. Further, while the UIs 1700, 1800, and 1900 collectively illustrate the activation of a fryer, it is to be appreciated that any other type of connected appliances may be automatically activated (or suggested to be activated) in other instances.

Figure 20:
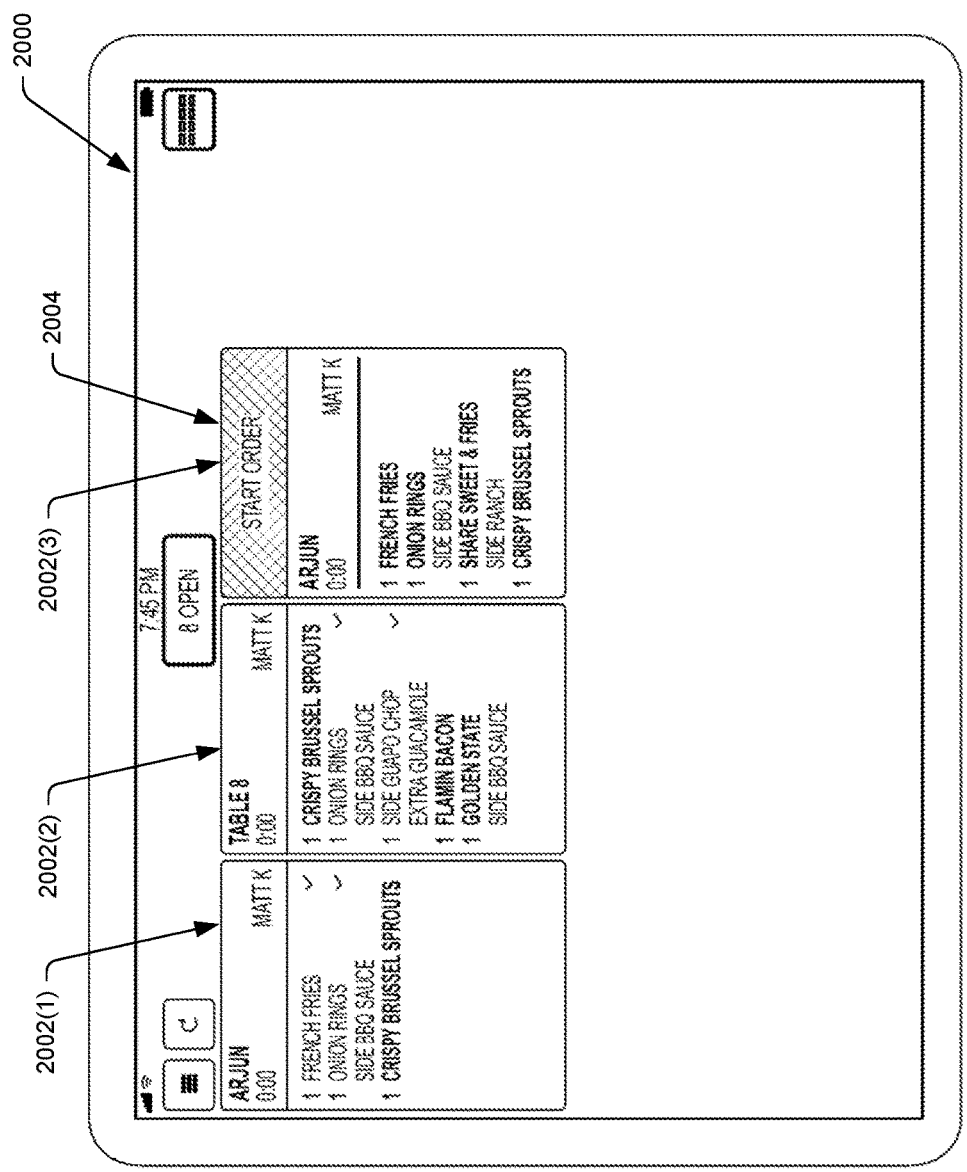
FIG. 20 illustrates another example UI that the BOH device may display. Here, the UI indicates certain orders and an icon for indicating that a particular order has been started.

FIG. 20 illustrates another example UI 200 that a BOH device in the establishment 102 of FIG. 1 may display. Here, the UI 2000 presents details regarding example orders 2002(1), 2002(2), and 2002(3). In addition, the UI 2000 presents a selectable icon 2004 ("Start Order") that, when selected, may reprioritize the orders displayed on the UI, may reprioritize orders displayed on other BOH devices, and/or may send a notification that an order has begun being prepared to an FOH device that is associated with the order.

FIG. 21, for example, illustrates an example UI 2100 that an FOH device may present for informing an operator of the FOH device of the current status of orders that the operator has placed to the BOH. That is, the UI 2100 may present the current status of each order that the server who is logged in to the FOH device has placed to the BOH 102. In this example, the UI 2100 indicates, at 2102, that the order associated with table 12 is ready, meaning that the server may deliver or may request that another user acquire the items associated with the order from the BOH 102(2) and deliver the items to table 12 in the FOH 102(1). In addition, the UI 2100 indicates, at 2104, that the order for table 4 is nearly complete (as 3 of 4 items are completed), while indicating, at 2106, that half of the order is complete for the order associated with "Dining 4". In some instances, the UI 2100 may periodically update as items are marked as completed via BOH devices(s). Further, in some instances, the FOH device may present a pop-up notification or the like when an order is complete, when an item of an order is complete, and so forth.

The UI 2100 may include additional details regarding orders placed by the server operating the FOH device. For example, the UI 2100 may indicate, at 2108, the number and identity of tables currently being handled by the server and, at 2110, items (or "courses") that are currently being held, and so forth.

FIG. 22 another example UI 2200 that an FOH device may display to provide additional information to server operating the FOH device. For instance, in addition to the information described above with reference to FIG. 21, the UI 2200 may present information regarding a current inventory at the establishment 102. For example, the UI 2200 may indicate, at 2202, items that are currently unavailable (e.g., because they have sold out) and, at 2204, items that are currently running low. Of course, while a few example inventory details are shown in the UI 2200, it is to be appreciated that any other details, metrics, or the like may be presented.

Routing Requests Based on Contextual Information

Figure 23:
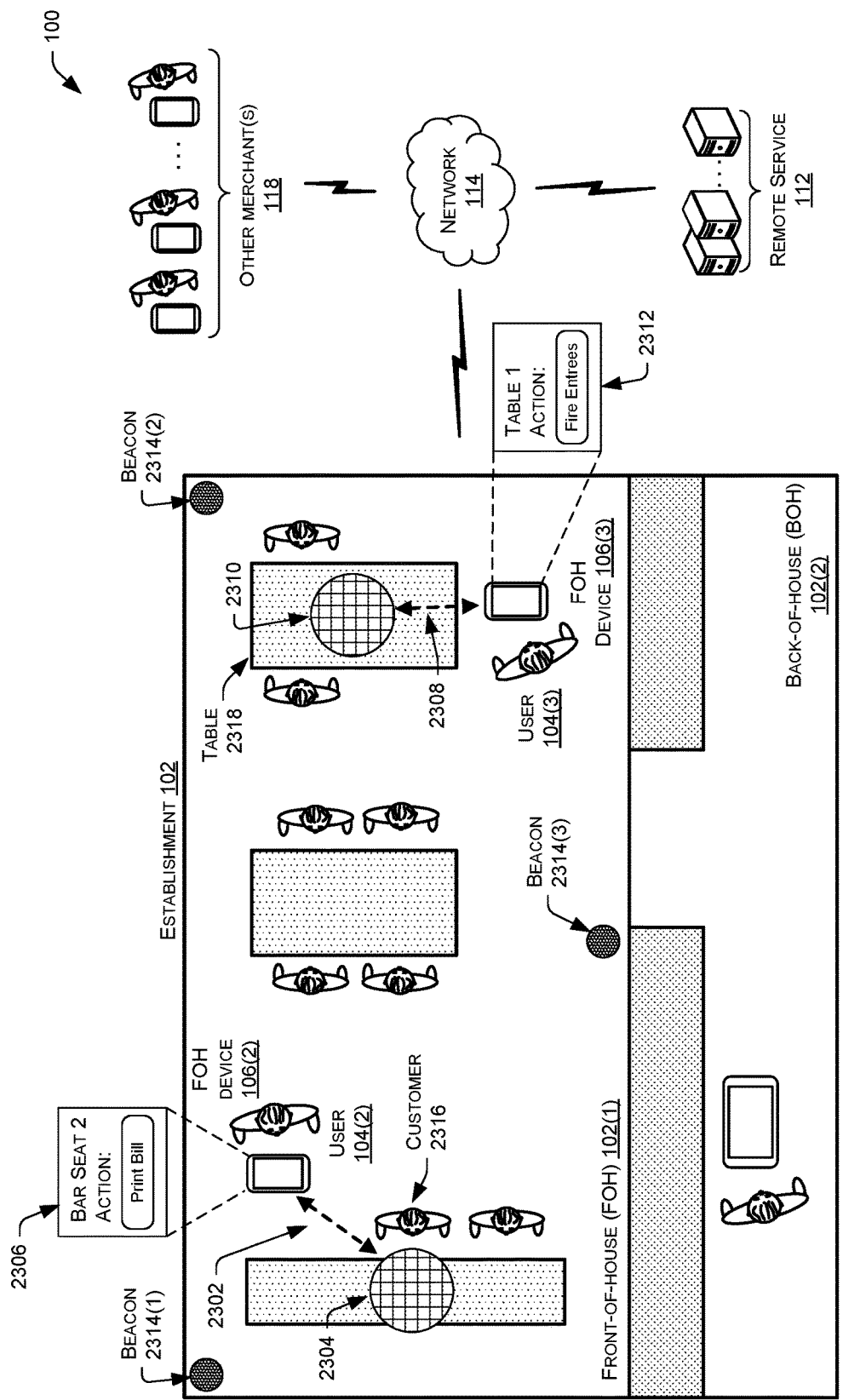
FIG. 23 illustrates the example environment of FIG. 1. Here, a first FOH device is near a first location in the establishment associated with a first order and, thus, presents a request or suggestion that a server of the first FOH device perform a certain action associated with the first order.

FIG. 23 illustrates the example architecture 100 introduced in FIG. 1. In this example, requests to perform certain actions may be sent to the most relevant FOH device, where relevance can be determined based on contextual information, such as the location of the FOH devices in the establishment 102, as well as based on current statuses of orders within the establishment 102 and the location associated with these orders. In another information, contextual information can be derived from time of the day, past history of the communication sessions, a location of the FOH device with respect to the location of the order, ranking of the FOH device with respect to other devices (in case of multiple devices, the devices may be ranked in priority); and historical data with respect to the first device (for example, for certain requests, a specific FOH device may be activated for assistance), and so on.

FIG. 23, for instances, illustrates that the FOH device 106(2) operated by the user 104(2) is currently located a certain distance 2302 from a location 2304 in the establishment 102 that is associated with a particular order associated with example customer 2316. For instance, when the user 104(2) opened an order for the customer 2316 using the FOH device 106(2), the user 104(2) may have indicated that the customer (and thus the associated order) is seated at a particular bar seat that is associated with the illustrated location 2304. Thus, in some instances, the FOH device 106(2) may present information regarding the order of the customer 2316 when the FOH device 106(2) is determined to be within a threshold distance of the location 2304.

In the illustrated example, for instance, the distance 2302 between the FOH device 106(2) and the location 2304 may be within the threshold proximity. Further, the FOH device, a BOH device, the remote service 112 and/or another device may determine that there are one or more current actions that may need to be taken with regard with the order of the customer 2316. For example, based on a time associated with the order (e.g., elapsed time, time since a course was served, etc.), one or more of the devices may determine that it is time to offer the bill the customer 2316, ask if the customer 2316 would like desert, check on the customer 2316, and/or the like. In the illustrated example, it is determined that it may be time to print the bill the for the customer 2316. Thus, in response to determining that the FOH device 106(1) is within the threshold proximity of the location 2304, the FOH device 106(1) may present an example 2306 suggesting that the user 104(1) print the bill for the user. In addition, the UI 2306 may include a selectable icon to print the bill.

In another example, the FOH device 106(2) may currently reside a certain distance 2308 from a location 2310 that is associated with an order a particular table 2318 in the establishment. Further, the FOH device, a BOH device, the remote service, and/or another device may determine that this distance 2308 is less than a threshold distance. Further, one or more devices may determine an action that may need to be taken with regards to the order associated with the table 2318. Thus, in response to determine that the FOH device 106(2) is within threshold distance of the location 2310, the FOH device 106(2) may present an example UI 2312 that suggests that the user 104(2) perform a certain action. In this example, the UI 2312 may suggest that the user 104(2) fire an ordered course for the users at the table 2318. For example, it may be determined that a predefined amount of time has elapsed since a certain event (e.g., since serving an appetizer) and, thus, it is time to fire the next course to the BOH 102(2).

The location-determination component 214, described above, may determine the current locations of the FOH devices in any suitable manner. In some instances, the FOH devices utilize GPS sensors that periodically or continually report out their current location. In other instances, the establishment 102 includes one or more beacons, such as example beacons 2314(1), 2314(2), and 2314(3), which may be used by the FOH devices for triangulating their current location in the establishment 102. For example, each FOH device may measure a respective signal strength between the FOH device and each of the beacons 2314(1)-(3), each of which may be associated with a predefined location, for triangulating a current position of the FOH device. In one example, the beacons can be wireless beacons. Of course, while a few example location-determination techniques are described, it is to be appreciated that the respective locations of the FOH devices may be determined in any other manner.

The above techniques may thus suggest certain actions to FOH devices based on current statuses of orders within the establishment 102 and based on current or predicted locations of the FOH devices within the establishment. For example, as the users traverse the establishment 102, the respective displays of the FOH devices may be updated to suggest certain actions that are pertinent to orders that are associated with locations that the operators of the devices are currently near. For instance, while the above examples describe suggesting to print a bill and fire a course, other suggested actions may include suggesting to open a table when an operator is near a table that is not currently associated with an order, suggesting to check on customer(s) when near a table that received their entrees five minutes prior, and the like.

In another example, the location-determination component 214 may determine whether tables move within the establishment and may, in response, update a UI indicating a current layout of the establishment. For example, if a customer or employee of the establishment moves a first table, having a first beacon coupled thereto, nearer a second table, having a second beacon coupled thereto, the location determination component may determine that the first table has moved nearer the second table based on the altered signal strength. In response, the UI indicating the current layout of the establishment may be updated to indicate this change.

FIG. 24 illustrates a flow diagram of an example process 2400 for determining that a particular FOH device is relevant to a particular order based on context information, with the context information being based on the device being within a threshold proximity of a first location associated with the order, the device being ranked higher regarding the order than other devices, and/or historical data regarding the device (e.g., the device having previously interacted with the order). In response, the process may send a UI to the FOH device requesting or suggesting a particular action associated with the first location.

An operation 2402 represents generating a layout of an establishment indicating that a first order is associated with a first location and a second order is associated with a second location. In some instances, a FOH device, a BOH device, another device in the establishment, and/or a remote service may generate and maintain this layout. For example, this device may store an association between tables and other seating areas in the establishment and the respective locations of these tables and other seating areas within the establishment. For example, a first table (T1) may be associated with a particular X, Y location in the establishment, while a second table (T2) may be associated with another X, Y location and a bar seat (B1) may be associated with yet another X, Y location, and so forth.

An operation 2404 represents determining an action to take regarding the first order based at least in part on a current status of the first order. For example, the order-processing component 212 may determine, from the order data 220, trigger data that indicates that a certain action may need be taken with regards to the first order. For example, the order-processing component 212 may determine, from the order data 220, that a threshold amount of time has elapsed from a certain event (e.g., the opening of the order, the serving of a previous course, etc.), which may trigger suggestion of an occurrence of a certain action (e.g., suggesting to print a bill, suggesting a next course, etc.). Thus, the order-processing component 212 may determine an action that may need to be taken with regard to the first order based at least in part on the current status of the first order.

An operation 2406 represents determining whether an FOH device in the establishment is within a threshold proximity of the first location associated with the first order. If not, then the process 2400 may await until an FOH device is within the threshold proximity. In some instances, this operation may comprise determining whether the particular FOH device that is associated with the first order is within the threshold proximity of the first location, while in other instances this operation may comprise determining whether any FOH device is within the threshold proximity.

If the operation 2406 determines that an FOH device is within the threshold proximity of the first location, then an operation 2408 represents generating a UI indicating the action to take regarding the first order, while an operation 2410 represents sending the UI for display on the FOH device. FIG. 31, for example, illustrates an example UI 3100 that the FOH device may present in response to being located within the threshold proximity of the first location associated with the first order. As illustrated, the UI 3100 may include a menu that identifies the table or order, as one or more suggested actions 3102 to take regarding the order. In this example, the menu 3102 suggests that the operator of the FOH device continue printing a bill for the customer(s) associated with the first order. The UI 3100 may also include an icon 3104 that is selectable to perform the suggested action. In some instances, the FOH device may generate the UI, while in other instances the remote service 112, a BOH device, or another device may generate the UI for presentation on the display of the FOH device.

FIG. 25, meanwhile, illustrates a flow diagram of an example process 2500 that may occur with regards to the second order that is associated with the second location, as described above with reference to the operation 2402. Here, an operation 2502 represents determining an action to take regarding the second order based at least in part on a current status of the second order. For example, the order-processing component 212 may determine, from the order data 220, trigger data that indicates that a certain action may need be taken with regards to the second order.

An operation 2504 represents determining whether an FOH device in the establishment is within a threshold proximity of the second location associated with the second order. If not, then the process 2500 may await until an FOH device is within the threshold proximity. Again, in some instances, this operation may comprise determining whether the particular FOH device that is associated with the second order is within the threshold proximity of the second location, while in other instances this operation may comprise determining whether any FOH device is within the threshold proximity.

If the operation 2504 determines that an FOH device is within the threshold proximity of the first location, then an operation 2406 represents generating a second UI indicating the action to take regarding the second order, while an operation 2508 represents sending the UI for display on the FOH device. FIG. 32, for example, illustrates an example UI 3200 that the FOH device may present in response to being located within the threshold proximity of the second location associated with the second order. As illustrated, the UI 3200 may include a menu that identifies the table or order, as one or more suggested actions 3202 to take regarding the order. In this example, the menu 3202 suggests that the operator of the FOH device "fire course 2" for the customer(s) associated with the second order. The UI 3200 may also include an icon 3204 that is selectable to perform the suggested action. In some instances, the FOH device may generate the UI, while in other instances the remote service 112, a BOH device, or another device may generate the UI for presentation on the display of the FOH device.

FIG. 26 illustrates a flow diagram of another example process 2600. Here, an operation 2602 represents determining whether an FOH device is within a threshold proximity of a third location in the establishment that is associated with a table or other seating area that is not currently associated with an open order. That is, this operation may comprise determining whether a user associated with an FOH device is walking by or otherwise near a table or seating area that is currently not associated with an open order or ticket.

If so, then an operation 2604 represents generating, at least partly in response to determining that the FOH device is within the threshold proximity of the third location, a third UI suggesting that a third order associated with the third order be opened. An operation 2606 represents sending this UI for presentation on the display of the FOH device. FIG. 33, for instance, illustrates an example UI 3300 that the FOH device may present in response to being within a threshold proximity of the third location that is not currently associated with an open order. As illustrated, the UI 3300 may include a menu that identifies the table or order, as one or more suggested actions 3302 to take regarding the order. In this example, the menu 3302 suggests that the operator of the FOH device open the table such that the operator may begin placing an order for customers that are or will be seating at the table or other seating area. The UI 3300 may also include an icon 3304 that is selectable to perform the suggested action. In some instances, the FOH device may generate the UI, while in other instances the remote service 112, a BOH device, or another device may generate the UI for presentation on the display of the FOH device.

FIG. 27 illustrates a flow diagram of another example process 2700 for enabling an operator of the FOH device to add items to an order. An operation 2702 represents presenting, on a display of the FOH device, a fourth UI that includes: (i) respective icons corresponding to items offered in the establishment, and (ii) the layout of tables and other seating areas in the establishment. FIG. 34, for instance, illustrates an example UI 3400. As illustrated, this UI 3400 includes example icons 3402 of items offered in the establishment and the layout 3404 of tables and other seating areas in the establishment.

Returning to FIG. 27, an operation 2704 comprises determining whether a user input to add a first item to a first order (associated with a first seating area on the layout) is received. For example, this operation may comprise determining whether a user input is received that begins at a location on the display corresponding to an icon associated with the first item and ending at a location on the display corresponding to a location on the layout that is associated with the first order.

FIG. 34, for example, illustrates that an operator the FOH device has provided a selection 3406, such as a press on a touchscreen of the FOH device. FIG. 35, meanwhile, illustrates a UI 3500 that includes the operator dragging the icon for the item ("Chips and Guac") towards the layout 3404 of the establishment. FIG. 36 illustrates an example UI 3600 in which the operator "drops" the icon on an icon 3602 on the UI 300 corresponding to a particular table ("table 2") of the layout 3404.

Returning to the process 2700, an operation 2706 represents adding the first item to the first order in response to receiving the user input at the operation 2704. That is, the first item may be added to the first order after the user drops the icon corresponding to the item on the icon 3602 corresponding to the table, as shown in FIG. 36.

In addition, an operation 2708 represents setting a time for a predefined amount of time. In some instances, this may comprise setting a timer for an amount of time, after which the item(s) associated with the order will be "fired" (i.e., sent to a BOH device for preparation). That is, after adding the first item to the first order, a timer may set and, upon expiration of the timer, the first order may be sent for preparation. FIG. 37, for instance, illustrates an example UI 3770 that include a timer 3702 set for a predefined amount of time (in this example, 20 seconds) in response to the item icon being dragged and dropped onto the icon 3602 associated with the table.

An operation 2170, meanwhile, represents determining whether a user input is received to add a second item to the first order. FIG. 38, for instance, illustrates the operator of the FOH device selecting an icon 3802 corresponding to a second item ("Bud Bucket") and dragging and dropping the icon 3802 onto the icon associated with the same table. FIG. 38 also illustrated that the timer 3702 has counted down to fifteen seconds since the adding of the first item to the order.

An operation 2712 represents adding the second item to the first order in response to the second user input. In addition, an operation 2714 represents re-setting the timer to the predefined amount of time. FIG. 39, for instance, illustrates an example UI 3900 that indicates that the timer 3702 has been re-set to the original twenty seconds.

An operation 2716, meanwhile, represents determining whether a user input has been received at the location on the display corresponding to the first location that is associated with the first order. For example, this operation may determine whether a user input is received on the icon corresponding to the table or other seating area that is associated with the first order. FIG. 39, for instance, illustrates an operator providing a selection 3902 of the icon corresponding to the table associated with the example order.

If the operation 2716 determines that the user input is received, then an operation 2718 represents presenting, on the display of the FOH device, an icon for submitting the first order, including the first and second items, to the BOH prior to expiration of the predefined amount of time. FIG.

40, for example, illustrates an example UI 4000 that includes a menu 4002 including an icon 4004 ("Fire Now") to enable the operator to send the order directly to the BOH 102(2) prior to expiration of the timer 3702. In addition, the menu 4002 includes an icon for canceling the items in this example.

FIG. 28 illustrates a flow diagram of another example process 2800 for determining an item to suggest for addition to a first order and presenting the suggestion on an FOH device in response to the FOH being within a threshold proximity of a first location associated with the first order. An operation 2802 represents determining an item to suggest for addition to the first order. For example, the FOH device, a BOH device, the remote service 112, or another device may determine an item to suggest to the first order based on any number of criteria, such as the items currently in the order, the history of items ordered by the customers associated with the first order, a current time of day, a current special in the establishment, or the like.

An operation 2804 represents determining whether an FOH device is within a threshold proximity of the first location associated with the first order. As described above, this operation may be based on the location-determination component 214 determining, using the location data 222, whether any FOH device (or an FOH device associated with the first order) is within a threshold proximity of the first location. If then, then an operation 2806 represents sending, to the FOH device, a fifth UI that includes the suggestion to add to the suggested item to the first order. In some instances, this suggestion, and other suggestions described herein, may be based on prior behavior of one or more customers, such as a purchase history of a particular customer to whom the suggestion is being presented, prior purchases of other customers, and/or the like. In some instances, the remote service 112 described above may generate some or all of these suggestions.

FIG. 41, for instance, illustrates an example UI 4100 that includes, at 4102, an indication of a table and, at 4104, suggested items and other actions for that table. For instance, in this example, a suggested item of "Bug Light Bucket" and a suggested item of "Fries" is determined for the order that is currently associated with the "Chefs Table". Thus, upon the FOH device being located within the threshold proximity of the Chef's Table, the UI 4100 may be presented on the FOH device to suggest that the operator of the FOH device suggest to add the items to the order.

FIG. 42, meanwhile, illustrates another example UI 4200 for presenting suggestions to the operator of the FOH device. As illustrated, the UI 4200 includes, at 4202, an indication of the table and, at 4204, one more suggested items and actions. In this example, the UI 4200 suggests that operator suggest, to customers at the Chefs Table, that they repeat their last round of drinks. The suggested actions may further include a suggestion to add an employee discount (perhaps because the current customer is an employee of the establishment 102), a suggestion to split the bill seats, and the like.

FIG. 29 illustrates a flow diagram of another example process 2900. In this instance, the process 2900 may determine the identity of an operator of an FOH device, determine whether the identity is associated with prior behavior and, if so, presenting a UI that includes a sequence of actions that have been customized to the operator based on the prior behavior.

An operation 2902 represents determining an identifier of a user currently operating the FOH device. For instance, this operation may comprise determining an identifier that is associated with a user that is currently signed into the FOH device. An operation 2904 represents determining whether prior behavior is associated with the determined identifier. For example, the analytics data 224 may store patterns of behavior associated with different operators of the devices in the establishments. These patterns of behavior may indicate certain sequences of actions that certain users tend to repeat when operating the FOH or other merchant devices. For instance, the analytics data 224 may determine that an operator associated with a first identifier often checks her tips before running her shift report, while another operator associated with a second identifier often skips this step.

If the identifier is determined to be associated with prior behavior, then an operation 2906 represents generating a sixth UI indicating customized actions to perform based on the prior behavior of the user currently operating the FOH device. An operation 2908 represents sending the sixth UI for display on the FOH device. For example, the sixth UI may present a sequence of actions that conforms to sequences of actions previously performed by the particular operator. Continuing the example from above, for instance, the sixth UI for the first user may begin with a screen for checking her tips, while the sixth UI for the second user might not include this screen at all.

FIG. 43, for example, illustrates an example UI 4300 that the FOH device may present based on prior behavior of a first operator of the FOH device. At 4302, the UI indicates suggested actions to take, such as print a latest check for Table 5 (T5), split a check by seat, and the like. FIG. 44, however, illustrates an example 4400 that the FOH device may present based on prior behavior of a second operator of the FOH device. At 4402, the UI 4400 suggests that the operator review tip adjustments, review shift details, and run a shift report. In some instances, the UIs may include suggested sequences of actions based on information that is additional to the prior behavior of the operator, such as a current time and a time at which the operator is expected to log out of the FOH device (e.g., because their shift is ending).

FIG. 44 further illustrates that an operator of the FOH device may provide a selection 4404 for navigating the sequence of actions that have been customized for the operator based on the prior behavior of the operator. In response to the selection 4404, FIG. 45 may present a UI 4500 that begins by enabling the operator to review her tip adjustments at 4502. Again, this screen may be presented on the operator often viewing this screen at the end of her shift. The UI 4500 also includes an icon 4504 that is selectable to move from the tip-adjustment screen to a shift-details screen. As illustrated, the UI 4500 receives a selection 4506 of this icon 4504.

FIG. 46 presents a UI 4600 that may be presented in response to the selection 4506 of the icon 4504. As illustrated, the UI may include, at 4602, details regarding the shift of the operator of the FOH device. These shift details may include an amount of time worked, a time until the shift is done, the number of breaks taken by the operator, total sales, the number of open orders, the number of tips received, and the like. In addition, the UI 4600 may include an icon 4604 that is selectable to move from the shift-details screen and to running a shift report for the operator. The operator provides a selection 4606 in this example.

FIG. 47 illustrates an example UI 4700 that the FOH device may present in response to the selection 4606 of the icon 4604 from the UI 4600. As illustrated at 4702, this UI 4700 indicates that the FOH device is running a shift report for the operator and, potentially, logging the operator out of the device. FIG. 48 illustrates an example UI 4800 that the FOH device may present after running the shift report and logging out the previous operator.

While FIGS. 44-47 illustrate and describe a customized sequence of operations that may be presented based on prior behavior of an operator of the FOH device, in some instances an operator might not be associated with such prior behavior and, thus, might not receive a customized sequence of actions. Returning to FIG. 29, if prior behavior is not associated with the determined identifier (or if a threshold amount of prior behavior is not associated with the identifier), then an operation 2910 may generate a seventh, default UI indicating the actions to take, while an operation 2912 may send the seventh UI for presentation on the display of the FOH device. This default UI may present actions that are not customized to the current operator of the FOH device, but rather corresponding a default, non-customized sequence of actions.

FIG. 30 illustrates a flow diagram of another example process 3000 for determining if an FOH device is physically coupled to, or within a threshold proximity of, another device and, if so, presenting a UI indicating a sequence of actions to perform. An operation 3002 represents determining whether the FOH device is physically coupled to another device or is within a threshold proximity of another device. This may include determining whether the FOH device is in a cradle, determining (e.g., via Bluetooth) whether an FOH device is near another FOH or BOH device, or the like. If so, then an operation 3004 represents presenting, on the display of the FOH device, an eight UI for performing one or more predefined actions. For example, this operation may include presenting a UI for running a shift report if the FOH device is plugged into a cradle or is within a particular device within the establishment 102.

FIG. 49, for example, illustrates an example UI 4900 that an FOH device may present prior to being coupled to or within a threshold proximity of another device. That is, this UI 4900 may indicate that an operator of the FOH device has navigated to a screen to view, at 4902, shift details but not has not yet selected an icon 4904 for running the shift report.

FIG. 50, however, illustrates an example UI 5000 that the FOH device of FIG. 49 may present after being physically coupled to another device, such as a receiver 5002. As illustrated, the receiver 5002 may connect, via a wired and/or wireless connection, to one or more other FOH/BOH devices 200, the remote service 112, and/or the like. Further, the hardware to hardware connections may enable specific software workflow actions. For example, the FOH device may begin running a shift report automatically in response to being physical coupled to the receiver 5002. In some embodiments, the receiver and the FOH device may be a power supply and power receiving device respectively, however in other embodiments, the receiver and the FOH device may not provide any power to the other but instead trigger other actions, such as shift report generation, clock out the server, transfer the tips, etc. The receiver 5002 when communicatively coupled with the FOH device can initiate certain actions pre-configured through rules, e.g., by the merchant or the remote service. For example, the merchant through BOH can configure the receiver to finalize shift reports or clock out the FOH server when the FOH device is docked in the receiver 5002. The custom rules can also enable financial flow from the merchant's financial account to the FOH server's account, in response to detection of docking of the FOH device in the receiver 5002. The receiver 5002 can enable the computing device to communicate with other devices communicatively coupled to the receiver (e.g. synchronization with the remote service) and other merchants, to refine the data displayed on the FOH device. In some implementations, the control may automatically move from the FOH device docked in the receiver 5002 to another device, e.g., another FOH device or another customer device, to move the displayed content to that other device. Alternatively, this allows another server to pick up from where the previous server left.

FIG. 51 continues the illustration of FIG. 50 and shows, via a UI 5100, that tips are being transferred to an account associated with an operator of the FOH device. FIG. 52 concludes the illustration of the FIG. 50 and shows, via a UI 5200, that the operator has been logged out of the FOH device. In some instances, the tips may be seamlessly and automatically transferred to a checking account of the operator, a mobile payment application of the operator, and/or the like. Thus, the sequence of UIs 50-52 illustrate that an FOH device may perform a predefined sequence of actions in response to be physically coupled to another device, such as the cradle 5002.

FIGS. 53 and 54, meanwhile, illustrate that a predefined sequence of actions may occur in response to an FOH device within a threshold proximity of another device in the establishment 102. FIG. 53, for example, illustrates an example UI 5300 in which the illustrated FOH device detects, and thus is within a threshold proximity of, a "Tableside Device", which may comprise a device that couples to or is otherwise associated with a particular table or other seating area in the establishment. The UI 5300 includes an indication 5302 that the device has detected the tableside device, and also includes an icon 5304 that is selectable to open a new order in response to detecting the tableside device. The UI 5300 illustrates that an operator of the device provides a selection 5306 of the icon 5304. In some implementations, creating an order on a tableside device can tag the order as such, and also send an alert to the BOH device regarding order and thus enable real-time communication regarding the orders.

FIG. 54 illustrates an example UI 5400 that the FOH device may present in response to the selection 5306. As illustrated, the UI 5400 illustrates that a new order has been opened, items have been added to the new order, and so forth. Of course, while a few example sequence of UIs have been described in response to a merchant device being physically coupled to another device or within a threshold proximity of another device, other UI sequences may be utilized.

Example Gestures

FIG. 55 and subsequent UIs illustrate different gestures that may cause the establishment application 210 to perform different actions. It is to be appreciated that while these figures describe example gestures and corresponding actions, additional gestures may be associated with additional actions on the establishment application 210 in other instances. In some instances, a server, individual devices, and/or the like may store rules associating the respective gestures with the respective actions. In some instances, these rules may be user configurable such that different devices and/or different operator profiles may be associated with different rules.

FIGS. 55-62 illustrate, for example, that an operator of the FOH device may add or remove different items (e.g., lettuce, tomato, cheese, etc.) from the example item (here, a burger) based on selecting respective modifier icons and swiping these icons in a particular direction. For example, selecting an icon and swiping to the right may cause the establishment application 210 to add the modifier to the item, while selecting an icon and swiping to the left may cause the establishment application 210 to remove the modifier to the item. Further, selecting an icon and swiping upwards may cause the establishment application 210 to add an extra amount of the modifier to the item, while selecting an icon and swiping downwards may cause the establishment application 210 to indicate that the modifier is to be placed "on the side". Of course, while example directions are associated with example actions in these examples, it is to be appreciated that these are merely illustrative and other directions may be associated with other actions.

In one implementation, the surface of the device accepting gestures, such as sensor pad may include various sensor points, identified in (x, y) coordinates and the sensor pad can identify a user activating one or several of these sensor points that ultimately produces sensor data, and in case of several sensor points, the sensor data also records the sequence of the sensor points enabled. The sensor points can be touch or touchless. When registering the actions, the user can register certain sensor point activation to trigger a certain action. For example, hover on an item could mean "seeking more information about the item" whereas tapping could mean "add to order." The methods and systems herein allow the user to define what each gesture can mean in the context of this order or in general, their experience with the application. Accordingly, when the user uses the application, the embedded rules are called out in response to each gesture to determine the underlying and customized action associated with the gesture. The server can also embed options with respect to each action to provide sub-actions, as shown in FIG. 64.

FIG. 55, for example, illustrates a UI 5500 that display example modifies at 5502. The UI 5500 also illustrates that an operator of the FOH device provides a selection 5504 corresponding to an icon associated with an example modifier (here, lettuce). FIG. 56 illustrates an example UI 5600 after the operator makes the selection 5504. Here, operator begins to drag the icon towards the right side of the display. FIG. 57, meanwhile, illustrates an UI 5700 that shows the operator has continued dragging the icon further to right and, in response, the UI 5700 indicates, at 5702, that lettuce has been added to the order. FIG. 58, meanwhile, illustrates a UI 5800 in which the user drags the icon back to the left. In response, the UI 5800 indicates, at 5802, that the modifier is to be removed ("No Lettuce").

FIG. 59 illustrates an example UI 5900 in which the operator of the FOH device provides a selection 5902 of another modifier (in this case, "Onions"). FIG. 60 illustrates, via example UI 6000, that the operator may drag the icon corresponding to the modifier significantly upwards (e.g., greater than a threshold distance from the initial location of the icon and/or with a speed that is greater than a threshold speed). In response, the UI 6000 indicates that the name of the icon has changed from "Onions" to "Extra Onions". FIG. 61 illustrates, via a UI 6100 and at 6102, that the item is now associated with "Extra Onions." In addition, however, the UI 6100 illustrates that the operator has changed from swiping the icon upwards to downwards, below the initial location of the icon on the display. In response, the UI 6100 updates the name of the modifier from "Extra Onions" to "Side Onions", given that a downwards swipe is associated with adding the modifier to the side in this example. FIG. 62 illustrates an example UI 6200 that indicates, at 6202, that the modifier has changed from "Extra Onions" to "Side Onions".

FIGS. 63-67 illustrates additional example UIs and corresponding gestures for adding or removing modifiers from an item, such as the example burger. FIG. 63, for instance, illustrates an example UI 6300 that lists some of the same example modifiers described above with reference to FIG. 55-62. Here, the operator provides a selection 6302 corresponding to the modifier "Bacon." FIG. 64 illustrates that the FOH device may present a UI 6400 in response. As illustrated, the UI 6400 includes an icon 6402 corresponding to the selected modifier, surround by a menu of options 6404 for the modifier. For example, the modifier ("Bacon") is surrounded by examples of "Allergy", "No", "Sub", "Extra", "Add", and "Side" in this example. Of course, while a few example options are listed, it is to be appreciated that other implementations may utilize additional and/or different options.

FIG. 65 illustrates an example UI 6500 after the operator has selected the icon 6402 and begun dragging it towards an option ("Extra") 6502 of the menu of options 6404. As illustrated, the size and/or color of the option 6404 may change as the icon 6402 nears the option 6502. For instance, the size of the option 6502 may enlarge as the icon 6402 nears the option 6502. FIG. 66 illustrates an example UI 6600 after the operator releases the icon 6402 while it is over the option 6502. As illustrated, the text of the option 6502 has changed to add an indication of the modifier. For example, here, the option 6502 has changed from "Extra" to "Extra Bacon". Further, FIG. 67 illustrates an example UI 6700 that the FOH device may present a predefined amount of time after the UI 6600 is presented. As illustrated, the menu 6404 of options has disappeared. In addition, the previously selected modifier has now been changed from its initial text ("Bacon") to indicate the selected option ("Extra Bacon").

FIGS. 68-73 illustrates yet another example of gestures for adding or removing modifiers to an item, such as the example burger. FIG. 68, for instance, illustrates an example UI 6800 that illustrates the array of modifiers described above. In addition, this UI 6800 indicates that an operator of the device has provided a selection 6802 corresponding to one of the modifiers (here, "Lettuce"). FIG. 69 presents a UI 6900 in response to the selection 6802. As illustrated, the UI 6900 presents a menu of options 6902 alongside the icon corresponding to the selected modifier. Again, these example options may include "Extra", "Add", "Side", "Sub", "No", and/or the like. In addition, the UI 6900 illustrates that the particular option adjacent to the selected modifier icon may change based on a direction of a user input 6904. For example, FIG. 69 illustrates that the operator may swipe upwards after selecting the icon corresponding to "Lettuce".

In response to the operator swiping upwards at 6904, FIG. 70 illustrates, via example UI 7000, that the option from menu of options 6902 has also moved downwards based on the upwards swiping gesture. Thus, while "Add" was previously adjacent to "Lettuce" in FIG. 69 prior to the upwards swiping gesture, "Extra" now appears next to "Lettuce" after the upwards swipe. FIG. 71, meanwhile, illustrates a UI 7100 after the operator has provided a downwards swipe. As illustrated, the menu 6902 has now moved upwards based on the downwards swipe, such that the option "No" is now adjacent to the selected modifier icon "Lettuce". FIG. 72, meanwhile, illustrate an example UI 7200 after the operator has removed the touch input from the touchscreen of the FOH device while the option "No" was adjacent to "Lettuce". In response, the UI 7200 has changed the modifier to include the option (from "Lettuce" to "No Lettuce") at 7202. In addition, while this example describes visually providing feedback to the user (e.g., by changing the icon from "Lettuce" to "No Lettuce"), the techniques may additionally or alternatively provide other types of feedback, such as audible feedback, haptic feedback, and/or the like.

FIG. 72 further illustrates that the operator has provided a selection 7204 of another modifier ("Fried Onions"). FIG. 73 illustrates an example UI 7300 that the FOH device may present in response. As illustrated, the UI 7300 again includes a menu of options 7302, although in this instance the menu 7302 appears on the left side of the selected modifier. Again, the operator may swipe upwards or downwards to move the menu to the desired location for selecting the desired option. Further, while the examples of FIGS. 68-73 illustrate the menu of options moving opposite the trajectory of the swiping gesture of the operator, in some instances the menu may move correspondingly to (i.e., in the same direction as) the swiping gesture.

While the above examples describe a few examples for modifying an item, such as swiping up or down, swiping with a threshold speed, or the like, other examples may enable modification of an item based on one or more additional or alternative gestures. For example, the device includes a touch sensor configured to determine an amount of force being applied to the display and may associate a particular modifier with the item based on the level of force. For example, if a user lightly touches an icon "lettuce", this may result in the icon displaying "no lettuce", whereas if they press harder, the icon may change to "extra lettuce", or the like. Further, the devices may be configured to modify an item based on any combination of inputs, such as force, speed, audible commands, and/or the like. Further, the device may be configured to output numerous types of output signals to indicate the addition of the modifier, such as an audible tone, a haptic response, a visual response, or the like.

Automatic Generation of Seating-Area Layouts

FIG. 74 illustrates the example architecture 100 of FIG. 1. Here, a merchant, such as example user 104(2), operates a merchant device, such as example FOH device 106(2), to capture image data of the establishment 102. For example, the FOH device 106(2) may utilize one or more LiDAR sensors 200 (e.g. a camera, lighting source, etc.) to generate sensor data of the environment. For example, the LiDAR sensors 200 of the device may comprise a light source that illuminates some or a portion of the environment and a camera that generates data indicative of an amount and timing of the reflection of the light emitted by the light source. The merchant device may then analyze this sensor data or send this sensor data to the remote service 112 or another device for analysis. The analysis may be effective to identify one or more surfaces (e.g., flat surfaces) in the establishment 102 that meet certain criteria. In addition, the merchant device may present a UI 7400 to enable the merchant to indication which identified surfaces correspond to seating areas and which do not. After receiving the respective indications from the merchant, the merchant device, the remote service 112, or another device may generate and present on the merchant device a layout of available seating areas in the establishment. Of course, while this example describes automatically generating a seating layout of an establishment, it is to be appreciated that the techniques may apply to automatically generating any other kind of establishment layout. For example, the techniques may be used for generating a layout of a clothing store (e.g., indicating locations where clothes are displayed), a grocery store (indicating locations where food items are located), a classroom (identifying locations where students sit), and/or any other type of establishment layout.

Furthermore, it is to be appreciated that the generated layout(s) may be used in conjunction with the techniques described above with reference to FIGS. 1-73. For example, after generating a layout of an establishment, this layout may be used to determine which FOH devices are associated with (e.g., responsible for) which seating areas within the establishment. This information, in turn, may be used to determine which FOH and/or BOH devices to establish communication session(s) with in order to clarify an order or the like, as described above. Stated otherwise, the techniques described below with reference to FIGS. 74-80 may be used with the techniques described above with reference to FIGS. 1-73, such as to help inform devices in the establishment regarding which communication sessions to establish with which devices.

In some instances, the remote service 112 may be configured to analyze the image data of the establishment 102 and generate the layout of available seating areas. Thus, the user 104(2) may operate the establishment application 210 on the FOH device 106(2) (or other merchant device) to generate image data of the inside of the establishment 102 and send this image data to the remote service over the network 114.

As illustrated, the remote service may comprise one or more processors 7402 and computer-readable media 7404 that stores an instance of an establishment application 7406. In this example, the establishment application 7406 may comprise a data-analysis component 7408, a UI component 7410, a layout component 7412, and a suggestion component 7414, along with sensor data 7416 received from merchant devices and one or more models 7418 for identifying relevant surfaces and determining suggested layouts, as described below. Here, flat surfaces are identified as relevant surfaces, however, depending on the establishment (identified for example via inventory of items offered), the surfaces can be defined in other ways, such as retail surfaces (where in a retail establishment clothes are hanged), or ecommerce surfaces (wherein a grocery store, shelves are arranged) and so on.

The data-analysis component 7408 may function to receive image or other sensor data received from the FOH device 106(2) and analyze the data to identify candidate flat surfaces in the environment. In some instances, the data-analysis component 7408 uses computer-vision (CV) techniques and trained machine-learning models to identify the flat surface. In other instances, the data-analysis component 7408 uses LiDAR techniques to identify these surfaces.

In one implementation, the LiDAR sensor performs a scan to collect scanner data that comprises a plurality of scan points. Each scan point specifies the range to a surface that was imaged by the LiDAR sensor when emitting a laser pulse in a particular direction. The sensor data is then mapped to known surface data to determine the sensor data that corresponds to known surface data within threshold error. In one implementation, the ML models, such as unsupervised training models or supervised training models, can be used to identify surfaces, such as dining surfaces, retail surfaces, where the server or the merchant can provide definitions of such surfaces. The dining surface can be any surface that is substantially flat and has a specific dimension to allow the dishes to be laid out. The dining surface for another section of the establishment may have dimensions enough to accommodate only certain items, such as drinks. The sensor data can also be used to identify furniture, or other stationary objects, within the environment. In some implementations, a layout API can provide architectural sketches of the environment, or comparable environment from similar merchants, that feeds into the data-analysis component 7408. The layout API can also include data such as restaurant menu, inventory, most requested items, etc., to use as training data in the ML models.

In one example, the data-analysis component 7408 may analyze the received image data to identify surfaces that meet certain criteria. In some instances, the criteria may comprise surfaces that are substantially parallel to a horizontal plane, surfaces having a surface area that is greater than a threshold surface area, surfaces having a width and/or length that are greater than a respective threshold width and/or length, surfaces that are elevated a certain distance from a floor (e.g., greater than two feet), surfaces that are within a certain range of the floor (e.g., two feet to six feet), and/or the like. These criteria help ensure that the identified candidate flat surfaces correspond to potential seating areas, as opposed to non-seating area flat surfaces, such as the tops or sides of cabinets, or the like. In addition, or in the alternative, the data-analysis component 7408 may analyze the received image data to determine a level of glare or reflection, which in turn may be used to determine whether an otherwise flat surface corresponds to a seating location. For example, given that tables may have some glare while carpet may not, this data may be used by the trained model(s) for disambiguating an available seating area from other flat surfaces, such as the floor.

After the data-analysis component 7408 identifies the candidate flat surface, the UI component 7410 may generate a UI for presentation on the merchant device to enable the merchant to select which candidate flat surfaces corresponding to available seating areas and/or which do not. FIG. 78, for instance, illustrates an example UI 7800 that that UI component 7410 may generate and send to the merchant device. As illustrated, the UI 7800 may comprise the image data 7802 captured by the camera of the merchant device, overlaid with respective indications 7804(1), 7804(2), and 7804(3) of flat surfaces within the environment that the data-analysis component 7408 has identified as meeting the specified criteria. In some instances, the layout generated as a result of the image 7802 can also indicate depth, height and other measurements to create a layout of the entire establishment with demarcated surfaces.

In one example, augmented reality (AR), virtual reality, mixed reality, or a combination thereof can be used to record the "scene" and insert virtual objects in the real environment. In one implementation, the virtual objects can be overlaid on a live camera feed with flat surfaces identified via the LiDAR sensors. In another implementation, the LiDAR modeled environment can act as the virtual canvas on which virtual objects are overlaid without interacting with the live camera feed. Additionally, or alternatively, relevant aspects of the real environment of the establishment can be embedded into a virtual layout (e.g., a restaurant canvas, a retail store canvas, a brick or mortar grocery store canvas, etc.) or restyling a virtual world to better match real-time conditions. Elements of a real-time environment can be incorporated in the scene generated by the augmented layout. Elements can be weather conditions, time parameters, mandatory elements of the establishment (POS devices, furniture, tableside devices, servers, etc.) can be utilized to augment the layout. In another example, moving elements (e.g., servers taking orders, clothing racks, etc.) can be detected using the data-analysis component 7408 and incorporated into the scene. This can involve overlaying the content on real-world imagery (for example, in near real-time) via the computing device, such that the user of the computing device sees a combination of the real-world imagery with the AR content seamlessly. In addition, the UI 7800 includes a request 7806 to "select which flat surfaces are available seating areas". In some instances, the merchant may use the touchscreen display or other input mechanism on the merchant device to select which of the identified candidate flat surfaces 7804(1)-(3) represent available seating areas in the establishment. For example, the UI 7800 may request that the merchant touch those flat surfaces that correspond to available seating areas. In addition, the UI 7800 may enable the merchant to specify the number and/or position of available seats at each seating area.

FIG. 79, for instance, illustrates an example UI 7900 after merchant has selected which of the candidate flat surfaces correspond to available seating areas. In this example, the merchant has indicated that each of the three flat surfaces 7804(1)-(3) correspond to available seating areas. After providing these selections and/or indicating that the merchant is done, the UI 7900 may present a menu 7902 requesting the merchant to indicate whether they are ready to create a layout or whether they would like to continue scanning the establishment 102 (e.g., walking through the establishment and generating image data of the establishment 102).

Returning to FIG. 74, after the merchant provides input back to the establishment application 7406 regarding which of the identified candidate flat surfaces correspond to available seating areas in the establishment 102 and has requested that a layout be generated, the layout component 7412 may generate a layout of available seating areas in the establishment. FIG. 80, for instance, illustrates an example UI 8000 that the layout component 7412 may generate. As illustrated, the UI 8000 indicates, in this example, that the layout of the establishment includes an area 8002 of tables and an area 8004 of bar seats. In some instances, the UI 8000 may provide editing tools to enable the merchant to add, remove, or change parts of the layout. Further, in some instances, the UI 8000 may include AR objects overlaid onto the layout to enable the merchant to view what the establishment would look like under normal operating conditions. For example, the UI 8000 may enable the operator of the device to superimpose a layer that includes servers, other employees, appliances, items, and/or any other type of AR objects that, when presented on the UI 8000, enables the operator to better understand the generated layout if adopted in the establishment.

Returning again to FIG. 74, the suggestion component 7414 may function to generate one or more layout suggestions and present these suggestions to the merchant. For example, after the layout component 7412 generates the layout, the suggestion component 7414 may analyze the generated layout to determine whether additional tables can be placed in the establishment, whether a more efficient layout can be created, or the like. In some instances, the suggestion component 7412 may use one or more trained machine-learning models that receive the layout as input and output one or more alternative layouts that may be suggested to the merchant.

FIG. 75 illustrates a flow diagram of an example process 7500 for generating a layout of available seating areas in an establishment. In some instances, the process 7500, as well as the processes described below, may be performed in whole or in part by a merchant device, the remote service 112, and/or a combination thereof. An operation 7502 represents generating image data of a physical establishment of a merchant using a camera of a merchant device. An operation 7504 represents determining whether any flat surfaces and corresponding locations have been identified based on analysis of the image data. If not, then an operation 7506 represents presenting an indication (e.g., on the merchant device) that no flat surface has been identified.

If one or more flat surfaces and their respective locations in the establishment are identified, however, then an operation 7508 represents presenting, on a display of the merchant device, the image data overlaid with respective indications of identified flat surfaces. For example, this operation may include presenting the UI 7800 on the merchant device. An operation 7510 represents receiving a selection of first flat surface, the selection indicating that the first flat surface represents an available seating area in the physical establishment. Again, this selection may be received via the UI 7800 or in any other manner. An operation 7512, meanwhile, represents receiving an indication of a number of available seats associated with the available seating location at the first location associated with first flat surface. In some instances, the merchant uses the merchant device to provide this indication of the number of available seats.

An operation 7514 represents receiving a selection of the second flat surface, the selection of the second flat surface indicating that the second flat surface is not an available seating area. For example, the merchant may use the UI 7800 to provide the selection indicating that the second flat surface is not an available seating area. An operation 7516 represents generating, based least in part on the first and second selections, a layout of available seating areas in the physical establishment, the layout of seating areas indicating that the first flat surface is an available seating at the first location. An operation 7518 represents presenting the layout on the display of the merchant device. For example, this operation may comprise presenting the UI 8000 on the merchant device.

FIG. 76 illustrates a flow diagram of another example process 7400 for determining a suggested layout of available seating areas in an establishment. An operation 7402 represents analyzing the image data to determine a suggested layout of available seating areas in the establishment of the merchant. For example, this operation may comprise the suggestion component 7414 inputting the image data and/or the generated layout into a trained machine-learning model. An operation 7604 represents determining whether a suggested layout has been determined. If not, then the process may end at an operation 7608. If a suggested layout is determined, however, then an operation 7606 represents presenting the suggested layout of available seating areas on the display of the merchant device.

Once the layout has been derived, and AR content objects have been generated based on the derived views of the layout, the AR objects could be overlaid on top of the layout. Thus, an operation 7610 represents determining whether a request has been received (e.g., from a user operating the device) to add AR objects to the suggested layout, as noted above. If so, then an operation 7612 represents embedding one or more AR objects into the suggested layout. If not, then the process may end at an operation 7614. The operation 7612 may comprise generating the AR objects based on one or more characteristics of the physical establishment, such as a type of establishment, objects within the establishment, and/or the like. For example, if the establishment comprises a restaurant, then the generated AR objects may comprise servers, food items, and the like. If the establishment comprises a clothing store, the generated AR objects may comprise clothing items and/or the like. The operation 7612 may further comprise associating the AR objects with the image data (e.g., the presented layout) and modifying the presented layout to include the generated AR objects. Modifying the presented layout may comprise showing the AR objects in the same view as the presented layout in response to a user request to do so (e.g., a request to present a layer associated with the AR objects) or, in some instances, modifying the generated layout itself based on the AR objects. For instance, the surfaces identified in the layout may be modified based on the location of the AR objects.

It should be appreciated that the set of AR content objects could be obtained in any suitable manner, including for example, based on a search query of AR object database (e.g., a search for AR content objects that are associated with one or more descriptors that are associated with one or more views of layout), based on a characteristic of the initial map (e.g., dimensions, architectural sketch, an indication of the type of establishment, etc.), based on a user selection, recommendation or request (e.g., by an advertiser, merchant, etc.), or based on a context of an intended use of a user (e.g., based on what activities a user wishes to capture (e.g., shopping, dining, gaming, etc.).

FIG. 77 illustrates a flow diagram of another example process 7700 for generating a layout of example seating areas in an establishment. An operation 7702 represents receiving data from a device in an environment. For example, this operation may comprise receiving image data from a merchant device, such as the example FOH device 106(2).

An operation 7704 represents determining whether any flat surfaces and corresponding locations have been identified. If not, then the process 7700 ends at an operation 7706. If so, however, then an operation 7708 represents generating a UI indicating the identified flat surfaces and an operation 7710 represents sending the UI to the device, such as the merchant device. In some instances, identifying the flat surfaces and their corresponding locations may comprise inputting the data into one or more trained machine-learning models, using LIDAR techniques to identify the flat surfaces and their X, Y or X, Y, Z locations in the establishment, or the like.

An operation 7712 represents receiving, from the device, a selection of first flat surface indicating that the first flat surface represents an available seating area in the environment. For example, this selection may be received via the example UI 7900. An operation 7714 represents generating, based at least in part on the selection, a layout of available seating areas in the environment, the layout of seating areas indicating that the first flat surface is an available seating at the first location, while an operation 7716 represents sending the layout of the available seating areas to the device. For example, this operation may comprise sending the UI 8000 to the merchant device. The generated layout may then be used for performing any of the techniques described above with reference to operations of the establishment applications 210 executing on the BOH and/or FOH devices.

Example Environments and Systems

FIG. 81 illustrates an example environment 8100. The environment 8100 includes server computing device(s) 8102 that can communicate over a network 81104 with user devices 8106 (which, in some examples can be merchant devices 8108 (individually, 8108(A)-8108(N))) and/or server computing device(s) 8110 associated with third-party service provider(s). The server computing device(s) 8102 can be associated with a service provider 8112 that can provide one or more services for the benefit of users 8114, as described below. Actions attributed to the service provider 8112 can be performed by the server computing device(s) 8102.

In some instances, the merchant devices 8108 and/or the user devices 8106 may correspond to the BOH and/or FOH devices 200 described above. Further, the service computing devices 8102 of the service provider 8112 may correspond to server computing devices of the remote service 112, as described in detail above.

With reference to FIG. 81, the server computing device(s) 8102 can correspond to the server computing device(s) of the remote service 112. Furthermore, the user devices 8106 can correspond to the FOH/BOH devices, or other merchant and/or customer devices. In at least one example, the service provider 8112 can correspond to the remote service 112 described above.

The environment 8100 can include a plurality of user devices 8106, as described above. Each one of the plurality of user devices 8106 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 8114. The users 8114 can be referred to as customers, buyers, merchants, sellers, borrowers, employees, employers, payors, payees, couriers, and so on. The users 8114 can interact with the user devices 8106 via user interfaces presented via the user devices 8106. In at least one example, a user interface can be presented via a web browser, or the like. In other examples, a user interface can be presented via an application, such as a mobile application or desktop application, which can be provided by the service provider 8112 or which can be an otherwise dedicated application. In at least one example, a user 8114 can interact with the user interface via touch input, spoken input, or any other type of input.

As described above, in at least one example, the users 8114 can include merchants 8116 (individually, 8116(A)-8116(N)). In an example, the merchants 8116 can operate respective merchant devices 8108, which can be user devices 8106 configured for use by merchants 8116. For the purpose of this discussion, a "merchant" can be any entity, or employee/associate of the entity, that offers items (e.g., goods or services) for purchase or other means of acquisition (e.g., rent, borrow, barter, etc.). The merchants 8116 can offer items for purchase or other means of acquisition via brick-and-mortar stores, mobile stores (e.g., pop-up shops, food trucks, etc.), online stores, combinations of the foregoing, and so forth. In some examples, at least some of the merchants 8116 can be associated with a same entity but can have different merchant locations and/or can have franchise/franchisee relationships. In additional or alternative examples, the merchants 8116 can be different merchants. That is, in at least one example, the merchant 8116(A) is a different merchant than the merchant 8116(B) and/or the merchant 8116(C).

For the purpose of this discussion, "different merchants" can refer to two or more unrelated merchants. "Different merchants" therefore can refer to two or more merchants that are different legal entities that do not share accounting, employees, branding, etc. "Different merchants," as used herein, have different names, employer identification numbers (EIN)s, lines of business (in some examples), inventories (or at least portions thereof), and/or the like. That is, the use of the term "different merchants" does not refer to a merchant with various merchant locations or franchise/franchisee relationships.

Each merchant device 8108 can have an instance of a POS application 8118 stored thereon. The POS application 8118 can configure the merchant device 8108 as a POS terminal, which enables the merchant 8116(A) to interact with one or more customers 8120. As described above, the users 8114 can include customers, such as the customers 8120 shown as interacting with the merchant 8116(A). For the purpose of this discussion, a "customer" can be any entity that acquires items from merchants. While only two customers 8120 are illustrated in FIG. 81, any number of customers 8120 can interact with the merchants 8116. Further, while FIG. 81 illustrates the customers 8120 interacting with the merchant 8116(A), the customers 8120 can interact with any of the merchants 8116.

In at least one example, interactions between the customers 8120 and the merchants 8116 that involve the exchange of funds (from the customers 8120) for items (from the merchants 8116) can be referred to as "POS transactions" and/or "transactions." In at least one example, the POS application 8118 can determine transaction data associated with the POS transactions. Transaction data can include payment information, which can be obtained from a reader device 8122 associated with the merchant device 8108(A), user authentication data, purchase amount information, point-of-purchase information (e.g., item(s) purchased, date of purchase, time of purchase, etc.), etc. The POS application 8118 can send transaction data to the server computing device(s) 8102. Furthermore, the POS application 8118 can present a UI to enable the merchant 8116(A) to interact with the POS application 8118 and/or the service provider 8112 via the POS application 8118.

In at least one example, the merchant device 8108(A) can be a special-purpose computing device configured as a POS terminal (via the execution of the POS application 8118). In at least one example, the POS terminal may be connected to a reader device 8122, which is capable of accepting a variety of payment instruments, such as credit cards, debit cards, gift cards, short-range communication-based payment instruments, and the like, as described below. In some examples, the reader device 8122 can read information from alternative payment instruments including, but not limited to, wristbands and the like.

The POS terminal can be paired with a reader device 8122 to comprise a POS system 8124. The reader device 8122 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments. The POS terminal may provide a rich user interface, communicate with the reader device 8122, and communicate with the server computing device(s) 8102, which can provide, among other services, a payment processing service. The service provider 8112 can communicate with server computing device(s) 8110, as described below. In this manner, the POS terminal and reader device 8122 may collectively process transaction(s) between the merchants 8116 and customers 8120. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device).

While, the POS terminal and the reader device 8122 of the POS system 8124 are shown as separate devices, in additional or alternative examples, the POS terminal and the reader device 8122 can be part of a single device. In some examples, the reader device 8122 can have a display integrated therein for presenting information to the customers 8120. In additional or alternative examples, the POS terminal can have a display integrated therein for presenting information to the customers 8120. POS systems, such as the POS system 8124, may be mobile, such that POS terminals and reader devices may process transactions in disparate locations across the world. POS systems can be used for processing card-present transactions and card-not-present (CNP) transactions, as described below.

A card-present transaction is a transaction where both a customer 8120 and his or her payment instrument are physically present at the time of the transaction. Card-present transactions may be processed by swipes, dips, taps, or any other interaction between a physical payment instrument (e.g., a card) and a reader device 8122 whereby the reader device 8122 is able to obtain payment data from the payment instrument. A swipe is a card-present transaction where a customer 8120 slides a card, or other payment instrument, having a magnetic strip through a reader device 8122 that captures payment data contained in the magnetic strip. A dip is a card-present transaction where a customer 8120 inserts a payment instrument having an embedded microchip (i.e., chip) into a reader device 8122 first. The dipped payment instrument remains in the payment reader until the reader device 8122 prompts the customer 8120 to remove the card, or other payment instrument. While the payment instrument is in the reader device 8122, the microchip can create a one-time code which is sent from the POS system 8124 to the server computing device(s) 8110 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 8120 may tap or hover his or her payment instrument (e.g., card, electronic device such as a smart phone running a payment application, etc.) over a reader device 8122 to complete a transaction via short-range communication (e.g., NFC, RFID, Bluetooth®, BLE, etc.). Short-range communication enables the payment instrument to exchange information with the reader device 8122. A tap may also be called a contactless payment.

A CNP transaction is a transaction where a card, or other payment instrument, are not physically present at the POS such that payment data is required to be manually keyed in (e.g., by a merchant, customer, etc.), or payment data is required to be recalled from a card-on-file data store, to complete the transaction.

The POS system 8124, the server computing device(s) 8102, and/or the server computing device(s) 8110 may exchange payment information and transaction data to determine whether transactions are authorized. For example, the POS system 8124 may provide encrypted payment data, user authentication data, purchase amount information, point-of-purchase information, etc. (collectively, transaction data) to server computing device(s) 8102 over the network(s) 81104. The server computing device(s) 8102 may send the transaction data to the server computing device(s) 8110. As described above, in at least one example, the server computing device(s) 8110 can be associated with third-party service providers that provide payment services, including but not limited to, an acquirer bank, an issuer, and/or a card payment network (e.g., Mastercard®, VISA®, etc.).

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 8110 associated therewith) can send a fund transfer request to a server computing device of a card payment network (e.g., Mastercard®, VISA®, etc.) to determine whether the transaction is authorized or deficient. In at least one example, the service provider 8112 can serve as an acquirer and connect directly with the card payment network.

The card payment network (e.g., the server computing device(s) 8110 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 8110 associated therewith) can make a determination as to whether the customer has the capacity to absorb the relevant charge associated with the payment transaction. In at least one example, the service provider 8112 can serve as an issuer and/or can partner with an issuer. The transaction is either approved or rejected by the issuer and/or the card payment network (e.g., the server computing device(s) 8110 associated therewith), and a payment authorization message is communicated from the issuer to the POS device via a path opposite of that described above, or via an alternate path.

As described above, the server computing device(s) 8110, which can be associated with payment service provider(s), may determine whether the transaction is authorized based on the transaction data, as well as information relating to parties to the transaction (e.g., the customer 8120 and/or the merchant 8116(A)). The server computing device(s) 8110 may send an authorization notification over the network(s) 81104 to the server computing device(s) 8102, which may send the authorization notification to the POS system 8124 over the network(s) 81104 to indicate whether the transaction is authorized. The server computing device(s) 8102 may also transmit additional information such as transaction identifiers to the POS system 8124. In one example, the server computing device(s) 8102 may include a merchant application and/or other functional modules for communicating with the POS system 8124 and/or the server computing device(s) 8110 to authorize or decline transactions.

Based on the authentication notification that is received by the POS system 8124 from server computing device(s) 8110, the merchant 8116(A) may indicate to the customer 8120 whether the transaction has been approved. In some examples, approval may be indicated at the POS system 8124, for example, at a display of the POS system 8124. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 8112 can provide, among other services, payment processing services, inventory management services, catalog management services, business banking services, financing services, web-development services, payroll services, employee management services, appointment services, restaurant management services, order management services, delivery/courier services, peer-to-peer payment services, onboarding services, identity verification (IDV) services, and so on. In some examples, the users 8114 can access all of the services of the service provider 8112. In other examples, the users 8114 can have gradated access to the services, which can be based on risk tolerance, IDV outputs, subscriptions, and so on. In at least one example, access to such services can be availed to the merchants 8116 via the POS application 8118. In additional or alternative examples, each service can be associated with its own access point (e.g., application, web browser, etc.).

The service provider 8112 can offer payment processing services for processing payments on behalf of the merchants 8116, as described above. For example, the service provider 8112 can provision payment processing software, payment processing hardware and/or payment processing services to merchants 8116, as described above, to enable the merchants 8116 to receive payments from the customers 8120 when conducting POS transactions with the customers 8120. For instance, the service provider 8112 can enable the merchants 8116 to receive cash payments, payment card payments, and/or electronic payments from customers 8120 for POS transactions and the service provider 8112 can process transactions on behalf of the merchants 8116.

As the service provider 8112 processes transactions on behalf of the merchants 8116, the service provider 8112 can maintain accounts or balances for the merchants 8116 in one or more ledgers. For example, the service provider 8112 can analyze transaction data received for a transaction to determine an amount of funds owed to a merchant 8116(A) for the transaction. In at least one example, such an amount can be a total purchase price less fees charged by the service provider 8112 for providing the payment processing services. Based on determining the amount of funds owed to the merchant 8116(A), the service provider 8112 can deposit funds into an account of the merchant 8116(A). The account can have a stored balance, which can be managed by the service provider 8112. The account can be different from a conventional bank account at least because the stored balance is managed by a ledger of the service provider 8112 and the associated funds are accessible via various withdrawal channels including, but not limited to, scheduled deposit, same-day deposit, instant deposit, and a linked payment instrument.

A scheduled deposit can occur when the service provider 8112 transfers funds associated with a stored balance of the merchant 8116(A) to a bank account of the merchant 8116(A) that is held at a bank or other financial institution (e.g., associated with the server computing device(s) 8110). Scheduled deposits can occur at a prearranged time after a POS transaction is funded, which can be a business day after the POS transaction occurred, or sooner or later. In some examples, the merchant 8116(A) can access funds prior to a scheduled deposit. For instance, the merchant 8116(A) may have access to same-day deposits (e.g., wherein the service provider 8112 deposits funds from the stored balance to a linked bank account of the merchant on a same day as POS transaction, in some examples prior to the POS transaction being funded) or instant deposits (e.g., wherein the service provider 8112 deposits funds from the stored balance to a linked bank account of the merchant on demand, such as responsive to a request). Further, in at least one example, the merchant 8116(A) can have a payment instrument that is linked to the stored balance that enables the merchant to access the funds without first transferring the funds from the account managed by the service provider 8112 to the bank account of the merchant 8116(A).

In at least one example, the service provider 8112 may provide inventory management services. That is, the service provider 8112 may provide inventory tracking and reporting. Inventory management services may enable the merchant 8116(A) to access and manage a database storing data associated with a quantity of each item that the merchant 8116(A) has available (i.e., an inventory). Furthermore, in at least one example, the service provider 8112 can provide catalog management services to enable the merchant 8116(A) to maintain a catalog, which can be a database storing data associated with items that the merchant 8116(A) has available for acquisition (i.e., catalog management services). In at least one example, the catalog may include a plurality of data items and a data item of the plurality of data items may represent an item that the merchant 1461(A) has available for acquisition.

In at least one example, the service provider 8112 can provide business banking services, which allow the merchant 8116(A) to track deposits (from payment processing and/or other sources of funds) into an account of the merchant 8116(A), payroll payments from the account (e.g., payments to employees of the merchant 8116(A)), payments to other merchants (e.g., business-to-business) directly from the account or from a linked debit card, withdrawals made via scheduled deposit and/or instant deposit, etc. Furthermore, the business banking services can enable the merchant 8116(A) to check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 8116 to visualize their cash flow to track their financial health, set aside money for upcoming obligations (e.g., savings), organize money around goals, etc.

In at least one example, the service provider 8112 can provide financing services and products, such as via business loans, consumer loans, fixed term loans, flexible term loans, and the like. In at least one example, the service provider 8112 can utilize one or more risk signals to determine whether to extend financing offers and/or terms associated with such financing offers.

In at least one example, the service provider 8112 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 8112 can offer different types of capital loan products. For instance, in at least one example, the service provider 8112 can offer a daily repayment loan product, wherein a capital loan is repaid daily, for instance, from a portion of transactions processed by the payment processing service on behalf of the borrower. Additionally and/or alternatively, the service provider 8112 can offer a monthly repayment loan product, wherein a capital loan is repaid monthly, for instance, via a debit from a bank account linked to the payment processing service.

Additionally or alternatively, the service provider 8112 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 8116. The service provider 8112 can generate the loan based at least in part on determining that the borrower purchased or intends to purchase the item from the merchant. The loan can be associated with a balance based on an actual purchase price of the item and the borrower can repay the loan overtime. In some examples, the borrower can repay the loan via installments, which can be paid via a stored balance associated with the service provider 8112. The service provider 8112 can offer specific financial products, such as payment instruments, tied specifically to the loan products. For example, in one implementation, the server provider 8112 associate capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 8112 can provide web-development services, which enable users 8114 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presence, such as social media posts for example.

Furthermore, the service provider 8112 can provide payroll services to enable employers to pay employees for work performed on behalf of employers. In at least one example, the service provider 8112 can receive data that includes time worked by an employee, sales made by the employee, gratuities received by the employee, and so forth. Based on such data, the service provider 8112 can make payroll payments to employee(s) on behalf of an employer via the payroll service. For instance, the service provider 8112 can facilitate the transfer of a total amount to be paid out for the payroll of an employee from the bank of the employer to the bank of the service provider 8112 to be used to make payroll payments. In at least one example, when the funds have been received at the bank of the service provider 8112, the service provider 8112 can pay the employee, such as by check or direct deposit, often a day, a week, or more after when the work was actually performed by the employee. In additional or alternative examples, the service provider 8112 can enable employee(s) to receive payments via same-day or instant deposit based at least in part on risk and/or reliability analyses performed by the service provider 8112.

Moreover, in at least one example, the service provider 8112 can provide employee management services for managing schedules of employees. Further, the service provider 8112 can provide appointment services for enabling users 8114 to set schedules for scheduling appointments and/or users 8114 to schedule appointments.

In some examples, the service provider 8112 can provide restaurant management services to enable users 8114 to make and/or manage reservations, to monitor front-of-house and/or back-of-house operations, and so on. In at least one example, the service provider 8112 can provide order management services and/or delivery services to enable restaurants to manage open tickets, split tickets, and so on and/or manage delivery services. In some examples, such services can be associated with restaurant merchants, as described above. In additional or alternative examples, such services can be any type of merchant.

As described above, the service provider 8112 can provide courier services, wherein couriers can travel between multiple locations to provide delivery services, photography services, etc. Couriers can be users 8114 who can travel between locations to perform services for a requesting user 8114 (e.g., deliver items, capture images, etc.). In some examples, the courier can receive compensation from the service provider 8112. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations.

In at least one example, the service provider 8112 can provide a peer-to-peer payment service that enables peer-to-peer payments between two or more users 8114. In at least one example, the service provider 8112 can communicate with instances of a payment application (or other access point) installed on devices 8106 configured for operation by users 8114. In an example, an instance of the payment application executing on a first device operated by a payor can send a request to the service provider 8112 to transfer an amount of funds (e.g., fiat currency or non-fiat currency such as cryptocurrency, securities, and related assets) from an account of the payor to an account of a payee (e.g., a peer-to-peer payment). The service provider 8112 can facilitate the transfer and can send a notification to an instance of the payment application executing on a second mobile device operated by the payee that the transfer is in process (or has been completed). In some examples, the service provider 8112 can send additional or alternative information to the instances of the payment application (e.g., low balance to the payor, current balance to the payor or the payee, etc.). In some examples, the payor can transfer funds to the payee unprompted. In other examples, the payee can send a request for funds to the payor prior to the payor initiating the transfer of funds. The funds transferred can be associated with any digital currency type, including, but not limited to, cash, cryptocurrency, etc.

In at least one example, a user 8114 may be new to the service provider 8112 such that the user 8114 that has not registered (e.g., subscribed to receive access to one or more services offered by the service provider) with the service provider 8112. The service provider 8112 can offer onboarding services for registering a potential user 8114 with the service provider 8112. In some examples, onboarding can involve presenting various questions, prompts, and the like to a potential user 8114 to obtain information that can be used to generate a profile for the potential user 8114. Responsive to the potential user 8114 providing all necessary information, the potential user 8114 can be onboarded to the service provider 8112.

The service provider 8112 can be associated with IDV services, which can be used by the service provider 8112 for compliance purposes and/or can be offered as a service, for instance to third-party service providers (e.g., associated with the server computing device(s) 8110). That is, the service provider 8112 can offer IDV services to verify the identity of users 8114 seeking to use or using their services. Identity verification requires a customer (or potential customer) to provide information that is used by compliance departments to prove that the information is associated with an identity of a real person or entity. In at least one example, the service provider 8112 can perform services for determining whether identifying information provided by a user 8114 accurately identifies the customer (or potential customer) (i.e., Is the customer who they say they are?).

The service provider 8112 is capable of providing additional or alternative services and the services described above are offered as a sampling of services. In at least one example, the service provider 8112 can exchange data with the server computing device(s) 8110 associated with third-party service providers. Such third-party service providers can provide information that enables the service provider 8112 to provide services, such as those described above. In additional or alternative examples, such third-party service providers can access services of the service provider 8112. That is, in some examples, the third-party service providers can be subscribers, or otherwise access, services of the service provider 8112.

Techniques described herein can be configured to operate in both real-time/online and offline modes. "Online" modes refer to modes when devices are capable of communicating with the service provider 8112 (e.g., the server computing device(s) 8102) and/or the server computing device(s) 8110 via the network(s) 81104. In some examples, the merchant device(s) 8108 are not capable of connecting with the service provider 8112 (e.g., the server computing device(s) 8102) and/or the server computing device(s) 8110, due to a network connectivity issue, for example. In additional or alternative examples, the server computing device(s) 8102 are not capable of communicating with the server computing device(s) 8110 due to network connectivity issue, for example. In such examples, devices may operate in "offline" mode where at least some payment data is stored (e.g., on the merchant device(s) 8108) and/or the server computing device(s) 8102 until connectivity is restored and the payment data can be transmitted to the server computing device(s) 8102 and/or the server computing device(s) 8110 for processing.

FIG. 82 depicts an illustrative block diagram illustrating a system 8200 for performing techniques described herein. The system 8200 includes a user device 8202, that communicates with server computing device(s) (e.g., server(s) 8204) via network(s) 8206 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 8202 is illustrated, in additional or alternate examples, the system 8200 can have multiple user devices, as described above with reference to FIG. 81. For example, the user device 8202 can correspond to any one of the merchant computing device 104 the photographer courier computing device 106, or the image capturing device 108, as described above with reference to FIG. 1.

In at least one example, the user device 8202 can be any suitable type of computing device, e.g., portable, semi-portable, semi-stationary, or stationary. Some examples of the user device 8202 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 8202 can be any computing device capable of sending communications and performing the functions according to the techniques described herein. The user device 8202 can include devices, e.g., payment card readers, or modules capable of accepting payments, as described below.

In the illustrated example, the user device 8202 includes one or more processors 8208, one or more computer-readable media 8210, one or more communication interface(s) 8212, one or more input/output (I/O) devices 8214, a display 8216, and sensor(s) 8218.

In at least one example, each processor 8208 can itself comprise one or more processors or processing cores. For example, the processor(s) 8208 can be implemented as one or more microprocessors, microcomputers, microcontrollers, digital signal processors, central processing units, state machines, logic circuitries, and/or any devices that manipulate signals based on operational instructions. In some examples, the processor(s) 8208 can be one or more hardware processors and/or logic circuits of any suitable type specifically programmed or configured to execute the algorithms and processes described herein. The processor(s) 8208 can be configured to fetch and execute computer-readable processor-executable instructions stored in the computer-readable media 8210.

Depending on the configuration of the user device 8202, the computer-readable media 8210 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 8210 can include, but is not limited to, RAM, ROM, EEPROM, flash memory, solid-state storage, magnetic disk storage, optical storage, and/or other computer-readable media technology. Further, in some examples, the user device 8202 can access external storage, such as RAID storage systems, storage arrays, network attached storage, storage area networks, cloud storage, or any other medium that can be used to store information and that can be accessed by the processor(s) 8208 directly or through another computing device or network. Accordingly, the computer-readable media 8210 can be computer storage media able to store instructions, modules or modules that can be executed by the processor(s) 8208. Further, when mentioned, non-transitory computer-readable media exclude media such as energy, carrier signals, electromagnetic waves, and signals per se.

The computer-readable media 8210 can be used to store and maintain any number of functional modules that are executable by the processor(s) 8208. In some implementations, these functional modules comprise instructions or programs that are executable by the processor(s) 8208 and that, when executed, implement operational logic for performing the actions and services attributed above to the user device 8202. Functional modules stored in the computer-readable media 8210 can include a user interface 8220 to enable users to interact with the user device 8202, and thus the server(s) 8204 and/or other networked devices. In at least one example, the user interface 8220 can be presented via a web browser, or the like. In other examples, the user interface 8220 can be presented via an application, such as a mobile application or desktop application, which can be provided by a service provider 8112 associated with the server(s) 8204, or which can be an otherwise dedicated application. In some examples, the user interface 8220 can be the ecommerce user interface 124, the courier user interface 128, or the image capturing user interface 130. In at least one example, a user can interact with the user interface via touch input, spoken input, gesture, or any other type of input. The word "input" is also used to describe "contextual" input that may not be directly provided by the user via the user interface 8220. For example, user's interactions with the user interface 8220 are analyzed using, e.g., natural language processing techniques, to determine context or intent of the user, which may be treated in a manner similar to "direct" user input.

Depending on the type of the user device 8202, the computer-readable media 8210 can also optionally include other functional modules and data, such as other modules and data 8222, which can include programs, drivers, etc., and the data used or generated by the functional modules. In some instances, the other modules and data 8222 may comprise the same functionality and data as that described above with reference to the Merchant device 114 and other client devices. In addition, the computer-readable media 8210 can also store data, data structures and the like, that are used by the functional modules. Further, the user device 8202 can include many other logical, programmatic and physical modules, of which those described are merely examples that are related to the discussion herein.

In at least one example, the computer-readable media 8210 can include additional functional modules, such as an operating system 8224 for controlling and managing various functions of the user device 8202 and for enabling basic user interactions.

The communication interface(s) 8212 can include one or more interfaces and hardware modules for enabling communication with various other devices, such as over the network(s) 8206 or directly. For example, communication interface(s) 8212 can enable communication through one or more network(s) 8206, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 8206 can include both wired and/or wireless communication technologies, including Bluetooth®, BLE, Wi-Fi and cellular communication technologies, as well as wired or fiber optic technologies. Modules used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 8202 can further include one or more input/output (I/O) devices 8214. The I/O devices 8214 can include speakers, a microphone, a camera, and various user controls (e.g., buttons, a joystick, a keyboard, a keypad, etc.), a haptic output device, and so forth. The I/O devices 8214 can also include attachments that leverage the accessories (audio-jack, USB-C, Bluetooth, etc.) to connect with the user device 8202.

In at least one example, user device 8202 can include a display 8216. Depending on the type of computing device(s) used as the user device 8202, the display 8216 can employ any suitable display technology. For example, the display 8216 can be a liquid crystal display, a plasma display, a light emitting diode display, an OLED (organic light-emitting diode) display, an electronic paper display, or any other suitable type of display able to present digital content thereon. In at least one example, the display 8216 can be an augmented reality display, a virtually reality display, or any other display able to present and/or project digital content. In some examples, the display 8216 can have a touch sensor associated with the display 8216 to provide a touchscreen display configured to receive touch inputs for enabling interaction with a graphic interface presented on the display 8216. Accordingly, implementations herein are not limited to any particular display technology. Alternatively, in some examples, the user device 8202 may not include the display 8216, and information can be presented by other means, such as aurally, haptically, etc.

In addition, the user device 8202 can include sensor(s) 8218. The sensor(s) 8218 can include a GPS device able to indicate location information. Further, the sensor(s) 8218 can include, but are not limited to, an accelerometer, gyroscope, compass, proximity sensor, camera, microphone, and/or a switch.

Additionally, the user device 8202 can include various other modules that are not shown, examples of which include removable storage, a power source, such as a battery and power control unit, a barcode scanner, a printer, a cash drawer, and so forth.

In addition, in some examples, the user device 8202 can include, be connectable to, or otherwise be coupled to a reader device 8226, for reading payment instruments and/or identifiers associated with payment objects. In some examples, as described above, the reader device 8226 can plug in to a port in the user device 8202, such as a microphone/headphone port, a data port, or other suitable port. In additional or alternative examples, the reader device 8226 can be coupled to the user device 8202 via another wired or wireless connection, such as via a Bluetooth®, BLE, and so on. The reader device 8226 can include a read head for reading a magnetic strip of a payment card, and further can include encryption technology for encrypting the information read from the magnetic strip. Additionally or alternatively, the reader device 8226 can be an EMV payment reader, which in some examples, can be embedded in the user device 8202. Moreover, numerous other types of readers can be employed with the user device 8202 herein, depending on the type and configuration of the user device 8202.

The reader device 8226 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 8226 may include hardware implementation, such as slots, magnetic tracks, and rails with one or more sensors or electrical contacts to facilitate detection and acceptance of a payment instrument. That is, the reader device 8226 may include hardware implementations to enable the reader device 8226 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 8226 may also include a biometric sensor to receive and process biometric characteristics and process them as payment instruments, given that such biometric characteristics are registered with the payment service system and connected to a financial account with a bank server.

The reader device 8226 may include processing unit(s), computer-readable media, a reader chip, a transaction chip, a timer, a clock, a network interface, a power supply, and so on. The processing unit(s) of the reader device 8226 may execute one or more modules and/or processes to cause the reader device 8226 to perform a variety of functions, as set forth above and explained in further detail in the following disclosure. In some examples, the processing unit(s) may include a central processing unit (CPU), a graphics processing unit (GPU), a CPU and a GPU, or processing units or modules known in the art. Additionally, each of the processing unit(s) may possess its own local memory, which also may store program modules, program data, and/or one or more operating systems. Depending on the exact configuration and type of the reader device 8226, the computer-readable media may include volatile memory (such as RAM), non-volatile memory (such as ROM, flash memory, miniature hard drive, memory card, or the like), or some combination thereof. In at least one example, the computer-readable media of the reader device 8226 may include at least one module for performing various functions as described herein.

The reader chip may perform functionalities to control the operations and processing of the reader device 8226. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 8206, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by modules of reader device 8226. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 8202, which can be a POS terminal, and the reader device 8226 are shown as separate devices, in additional or alternative examples, the user device 8202 and the reader device 8226 can be part of a single device, which may be a battery-operated device. In such an example, modules of both the user device 8202 and the reader device 8226 may be associated with the single device. In some examples, the reader device 8226 can have a display integrated therewith, which can be in addition to (or as an alternative of) the display 8216 associated with the user device 8202.

The server(s) 8204 can include one or more servers or other types of computing devices that can be embodied in any number of ways. For example, in the example of a server, the modules, other functional modules, and data can be implemented on a single server, a cluster of servers, a server farm or data center, a cloud-hosted computing service, a cloud-hosted storage service, and so forth, although other computer architectures can additionally or alternatively be used. In at least one example, the server(s) 8204 can correspond to the server computing device(s) 102 described above with reference to FIG. 1.

Further, while the figures illustrate the modules and data of the server(s) 8204 as being present in a single location, these modules and data can alternatively be distributed across different computing devices and different locations in any manner. Consequently, the functions can be implemented by one or more server computing devices, with the various functionality described above distributed in various ways across the different computing devices. Multiple server(s) 8204 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 8204 can include one or more processors 8228, one or more computer-readable media 8230, one or more I/O devices 8232, and one or more communication interfaces 8234. Each processor 8228 can be a single processing unit or a number of processing units and can include single or multiple computing units or multiple processing cores. The processor(s) 8228 can be implemented as one or more microprocessors, microcomputers, microcontrollers, digital signal processors, central processing units, state machines, logic circuitries, and/or any devices that manipulate signals based on operational instructions. For example, the processor(s) 8228 can be one or more hardware processors and/or logic circuits of any suitable type specifically programmed or configured to execute the algorithms and processes described herein. The processor(s) 8228 can be configured to fetch and execute computer-readable instructions stored in the computer-readable media 8230, which can program the processor(s) 8228 to perform the functions described herein.

The computer-readable media 8230 can include volatile and nonvolatile memory and/or removable and non-removable media implemented in any type of technology for storage of information, such as computer-readable instructions, data structures, program modules, or other data. Such computer-readable media 8230 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 8204, the computer-readable media 8230 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 8230 can be used to store any number of functional modules that are executable by the processor(s) 8228. In many implementations, these functional modules comprise instructions or programs that are executable by the processors 8228 and that, when executed, specifically configure the one or more processors 8228 to perform the actions attributed above to the service provider 8112 and/or payment processing service. Functional modules stored in the computer-readable media 8230 can optionally include a merchant module 8236, a training module 8238, and one or more other modules and data 8240.

The merchant module 8236 can be configured to receive transaction data from POS systems, such as the POS system 8124 described above with reference to FIG. 81. The merchant module 8236 can transmit requests (e.g., authorization, capture, settlement, etc.) to payment service server computing device(s) to facilitate POS transactions between merchants and customers. The merchant module 8236 can communicate the successes or failures of the POS transactions to the POS systems. In some examples, the payment processing module 116, described above, and the merchant module 8236 can perform the same or similar functions.

The training module 8238 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 8202 and/or the server(s) 8204 for use at a time after the data models have been trained (e.g., at runtime).

The one or more other modules and data 8240 can include programs, drivers, etc., and the data used or generated by the functional modules. Further, the server(s) 8204 can include many other logical, programmatic and physical modules, of which those described above are merely examples that are related to the discussion herein. In some instances, the other modules and data 8222 may comprise the same functionality and data as that described above with reference to the remote service 112.

The one or more "modules" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In some examples, a module may include one or more application programming interfaces (APIs) to perform some or all of its functionality (e.g., operations). In additional and/or alternative examples, the module(s) may be implemented as computer-readable instructions, various data structures, and so forth via at least one processing unit to configure the computing device(s) described herein to execute instructions and to perform operations as described herein.

The computer-readable media 8230 can additionally include an operating system 8242 for controlling and managing various functions of the server(s) 8204.

The communication interface(s) 8234 can include one or more interfaces and hardware modules for enabling communication with various other devices, such as over the network(s) 8206 or directly. For example, communication interface(s) 8234 can enable communication through one or more network(s) 8206, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 8206 can include both wired and/or wireless communication technologies, including Bluetooth®, BLE, Wi-Fi and cellular communication technologies, as well as wired or fiber optic technologies. Modules used for such communications can depend at least in part upon the type of network, the environment selected, or both. Protocols for communicating over such networks are well known and will not be discussed herein in detail.

The server(s) 8204 can further be equipped with various I/O devices 8232. Such I/O devices 8232 can include a display, various user interface controls (e.g., buttons, joystick, keyboard, mouse, touch screen, biometric or sensory input devices, etc.), audio speakers, connection ports and so forth.

In at least one example, the system 8200 can include a datastore 8244 that can be configured to store data that is accessible, manageable, and updatable. In some examples, the datastore 8244 can be integrated with the user device 8202 and/or the server(s) 8204. In other examples, as shown in FIG. 82, the datastore 8244 can be located remotely from the server(s) 8204 and can be accessible to the server(s) 8204. The datastore 8244 can comprise multiple databases and/or servers connected locally and/or remotely via the network(s) 8206.

In at least one example, the datastore 8244 can store user profiles, which can include merchant profiles, customer profiles, courier profiles, and so on, as described above. Furthermore, in at least one example, the datastore 8244 can store inventory database(s) and/or catalog database(s). As described above, an inventory can store data associated with a quantity of each item that a merchant has available to the merchant. Furthermore, a catalog can store data associated with items that a merchant has available for acquisition. The datastore 8244 can store additional or alternative types of data (e.g., image(s) 120, etc.) as described herein.

In at least one example, the datastore 8244 can be associated with a brand asset database, which can store information associated with brand assets associated with merchants. A brand asset can be a logo (e.g., text logo, graphic logo, favicon, etc.), a font, a color, an image, an icon, a button style, effects, spacing, and the like used in association with a brand of the merchant. In some examples, a brand asset can be associated with multiple content items, which can be applicable to different end users and/or intended viewers. For instance, a brand asset corresponding to a logo can be associated with a logo that is presented to customers and a logo that is presented to merchants. In some examples, image(s) captured via techniques described herein can be added to the brand asset database and/or data associated with the brand asset database can be used for informing guidance as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a module or feature "can," "may," "could," or "might" be included or have a characteristic, that particular module or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various techniques described herein refer to "requests" and/or "prompts." For the purpose of this discussion, a "request" or a "prompt" can be a data item transmitted between computing devices described herein with instructions for performing and/or taking an action (e.g., a "request") and/or a recommendation for performing and/or taking an action (e.g., a "prompt"). In some examples, the "requests" and/or "prompts" can be associated with graphical user interface (GUI) elements that are to be presented via a user interface to communicate the instructions to a user of a respective user device.

Various figures included herein are flowcharts showing example methods involving techniques as described herein. The methods illustrated are described for convenience and ease of understanding. However, the methods illustrated are not limited to being performed using modules described in the illustrated figures, and such modules are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, modules, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A method comprising:
    causing, on a display of a front-of-house (FOH) device, a user interface (UI) to be presented, the UI including an icon corresponding to a modifier associated with an item offered by a merchant having a physical establishment;
    receiving a first user input on the display, wherein the first user input comprises swiping or dragging the icon in a first direction beginning at a first location of the display corresponding to the icon and ending at a second location on the display corresponding to the item;
    adding, based at least in part on the first user input, the modifier to the item associated with a food order;
    receiving a second user input on the display, wherein the second user input comprises swiping or dragging the icon in a second direction different from the first direction;

updating, as an updated modifier and based at least in part on the second user input, the modifier on the UI; and presenting, on the display of the FOH device, the item offered by the merchant with the updated modifier.

2. The method of claim 1, wherein the modifier corresponds to one or more ingredients associated with the item of the food order.

3. The method of claim 1, wherein the UI further comprises a visual representation of a time, the method further comprising setting the visual representation of a timer for a predefined amount of time, wherein the FOH device sends an indication of the item to a back-of-house (BOH) device upon expiration of the predefined amount of time.

4. The method of claim 1, wherein the modifier being located adjacent to the item on the display.

5. The method of claim 1, wherein updating the modifier comprises displaying an indication that at least one of the modifier has been added to the food order, the modifier has been removed from the food order, an amount of the modifier associated with the food order has changed, or the modifier is requested as a side item.

6. The method of claim 1, wherein the UI further comprises a menu of options associated with the modifier.

7. The method of claim 1, further comprising:
determining at least one of that the FOH device is physically coupled to another device or is within a threshold proximity of the other device; and
causing presentation, on the display and at least partly in response to determining the at least one of that the FOH device is physically coupled to the other device or is within the threshold proximity of the other device, of a second UI for performing one or more predefined actions.

8. A system comprising:
one or more processors; and
one or more computer-readable media storing computer-executable instructions that, when executed, cause the one or more processors to perform operations comprising:
causing, on a display of a front-of-house (FOH) device, a user interface (UI) to be presented, the UI including an icon corresponding to a modifier associated with an item offered by a merchant having a physical establishment;
receiving a first user input on the display, wherein the first user input comprises swiping or dragging the icon in a first direction beginning at a first location of the display corresponding to the icon and ending at a second location on the display corresponding to the item;
adding, based at least in part on the first user input, the modifier to the item associated with a food order;
receiving a second user input on the display, wherein the second user input comprises swiping or dragging the icon in a second direction different from the first direction;
updating, as an updated modifier and based at least in part on the second user input, the modifier on the UI; and
presenting, on the display of the FOH device, the item offered by the merchant with the updated modifier.

9. The system of claim 8, wherein the modifier corresponds to one or more ingredients associated with the item of the food order.

10. The system of claim 8, wherein the modifier being located adjacent to the item on the display.

11. The system of claim 8, the operations further comprising:
determining at least one of that the FOH device is physically coupled to another device or is within a threshold proximity of the other device; and
causing presentation, on the display and at least partly in response to determining the at least one of that the FOH device is physically coupled to the other device or is within the threshold proximity of the other device, of a second UI for performing one or more predefined actions.

12. The system of claim 8, wherein updating the modifier comprises displaying an indication that at least one of the modifier has been added to the food order, the modifier has been removed from the food order, an amount of the modifier associated with the food order has changed, or the modifier is requested as a side item.

13. The system of claim 8, wherein the UI further comprises a menu of options associated with the modifier.

14. One or more non-transitory computer-readable media storing instructions that, when executed, cause one or more processors to perform acts comprising:
causing, on a display of a front-of-house (FOH) device, a user interface (UI) to be presented, the UI including an icon corresponding to a modifier associated with an item offered by a merchant having a physical establishment;
receiving a first user input on the display, wherein the first user input comprises swiping or dragging the icon in a first direction beginning at a first location of the display corresponding to the icon and ending at a second location on the display corresponding to the item;
adding, based at least in part on the first user input, the modifier to the item associated with a food order;
receiving a second user input on the display, wherein the second user input comprises swiping or dragging the icon in a second direction different from the first direction;
updating, as an updated modifier and based at least in part on the second user input, the modifier on the UI; and
presenting, on the display of the FOH device, the item offered by the merchant with the updated modifier.

15. The one or more non-transitory computer-readable media of claim 14, wherein the modifier corresponds to one or more ingredients associated with the item of the food order.

16. The one or more non-transitory computer-readable media of claim 14, the acts further comprising:
determining at least one of that the FOH device is physically coupled to another device or is within a threshold proximity of the other device; and
causing presentation, on the display and at least partly in response to determining the at least one of that the FOH device is physically coupled to the other device or is within the threshold proximity of the other device, of a second UI for performing one or more predefined actions.

17. The one or more non-transitory computer-readable media of claim 14, wherein the modifier being located adjacent to the item on the display.

18. The one or more non-transitory computer-readable media of claim 14, wherein updating the modifier comprises displaying an indication that at least one of the modifier has been added to the food order, the modifier has been removed from the food order, an amount of the modifier associated with the food order has changed, or the modifier is requested as a side item.

19. The one or more non-transitory computer-readable media of claim 14, wherein the UI further comprises a menu of options associated with the modifier.

20. The system of claim 8, wherein the UI further comprises a visual representation of a time, the operations further comprising setting the visual representation of a timer for a predefined amount of time, wherein the FOH device sends an indication of the item to a back-of-house (BOH) device upon expiration of the predefined amount of time.

* * * * *